United States Patent
Cirik et al.

(10) Patent No.: US 11,632,758 B2
(45) Date of Patent: Apr. 18, 2023

(54) TRANSMISSION AND RECEPTION OF APERIODIC CHANNEL STATE INFORMATION

(71) Applicant: Comcast Cable Communications, LLC, Philadelphia, PA (US)

(72) Inventors: Ali Cirik, Herndon, VA (US); Esmael Dinan, Herndon, VA (US); Hua Zhou, Herndon, VA (US); Hyoungsuk Jeon, Centreville, VA (US); Alireza Babaei, Fairfax, VA (US); Kyungmin Park, Herndon, VA (US); Kai Xu, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 81 days.

(21) Appl. No.: 17/493,282

(22) Filed: Oct. 4, 2021

(65) Prior Publication Data

US 2022/0030579 A1 Jan. 27, 2022

Related U.S. Application Data

(63) Continuation of application No. 16/790,830, filed on Feb. 14, 2020.

(60) Provisional application No. 62/805,543, filed on Feb. 14, 2019.

(51) Int. Cl.
*H04W 72/044* (2023.01)
*H04W 72/1268* (2023.01)
*H04W 72/23* (2023.01)

(52) U.S. Cl.
CPC ..... *H04W 72/046* (2013.01); *H04W 72/1268* (2013.01); *H04W 72/23* (2023.01)

(58) Field of Classification Search
CPC ........ H04W 72/046; H04W 72/1268; H04W 72/23; H04B 7/088
See application file for complete search history.

(56) References Cited

U.S. PATENT DOCUMENTS

| | | | |
|---|---|---|---|
| 11,239,893 B2* | 2/2022 | John Wilson | H04L 5/0051 |
| 2009/0323652 A1 | 12/2009 | Chen et al. | |
| 2013/0040581 A1 | 2/2013 | Alberth et al. | |
| 2013/0051261 A1 | 2/2013 | Kazmi et al. | |
| 2013/0272258 A1 | 10/2013 | Lee et al. | |

(Continued)

FOREIGN PATENT DOCUMENTS

WO 2018174641 A2 9/2018

OTHER PUBLICATIONS

R1-1900731 3GPP TSG RAN WG1 Ad-Hoc Meeting 1901, Taipei, Taiwan, Jan. 21-25, 2019, Source: Ericsson, Title: Additional evaluation results for NC-JT under 5G UMa scenario.

(Continued)

*Primary Examiner* — Jael M Ulysse
(74) *Attorney, Agent, or Firm* — Banner & Witcoff, Ltd.

(57) ABSTRACT

Wireless communications may comprise aperiodic transmission and reception. Control information may be associated with an aperiodic reference signal. A wireless device may be configured to use a first transmission control indicator (TCI) state of at least two TCI states to receive an aperiodic reference signal based on: a scheduling offset, and the aperiodic reference signal overlapping in time with a scheduled physical downlink shared channel (PDSCH).

20 Claims, 33 Drawing Sheets

(56) References Cited

U.S. PATENT DOCUMENTS

| | | | |
|---|---|---|---|
| 2014/0169317 A1 | 6/2014 | Gao et al. | |
| 2015/0223149 A1 | 8/2015 | Liu et al. | |
| 2017/0064770 A1 | 3/2017 | Patwardhan et al. | |
| 2018/0145742 A1 | 5/2018 | Li et al. | |
| 2018/0206132 A1 | 7/2018 | Guo et al. | |
| 2018/0279193 A1 | 9/2018 | Park et al. | |
| 2019/0028167 A1 | 1/2019 | Chang et al. | |
| 2019/0132851 A1* | 5/2019 | Davydov | H04L 5/0053 |
| 2019/0190582 A1* | 6/2019 | Guo | H04L 27/2607 |
| 2019/0260445 A1* | 8/2019 | John | H04B 7/0404 |
| 2019/0297637 A1 | 9/2019 | Liou et al. | |
| 2020/0029274 A1 | 1/2020 | Cheng et al. | |
| 2020/0106168 A1 | 4/2020 | Hakola et al. | |
| 2020/0145062 A1 | 5/2020 | Jung et al. | |
| 2020/0145158 A1* | 5/2020 | Zhou | H04W 72/23 |
| 2020/0145982 A1* | 5/2020 | Cheng | H04W 72/044 |
| 2020/0169995 A1* | 5/2020 | Nam | H04B 7/0404 |
| 2020/0358585 A1 | 11/2020 | Ryu et al. | |
| 2021/0022152 A1* | 1/2021 | Yang | H04L 5/0048 |
| 2021/0167821 A1 | 6/2021 | Chen et al. | |
| 2021/0168714 A1 | 6/2021 | Guan et al. | |
| 2021/0242926 A1* | 8/2021 | Yang | H04B 7/088 |
| 2021/0314128 A1 | 10/2021 | Li et al. | |
| 2021/0392671 A1* | 12/2021 | Liu | H04L 5/0094 |
| 2022/0159568 A1 | 5/2022 | Kim et al. | |

OTHER PUBLICATIONS

R1-1900737 3GPP TSG RAN WG1 Ad-Hoc Meeting 1901, Taipei, Taiwan, Jan. 21-25, 2019, Source: Fraunhofer HHI, Fraunhofer IIS, Title: Enhancements on multi-TRP/panel transmission for ultra-reliable communications.
R1-1900749 3GPP TSG RAN WG1 Ad-Hoc Meeting 1901, Taipei, Taiwan, Jan. 21-25, 2019, Source: Apple, Title: Considerations on PDCCH design for NCJT.
R1-1900750 3GPP TSG RAN WG1 Ad-Hoc Meeting 1901, Taipei, Taiwan, Jan. 21-25, 2019, Source: Apple Inc., Title: Consideration on beam measurement and reporting enhancement.
R1-1900751 3GPP TSG RAN WG1 Ad-Hoc Meeting 1901, Taipei, Taiwan, Jan. 21-25, 2019, Source: Apple, Title: Considerations on separate DL and UL beam reporting.
R1-1900808 3GPP TSG RAN WG1 Ad-Hoc Meeting 1901, Taipei, Taiwan, Jan. 21-25, 2019, Source: InterDigital Inc., Title: Enhanced Reliability for Multi-TRP Transmission.
R1-1900809 3GPP TSG RAN WG1 Ad-Hoc Meeting 1901, Taipei, Taiwan, Jan. 21-25, 2019, Source: InterDigital Inc., Title: On Multi-Beam Operation Enhancement.
R1-1900812 3GPP TSG RAN WG1 Ad-Hoc Meeting 1901, Taipei, Taiwan, Jan. 21-25, 2019, Source: InterDigital Inc., Title: On Solutions for Multi-TRP Transmission.
R1-1900820 3GPP TSG RAN WG1 Ad-Hoc Meeting 1901, Taipei, Taiwan, Jan. 21-25, 2019, Source: MTI, Title: Enhancements on UL Multi-beam Operation.
R1-1900835 3GPP TSG RAN WG1 Ad-Hoc Meeting 1901, Taipei, Taiwan, Jan. 21-25, 2019, Source: Sharp, Title: Discussion on multi-TRP/panel techniques for URLLC.
R1-1900841 3GPP TSG RAN WG1 Ad-Hoc Meeting 1901, Taipei, Taiwan, Jan. 21-25, 2019, Source: Xiaomi, Title: Enhancements on Multi-TRP/Panel Transmission.
R1-1900842 3GPP TSG RAN WG1 Ad-Hoc Meeting 1901, Taipei, Taiwan, Jan. 21-25, 2019, Source: Xiaomi, Title: Enhancements on beam management.
R1-1900843 3GPP TSG RAN WG1 Ad-Hoc Meeting 1901, Taipei, Taiwan, Jan. 21-25, 2019, Source: Huawei, HiSilicon, Title: UL/DL BM for latency/overhead reduction.
R1-1900844 3GPP TSG RAN WG1 Ad-Hoc Meeting 1901, Taipei, Taiwan, Jan. 21-25, 2019, Source: Huawei, HiSilicon, Title: Panel-based UL beam selection.
R1-1900845 3GPP TSG RAN WG1 Ad-Hoc Meeting 1901, Taipei, Taiwan, Jan. 21-25, 2019, Source: Huawei, HiSilicon, Title: Beam measurement and reporting using L1-SINR.
R1-1900846 3GPP TSG RAN WG1 Ad-Hoc Meeting 1901, Taipei, Taiwan, Jan. 21-25, 2019, Source: Huawei, HiSilicon, Title: Beam failure recovery for Scell.
R1-1900848 3GPP TSG RAN WG1 Ad-Hoc Meeting 1901, Taipei, Taiwan, Jan. 21-25, 2019, Source: Huawei, HiSilicon, Title: Single PDCCH based multi-TRP/panel transmission.
R1-1900849 3GPP TSG RAN WG1 Ad-Hoc Meeting 1901, Taipei, Taiwan, Jan. 21-25, 2019, Source: Huawei, HiSilicon, Title: CSI measurement enhancement for multi-TRP/panel transmission.
R1-1900850 3GPP TSG RAN WG1 Ad-Hoc Meeting 1901, Taipei, Taiwan, Jan. 21-25, 2019, Source: Huawei, HiSilicon, Title: Reliability/robustness enhancement with multi-TRP/panel/beam for PDCCH/PUSCH/PUCCH.
R1-1900905 3GPP TSG RAN WG1 Ad-Hoc Meeting 1901, Taipei, Taiwan, Jan. 21-25, 2019, Source: Qualcomm Incorporated, Title: Multi-TRP Enhancements.
R1-1900906 3GPP TSG RAN WG1 Ad-Hoc Meeting 1901, Taipei, Taiwan, Jan. 21-25, 2019, Source: Qualcomm Incorporated, Title: Enhancements on Multi-beam Operation.
R1-1900909 3GPP TSG RAN WG1 Ad-Hoc Meeting 1901, Taipei, Taiwan, Jan. 21-25, 2019, Source: Qualcomm Incorporated, Title: Comparison between Single-CW and Multi-CW for Multi-TRP.
R1-1900944 3GPP TSG RAN WG1 Ad-Hoc Meeting 1901, Taipei, Taiwan, Jan. 21-25, 2019, Source: Motorola Mobility, Lenovo, Title: Power control for multi-panel uplink transmission.
R1-19000978 3GPP TSG RAN WG1 Ad-Hoc Meeting 1901, Taipei, Taiwan, Jan. 21-25, 2019, Source: NTT Docomo, Inc., Title: Enhancements on multi-TRP/panel transmission.
R1-1900979 3GPP TSG RAN WG1 Ad-Hoc Meeting 1901, Taipei, Taiwan, Jan. 21-25, 2019, Source: NTT Docomo, Inc., Title: Discussion on multi-beam enhancement.
R1-1900990 3GPP TSG RAN WG1 Ad-Hoc Meeting 1901, Taipei, Taiwan, Jan. 21-25, 2019, Source: ITRI, Title: Discussion on enhancements on multi-beam operation.
R1-1901076 3GPP TSG RAN WG1 Ad-Hoc Meeting 1901, Taipei, Taiwan, Jan. 21-25, 2019, Source: Samsung, Title: Enhancements on Multi-TRP/Panel Transmission.
R1-1901077 3GPP TSG RAN WG1 Ad-Hoc Meeting 1901, Taipei, Taiwan, Jan. 21-25, 2019, Source: Samsung, Title: Enhancements on multi-beam operations.
R1-1901084 3GPP TSG RAN WG1 Ad-Hoc Meeting 1901, Taipei, Taiwan, Jan. 21-25, 2019, Source: Samsung, Title: Evaluation on SINR metrics for beam selection.
R1-1901085 3GPP TSG RAN WG1 Ad-Hoc Meeting 1901, Taipei, Taiwan, Jan. 21-25, 2019, Source: Samsung, Title: SLS evaluation on Multi-TRP/panel transmission.
R1-1901113 3GPP TSG RAN WG1 Ad-Hoc Meeting 1901, Taipei, Taiwan, Jan. 21-25, 2019, Source: Ericsson, Title: Performance of NC-JT at 30 GHz.
R1-1901114 3GPP TSG RAN WG1 Ad-Hoc Meeting 1901, Taipei, Taiwan, Jan. 21-25, 2019, Source: Ericsson, Title: Rank restriction for NC-JT with independent scheduling.
R1-1901115 3GPP TSG RAN WG1 Ad-Hoc Meeting 1901, Taipei, Taiwan, Jan. 21-25, 2019, Source: Ericsson, Title: Multi-TRP diversity strategies at 4 GHz.
R1-1901116 3GPP TSG RAN WG1 Ad-Hoc Meeting 1901, Taipei, Taiwan, Jan. 21-25, 2019, Source: Ericsson, Title: On the number of TRPs for high reliability at 4 GHz.
R1-1901133 3GPP TSG RAN WG1 Ad-Hoc Meeting 1901, Taipei, Taiwan, Jan. 21-25, 2019, Source: CAICT, Title: Discussion on URLLC reliability/robustness enhancement with multi-TRP/panel.
R1-1901141 3GPP TSG RAN WG1 Ad-Hoc Meeting 1901, Taipei, Taiwan, Jan. 21-25, 2019, Source: KDDI, Title: Discussion on multi-beam operation.
R1-1901153 3GPP TSG RAN WG1 Ad-Hoc Meeting 1901, Taipei, Taiwan, Jan. 21-25, 2019, Source ASUSTeK, Title: Enhancements on multi-TRP or panel transmission.
R1-1901154 3GPP TSG RAN WG1 Ad-Hoc Meeting 1901, Taipei, Taiwan, Jan. 21-25, 2019, Source: ASUSTeK, Title: Enhancements on multi-beam operation.
R1-1901164 3GPP TSG RAN WG1 Ad-Hoc Meeting 1901, Taipei, Taiwan, Jan. 21-25, 2019, Source: Ericsson, Title: Enhancements to multi-beam operation.

(56) References Cited

OTHER PUBLICATIONS

R1-1901201 3GPP TSG RAN WG1 Ad-Hoc Meeting 1901, Taipei, Taiwan, Jan. 21-25, 2019, Source: Ericsson, Title: Further simulation results for UL multi-panel transmission.
R1-1901202 3GPP TSG RAN WG1 Ad-Hoc Meeting 1901, Taipei, Taiwan, Jan. 21-25, 2019, Source: Ericsson, Title: Latency analysis of SCell link recovery solutions.
R1-1901203 3GPP TSG RAN WG1 Ad-Hoc Meeting 1901, Taipei, Taiwan, Jan. 21-25, 2019, Source: Ericsson, Title: On event-driven reporting for beam management.
R1-1901204 3GPP TSG RAN WG1 Ad-Hoc Meeting 1901, Taipei, Taiwan, Jan. 21-25, 2019, Source: Ericsson, Title: Performance of beam selection based on L1-SINR.
R1-1901205 3GPP TSG RAN WG1 Ad-Hoc Meeting 1901, Taipei, Taiwan, Jan. 21-25, 2019, Source: Ericsson, Title: UL beam selection improvements.
R1-1901206 3GPP TSG RAN WG1 Ad-Hoc Meeting 1901, Taipei, Taiwan, Jan. 21-25, 2019, Source: Donvida Wireless, Title: On Beam Failure Recovery for Scell.
R1-1901234 3GPP TSG RAN WG1 Ad-Hoc Meeting 1901, Taipei, Taiwan, Jan. 21-25, 2019, Source: Huawei, HiSilicon, Title: Evaluation results of multi-beam operation.
R1-1901237 3GPP TSG RAN WG1 Ad-Hoc Meeting 1901, Taipei, Taiwan, Jan. 21-25, 2019, Source: Huawei, HiSilicon, Title: Evaluation results for multi-TRP/panel transmission.
R1-1901238 3GPP TSG RAN WG1 Ad-Hoc Meeting 1901, Taipei, Taiwan, Jan. 21-25, 2019, Source: Huawei, HiSilicon, Title: Discussion on the RAN2 spec impact of multi-TRP transmission.
R1-1901266 3GPP TSG RAN WG1 Ad-Hoc Meeting 1901, Taipei, Taiwan, Jan. 21-25, 2019, Source: Huawei, HiSilicon, Title: CW to layer mapping enhancement for single PDCCH based multi-TRP/panel transmission.
R1-1901275 3GPP TSG RAN WG1 Ad-Hoc Meeting 1901, Taipei, Taiwan, Jan. 21-25, 2019, Source: Intel Corporation, Title: On multi-TRP/multi-panel transmission.
R1-1813251 3GPP TSG RAN WG1 Meeting #95, Spokane, USA, Nov. 12-16, 2018, Source: Ericcson, Title: Draft CR to TS 38.213 on PDCCH QCL TypeD collision.
R1-1813251 3GPP TSG RAN WG1 Meeting #95, Spokane, USA, Nov. 12-16, 2018, Source: Ericcson, Title: Maintenance for simultaneous RX and TX.
R1-1813300 3GPP TSG RAN WG1 Meeting #95, Spokane, USA, Nov. 12-16, 2018, Source: NTT Docomo, Inc., Title: Simultaneous Tx for physical channels.
R1-1813398 3GPP TSG RAN WG1 Meeting #95, Spokane, USA, Nov. 12-16, 2018, Source: Qualcomm ncorporated, Title: Details on simultaneous reception/transmission of PHY channels and RS in FR2.
R1-1813933 3GPP TSG RAN WG1 Meeting #95, Spokane, USA, Nov. 12-16, 2018, Source: NTT Docomo, Inc., Title: Offline summary for PDCCH structure and search space.
R1-1814011 3GPP TSG RAN WG1 Meeting #95, Spokane, USA, Nov. 12-16, 2018, Source: Intel, Ericsson, Huawei, Vivo, Nokia, Title: Proposal for simultaneous Tx and Rx of channels and RS.
R1-1900018 3GPP TSG RAN WG1 Ad-Hoc Meeting 1901, Taipei, Taiwan, Jan. 21-25, 2019, Source: Huawei, HiSilicon, Title: Enhancements on multi-beam operation.
R1-1900017 3GPP TSG RAN WG1 Ad-Hoc Meeting 1901, Taipei, Taiwan, Jan. 21-25, 2019, Source: Huawei, HiSilicon, Title: Enhancements on multi-TRP/panel transmission.
R1-1900087 3GPP TSG RAN WG1 Ad-Hoc Meeting 1901, Taipei, Taiwan, Jan. 21-25, 2019, Source: ZTE, Title: Enhancements on multi-TRP/Panel transmission.
R1-1900088 3GPP TSG RAN WG1 Ad-Hoc Meeting 1901, Taipei, Taiwan, Jan. 21-25, 2019, Source: ZTE, Title: Enhancements on multi-beam operation.
R1-1900091 3GPP TSG RAN WG1 Ad-Hoc Meeting 1901, Taipei, Taiwan, Jan. 21-25, 2019, Source: ZTE, Title: Details and evaluation results on multi-TRP/Panel for URLLC.
R1-1900092 3GPP TSG RAN WG1 Ad-Hoc Meeting 1901, Taipei, Taiwan, Jan. 21-25, 2019, Source: ZTE, Title: Additional considerations on beam management for multi-TRP.
R1-1900093 3GPP TSG RAN WG1 Ad-Hoc Meeting 1901, Taipei, Taiwan, Jan. 21-25, 2019, Source: ZTE, Title: Additional details of latency and overhead reduction for beam management.
R1-1900094 3GPP TSG RAN WG1 Ad-Hoc Meeting 1901, Taipei, Taiwan, Jan. 21-25, 2019, Source: ZTE, Title: Details and evaluation on UL simultaneous transmission for multi-panel operation.
R1-1900095 3GPP TSG RAN WG1 Ad-Hoc Meeting 1901, Taipei, Taiwan, Jan. 21-25, 2019, Source: ZTE, Title: Details and evaluation on L1-SINR measurement and reporting.
R1-1900096 3GPP TSG RAN WG1 Ad-Hoc Meeting 1901, Taipei, Taiwan, Jan. 21-25, 2019, Source: ZTE, Title: Discussion on UL power control for multi-panel operation.
R1-1900137 3GPP TSG RAN WG1 Ad-Hoc Meeting 1901, Taipei, Taiwan, Jan. 21-25, 2019, Source: Vivo, Title: Discussion on multi PDCCH based multi TRP transmission.
R1-1900138 3GPP TSG RAN WG1 Ad-Hoc Meeting 1901, Taipei, Taiwan, Jan. 21-25, 2019, Source: Vivo, Title: Discussion on Multi-Beam Operation.
R1-1900142 3GPP TSG RAN WG1 Ad-Hoc Meeting 1901, Taipei, Taiwan, Jan. 21-25, 2019, Source: Vivo, Title: Performance evaluation on multi PDCCH based multi TRP transmission.
R1-1900143 3GPP TSG RAN WG1 Ad-Hoc Meeting 1901, Taipei, Taiwan, Jan. 21-25, 2019, Source: Vivo, Title: Discussion on Multi-TRP based URLLC transmission and UL simultaneous TX.
R1-1900217 3GPP TSG RAN WG1 Ad-Hoc Meeting 1901, Taipei, Taiwan, Jan. 21-25, 2019, Source: MediaTek Inc., Title: Enhancements on multi-TRP/panel transmission.
R1-1900218 3GPP TSG RAN WG1 Ad-Hoc Meeting 1901, Taipei, Taiwan, Jan. 21-25, 2019, Source: MediaTek Inc., Title: Enhancements on multi-beam operations.
R1-1900257 3GPP TSG RAN WG1 Ad-Hoc Meeting 1901, Taipei, Taiwan, Jan. 21-25, 2019, Source: Fujitsu, Title: Enhancements on Multi-beam Operation.
R1-1900266 3GPP TSG RAN WG1 Ad-Hoc Meeting 1901, Taipei, Taiwan, Jan. 21-25, 2019, Source: OPPO, Title: Enhancements on multi-TRP and multi-panel transmission.
R1-1900294 3GPP TSG RAN WG1 Ad-Hoc Meeting 1901, Taipei, Taiwan, Jan. 21-25, 2019, Source: OPPO Title: Discussion on Multi-beam Operation Enhancements.
R1-1900340 3GPP TSG RAN WG1 Ad-Hoc Meeting 1901, Taipei, Taiwan, Jan. 21-25, 2019, Source: CATT, Title: Enhancements on multi-beam operation.
R1-1900359 3GPP TSG RAN WG1 Ad-Hoc Meeting 1901, Taipei, Taiwan, Jan. 21-25, 2019, Source: Fraunhofer IIS, Fraunhofer HHI, Title: UE panel-specific UL transmission.
R1-1900377 3GPP TSG RAN WG1 Ad-Hoc Meeting 1901, Taipei, Taiwan, Jan. 21-25, 2019, Source: Sony, Title: Considerations on Multi-TRP/Panel Transmission.
R1-1900378 3GPP TSG RAN WG1 Ad-Hoc Meeting 1901, Taipei, Taiwan, Jan. 21-25, 2019, Source: Sony, Title: Considerations on multi-beam operation.
R1-1900386 3GPP TSG RAN WG1 Ad-Hoc Meeting 1901, Taipei, Taiwan, Jan. 21-25, 2019, Source: Lenovo, Motorola Mobility, Title: Discussion of multi-panel transmission.
R1-1900387 3GPP TSG RAN WG1 Ad-Hoc Meeting 1901, Taipei, Taiwan, Jan. 21-25, 2019, Source: Lenovo, Motorola Mobility, Title: Discussion of multi-beam operation.
R1-1900388 3GPP TSG RAN WG1 Ad-Hoc Meeting 1901, Taipei, Taiwan, Jan. 21-25, 2019, Source: Lenovo, Motorola Mobility, Title: Discussion on UL multi-panel transmission.
R1-1900418 3GPP TSG RAN WG1 Ad-Hoc Meeting 1901, Taipei, Taiwan, Jan. 21-25, 2019, Source: CMCC, Title: Discussion on DL multi-TRP transmission.
R1-1900419 3GPP TSG RAN WG1 Ad-Hoc Meeting 1901, Taipei, Taiwan, Jan. 21-25, 2019, Source: CMCC, Title: Enhancements on multi-beam operation.
R1-1900434 3GPP TSG RAN WG1 Ad-Hoc Meeting 1901, Taipei, Taiwan, Jan. 21-25, 2019, Source: AT&T, Title: Overview of Multi-TRP/Panel Enhancements.

(56) References Cited

OTHER PUBLICATIONS

R1-1900450 3GPP TSG RAN WG1 Ad-Hoc Meeting 1901, Taipei, Taiwan, Jan. 21-25, 2019, Source: AT&T, Title: Enhancements on Multi-Beam Operation for NR.
R1-1900503 3GPP TSG RAN WG1 Ad-Hoc Meeting 1901, Taipei, Taiwan, Jan. 21-25, 2019, Source: Intel Corporation, Title: On Beam Management Enhancement.
R1-1900622 3GPP TSG RAN WG1 Ad-Hoc Meeting 1901, Taipei, Taiwan, Jan. 21-25, 2019, Source: LG Electronics, Title: Enhancements on multi-TRP/panel transmission.
R1-1900623 3GPP TSG RAN WG1 Ad-Hoc Meeting 1901, Taipei, Taiwan, Jan. 21-25, 2019, Source: LG Electronics, Title: Discussion on multi-beam based operations and enhancements.
R1-1900628 3GPP TSG RAN WG1 Ad-Hoc Meeting 1901, Taipei, Taiwan, Jan. 21-25, 2019, Source: LG Electronics, Title: Evaluation and analysis on simultaneous multi-panel Tx.
R1-1900634 3GPP TSG RAN WG1 Ad-Hoc Meeting 1901, Taipei, Taiwan, Jan. 21-25, 2019, Source: Mitsubishi Electric, Title: Views on multi-beam operation.
R1-1900637 3GPP TSG RAN WG1 Ad-Hoc Meeting 1901, Taipei, Taiwan, Jan. 21-25, 2019, Source: China Telecom, Title: Enhancements on Multi-beam Operation for UL beam management.
R1-1900664 3GPP TSG RAN WG1 Ad-Hoc Meeting 1901, Taipei, Taiwan, Jan. 21-25, 2019, Source: NEC, Title: Discussion on multi-beam operation.
R1-1900672 3GPP TSG RAN WG1 Ad-Hoc Meeting 1901, Taipei, Taiwan, Jan. 21-25, 2019, Source: NEC, Title: Discussion on multi-TRP transmission.
R1-1900677 3GPP TSG RAN WG1 Ad-Hoc Meeting 1901, Taipei, Taiwan, Jan. 21-25, 2019, Source: Panasonic, Title: On multi-TRP enhancements for NR MIMO in Rel. 16.
R1-1900691 3GPP TSG RAN WG1 Ad-Hoc Meeting 1901, Taipei, Taiwan, Jan. 21-25, 2019, Source: Nokia, Nokia Shanghai Bell, Title: Enhancements on Multi-TRP/Panel Transmission.
R1-1900692 3GPP TSG RAN WG1 Ad-Hoc Meeting 1901, Taipei, Taiwan, Jan. 21-25, 2019, Source: Nokia, Nokia Shanghai Bell, Title: Enhancements on Multi-beam Operation.
R1-1900700 3GPP TSG RAN WG1 Ad-Hoc Meeting 1901, Taipei, Taiwan, Jan. 21-25, 2019, Source: Spreadtrum Communications, Title: Discussion on multi-beam operation.
R1-1900711 3GPP TSG RAN WG1 Ad-Hoc Meeting 1901, Taipei, Taiwan, Jan. 21-25, 2019, Source: Spreadtrum Communications, Title: Discussion on Multi-TRP transmission.
R1-1900728 3GPP TSG RAN WG1 Ad-Hoc Meeting 1901, Taipei, Taiwan, Jan. 21-25, 2019, Source: Ericsson, Title: On multi-TRP and multi-panel.
U.S. Appl. No. 62/699,465, filed Jul. 17, 2018.
U.S. Appl. No. 62/772,510, filed Nov. 28, 2018.
Jun. 17, 2020—European Extended Search Report—EP 20157343.3.
R1-1814122 3GPP TSG RAN WG1 Meeting #95, Spokane, USA, Nov. 12-16, 2018, Source: LG Electronics, Title: Updated feature lead summary of Enhancements on Multi-beam Operations.
R1-1813620 3GPP TSG RAN WG1 Meeting #95, Spokane, USA, Nov. 12-16, 2018, Source: Nokia, Nokia Shanghai Bell, Title: On UE adaptation to the traffic.
R1-1813559 3GPP TSG RAN WG1 Meeting #95, Spokane, USA, Nov. 12-16, 2018, Source: Huawei, HiSilicon, Title: Panel-based UL beam selection.
3GPP TS 38.211 V15.4.0 (Dec. 2018), Technical Specification, 3rd Generation Partnership Project; Technical Specification Group Radio Access Network; NR; Physical channels and modulation (Release 15).
3GPP TS 38.212 V15.4.0 (Dec. 2018), Technical Specification, 3rd Generation Partnership Project; Technical Specification Group Radio Access Network; NR; Multiplexing and channel coding (Release 15).
3GPP TS 38.213 V15.4.0 (Dec. 2018), Technical Specification, 3rd Generation Partnership Project; Technical Specification Group Radio Access Network; NR; Physical layer procedures for control (Release 15).
3GPP TS 38.214 V15.4.0 (Dec. 2018), Technical Specification, 3rd Generation Partnership Project; Technical Specification Group Radio Access Network; NR; Physical layer procedures for data (Release 15).
3GPP TS 38.300 V15.4.0 (Dec. 2018), Technical Specification, 3rd Generation Partnership Project; Technical Specification Group Radio Access Network; NR; NR and NG-RAN Overall Description; Stage 2 (Release 15).
3GPP TS 38.321 V15.4.0 (Dec. 2018), Technical Specification, 3rd Generation Partnership Project; Technical Specification Group Radio Access Network; NR; Medium Access Control (MAC) protocol specification (Release 15).
3GPP TS 38.331 V15.4.0 (Dec. 2018), Technical Specification, 3rd Generation Partnership Project; Technical Specification Group Radio Access Network; NR; Radio Resource Control (RRC) protocol specification (Release 15).
R1-1809881 3GPP TSG RAN WG1 Meeting #94, Gothenburg, Sweden, Aug. 20-24, 2018, Source: [RAN1], Intel, Title: draft LS on UE behaviour on reception of channels or RS in the same OFDM symbol.
R1-181xxxx 3GPP TSG RAN WG1 Meeting #95, Spokane, USA, Nov. 12-16, 2018, Source: Intel Corporation, Title: Summary for simultaneous Tx and Rx of channels and RS.
R1-1808142 3GPP TSG RAN WG1 Meeting #94, Gothenburg, Sweden, Aug. 20-24, 2018, Source: Huawei, HiSilicon, Title: Remaining issues on simultaneous reception or transmission over CCs and BWPs.
R1-1808198 3GPP TSG RAN WG1 Meeting #94, Gothenburg, Sweden, Aug. 20-24, 2018, Source: ZTE, Title Simultaneous transmission and reception of different channels and reference signals.
R1-1808199 3GPP TSG RAN WG1 Meeting #94, Gothenburg, Sweden, Aug. 20-24, 2018, Source: ZTE, Title Enhancements on multi-beam operation.
R1-1808223 3GPP TSG RAN WG1 Meeting #94, Gothenburg, Sweden, Aug. 20-24, 2018, Source: Vivo, Title Remaining issues on simultaneous reception of DL/UL physical channels and RSs.
R1-1808265 3GPP TSG RAN WG1 Meeting #94, Gothenburg, Sweden, Aug. 20-24, 2018, Source: MediaTek Inc., Title: Discussions on simultaneous reception and transmission across CCs.
R1-1808377 3GPP TSG RAN WG1 Meeting #94, Gothenburg, Sweden, Aug. 20-24, 2018, Source: CATT, Title: Discussion on simultaneous transmission and reception of physical signals/channels.
R1-1808489 3GPP TSG RAN WG1 Meeting #94, Gothenburg, Sweden, Aug. 20-24, 2018, Source: LG Electronics, Title: Remaining issues on simultaneous Tx/Rx.
R1-1808671 3GPP TSG RAN WG1 Meeting #94, Gothenburg, Sweden, Aug. 20-24, 2018, Source: Intel Corporation, Title: Simultaneous Tx and Rx of channels and RS.
R1-1808752 3GPP TSG RAN WG1 Meeting #94, Gothenburg, Sweden, Aug. 20-24, 2018, Source: Samsung, Title: Simultaneous reception of physical channels and reference signals.
R1-1809140 3GPP TSG RAN WG1 Meeting #94, Gothenburg, Sweden, Aug. 20-24, 2018, Source: NTT Docomo, Inc., Title: Simultaneous Tx/Rx of UL/DL physical channels and reference signals.
R1-1809199 3GPP TSG RAN WG1 Meeting #94, Gothenburg, Sweden, Aug. 20-24, 2018, Source: Ericsson, Title: On simultaneous transmission and reception in FR2.
R1-1809240 3GPP TSG RAN WG1 Meeting #94, Gothenburg, Sweden, Aug. 20-24, 2018, Source: Nokia, Nokia Shanghai Bell, Title: On simultaneous transmission and reception of multiplexed channels.
R1-1809425 3GPP TSG RAN WG1 Meeting #94, Gothenburg, Sweden, Aug. 20-24, 2018, Source: Qualcomm Incorporated, Title: Details on simultaneous reception/transmission of PHY channels and RS in FR2.

(56) References Cited

OTHER PUBLICATIONS

R1-1809820 3GPP TSG RAN WG1 Meeting #94, Gothenburg, Sweden, Aug. 20-24, 2018, Source: Intel Corporation, Title: Summary of simultaneous Rx and Tx.
R1-1809882 3GPP TSG RAN WG1 Meeting #94, Gothenburg, Sweden, Aug. 20-24, 2018, Source: Intel Corporation, Title: Guidance on simultaneous reception of channels or RS.
R1-1810102 3GPP TSG RAN WG1 Meeting #94bis, Chengdu, China, Oct. 8-12, 2018, Source: Huawei, HiSilicon, Title: Remaining issues on simultaneous reception or transmission over CC/BWP(s).
R1-1810216 3GPP TSG RAN WG1 Meeting #94bis, Chengdu, China, Oct. 8-12, 2018, Source: ZTE, Title: Simultaneous transmission and reception of channels/signals.
R1-1810368 3GPP TSG RAN WG1 Meeting #94bis, Chengdu, China, Oct. 8-12, 2018, Source: Vivo, Title: Maintenance for simultaneous reception of DL/UL physical channels and RSs.
R1-1810753 3GPP TSG RAN WG1 Meeting #94bis, Chengdu, China, Oct. 8-12, 2018, Source: Intel Corporation, Title: Simultaneous Tx and Rx of channels and RS.
R1-1810841 3GPP TSG RAN WG1 Meeting #94bis, Chengdu, China, Oct. 8-12, 2018, Source: Samsung, Title: Simultaneous reception of physical channels and reference signals.
R1-1811233 3GPP TSG RAN WG1 Meeting #94bis, Chengdu, China, Oct. 8-12, 2018, Source: Qualcomm ncorporated, Title: Details on simultaneous reception/transmission of PHY channels and RS in FR2.
R1-1811353 3GPP TSG RAN WG1 Meeting #94bis, Chengdu, China, Oct. 8-12, 2018, Source: NTT Docomo, Inc., Title: Simultaneous Tx/Rx for physical channels.
R1-1811549 3GPP TSG RAN WG1 Meeting #94bis, Chengdu, China, Oct. 8-12, 2018, Source: Ericsson, Title: On simultaneous transmission and reception in FR2.
R1-1811820 3GPP TSG RAN WG1 Meeting #94bis, Chengdu, China, Oct. 8-12, 2018, Source: NTT Docomo, Inc., Title: Offline summary for PDCCH structure and search space.
R1-1812004 3GPP TSG RAN WG1 Meeting #94bis, Chengdu, China, Oct. 8-12, 2018, Source: Intel Corporation, Title: Summary of simultaneous Rx and Tx.
R1-1812241 3GPP TSG RAN WG1 Meeting #95, Spokane, USA, Nov. 12-16, 2018, Source: Huawei, HiSilicon, Title: Simultaneous Rx orTx over CC/BWP(s).
R1-1812268 3GPP TSG RAN WG1 Meeting #95, Spokane, USA, Nov. 12-16, 2018, Source: ZTE, Title: Discussion on draft CR on simultaneous transmission and reception.
R1-1812268 3GPP TSG RAN WG1 Meeting #95, Spokane, USA, Nov. 12-16, 2018, Source: ZTE, Title Draft CR to TS 38.213 on simultaneous transmission of CORESET+PDSCH.
R1-1812287 3GPP TSG RAN WG1 Meeting #95, Spokane, USA, Nov. 12-16, 2018, Source: Vivo, Title: Draft CR on simultaneous reception of DL/UL physical channels and RSs.
R1-1812469 3GPP TSG RAN WG1 Meeting #95, Spokane, USA, Nov. 12-16, 2018, Source: Intel Corporation, Title: CR to 38.214 for Csi-Rs (TRS, CSI, IM) + PDSCH multiplexing.
R1-1812469 3GPP TSG RAN WG1 Meeting #95, Spokane, USA, Nov. 12-16, 2018, Source: Intel Corporation, Title: CR to 38.214 for PDCCH + PDSCH multiplexing.
R1-1812469 3GPP TSG RAN WG1 Meeting #95, Spokane, USA, Nov. 12-16, 2018, Source: Intel Corporation, Title: Simultaneous Tx and Rx of channels and RS.
R1-1812548 3GPP TSG RAN WG1 Meeting #95, Spokane, USA, Nov. 12-16, 2018, Source: LG Electronics, Title: Draft CR on simultaneous Tx/Rx.
R1-1812959 3GPP TSG RAN WG1 Meeting #95, Spokane, USA, Nov. 12-16, 2018, Source: Samsung, Title: Simultaneous reception of physical channels and reference signals.
R1-1813251 3GPP TSG RAN WG1 Meeting #95, Spokane, USA, Nov. 12-16, 2018, Source: Ericcson, Title: Correction to 38.214 on simultaneous reception of PDCCH and PDSCH.
R1-1901296 3GPP TSG RAN WG1 Ad-Hoc Meeting 1901, Taipei, Taiwan, Jan. 21-25, 2019, Source: CATT, Title: Consideration on multi-TRP/panel transmission.
R1-1901348 3GPP TSG RAN WG1 Ad-Hoc Meeting 1901, Taipei, Taiwan, Jan. 21-25, 2019, Source: LG Electronics, Title: Feature lead summary of Enhancements on Multi-beam Operations.
R1-1901371 3GPP TSG RAN WG1 Ad-Hoc Meeting 1901, Taipei, Taiwan, Jan. 21-25, 2019, Source Huawei, HiSilicon, Title: Summary of AI: 7.2.8 2 Enhancements on Multi-TRP/Panel Transmission of Offline Discussion.
R1-1901378 3GPP TSG RAN WG1 Ad-Hoc Meeting 1901, Taipei, Taiwan, Jan. 21-25, 2019, Source Samsung, Title: Enhancements on multi-beam operations.
R1-1901412 3GPP TSG RAN WG1 Ad-Hoc Meeting 1901, Taipei, Taiwan, Jan. 21-25, 2019, Source: Huawei, HiSilicon, Title: Summary of AI: Update of Offline Discussion for Multi-TRP/Panel Transmission and General plan for RAN1 96.
R1-1901430 3GPP TSG RAN WG1 Ad-Hoc Meeting 1901, Taipei, Taiwan, Jan. 21-25, 2019, Source: LG Electronics, Title: Updated feature lead summary of Enhancements on Multi-beam Operations.
Huawei et al. "Discussion on Panel-based UL beam selection," 3GPP Draft, 3GPP TSG WAN WG1 Meeting R1-1809122, 3RD Generation Partnership Project (3GPP), Mobile Competence Centre, 650, Route Des Lucioles, Aug. 11, 2018, 7 pages, Retrieved from http://www.3gpp.org; Published Date: Aug. 2018.

* cited by examiner

User Plane Protocol Stack

Control Plane Protocol Stack

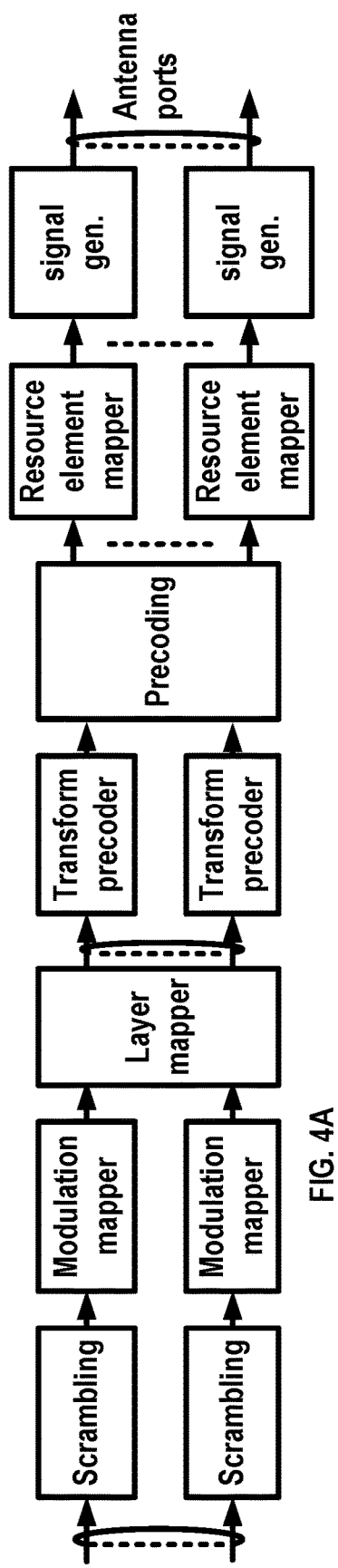
FIG. 4A
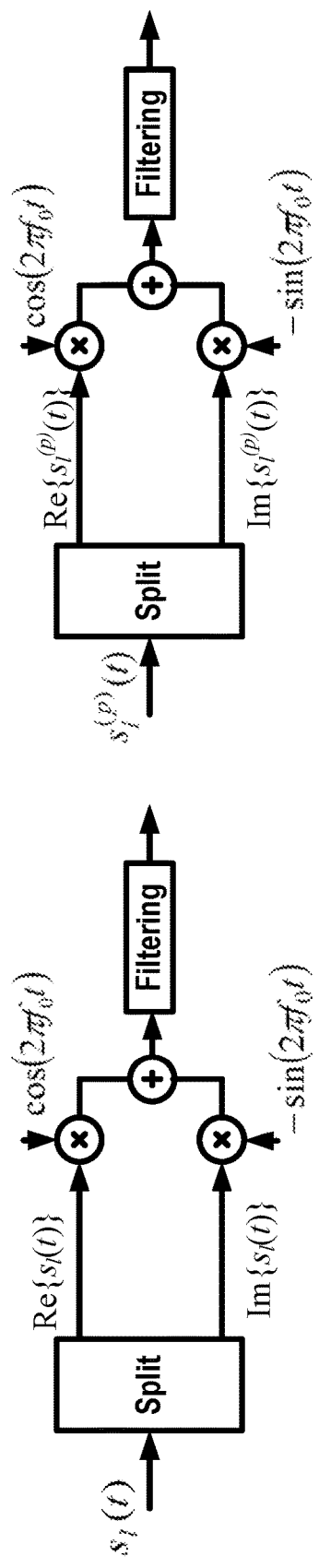
FIG. 4B
FIG. 4D
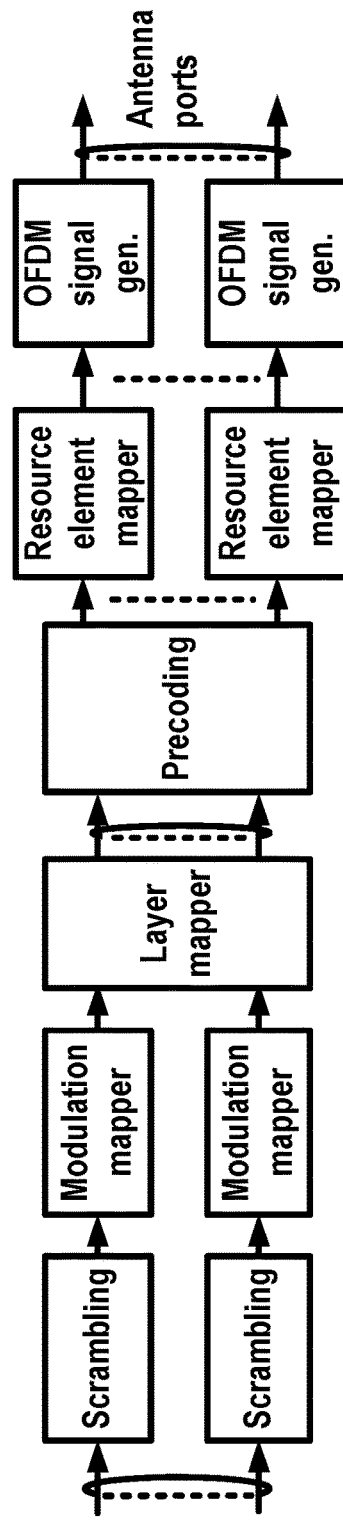
FIG. 4C

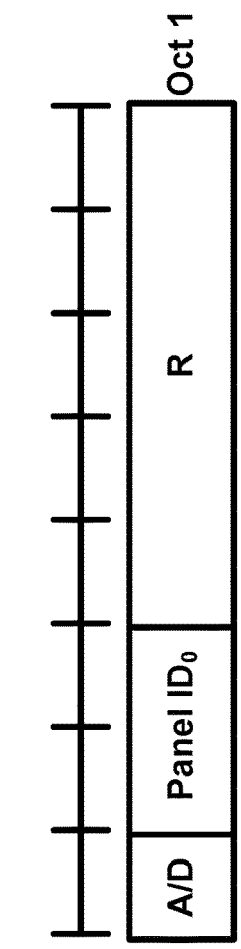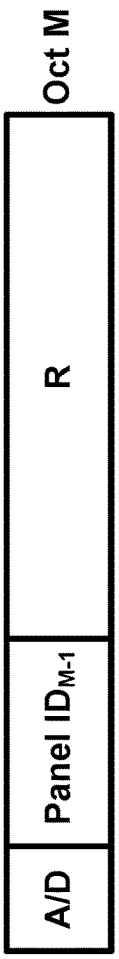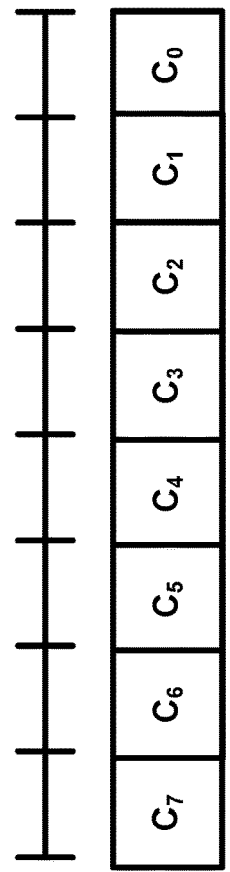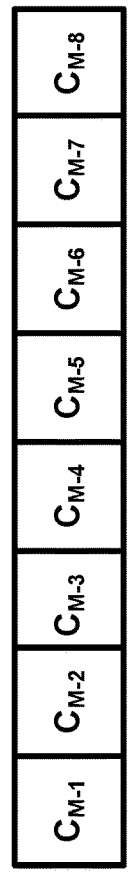
FIG. 25B
FIG. 25C
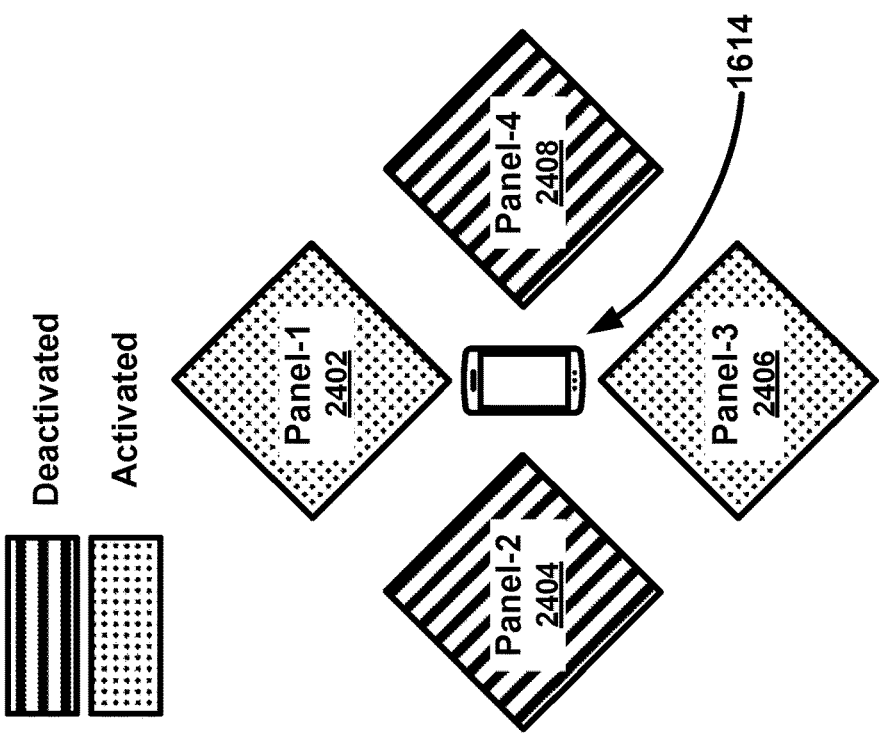
FIG. 25A

*TCI-State information element*

```
-- ASN1START
-- TAG-TCI-STATE-START

TCI-State ::=           SEQUENCE {
    tci-StateId             TCI-StateId,
    qcl-Type1               QCL-Info,
    qcl-Type2               QCL-Info          OPTIONAL,   -- Need R
    ...
}

QCL-Info ::=            SEQUENCE {
    cell                    ServCellIndex     OPTIONAL,   -- Need R
    bwp-Id                  BWP-Id            OPTIONAL,   -- Cond CSI-RS-Indicated
    referenceSignal         CHOICE {
        csi-rs                  NZP-CSI-RS-ResourceId,
        ssb                     SSB-Index
    },
    qcl-Type                ENUMERATED {typeA, typeB, typeC, typeD},
    ...
}
```

FIG. 26

TRANSMISSION AND RECEPTION OF APERIODIC CHANNEL STATE INFORMATION

CROSS-REFERENCE TO RELATED APPLICATIONS

This application is a continuation of U.S. application Ser. No. 16/790,830 as filed Feb. 14, 2020, which claims the benefit of U.S. Provisional Application No. 62/805,543, titled "Multiple Transmission and Reception Points and Multiple Panels in New Radio" and filed on Feb. 14, 2019. The above-referenced application is hereby incorporated by reference in its entirety.

BACKGROUND

Various procedures may be used for selecting wireless communication resources. A wireless device and/or a base station may select one or more beams among multiple beams for transmission and/or reception of signals. Signaling protocols may not be able to indicate/provide signaling information for the wireless device to select beams, which may result in the wireless device being unable to determine a beam to be used for transmission and/or reception of signals.

SUMMARY

The following summary presents a simplified summary of certain features. The summary is not an extensive overview and is not intended to identify key or critical elements.

Wireless communications are described. Wireless communications may comprise aperiodic transmission and reception. Control information may be associated with an aperiodic reference signal. A wireless device may be configured to use a first transmission control indicator (TCI) state of at least two TCI states to receive an aperiodic reference signal based on: a scheduling offset, and the aperiodic reference signal overlapping in time with a scheduled physical downlink shared channel (PDSCH).

A wireless device may comprise various hardware and/or software transmission/reception components (e.g., one or more antenna panels, transceivers, encoders, decoders, validators). The wireless device may selectively activate or deactivate transmission/reception components for reception of data from one or more cells and/or transmission points. The wireless device may report the activation status of the antenna panels to a base station. The wireless device may, for example, report activation status based on an autonomous activation or deactivation of an antenna panel by the wireless device. The wireless device may send antenna panel activation status information to a base station using an uplink message and/or using a media access control control element (MAC CE). A base station may, based on activation status information received from the wireless device, stop or start using channels and/or signals associated with an antenna panel associated with the activation status. The reporting of activation or deactivation of antenna panels may result in advantages such as more efficient data transfer, higher signal reliability, and/or reduced latency between a transmitter and a receiver.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 4A, FIG. 4B, FIG. 4C, and FIG. 4D show examples of uplink and downlink signal transmission.

FIG. 25A, FIG. 25B, FIG. 25C, FIG. 25D, FIG. 25E, and FIG. 25F show examples of multiple antenna panels and indications of activation/deactivation of the multiple antenna panels.

FIG. 26 shows an example of a TCI State information element.

DETAILED DESCRIPTION

Figure 1:
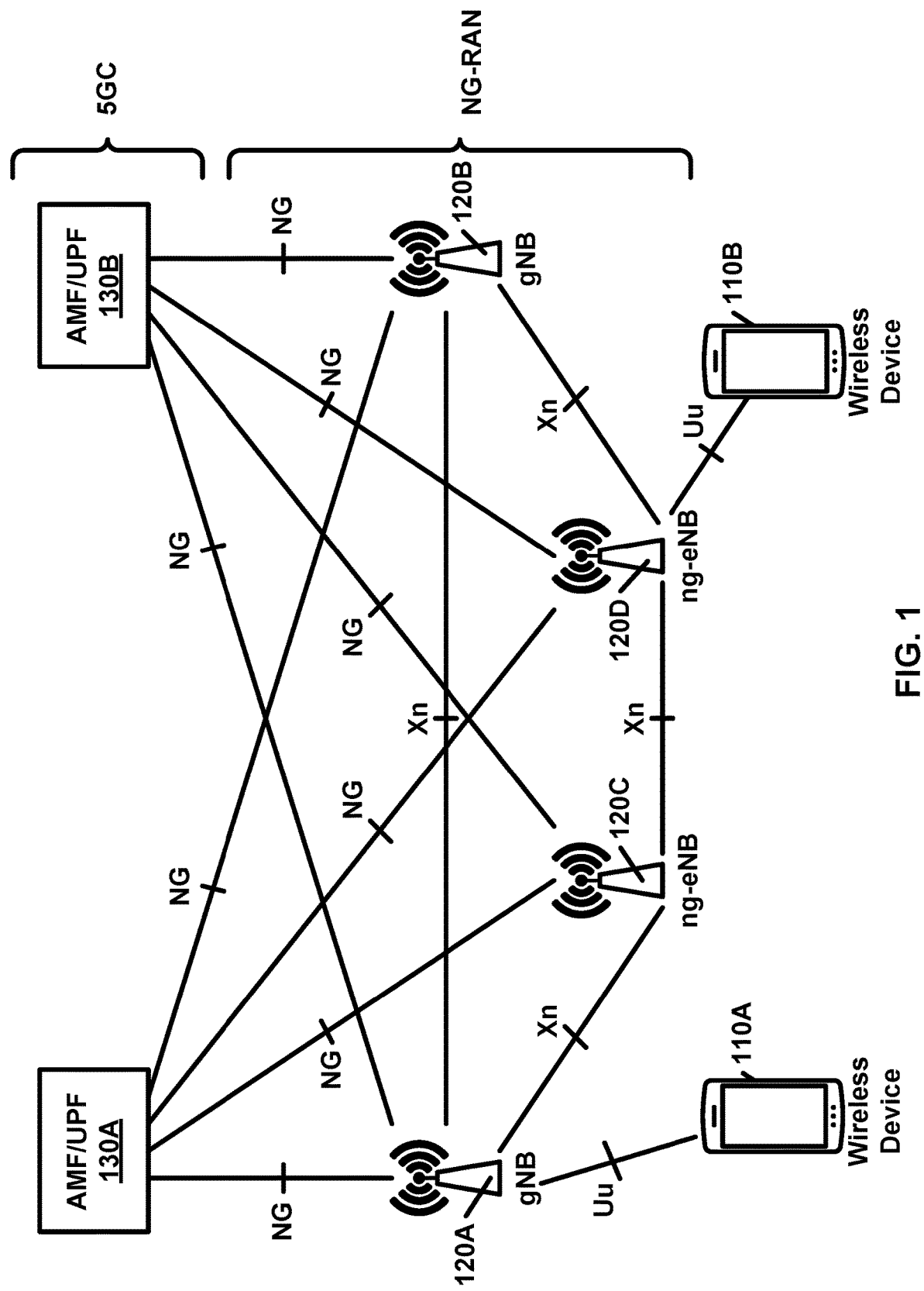
FIG. 1 shows an example radio access network (RAN) architecture.

The accompanying drawings and descriptions provide examples. It is to be understood that the examples shown in the drawings and/or described are non-exclusive and that there are other examples of how features shown and described may be practiced.

Examples are provided for operation of wireless communication systems which may be used in the technical field of multicarrier communication systems. More particularly, the technology described herein may relate to procedures for the management of multiple antenna panels and/or multiple transmission and reception points in multicarrier communication systems.

The following acronyms are used throughout the drawings and/or descriptions, and are provided below for convenience although other acronyms may be introduced in the detailed description:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BFR Beam Failure Recovery
BLER Block Error Rate
BPSK Binary Phase Shift Keying
BSR Buffer Status Report
BWP Bandwidth Part
CA Carrier Aggregation
CC Component Carrier
CCCH Common Control CHannel
CDMA Code Division Multiple Access
CN Core Network
CORESET Control Resource Set
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCH Logical Channel
LCID Logical Channel Identifier
LTE Long Term Evolution
MAC Medium Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QCLed Quasi-Co-Located
QCL Quasi-Co-Location
QFI Quality of Service Indicator
QoS Quality of Service
QPSK Quadrature Phase Shift Keying
RA Random Access
RACH Random Access CHannel
RAN Radio Access Network
RAT Radio Access Technology RA-RNTI Random Access-Radio Network Temporary Identifier
RB Resource Blocks
RBG Resource Block Groups
RI Rank indicator
RLC Radio Link Control
RLM Radio Link Monitoring
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SINR Signal-to-Interference-plus-Noise Ratio
SMF Session Management Function
SN Secondary Node
SpCell Special Cell
SR Scheduling Request
SRB Signaling Radio Bearer
SRS Sounding Reference Signal
SS Synchronization Signal
SSB Synchronization Signal Block
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TCI Transmission Configuration Indication
TDD Time Division Duplex
TDMA Time Division Multiple Access
TRP Transmission and Receiving Point
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Examples described herein may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and/or OFDM/CDMA may be used. Various modulation schemes may be used for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, 1024-QAM and/or the like. Physical radio transmission may be enhanced by dynamically or semi-dynamically changing the modulation and coding scheme, for example, depending on transmission requirements and/or radio conditions.

FIG. 1 shows an example Radio Access Network (RAN) architecture. A RAN node may comprise a next generation Node B (gNB) (e.g., 120A, 120B) providing New Radio (NR) user plane and control plane protocol terminations towards a first wireless device (e.g., 110A). A RAN node may comprise a base station such as a next generation evolved Node B (ng-eNB) (e.g., 120C, 120D), providing Evolved UMTS Terrestrial Radio Access (E-UTRA) user plane and control plane protocol terminations towards a second wireless device (e.g., 110B). A first wireless device 110A may communicate with a base station, such as a gNB 120A, over a Uu interface. A second wireless device 110B may communicate with a base station, such as an ng-eNB 120D, over a Uu interface. The wireless devices 110A and/or 110B may be structurally similar to wireless devices shown in and/or described in connection with other drawing figures. The Node B 120A, the Node B 120B, the Node B 120C, and/or the Node B 120D may be structurally similar to Nodes B and/or base stations shown in and/or described in connection with other drawing figures.

A base station, such as a gNB (e.g., 120A, 120B, etc.) and/or an ng-eNB (e.g., 120C, 120D, etc.) may host functions such as radio resource management and scheduling, IP header compression, encryption and integrity protection of data, selection of Access and Mobility Management Function (AMF) at wireless device (e.g., User Equipment (UE)) attachment, routing of user plane and control plane data, connection setup and release, scheduling and transmission of paging messages (e.g., originated from the AMF), scheduling and transmission of system broadcast information (e.g., originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in an inactive state (e.g., RRC_INACTIVE state), distribution function for Non-Access Stratum (NAS) messages, RAN sharing, dual connectivity, and/or tight interworking between NR and E-UTRA.

One or more first base stations (e.g., gNBs 120A and 120B) and/or one or more second base stations (e.g., ng-eNBs 120C and 120D) may be interconnected with each other via Xn interface. A first base station (e.g., gNB 120A, 120B, etc.) or a second base station (e.g., ng-eNB 120C, 120D, etc.) may be connected via NG interfaces to a network, such as a 5G Core Network (5GC). A 5GC may comprise one or more AMF/User Plan Function (UPF) functions (e.g., 130A and/or 130B). A base station (e.g., a gNB and/or an ng-eNB) may be connected to a UPF via an NG-User plane (NG-U) interface. The NG-U interface may provide delivery (e.g., non-guaranteed delivery) of user plane Protocol Data Units (PDUs) between a RAN node and the UPF. A base station (e.g., a gNB and/or an ng-eNB) may be connected to an AMF via an NG-Control plane (NG-C) interface. The NG-C interface may provide functions such as NG interface management, wireless device (e.g., UE) context management, wireless device (e.g., UE) mobility management, transport of NAS messages, paging, PDU session management, configuration transfer, and/or warning message transmission.

A UPF may host functions such as anchor point for intra-/inter-Radio Access Technology (RAT) mobility (e.g., if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, quality of service (QoS) handling for user plane, packet filtering, gating, Uplink (UL)/Downlink (DL) rate enforcement, uplink traffic verification (e.g., Service Data Flow (SDF) to QoS flow mapping), downlink packet buffering, and/or downlink data notification triggering.

An AMF may host functions such as NAS signaling termination, NAS signaling security, Access Stratum (AS) security control, inter Core Network (CN) node signaling (e.g., for mobility between 3rd Generation Partnership Project (3GPP) access networks), idle mode wireless device reachability (e.g., control and execution of paging retransmission), registration area management, support of intra-system and inter-system mobility, access authentication, access authorization including check of roaming rights, mobility management control (e.g., subscription and/or policies), support of network slicing, and/or Session Management Function (SMF) selection.

Figure 2A:
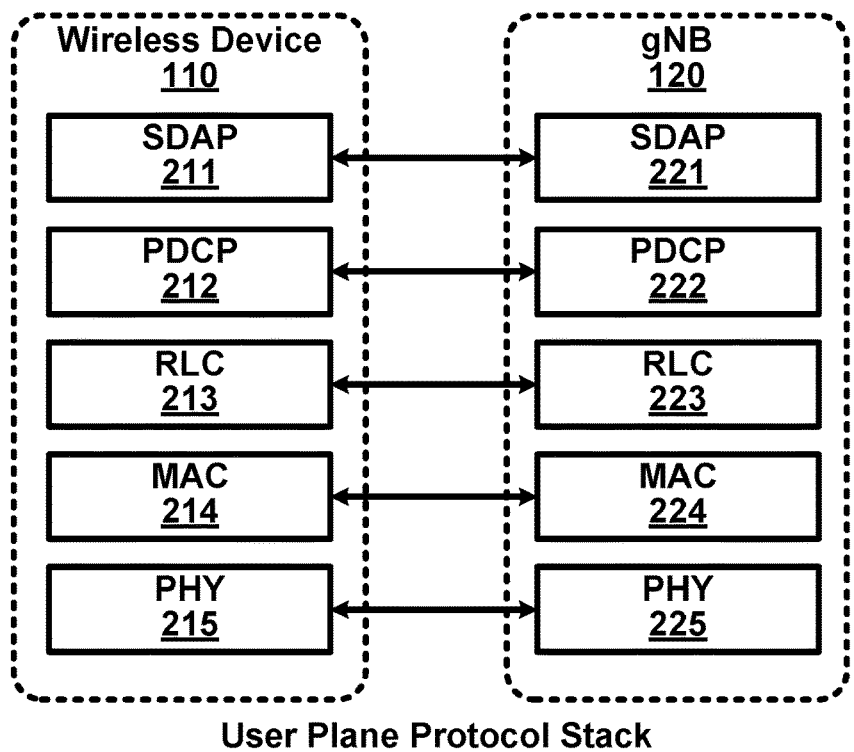
FIG. 2A shows an example user plane protocol stack.

FIG. 2A shows an example user plane protocol stack. A Service Data Adaptation Protocol (SDAP) (e.g., 211 and 221), Packet Data Convergence Protocol (PDCP) (e.g., 212 and 222), Radio Link Control (RLC) (e.g., 213 and 223), and Medium Access Control (MAC) (e.g., 214 and 224) sublayers, and a Physical (PHY) (e.g., 215 and 225) layer, may be terminated in a wireless device (e.g., 110) and in a base station (e.g., 120) on a network side. A PHY layer may provide transport services to higher layers (e.g., MAC, RRC, etc.). Services and/or functions of a MAC sublayer may comprise mapping between logical channels and transport channels, multiplexing and/or demultiplexing of MAC Service Data Units (SDUs) belonging to the same or different logical channels into and/or from Transport Blocks (TBs) delivered to and/or from the PHY layer, scheduling information reporting, error correction through Hybrid Automatic Repeat request (HARQ) (e.g., one HARQ entity per carrier for Carrier Aggregation (CA)), priority handling between wireless devices such as by using dynamic scheduling, priority handling between logical channels of a wireless device such as by using logical channel prioritization, and/or padding. A MAC entity may support one or multiple numerologies and/or transmission timings. Mapping restrictions in a logical channel prioritization may control which numerology and/or transmission timing a logical channel may use. An RLC sublayer may support transparent mode (TM), unacknowledged mode (UM), and/or acknowledged mode (AM) transmission modes. The RLC configuration may be per logical channel with no dependency on numerologies and/or Transmission Time Interval (TTI) durations. Automatic Repeat Request (ARQ) may operate on any of the numerologies and/or TTI durations with which the logical channel is configured. Services and functions of the PDCP layer for the user plane may comprise, for example, sequence numbering, header compression and decompression, transfer of user data, reordering and duplicate detection, PDCP PDU routing (e.g., such as for split bearers), retransmission of PDCP SDUs, ciphering, deciphering and integrity protection, PDCP SDU discard, PDCP re-establishment and data recovery for RLC AM, and/or duplication of PDCP PDUs. Services and/or functions of SDAP may comprise, for example, mapping between a QoS flow and a data radio bearer. Services and/or functions of SDAP may comprise mapping a Quality of Service Indicator (QFI) in DL and UL packets. A protocol entity of SDAP may be configured for an individual PDU session.

Figure 2B:
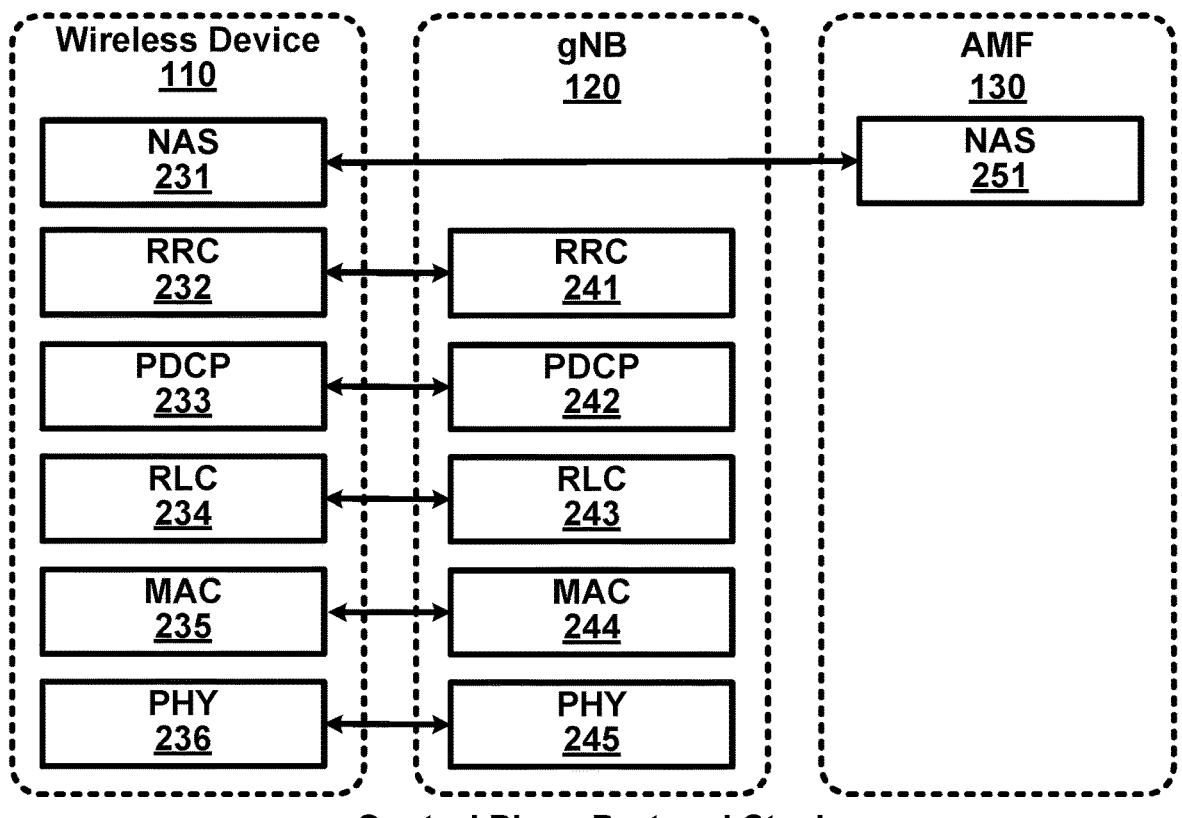
FIG. 2B shows an example control plane protocol stack.

FIG. 2B shows an example control plane protocol stack. A PDCP (e.g., 233 and 242), RLC (e.g., 234 and 243), and MAC (e.g., 235 and 244) sublayers, and a PHY (e.g., 236 and 245) layer, may be terminated in a wireless device (e.g., 110), and in a base station (e.g., 120) on a network side, and perform service and/or functions described above. RRC (e.g., 232 and 241) may be terminated in a wireless device and a base station on a network side. Services and/or functions of RRC may comprise broadcast of system information related to AS and/or NAS; paging (e.g., initiated by a 5GC or a RAN); establishment, maintenance, and/or release of an RRC connection between the wireless device and RAN; security functions such as key management, establishment, configuration, maintenance, and/or release of Signaling Radio Bearers (SRBs) and Data Radio Bearers (DRBs); mobility functions; QoS management functions; wireless device measurement reporting and control of the reporting; detection of and recovery from radio link failure; and/or NAS message transfer to/from NAS from/to a wireless device. NAS control protocol (e.g., 231 and 251) may be terminated in the wireless device and AMF (e.g., 130) on a network side. NAS control protocol may perform functions such as authentication, mobility management between a wireless device and an AMF (e.g., for 3GPP access and non-3GPP access), and/or session management between a wireless device and an SMF (e.g., for 3GPP access and non-3GPP access).

A base station may configure a plurality of logical channels for a wireless device. A logical channel of the plurality of logical channels may correspond to a radio bearer. The radio bearer may be associated with a QoS requirement. A base station may configure a logical channel to be mapped to one or more TTIs and/or numerologies in a plurality of TTIs and/or numerologies. The wireless device may receive Downlink Control Information (DCI) via a Physical Downlink Control CHannel (PDCCH) indicating an uplink grant. The uplink grant may be for a first TTI and/or a first numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise, for example, priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or to one or more MAC Control Elements (CEs). The one or more first logical channels may be mapped to the first TTI and/or the first numerology. The MAC layer at the wireless device may multiplex one or more MAC CEs and/or one or more MAC SDUs (e.g., logical channel) in a MAC PDU (e.g., transport block). The MAC PDU may comprise a MAC header comprising a plurality of MAC sub-headers. A MAC sub-header in the plurality of MAC sub-headers may correspond to a MAC CE or a MAC SUD (e.g., logical channel) in the one or more MAC CEs and/or in the one or more MAC SDUs. A MAC CE and/or a logical channel may be configured with a Logical Channel IDentifier (LCID). An LCID for a logical channel and/or a MAC CE may be fixed and/or pre-configured. An LCID for a logical channel and/or MAC CE may be configured for the wireless device by the base station. The MAC sub-header corresponding to a MAC CE and/or a MAC SDU may comprise an LCID associated with the MAC CE and/or the MAC SDU.

A base station may activate, deactivate, and/or impact one or more processes (e.g., set values of one or more parameters of the one or more processes or start and/or stop one or more timers of the one or more processes) at the wireless device, for example, by using one or more MAC commands. The one or more MAC commands may comprise one or more MAC control elements. The one or more processes may comprise activation and/or deactivation of PDCP packet duplication for one or more radio bearers. The base station may send (e.g., transmit) a MAC CE comprising one or more fields. The values of the fields may indicate activation and/or deactivation of PDCP duplication for the one or more radio bearers. The one or more processes may comprise Channel State Information (CSI) transmission of on one or more cells. The base station may send (e.g., transmit) one or more MAC CEs indicating activation and/or deactivation of the CSI transmission on the one or more cells. The one or more processes may comprise activation and/or deactivation of one or more secondary cells. The base station may send (e.g., transmit) a MAC CE indicating activation and/or deactivation of one or more secondary cells. The base station may send (e.g., transmit) one or more MAC CEs indicating starting and/or stopping of one or more Discontinuous Reception (DRX) timers at the wireless device. The base station may send (e.g., transmit) one or more MAC CEs that indicate one or more timing advance values for one or more Timing Advance Groups (TAGs).

Figure 3:
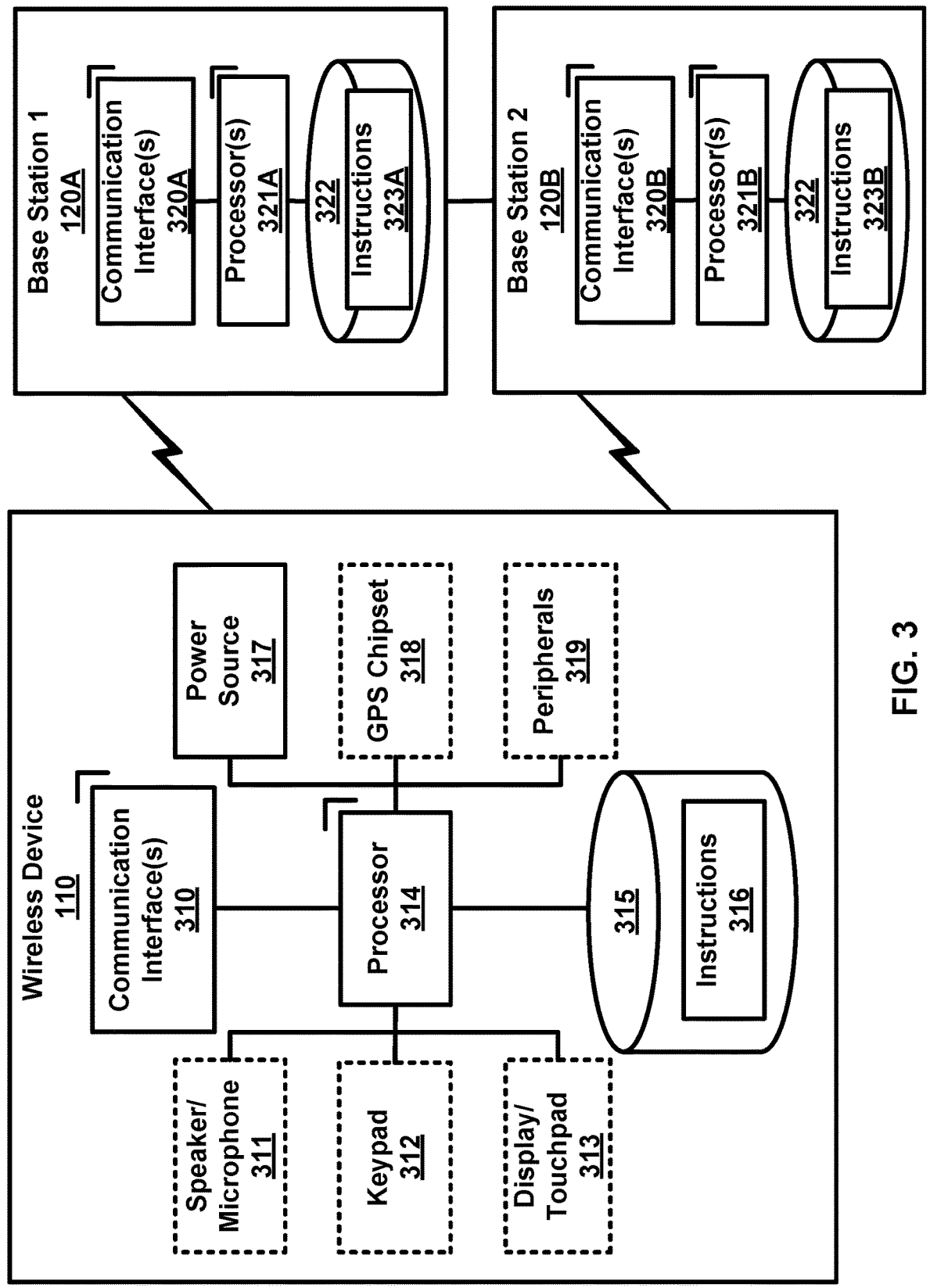
FIG. 3 shows an example wireless device and two base stations.

FIG. 3 shows an example of base stations (base station 1, 120A, and base station 2, 120B) and a wireless device 110. The wireless device 110 may comprise a UE or any other wireless device. The base station (e.g., 120A, 120B) may comprise a Node B, eNB, gNB, ng-eNB, or any other base station. A wireless device and/or a base station may perform one or more functions of a relay node. The base station 1, 120A, may comprise at least one communication interface 320A (e.g., a wireless modem, an antenna, a wired modem, and/or the like), at least one processor 321A, and at least one set of program code instructions 323A that may be stored in non-transitory memory 322A and executable by the at least one processor 321A. The base station 2, 120B, may comprise at least one communication interface 320B, at least one processor 321B, and at least one set of program code instructions 323B that may be stored in non-transitory memory 322B and executable by the at least one processor 321B.

A base station may comprise any number of sectors, for example: 1, 2, 3, 4, or 6 sectors. A base station may comprise any number of cells, for example, ranging from 1 to 50 cells or more. A cell may be categorized, for example, as a primary cell or secondary cell. At Radio Resource Control (RRC) connection establishment, re-establishment, handover, etc., a serving cell may provide NAS (non-access stratum) mobility information (e.g., Tracking Area Identifier (TAI)). At RRC connection re-establishment and/or handover, a serving cell may provide security input. This serving cell may be referred to as the Primary Cell (PCell). In the downlink, a carrier corresponding to the PCell may be a DL Primary Component Carrier (PCC). In the uplink, a carrier may be an UL PCC. Secondary Cells (SCells) may be configured to form together with a PCell a set of serving cells, for example, depending on wireless device capabilities. In a downlink, a carrier corresponding to an SCell may be a downlink secondary component carrier (DL SCC). In an uplink, a carrier may be an uplink secondary component carrier (UL SCC). An SCell may or may not have an uplink carrier.

A cell, comprising a downlink carrier and optionally an uplink carrier, may be assigned a physical cell ID and/or a cell index. A carrier (downlink and/or uplink) may belong to one cell. The cell ID and/or cell index may identify the downlink carrier and/or uplink carrier of the cell (e.g., depending on the context it is used). A cell ID may be equally referred to as a carrier ID, and a cell index may be referred to as a carrier index. A physical cell ID and/or a cell index may be assigned to a cell. A cell ID may be determined using a synchronization signal transmitted via a downlink carrier. A cell index may be determined using RRC messages. A first physical cell ID for a first downlink carrier may indicate that the first physical cell ID is for a cell comprising the first downlink carrier. The same concept may be used, for example, with carrier activation and/or deactivation (e.g., secondary cell activation and/or deactivation). A first carrier that is activated may indicate that a cell comprising the first carrier is activated.

A base station may send (e.g., transmit) to a wireless device one or more messages (e.g., RRC messages) comprising a plurality of configuration parameters for one or more cells. One or more cells may comprise at least one primary cell and at least one secondary cell. An RRC message may be broadcasted and/or unicasted to the wireless device. Configuration parameters may comprise common parameters and dedicated parameters.

Services and/or functions of an RRC sublayer may comprise at least one of: broadcast of system information related to AS and/or NAS; paging initiated by a 5GC and/or an NG-RAN; establishment, maintenance, and/or release of an RRC connection between a wireless device and an NG-RAN, which may comprise at least one of addition, modification, and/or release of carrier aggregation; and/or addition, modification, and/or release of dual connectivity in NR or between E-UTRA and NR. Services and/or functions of an RRC sublayer may comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g., intra NR mobility or inter-RAT mobility) and/or a context transfer; and/or a wireless device cell selection and/or reselection and/or control of cell selection and reselection. Services and/or functions of an RRC sublayer may comprise at least one of QoS management functions; a wireless device measurement configuration/reporting; detection of and/or recovery from radio link failure; and/or NAS message transfer to and/or from a core network entity (e.g., AMF, Mobility Management Entity (MME)) from and/or to the wireless device.

An RRC sublayer may support an RRC_Idle state, an RRC_Inactive state, and/or an RRC_Connected state for a wireless device. In an RRC_Idle state, a wireless device may perform at least one of: Public Land Mobile Network (PLMN) selection; receiving broadcasted system information; cell selection and/or re-selection; monitoring and/or receiving a paging for mobile terminated data initiated by 5GC; paging for mobile terminated data area managed by 5GC; and/or DRX for CN paging configured via NAS. In an RRC_Inactive state, a wireless device may perform at least one of: receiving broadcasted system information; cell selection and/or re-selection; monitoring and/or receiving a RAN and/or CN paging initiated by an NG-RAN and/or a 5GC; RAN-based notification area (RNA) managed by an NG- RAN; and/or DRX for a RAN and/or CN paging configured by NG-RAN/NAS. In an RRC_Idle state of a wireless device, a base station (e.g., NG-RAN) may keep a 5GC-NG-RAN connection (e.g., both C/U-planes) for the wireless device; and/or store a wireless device AS context for the wireless device. In an RRC_Connected state of a wireless device, a base station (e.g., NG-RAN) may perform at least one of: establishment of 5GC-NG-RAN connection (both C/U-planes) for the wireless device; storing a UE AS context for the wireless device; send (e.g., transmit) and/or receive of unicast data to and/or from the wireless device; and/or network-controlled mobility based on measurement results received from the wireless device. In an RRC_Connected state of a wireless device, an NG-RAN may know a cell to which the wireless device belongs.

System information (SI) may be divided into minimum SI and other SI. The minimum SI may be periodically broadcast. The minimum SI may comprise basic information required for initial access and/or information for acquiring any other SI broadcast periodically and/or provisioned on-demand (e.g., scheduling information). The other SI may either be broadcast, and/or be provisioned in a dedicated manner, such as either triggered by a network and/or upon request from a wireless device. A minimum SI may be transmitted via two different downlink channels using different messages (e.g., MasterinformationBlock and SystemInformationBlockType1). Another SI may be transmitted via SystemInformationBlockType2. For a wireless device in an RRC_Connected state, dedicated RRC signaling may be used for the request and delivery of the other SI. For the wireless device in the RRC_Idle state and/or in the RRC_Inactive state, the request may trigger a random access procedure.

A wireless device may report its radio access capability information, which may be static. A base station may request one or more indications of capabilities for a wireless device to report based on band information. A temporary capability restriction request may be sent by the wireless device (e.g., if allowed by a network) to signal the limited availability of some capabilities (e.g., due to hardware sharing, interference, and/or overheating) to the base station. The base station may confirm or reject the request. The temporary capability restriction may be transparent to 5GC (e.g., static capabilities may be stored in 5GC).

A wireless device may have an RRC connection with a network, for example, if CA is configured. At RRC connection establishment, re-establishment, and/or handover procedures, a serving cell may provide NAS mobility information. At RRC connection re-establishment and/or handover, a serving cell may provide a security input. This serving cell may be referred to as the PCell. SCells may be configured to form together with the PCell a set of serving cells, for example, depending on the capabilities of the wireless device. The configured set of serving cells for the wireless device may comprise a PCell and one or more SCells.

The reconfiguration, addition, and/or removal of SCells may be performed by RRC messaging. At intra-NR handover, RRC may add, remove, and/or reconfigure SCells for usage with the target PCell. Dedicated RRC signaling may be used (e.g., if adding a new SCell) to send all required system information of the SCell (e.g., if in connected mode, wireless devices may not acquire broadcasted system information directly from the SCells).

The purpose of an RRC connection reconfiguration procedure may be to modify an RRC connection, (e.g., to establish, modify, and/or release RBs; to perform handover; to setup, modify, and/or release measurements, for example, to add, modify, and/or release SCells and cell groups). NAS dedicated information may be transferred from the network to the wireless device, for example, as part of the RRC connection reconfiguration procedure. The RRCConnectionReconfiguration message may be a command to modify an RRC connection. One or more RRC messages may convey information for measurement configuration, mobility control, and/or radio resource configuration (e.g., RBs, MAC main configuration, and/or physical channel configuration), which may comprise any associated dedicated NAS information and/or security configuration. The wireless device may perform an SCell release, for example, if the received RRC Connection Reconfiguration message includes the sCellToReleaseList. The wireless device may perform SCell additions or modification, for example, if the received RRC Connection Reconfiguration message includes the sCellToAddModList.

An RRC connection establishment, reestablishment, and/or resume procedure may be to establish, reestablish, and/or resume an RRC connection, respectively. An RRC connection establishment procedure may comprise SRB1 establishment. The RRC connection establishment procedure may be used to transfer the initial NAS dedicated information and/or message from a wireless device to an E-UTRAN. The RRCConnectionReestablishment message may be used to re-establish SRB1.

A measurement report procedure may be used to transfer measurement results from a wireless device to an NG-RAN. The wireless device may initiate a measurement report procedure, for example, after successful security activation. A measurement report message may be used to send (e.g., transmit) measurement results.

The wireless device 110 may comprise at least one communication interface 310 (e.g., a wireless modem, an antenna, and/or the like), at least one processor 314, and at least one set of program code instructions 316 that may be stored in non-transitory memory 315 and executable by the at least one processor 314. The wireless device 110 may further comprise at least one of at least one speaker and/or microphone 311, at least one keypad 312, at least one display and/or touchpad 313, at least one power source 317, at least one global positioning system (GPS) chipset 318, and/or other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and/or the like. The processor 314 of the wireless device 110, the processor 321A in base station 1 120A, and/or the processor 321B in base station 2 120B may perform at least one of signal coding and/or processing, data processing, power control, input/output processing, and/or any other functionality that may enable the wireless device 110, the base station 1 120A and/or the base station 2 120B to operate in a wireless environment.

The processor 314 of the wireless device 110 may be connected to and/or in communication with the speaker and/or microphone 311, the keypad 312, and/or the display and/or touchpad 313. The processor 314 may receive user input data from and/or provide user output data to the speaker and/or microphone 311, the keypad 312, and/or the display and/or touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and/or the like. The processor 314 may be connected to the GPS chipset 318. The GPS chipset 318 may be configured to provide geographic location information of the wireless device 110.

The processor 314 of the wireless device 110 may further be connected to and/or in communication with other peripherals 319, which may comprise one or more software and/or hardware modules that may provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and/or the like.

The communication interface 320A of the base station 1, 120A, and/or the communication interface 320B of the base station 2, 120B, may be configured to communicate with the communication interface 310 of the wireless device 110, for example, via a wireless link 330A and/or via a wireless link 330B, respectively. The communication interface 320A of the base station 1, 120A, may communicate with the communication interface 320B of the base station 2 and/or other RAN and/or core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110, and/or the base station 2 120B and the wireless device 110, may be configured to send and receive transport blocks, for example, via the wireless link 330A and/or via the wireless link 330B, respectively. The wireless link 330A and/or the wireless link 330B may use at least one frequency carrier. Transceiver(s) may be used. A transceiver may be a device that comprises both a transmitter and a receiver. Transceivers may be used in devices such as wireless devices, base stations, relay nodes, computing devices, and/or the like. Radio technology may be implemented in the communication interface 310, 320A, and/or 320B, and the wireless link 330A and/or 330B. The radio technology may comprise one or more elements shown in FIG. 4A, FIG. 4B, FIG. 4C, FIG. 4D, FIG. 6, FIG. 7A, FIG. 7B, FIG. 8, and associated text, described below.

Other nodes in a wireless network (e.g., AMF, UPF, SMF, etc.) may comprise one or more communication interfaces, one or more processors, and memory storing instructions. A node (e.g., wireless device, base station, AMF, SMF, UPF, servers, switches, antennas, and/or the like) may comprise one or more processors, and memory storing instructions that when executed by the one or more processors causes the node to perform certain processes and/or functions. Single-carrier and/or multi-carrier communication operation may be performed. A non-transitory tangible computer readable media may comprise instructions executable by one or more processors to cause operation of single-carrier and/or multi-carrier communications. An article of manufacture may comprise a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, and/or electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and/or code stored in (and/or in communication with) a memory device to implement connections, electronic device operations, protocol(s), protocol layers, communication drivers, device drivers, hardware operations, combinations thereof, and/or the like.

A communication network may comprise the wireless device 110, the base station 1, 120A, the base station 2, 120B, and/or any other device. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

FIG. 4A, FIG. 4B, FIG. 4C and FIG. 4D show examples of uplink and downlink signal transmission. FIG. 4A shows an example uplink transmitter for at least one physical channel A baseband signal representing a physical uplink shared channel may perform one or more functions. The one or more functions may comprise at least one of: scrambling (e.g., by Scrambling); modulation of scrambled bits to generate complex-valued symbols (e.g., by a Modulation mapper); mapping of the complex-valued modulation symbols onto one or several transmission layers (e.g., by a Layer mapper); transform precoding to generate complex-valued symbols (e.g., by a Transform precoder); precoding of the complex-valued symbols (e.g., by a Precoder); mapping of precoded complex-valued symbols to resource elements (e.g., by a Resource element mapper); generation of complex-valued time-domain Single Carrier-Frequency Division Multiple Access (SC-FDMA) or CP-OFDM signal for an antenna port (e.g., by a signal gen.); and/or the like. A SC-FDMA signal for uplink transmission may be generated, for example, if transform precoding is enabled. A CP-OFDM signal for uplink transmission may be generated by FIG. 4A, for example, if transform precoding is not enabled. These functions are shown as examples and other mechanisms may be implemented.

FIG. 4B shows an example of modulation and up-conversion to the carrier frequency of a complex-valued SC-FDMA or CP-OFDM baseband signal for an antenna port and/or for the complex-valued Physical Random Access CHannel (PRACH) baseband signal. Filtering may be performed prior to transmission.

FIG. 4C shows an example of downlink transmissions. The baseband signal representing a downlink physical channel may perform one or more functions. The one or more functions may comprise: scrambling of coded bits in a codeword to be transmitted on a physical channel (e.g., by Scrambling); modulation of scrambled bits to generate complex-valued modulation symbols (e.g., by a Modulation mapper); mapping of the complex-valued modulation symbols onto one or several transmission layers (e.g., by a Layer mapper); precoding of the complex-valued modulation symbols on a layer for transmission on the antenna ports (e.g., by Precoding); mapping of complex-valued modulation symbols for an antenna port to resource elements (e.g., by a Resource element mapper); generation of complex-valued time-domain OFDM signal for an antenna port (e.g., by an OFDM signal gen.); and/or the like. These functions are shown as examples and other mechanisms may be implemented.

A base station may send (e.g., transmit) a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. A first antenna port and a second antenna port may be quasi co-located, for example, if one or more large-scale properties of the channel over which a first symbol on the first antenna port is conveyed may be inferred from the channel over which a second symbol on a second antenna port is conveyed. The one or more large-scale properties may comprise at least one of: delay spread; Doppler spread; Doppler shift; average gain; average delay; and/or spatial receiving (Rx) parameters.

FIG. 4D shows an example modulation and up-conversion to the carrier frequency of the complex-valued OFDM baseband signal for an antenna port. Filtering may be performed prior to transmission.

Figure 5A:
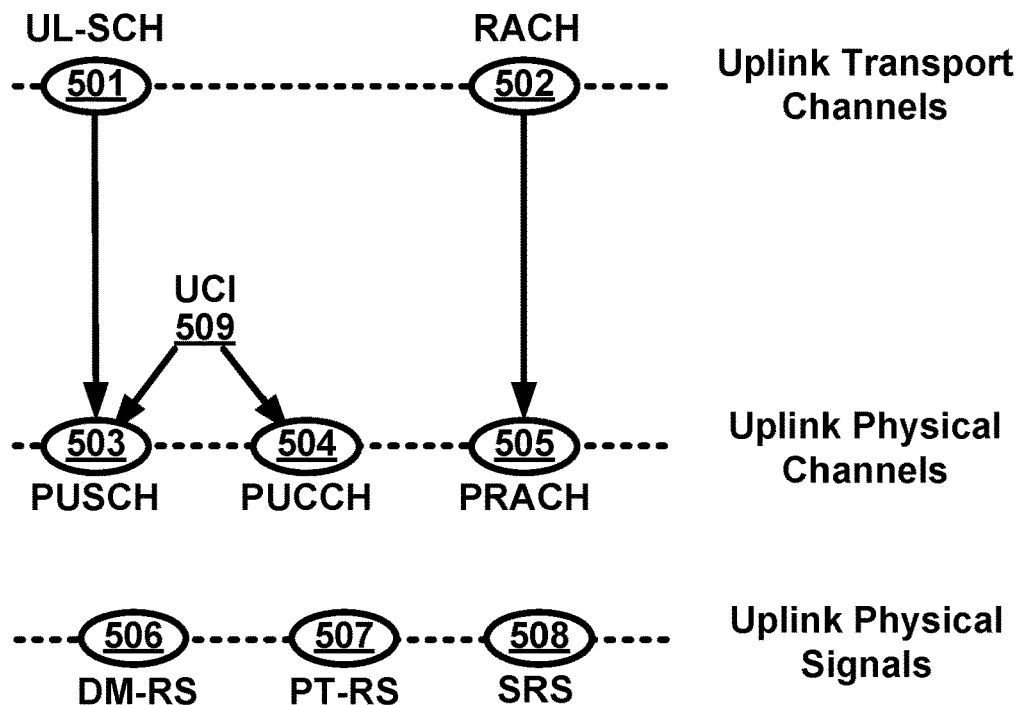
FIG. 5A shows an example uplink channel mapping and example uplink physical signals.

FIG. 5A shows example uplink channel mapping and example uplink physical signals. A physical layer may provide one or more information transfer services to a MAC and/or one or more higher layers. The physical layer may provide the one or more information transfer services to the MAC via one or more transport channels. An information transfer service may indicate how and/or with what characteristics data is transferred over the radio interface.

Uplink transport channels may comprise an Uplink-Shared CHannel (UL-SCH) 501 and/or a Random Access CHannel (RACH) 502. A wireless device may send (e.g., transmit) one or more uplink DM-RSs 506 to a base station for channel estimation, for example, for coherent demodulation of one or more uplink physical channels (e.g., PUSCH 503 and/or PUCCH 504). The wireless device may send (e.g., transmit) to a base station at least one uplink DM-RS 506 with PUSCH 503 and/or PUCCH 504, wherein the at least one uplink DM-RS 506 may be spanning a same frequency range as a corresponding physical channel. The base station may configure the wireless device with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to send (e.g., transmit) at one or more symbols of a PUSCH and/or PUCCH. The base station may semi-statically configure the wireless device with a maximum number of front-loaded DM-RS symbols for PUSCH and/or PUCCH. The wireless device may schedule a single-symbol DM-RS and/or double symbol DM-RS based on a maximum number of front-loaded DM-RS symbols, wherein the base station may configure the wireless device with one or more additional uplink DM-RS for PUSCH and/or PUCCH. A new radio network may support, for example, at least for CP-OFDM, a common DM-RS structure for DL and UL, wherein a DM-RS location, DM-RS pattern, and/or scrambling sequence may be same or different.

Whether or not an uplink PT-RS 507 is present may depend on an RRC configuration. A presence of the uplink PT-RS may be wireless device-specifically configured. A presence and/or a pattern of the uplink PT-RS 507 in a scheduled resource may be wireless device-specifically configured by a combination of RRC signaling and/or association with one or more parameters used for other purposes (e.g., Modulation and Coding Scheme (MCS)) which may be indicated by DCI. If configured, a dynamic presence of uplink PT-RS 507 may be associated with one or more DCI parameters comprising at least a MCS. A radio network may support a plurality of uplink PT-RS densities defined in time/frequency domain. If present, a frequency domain density may be associated with at least one configuration of a scheduled bandwidth. A wireless device may assume a same precoding for a DM-RS port and a PT-RS port. A number of PT-RS ports may be less than a number of DM-RS ports in a scheduled resource. The uplink PT-RS 507 may be confined in the scheduled time/frequency duration for a wireless device.

A wireless device may send (e.g., transmit) an SRS 508 to a base station for channel state estimation, for example, to support uplink channel dependent scheduling and/or link adaptation. The SRS 508 sent (e.g., transmitted) by the wireless device may allow for the base station to estimate an uplink channel state at one or more different frequencies. A base station scheduler may use an uplink channel state to assign one or more resource blocks of a certain quality (e.g., above a quality threshold) for an uplink PUSCH transmission from the wireless device. The base station may semi-statically configure the wireless device with one or more SRS resource sets. For an SRS resource set, the base station may configure the wireless device with one or more SRS resources. An SRS resource set applicability may be configured by a higher layer (e.g., RRC) parameter. An SRS resource in each of one or more SRS resource sets may be sent (e.g., transmitted) at a time instant, for example, if a higher layer parameter indicates beam management. The wireless device may send (e.g., transmit) one or more SRS resources in different SRS resource sets simultaneously. A new radio network may support aperiodic, periodic, and/or semi-persistent SRS transmissions. The wireless device may send (e.g., transmit) SRS resources, for example, based on one or more trigger types. The one or more trigger types may comprise higher layer signaling (e.g., RRC) and/or one or more DCI formats (e.g., at least one DCI format may be used for a wireless device to select at least one of one or more configured SRS resource sets). An SRS trigger type 0 may refer to an SRS triggered based on a higher layer signaling. An SRS trigger type 1 may refer to an SRS triggered based on one or more DCI formats. The wireless device may be configured to send (e.g., transmit) the SRS 508 after a transmission of PUSCH 503 and corresponding uplink DM-RS 506, for example, if PUSCH 503 and the SRS 508 are transmitted in a same slot.

A base station may semi-statically configure a wireless device with one or more SRS configuration parameters indicating at least one of following: an SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, an SRS bandwidth, a frequency hopping bandwidth, a cyclic shift, and/or an SRS sequence ID.

Figure 5B:
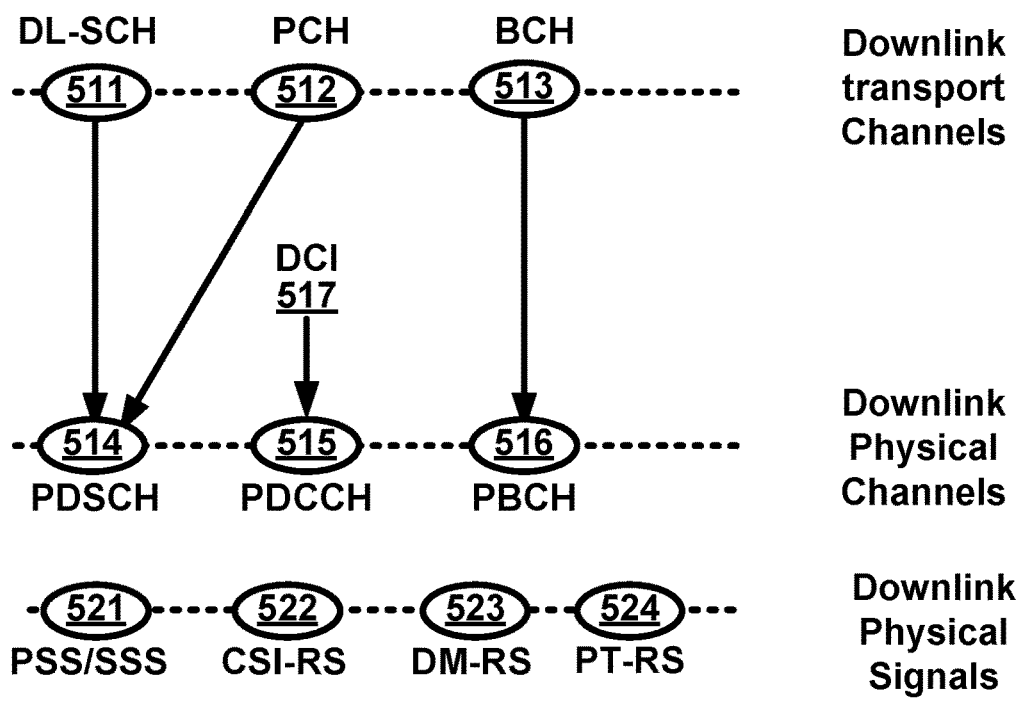
FIG. 5B shows an example downlink channel mapping and example downlink physical signals.

FIG. 5B shows an example downlink channel mapping and downlink physical signals. Downlink transport channels may comprise a Downlink-Shared CHannel (DL-SCH) 511, a Paging CHannel (PCH) 512, and/or a Broadcast CHannel (BCH) 513. A transport channel may be mapped to one or more corresponding physical channels. A UL-SCH 501 may be mapped to a Physical Uplink Shared CHannel (PUSCH) 503. A RACH 502 may be mapped to a PRACH 505. A DL-SCH 511 and a PCH 512 may be mapped to a Physical Downlink Shared CHannel (PDSCH) 514. A BCH 513 may be mapped to a Physical Broadcast CHannel (PBCH) 516.

A radio network may comprise one or more downlink and/or uplink transport channels. The radio network may comprise one or more physical channels without a corresponding transport channel. The one or more physical channels may be used for an Uplink Control Information (UCI) 509 and/or a Downlink Control Information (DCI) 517. A Physical Uplink Control CHannel (PUCCH) 504 may carry UCI 509 from a wireless device to a base station. A Physical Downlink Control CHannel (PDCCH) 515 may carry the DCI 517 from a base station to a wireless device. The radio network (e.g., NR) may support the UCI 509 multiplexing in the PUSCH 503, for example, if the UCI 509 and the PUSCH 503 transmissions may coincide in a slot (e.g., at least in part). The UCI 509 may comprise at least one of a CSI, an Acknowledgement (ACK)/Negative Acknowledgement (NACK), and/or a scheduling request. The DCI 517 via the PDCCH 515 may indicate at least one of following: one or more downlink assignments and/or one or more uplink scheduling grants.

In uplink, a wireless device may send (e.g., transmit) one or more Reference Signals (RSs) to a base station. The one or more RSs may comprise at least one of a Demodulation-RS (DM-RS) 506, a Phase Tracking-RS (PT-RS) 507, and/or a Sounding RS (SRS) 508. In downlink, a base station may send (e.g., transmit, unicast, multicast, and/or broadcast) one or more RSs to a wireless device. The one or more RSs may comprise at least one of a Primary Synchronization Signal (PSS)/Secondary Synchronization Signal (SSS) 521, a CSI-RS 522, a DM-RS 523, and/or a PT-RS 524.

In a time domain, an SS/PBCH block may comprise one or more OFDM symbols (e.g., 4 OFDM symbols numbered in increasing order from 0 to 3) within the SS/PBCH block. An SS/PBCH block may comprise the PSS/SSS 521 and/or the PBCH 516. In the frequency domain, an SS/PBCH block may comprise one or more contiguous subcarriers (e.g., 240 contiguous subcarriers with the subcarriers numbered in increasing order from 0 to 239) within the SS/PBCH block. The PSS/SSS 521 may occupy, for example, 1 OFDM symbol and 127 subcarriers. The PBCH 516 may span across, for example, 3 OFDM symbols and 240 subcarriers. A wireless device may assume that one or more SS/PBCH blocks transmitted with a same block index may be quasi co-located, for example, with respect to Doppler spread, Doppler shift, average gain, average delay, and/or spatial Rx parameters. A wireless device may not assume quasi co-location for other SS/PBCH block transmissions. A periodicity of an SS/PBCH block may be configured by a radio network (e.g., by an RRC signaling). One or more time locations in which the SS/PBCH block may be sent may be determined by sub-carrier spacing. A wireless device may assume a band-specific sub-carrier spacing for an SS/PBCH block, for example, unless a radio network has configured the wireless device to assume a different sub-carrier spacing.

The downlink CSI-RS 522 may be used for a wireless device to acquire channel state information. A radio network may support periodic, aperiodic, and/or semi-persistent transmission of the downlink CSI-RS 522. A base station may semi-statically configure and/or reconfigure a wireless device with periodic transmission of the downlink CSI-RS 522. A configured CSI-RS resources may be activated and/or deactivated. For semi-persistent transmission, an activation and/or deactivation of a CSI-RS resource may be triggered dynamically. A CSI-RS configuration may comprise one or more parameters indicating at least a number of antenna ports. A base station may configure a wireless device with 32 ports, or any other number of ports. A base station may semi-statically configure a wireless device with one or more CSI-RS resource sets. One or more CSI-RS resources may be allocated from one or more CSI-RS resource sets to one or more wireless devices. A base station may semi-statically configure one or more parameters indicating CSI RS resource mapping, for example, time-domain location of one or more CSI-RS resources, a bandwidth of a CSI-RS resource, and/or a periodicity. A wireless device may be configured to use the same OFDM symbols for the downlink CSI-RS 522 and the Control Resource Set (CORESET), for example, if the downlink CSI-RS 522 and the CORESET are spatially quasi co-located and resource elements associated with the downlink CSI-RS 522 are the outside of PRBs configured for the CORESET. A wireless device may be configured to use the same OFDM symbols for downlink CSI-RS 522 and SS/PBCH blocks, for example, if the downlink CSI-RS 522 and SS/PBCH blocks are spatially quasi co-located and resource elements associated with the downlink CSI-RS 522 are outside of the PRBs configured for the SS/PBCH blocks.

A wireless device may send (e.g., transmit) one or more downlink DM-RSs 523 to a base station for channel estimation, for example, for coherent demodulation of one or more downlink physical channels (e.g., PDSCH 514). A radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a wireless device with a maximum number of front-loaded DM-RS symbols for PDSCH 514. A DM-RS configuration may support one or more DM-RS ports. A DM-RS configuration may support at least 8 orthogonal downlink DM-RS ports, for example, for single user-MIMO. ADM-RS configuration may support 12 orthogonal downlink DM-RS ports, for example, for multiuser-MIMO. A radio network may support, for example, at least for CP-OFDM, a common DM-RS structure for DL and UL, wherein a DM-RS location, DM-RS pattern, and/or scrambling sequence may be the same or different.

Whether or not the downlink PT-RS 524 is present may depend on an RRC configuration. A presence of the downlink PT-RS 524 may be wireless device-specifically configured. A presence and/or a pattern of the downlink PT-RS 524 in a scheduled resource may be wireless device-specifically configured, for example, by a combination of RRC signaling and/or an association with one or more parameters used for other purposes (e.g., MCS) which may be indicated by the DCI. If configured, a dynamic presence of the downlink PT-RS 524 may be associated with one or more DCI parameters comprising at least MCS. A radio network may support a plurality of PT-RS densities in a time/frequency domain. If present, a frequency domain density may be associated with at least one configuration of a scheduled bandwidth. A wireless device may assume the same precoding for a DM-RS port and a PT-RS port. A number of PT-RS ports may be less than a number of DM-RS ports in a scheduled resource. The downlink PT-RS 524 may be confined in the scheduled time/frequency duration for a wireless device.

Figure 6:
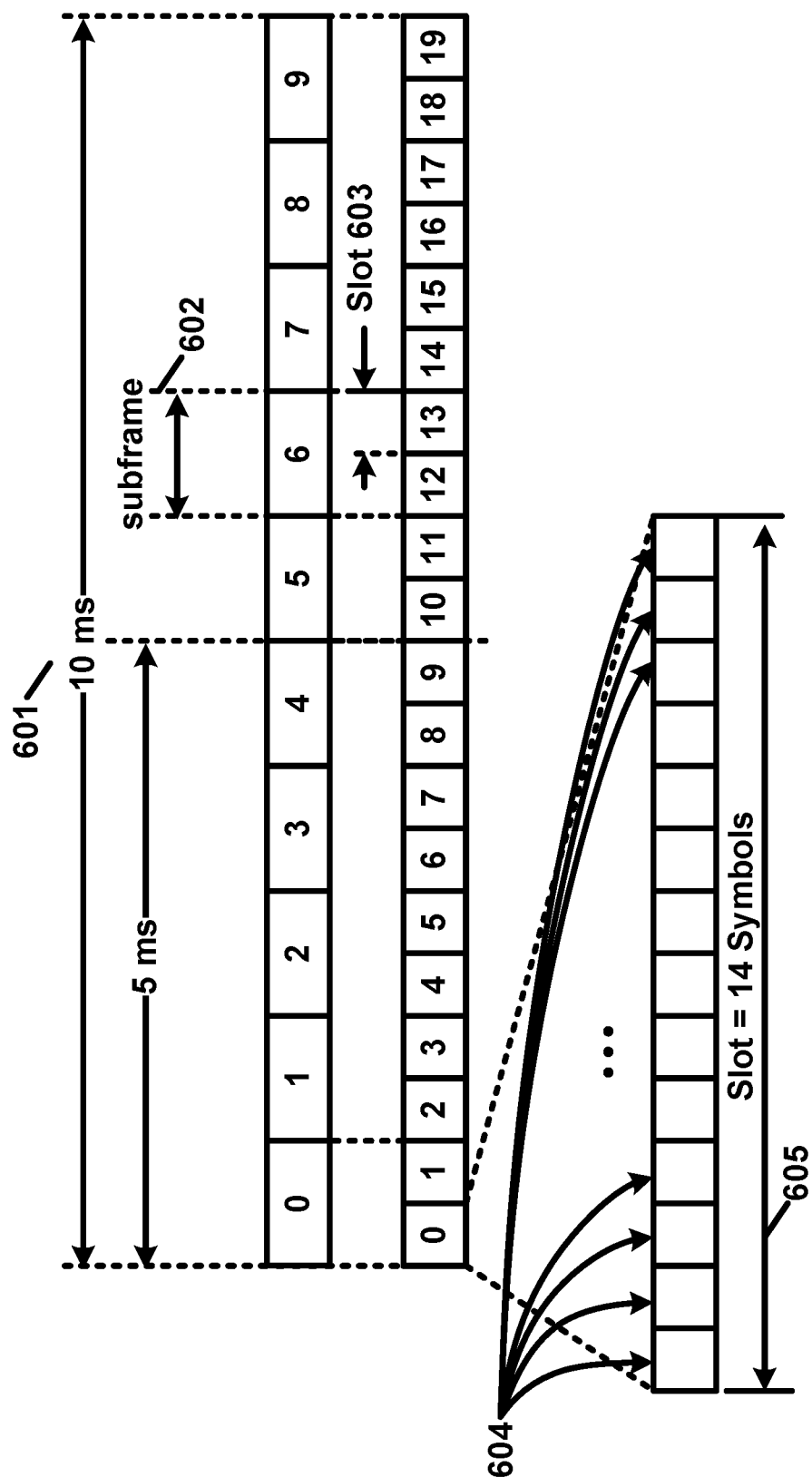
FIG. 6 shows an example transmission time and/or reception time for a carrier.

FIG. 6 shows an example transmission time and reception time, as well as an example frame structure, for a carrier. A multicarrier OFDM communication system may include one or more carriers, for example, ranging from 1 to 32 carriers (such as for carrier aggregation) or ranging from 1 to 64 carriers (such as for dual connectivity). Different radio frame structures may be supported (e.g., for FDD and/or for TDD duplex mechanisms). FIG. 6 shows an example frame timing. Downlink and uplink transmissions may be organized into radio frames 601. Radio frame duration may be 10 milliseconds (ms). A 10 ms radio frame 601 may be divided into ten equally sized subframes 602, each with a 1 ms duration. Subframe(s) may comprise one or more slots (e.g., slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Other subframe durations such as, for example, 0.5 ms, 1 ms, 2 ms, and 5 ms may be supported. Uplink and downlink transmissions may be separated in the frequency domain. Slot(s) may include a plurality of OFDM symbols 604. The number of OFDM symbols 604 in a slot 605 may depend on the cyclic prefix length. A slot may be 14 OFDM symbols for the same subcarrier spacing of up to 480 kHz with normal CP. A slot may be 12 OFDM symbols for the same subcarrier spacing of 60 kHz with extended CP. A slot may comprise downlink, uplink, and/or a downlink part and an uplink part, and/or alike.

Figure 7A:
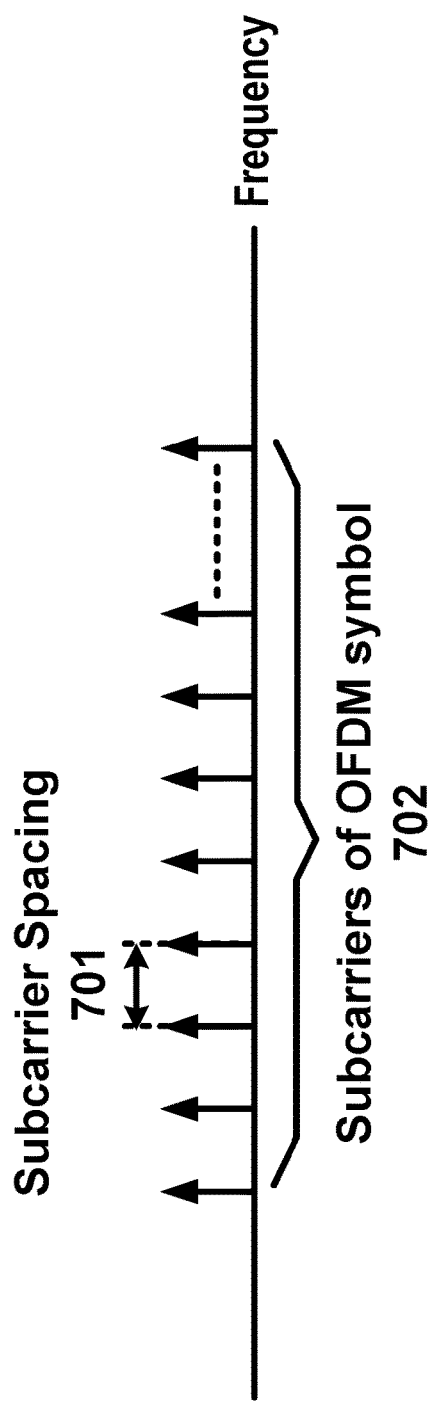
FIG. 7A and FIG. 7B show example sets of orthogonal frequency division multiplexing (OFDM) subcarriers.

FIG. 7A shows example sets of OFDM subcarriers. A base station may communicate with a wireless device using a carrier having an example channel bandwidth 700. Arrow(s) in the example may depict a subcarrier in a multicarrier OFDM system. The OFDM system may use technology such as OFDM technology, SC-FDMA technology, and/or the like. An arrow 701 shows a subcarrier transmitting information symbols. A subcarrier spacing 702, between two contiguous subcarriers in a carrier, may be any one of 15 kHz, 30 kHz, 60 kHz, 120 kHz, 240 kHz, or any other frequency. Different subcarrier spacing may correspond to different transmission numerologies. A transmission numerology may comprise at least: a numerology index; a value of subcarrier spacing; and/or a type of cyclic prefix (CP). A base station may send (e.g., transmit) to and/or receive from a wireless device via a number of subcarriers 703 in a carrier. A bandwidth occupied by a number of subcarriers 703 (e.g., transmission bandwidth) may be smaller than the channel bandwidth 700 of a carrier, for example, due to guard bands 704 and 705. Guard bands 704 and 705 may be used to reduce interference to and from one or more neighbor carriers. A number of subcarriers (e.g., transmission bandwidth) in a carrier may depend on the channel bandwidth of the carrier and/or the subcarrier spacing. A transmission bandwidth, for a carrier with a 20 MHz channel bandwidth and a 15 kHz subcarrier spacing, may be in number of 1024 subcarriers.

A base station and a wireless device may communicate with multiple component carriers (CCs), for example, if configured with CA. Different component carriers may have different bandwidth and/or different subcarrier spacing, for example, if CA is supported. A base station may send (e.g., transmit) a first type of service to a wireless device via a first component carrier. The base station may send (e.g., transmit) a second type of service to the wireless device via a second component carrier. Different types of services may have different service requirements (e.g., data rate, latency, reliability), which may be suitable for transmission via different component carriers having different subcarrier spacing and/or different bandwidth.

Figure 7B:
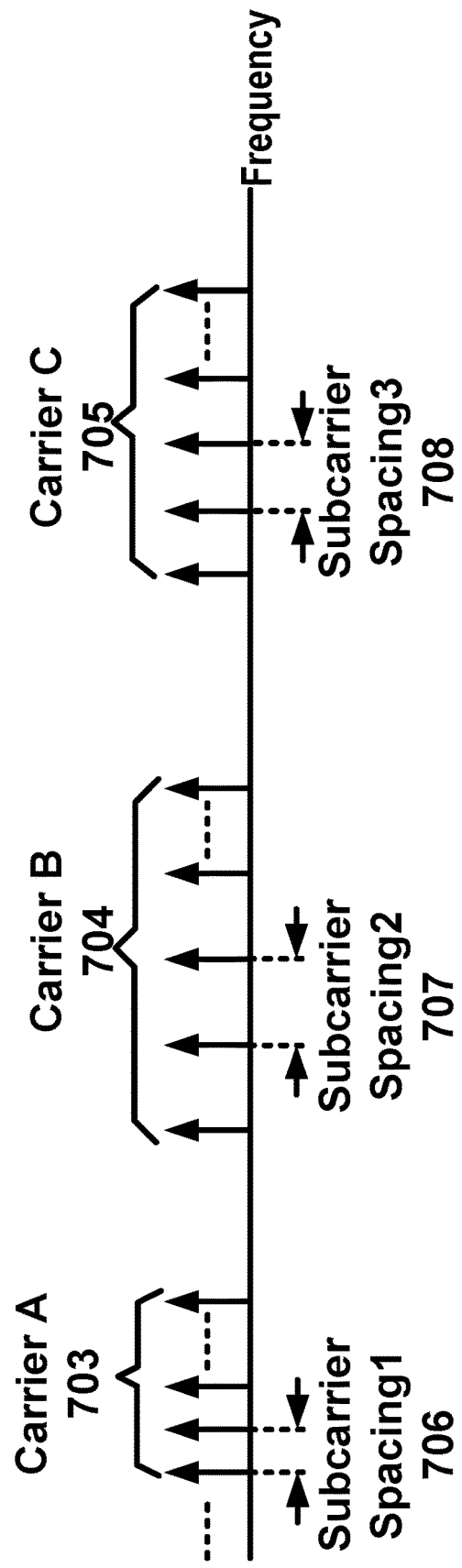

FIG. 7B shows examples of component carriers. A first component carrier may comprise a first number of subcarriers 706 having a first subcarrier spacing 709. A second component carrier may comprise a second number of subcarriers 707 having a second subcarrier spacing 710. A third component carrier may comprise a third number of subcarriers 708 having a third subcarrier spacing 711. Carriers in a multicarrier OFDM communication system may be contiguous carriers, non-contiguous carriers, or a combination of both contiguous and non-contiguous carriers.

Figure 8:
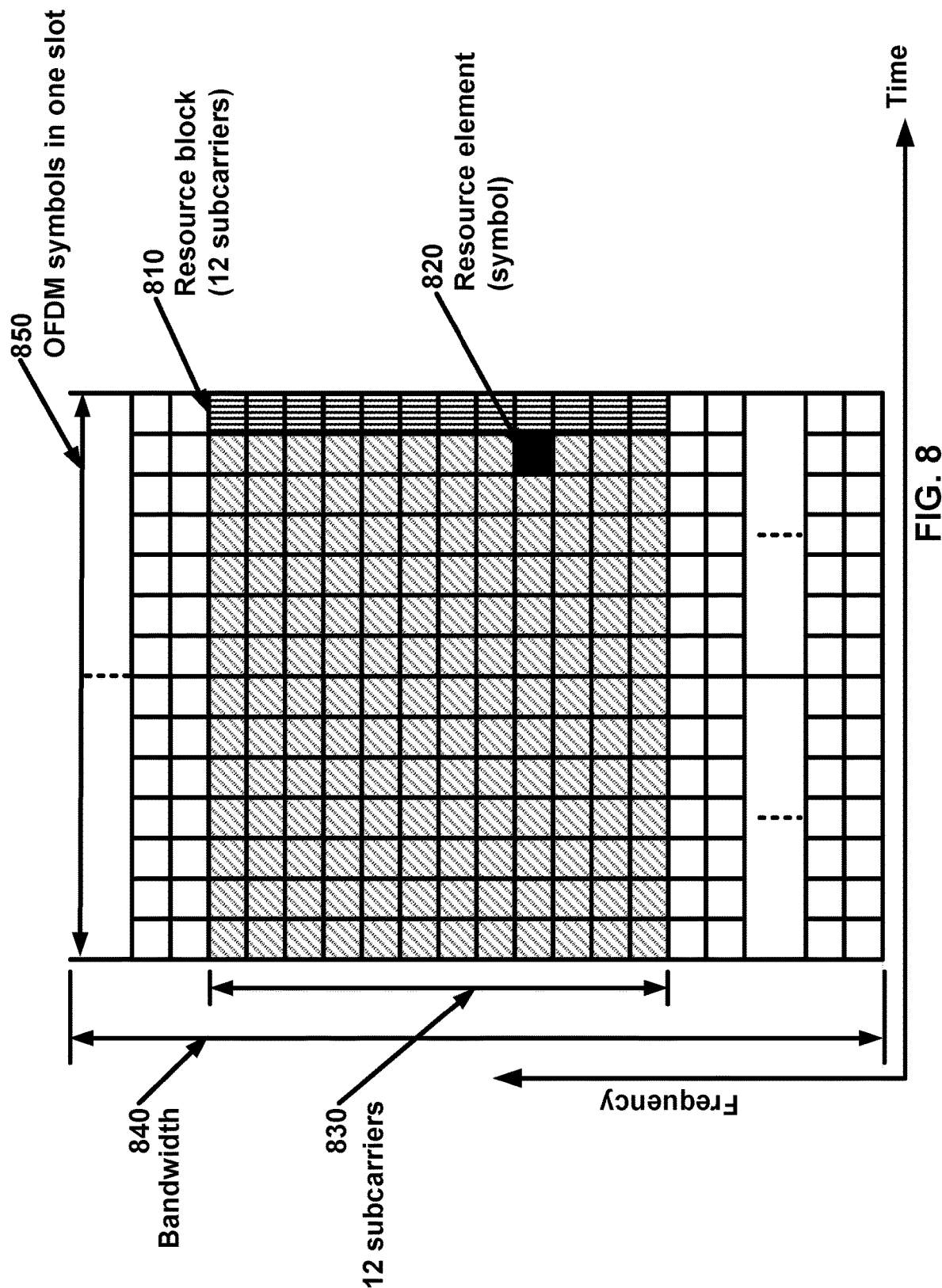
FIG. 8 shows example OFDM radio resources.

FIG. 8 shows an example of OFDM radio resources. A carrier may have a transmission bandwidth 801. A resource grid may be in a structure of frequency domain 802 and time domain 803. A resource grid may comprise a first number of OFDM symbols in a subframe and a second number of resource blocks, starting from a common resource block indicated by higher-layer signaling (e.g., RRC signaling), for a transmission numerology and a carrier. In a resource grid, a resource element 805 may comprise a resource unit that may be identified by a subcarrier index and a symbol index. A subframe may comprise a first number of OFDM symbols 807 that may depend on a numerology associated with a carrier. A subframe may have 14 OFDM symbols for a carrier, for example, if a subcarrier spacing of a numerology of a carrier is 15 kHz. A subframe may have 28 OFDM symbols, for example, if a subcarrier spacing of a numerology is 30 kHz. A subframe may have 56 OFDM symbols, for example, if a subcarrier spacing of a numerology is 60 kHz. A subcarrier spacing of a numerology may comprise any other frequency. A second number of resource blocks comprised in a resource grid of a carrier may depend on a bandwidth and a numerology of the carrier.

A resource block 806 may comprise 12 subcarriers. Multiple resource blocks may be grouped into a Resource Block Group (RBG) 804. A size of a RBG may depend on at least one of: a RRC message indicating a RBG size configuration; a size of a carrier bandwidth; and/or a size of a bandwidth part of a carrier. A carrier may comprise multiple bandwidth parts. A first bandwidth part of a carrier may have a different frequency location and/or a different bandwidth from a second bandwidth part of the carrier.

A base station may send (e.g., transmit), to a wireless device, a downlink control information comprising a downlink or uplink resource block assignment. A base station may send (e.g., transmit) to and/or receive from, a wireless device, data packets (e.g., transport blocks). The data packets may be scheduled on and transmitted via one or more resource blocks and one or more slots indicated by parameters in downlink control information and/or RRC message(s). A starting symbol relative to a first slot of the one or more slots may be indicated to the wireless device. A base station may send (e.g., transmit) to and/or receive from, a wireless device, data packets. The data packets may be scheduled for transmission on one or more RBGs and in one or more slots.

A base station may send (e.g., transmit), to a wireless device, downlink control information comprising a downlink assignment. The base station may send (e.g., transmit) the DCI via one or more PDCCHs. The downlink assignment may comprise parameters indicating at least one of a modulation and coding format; resource allocation; and/or HARQ information related to the DL-SCH. The resource allocation may comprise parameters of resource block allocation; and/or slot allocation. A base station may allocate (e.g., dynamically) resources to a wireless device, for example, via a Cell-Radio Network Temporary Identifier (C-RNTI) on one or more PDCCHs. The wireless device may monitor the one or more PDCCHs, for example, in order to find possible allocation if its downlink reception is enabled. The wireless device may receive one or more downlink data packets on one or more PDSCH scheduled by the one or more PDCCHs, for example, if the wireless device successfully detects the one or more PDCCHs.

A base station may allocate Configured Scheduling (CS) resources for down link transmission to a wireless device. The base station may send (e.g., transmit) one or more RRC messages indicating a periodicity of the CS grant. The base station may send (e.g., transmit) DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages. The CS grant may be implicitly reused, for example, until deactivated.

A base station may send (e.g., transmit), to a wireless device via one or more PDCCHs, downlink control information comprising an uplink grant. The uplink grant may comprise parameters indicating at least one of a modulation and coding format; a resource allocation; and/or HARQ information related to the UL-SCH. The resource allocation may comprise parameters of resource block allocation; and/or slot allocation. The base station may dynamically allocate resources to the wireless device via a C-RNTI on one or more PDCCHs. The wireless device may monitor the one or more PDCCHs, for example, in order to find possible resource allocation. The wireless device may send (e.g., transmit) one or more uplink data packets via one or more PUSCH scheduled by the one or more PDCCHs, for example, if the wireless device successfully detects the one or more PDCCHs.

The base station may allocate CS resources for uplink data transmission to a wireless device. The base station may transmit one or more RRC messages indicating a periodicity of the CS grant. The base station may send (e.g., transmit) DCI via a PDCCH addressed to a CS-RNTI to activate the CS resources. The DCI may comprise parameters indicating that the uplink grant is a CS grant. The CS grant may be implicitly reused according to the periodicity defined by the one or more RRC message, The CS grant may be implicitly reused, for example, until deactivated.

A base station may send (e.g., transmit) DCI and/or control signaling via a PDCCH. The DCI may comprise a format of a plurality of formats. The DCI may comprise downlink and/or uplink scheduling information (e.g., resource allocation information, HARQ related parameters, MCS), request(s) for CSI (e.g., aperiodic CQI reports), request(s) for an SRS, uplink power control commands for one or more cells, one or more timing information (e.g., TB transmission/reception timing, HARQ feedback timing, etc.), and/or the like. The DCI may indicate an uplink grant comprising transmission parameters for one or more transport blocks. The DCI may indicate a downlink assignment indicating parameters for receiving one or more transport blocks. The DCI may be used by the base station to initiate a contention-free random access at the wireless device. The base station may send (e.g., transmit) DCI comprising a slot format indicator (SFI) indicating a slot format. The base station may send (e.g., transmit) DCI comprising a preemption indication indicating the PRB(s) and/or OFDM symbol(s) in which a wireless device may assume no transmission is intended for the wireless device. The base station may send (e.g., transmit) DCI for group power control of the PUCCH, the PUSCH, and/or an SRS. DCI may correspond to an RNTI. The wireless device may obtain an RNTI after or in response to completing the initial access (e.g., C-RNTI). The base station may configure an RNTI for the wireless (e.g., CS-RNTI, TPC-CS-RNTI, TPC-PUCCH-RNTI, TPC-PUSCH-RNTI, TPC-SRS-RNTI, etc.). The wireless device may determine (e.g., compute) an RNTI (e.g., the wireless device may determine the RA-RNTI based on resources used for transmission of a preamble). An RNTI may have a pre-configured value (e.g., P-RNTI or SI-RNTI). The wireless device may monitor a group common search space which may be used by the base station for sending (e.g., transmitting) DCIs that are intended for a group of wireless devices. A group common DCI may correspond to an RNTI which is commonly configured for a group of wireless devices. The wireless device may monitor a wireless device-specific search space. A wireless device specific DCI may correspond to an RNTI configured for the wireless device.

A communications system (e.g., an NR system) may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources (e.g., which may be associated with a CSI-RS resource index (CRI)), and/or one or more DM-RSs of a PBCH, may be used as an RS for measuring a quality of a beam pair link. The quality of a beam pair link may be based on a reference signal received power (RSRP) value, a reference signal received quality (RSRQ) value, and/or a CSI value measured on RS resources. The base station may indicate whether an RS resource, used for measuring a beam pair link quality, is quasi-co-located (QCLed) with DM-RSs of a control channel. An RS resource and DM-RSs of a control channel may be called QCLed, for example, if channel characteristics from a transmission on an RS to a wireless device, and that from a transmission on a control channel to a wireless device, are similar or the same under a configured criterion. In a multi-beam operation, a wireless device may perform an uplink beam sweeping to access a cell.

A wireless device may be configured to monitor a PDCCH on one or more beam pair links simultaneously, for example, depending on a capability of the wireless device. This monitoring may increase robustness against beam pair link blocking. A base station may send (e.g., transmit) one or more messages to configure the wireless device to monitor the PDCCH on one or more beam pair links in different PDCCH OFDM symbols. A base station may send (e.g., transmit) higher layer signaling (e.g., RRC signaling) and/or a MAC CE comprising parameters related to the Rx beam setting of the wireless device for monitoring the PDCCH on one or more beam pair links. The base station may send (e.g., transmit) an indication of a spatial QCL assumption between an DL RS antenna port(s) (e.g., a cell-specific CSI-RS, a wireless device-specific CSI-RS, an SS block, and/or a PBCH with or without DM-RSs of the PBCH) and/or DL RS antenna port(s) for demodulation of a DL control channel. Signaling for beam indication for a PDCCH may comprise MAC CE signaling, RRC signaling, DCI signaling, and/or specification-transparent and/or implicit method, and/or any combination of signaling methods.

A base station may indicate spatial QCL parameters between DL RS antenna port(s) and DM-RS antenna port(s) of a DL data channel, for example, for reception of a unicast DL data channel. The base station may send (e.g., transmit) DCI (e.g., downlink grants) comprising information indicating the RS antenna port(s). The information may indicate RS antenna port(s) that may be QCL-ed with the DM-RS antenna port(s). A different set of DM-RS antenna port(s) for a DL data channel may be indicated as QCL with a different set of the RS antenna port(s).

Figure 9A:
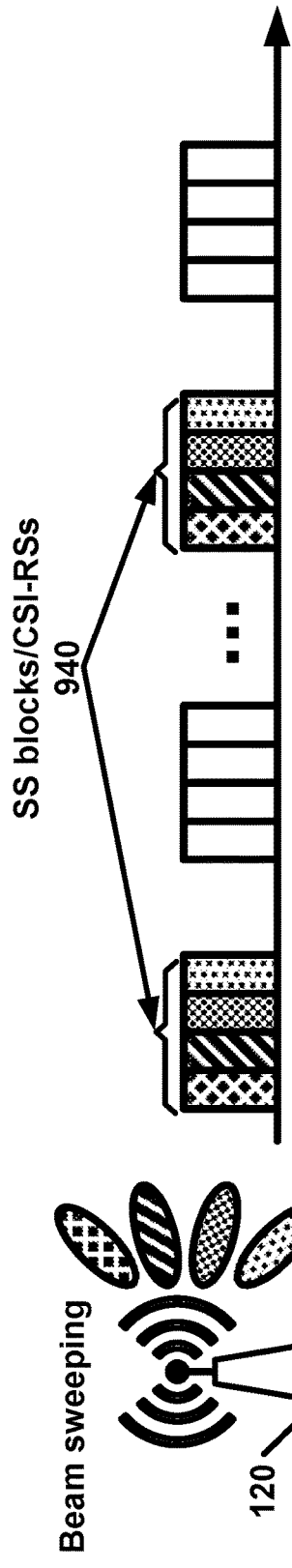
FIG. 9A shows an example channel state information reference signal (CSI-RS) and/or synchronization signal (SS) block transmission in a multi-beam system.

FIG. 9A shows an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. A base station 120 may send (e.g., transmit) SS blocks in multiple beams, together forming a SS burst 940, for example, in a multi-beam operation. One or more SS blocks may be sent (e.g., transmitted) on one beam. If multiple SS bursts 940 are transmitted with multiple beams, SS bursts together may form SS burst set 950.

A wireless device may use CSI-RS for estimating a beam quality of a link between a wireless device and a base station, for example, in the multi beam operation. A beam may be associated with a CSI-RS. A wireless device may (e.g., based on a RSRP measurement on CSI-RS) report a beam index, which may be indicated in a CRI for downlink beam selection and/or associated with an RSRP value of a beam. A CSI-RS may be sent (e.g., transmitted) on a CSI-RS resource, which may comprise at least one of: one or more antenna ports and/or one or more time and/or frequency radio resources. A CSI-RS resource may be configured in a cell-specific way such as by common RRC signaling, or in a wireless device-specific way such as by dedicated RRC signaling and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be sent (e.g., transmitted) periodically, using aperiodic transmission, or using a multi-shot or semi-persistent transmission. In a periodic transmission in FIG. 9A, a base station 120 may send (e.g., transmit) configured CSI-RS resources 940 periodically using a configured periodicity in a time domain. In an aperiodic transmission, a configured CSI-RS resource may be sent (e.g., transmitted) in a dedicated time slot. In a multi-shot and/or semi-persistent transmission, a configured CSI-RS resource may be sent (e.g., transmitted) within a configured period. Beams used for CSI-RS transmission may have a different beam width than beams used for SS-blocks transmission.

Figure 9B:
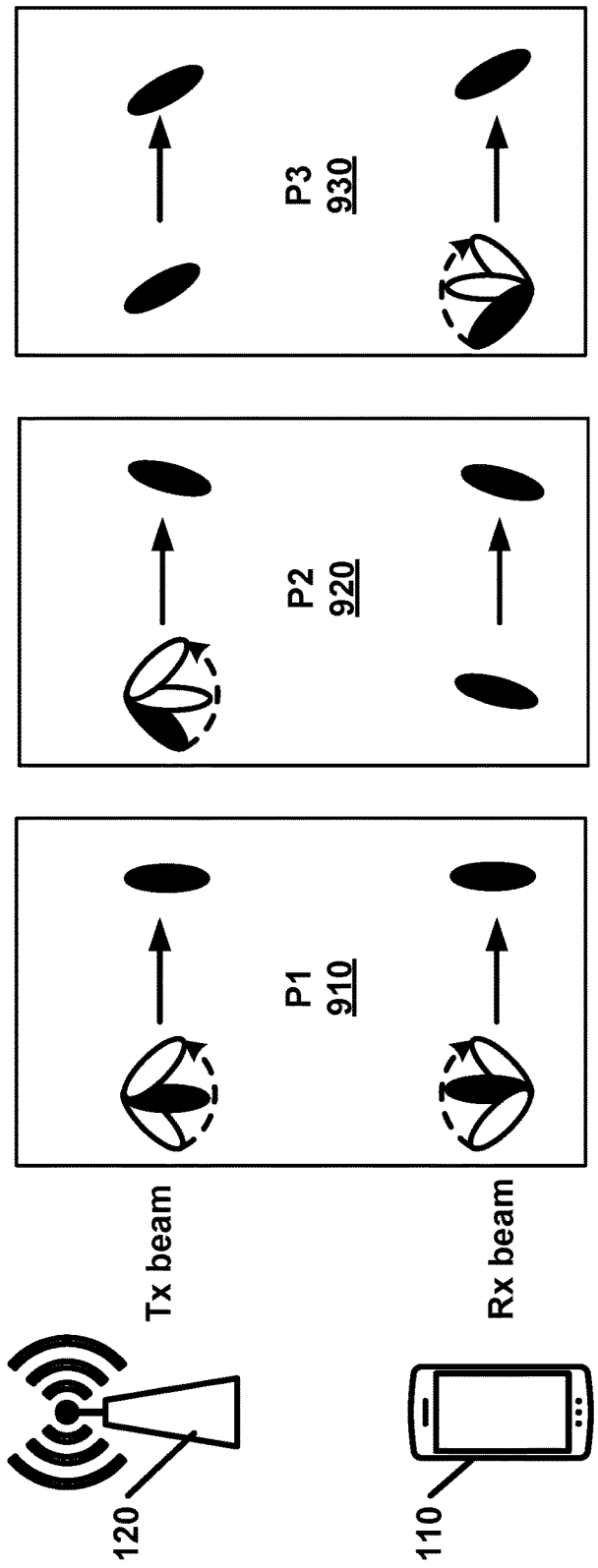
FIG. 9B shows an example downlink beam management procedure.

FIG. 9B shows an example of a beam management procedure, such as in an example new radio network. The base station 120 and/or the wireless device 110 may perform a downlink L1/L2 beam management procedure. One or more of the following downlink L1/L2 beam management procedures may be performed within one or more wireless devices 110 and one or more base stations 120. A P1 procedure 910 may be used to enable the wireless device 110 to measure one or more Transmission (Tx) beams associated with the base station 120, for example, to support a selection of a first set of Tx beams associated with the base station 120 and a first set of Rx beam(s) associated with the wireless device 110. A base station 120 may sweep a set of different Tx beams, for example, for beamforming at a base station 120 (such as shown in the top row, in a counter-clockwise direction). A wireless device 110 may sweep a set of different Rx beams, for example, for beamforming at a wireless device 110 (such as shown in the bottom row, in a clockwise direction). A P2 procedure 920 may be used to enable a wireless device 110 to measure one or more Tx beams associated with a base station 120, for example, to possibly change a first set of Tx beams associated with a base station 120. A P2 procedure 920 may be performed on a possibly smaller set of beams (e.g., for beam refinement) than in the P1 procedure 910. A P2 procedure 920 may be a special example of a P1 procedure 910. A P3 procedure 930 may be used to enable a wireless device 110 to measure at least one Tx beam associated with a base station 120, for example, to change a first set of Rx beams associated with a wireless device 110.

A wireless device 110 may send (e.g., transmit) one or more beam management reports to a base station 120. In one or more beam management reports, a wireless device 110 may indicate one or more beam pair quality parameters comprising one or more of: a beam identification; an RSRP; a Precoding Matrix Indicator (PMI), Channel Quality Indicator (CQI), and/or Rank Indicator (RI) of a subset of configured beams. Based on one or more beam management reports, the base station 120 may send (e.g., transmit) to a wireless device 110 a signal indicating that one or more beam pair links are one or more serving beams. The base station 120 may send (e.g., transmit) the PDCCH and the PDSCH for a wireless device 110 using one or more serving beams.

A communications network (e.g., a new radio network) may support a Bandwidth Adaptation (BA). Receive and/or transmit bandwidths that may be configured for a wireless device using a BA may not be large. Receive and/or transmit bandwidth may not be as large as a bandwidth of a cell. Receive and/or transmit bandwidths may be adjustable. A wireless device may change receive and/or transmit bandwidths, for example, to reduce (e.g., shrink) the bandwidth(s) at (e.g., during) a period of low activity such as to save power. A wireless device may change a location of receive and/or transmit bandwidths in a frequency domain, for example, to increase scheduling flexibility. A wireless device may change a subcarrier spacing, for example, to allow different services.

A Bandwidth Part (BWP) may comprise a subset of a total cell bandwidth of a cell. A base station may configure a wireless device with one or more BWPs, for example, to achieve a BA. A base station may indicate, to a wireless device, which of the one or more (configured) BWPs is an active BWP.

Figure 10:
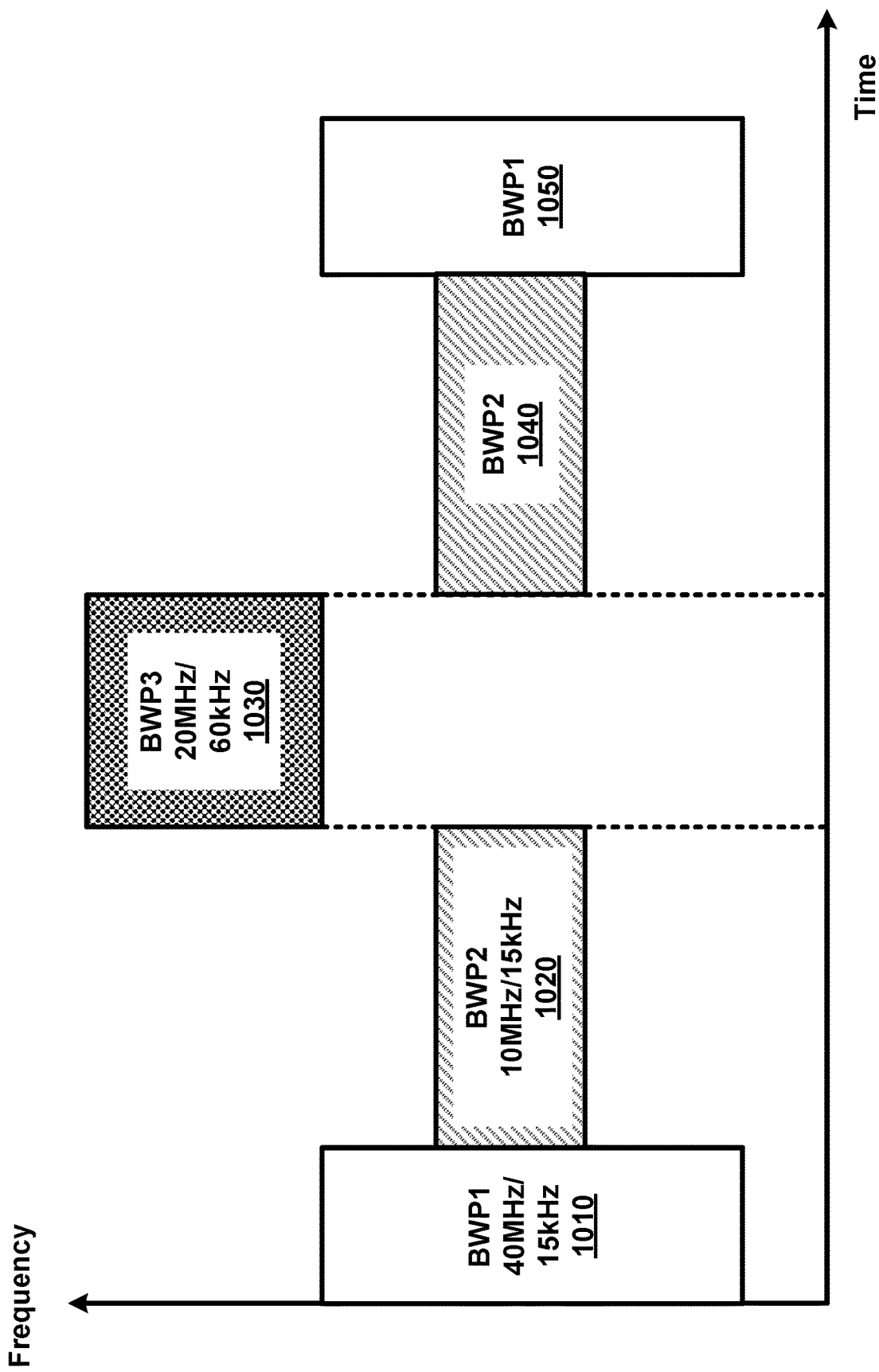
FIG. 10 shows an example of configured bandwidth parts (BWPs).

FIG. 10 shows an example of BWP configurations. BWPs may be configured as follows: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz. Any number of BWP configurations may comprise any other width and subcarrier spacing combination.

A wireless device, configured for operation in one or more BWPs of a cell, may be configured by one or more higher layers (e.g., RRC layer). The wireless device may be configured for a cell with: a set of one or more BWPs (e.g., at most four BWPs) for reception (e.g., a DL BWP set) in a DL bandwidth by at least one parameter DL-BWP; and a set of one or more BWPs (e.g., at most four BWPs) for transmissions (e.g., UL BWP set) in an UL bandwidth by at least one parameter UL-BWP.

A base station may configure a wireless device with one or more UL and DL BWP pairs, for example, to enable BA on the PCell. To enable BA on SCells (e.g., for CA), a base station may configure a wireless device at least with one or more DL BWPs (e.g., there may be none in an UL).

An initial active DL BWP may comprise at least one of a location and number of contiguous PRBs, a subcarrier spacing, or a cyclic prefix, for example, for a CORESETs for at least one common search space. For operation on the PCell, one or more higher layer parameters may indicate at least one initial UL BWP for a random access procedure. If a wireless device is configured with a secondary carrier on a primary cell, the wireless device may be configured with an initial BWP for random access procedure on a secondary carrier.

A wireless device may expect that a center frequency for a DL BWP may be same as a center frequency for a UL BWP, for example, for unpaired spectrum operation. A base station may semi-statically configure a wireless device for a cell with one or more parameters, for example, for a DL BWP or an UL BWP in a set of one or more DL BWPs or one or more UL BWPs, respectively. The one or more parameters may indicate one or more of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; and/or an offset of a first PRB of a DL bandwidth or an UL bandwidth, respectively, relative to a first PRB of a bandwidth.

For a DL BWP in a set of one or more DL BWPs on a PCell, a base station may configure a wireless device with one or more control resource sets for at least one type of common search space and/or one wireless device-specific search space. A base station may not configure a wireless device without a common search space on a PCell, or on a PSCell, in an active DL BWP. For an UL BWP in a set of one or more UL BWPs, a base station may configure a wireless device with one or more resource sets for one or more PUCCH transmissions.

DCI may comprise a BWP indicator field. The BWP indicator field value may indicate an active DL BWP, from a configured DL BWP set, for one or more DL receptions. The BWP indicator field value may indicate an active UL BWP, from a configured UL BWP set, for one or more UL transmissions.

For a PCell, a base station may semi-statically configure a wireless device with a default DL BWP among configured DL BWPs. If a wireless device is not provided a default DL BWP, a default BWP may be an initial active DL BWP.

A base station may configure a wireless device with a timer value for a PCell. A wireless device may start a timer (e.g., a BWP inactivity timer), for example, if a wireless device detects DCI indicating an active DL BWP, other than a default DL BWP, for a paired spectrum operation, and/or if a wireless device detects DCI indicating an active DL BWP or UL BWP, other than a default DL BWP or UL BWP, for an unpaired spectrum operation. The wireless device may increment the timer by an interval of a first value (e.g., the first value may be 1 millisecond, 0.5 milliseconds, or any other time duration), for example, if the wireless device does not detect DCI at (e.g., during) the interval for a paired spectrum operation or for an unpaired spectrum operation. The timer may expire at a time that the timer is equal to the timer value. A wireless device may switch to the default DL BWP from an active DL BWP, for example, if the timer expires.

A base station may semi-statically configure a wireless device with one or more BWPs. A wireless device may switch an active BWP from a first BWP to a second BWP, for example, after or in response to receiving DCI indicating the second BWP as an active BWP, and/or after or in response to an expiry of BWP inactivity timer (e.g., the second BWP may be a default BWP). FIG. 10 shows an example of three BWPs configured, BWP1 (1010 and 1050), BWP2 (1020 and 1040), and BWP3 (1030). BWP2 (1020 and 1040) may be a default BWP. BWP1 (1010) may be an initial active BWP. A wireless device may switch an active BWP from BWP1 1010 to BWP2 1020, for example, after or in response to an expiry of the BWP inactivity timer. A wireless device may switch an active BWP from BWP2 1020 to BWP3 1030, for example, after or in response to receiving DCI indicating BWP3 1030 as an active BWP. Switching an active BWP from BWP3 1030 to BWP2 1040 and/or from BWP2 1040 to BWP1 1050 may be after or in response to receiving DCI indicating an active BWP, and/or after or in response to an expiry of BWP inactivity timer.

Wireless device procedures on a secondary cell may be same as on a primary cell using the timer value for the secondary cell and the default DL BWP for the secondary cell, for example, if a wireless device is configured for a secondary cell with a default DL BWP among configured DL BWPs and a timer value. A wireless device may use an indicated DL BWP and an indicated UL BWP on a secondary cell as a respective first active DL BWP and first active UL BWP on a secondary cell or carrier, for example, if a base station configures a wireless device with a first active DL BWP and a first active UL BWP on a secondary cell or carrier.

Figure 11A:
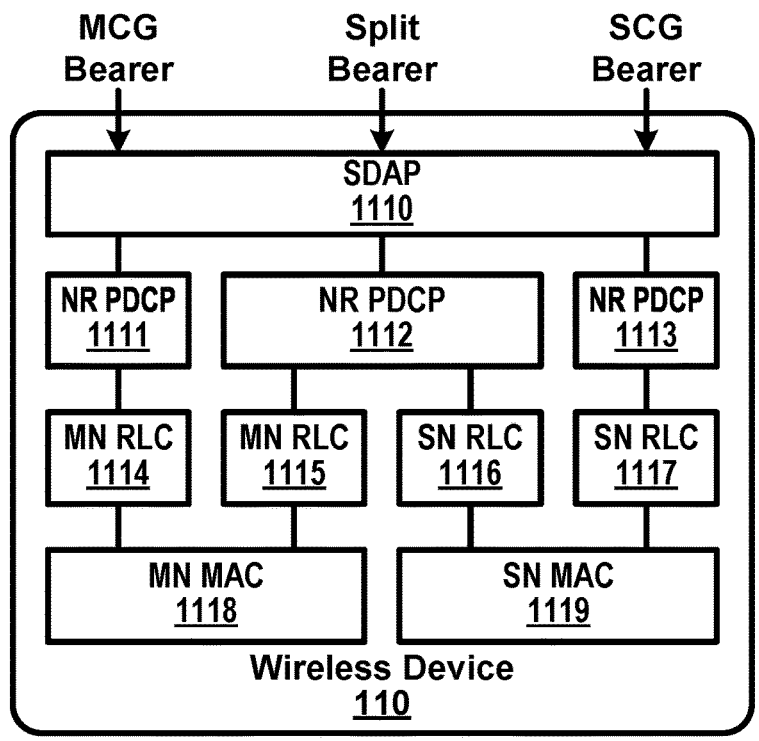
FIG. 11A and FIG. 11B show examples of multi connectivity.
Figure 11B:
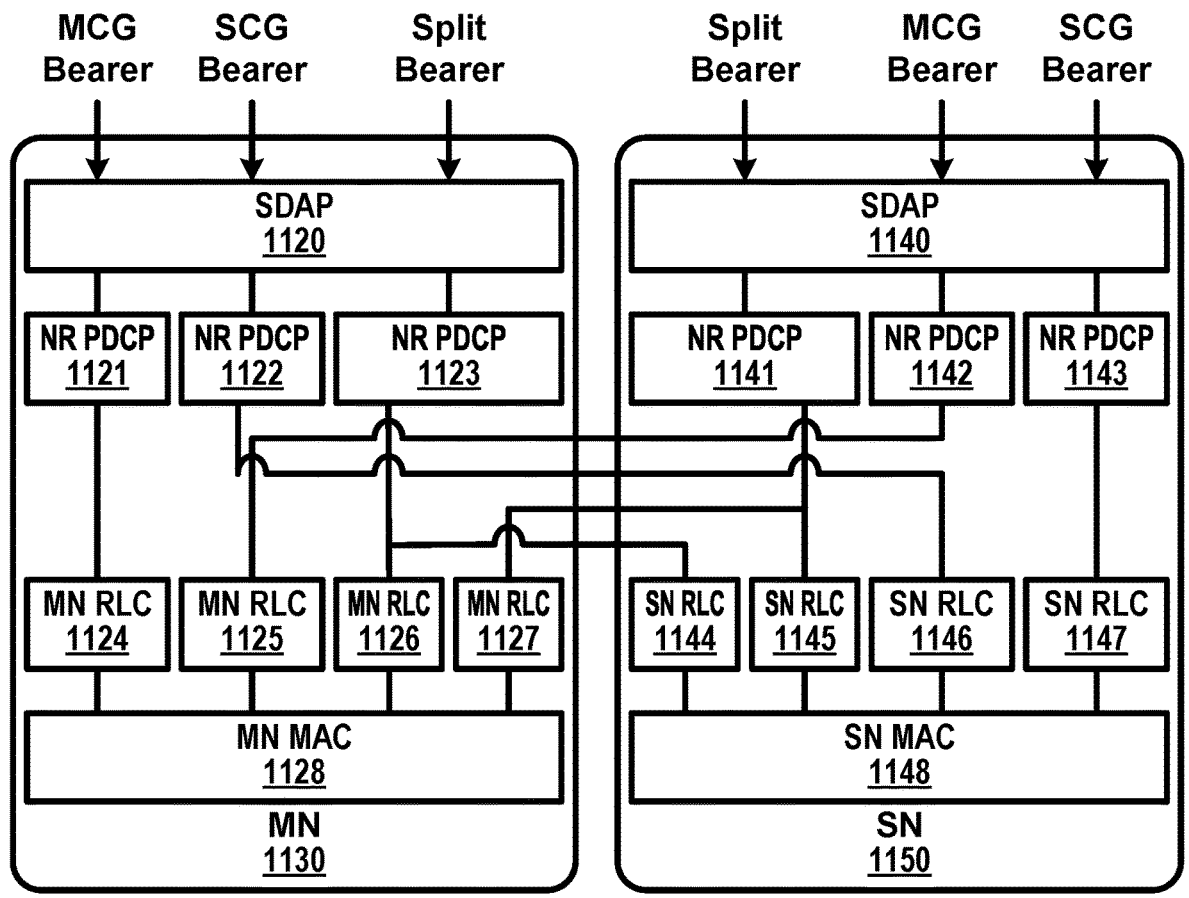

FIG. 11A and FIG. 11B show packet flows using a multi connectivity (e.g., dual connectivity, multi connectivity, tight interworking, and/or the like). FIG. 11A shows an example of a protocol structure of a wireless device 110 (e.g., UE) with CA and/or multi connectivity. FIG. 11B shows an example of a protocol structure of multiple base stations with CA and/or multi connectivity. The multiple base stations may comprise a master node, MN 1130 (e.g., a master node, a master base station, a master gNB, a master eNB, and/or the like) and a secondary node, SN 1150 (e.g., a secondary node, a secondary base station, a secondary gNB, a secondary eNB, and/or the like). A master node 1130 and a secondary node 1150 may co-work to communicate with a wireless device 110.

If multi connectivity is configured for a wireless device 110, the wireless device 110, which may support multiple reception and/or transmission functions in an RRC connected state, may be configured to utilize radio resources provided by multiple schedulers of a multiple base stations. Multiple base stations may be inter-connected via a non-ideal or ideal backhaul (e.g., Xn interface, X2 interface, and/or the like). A base station involved in multi connectivity for a certain wireless device may perform at least one of two different roles: a base station may act as a master base station or act as a secondary base station. In multi connectivity, a wireless device may be connected to one master base station and one or more secondary base stations. A master base station (e.g., the MN 1130) may provide a master cell group (MCG) comprising a primary cell and/or one or more secondary cells for a wireless device (e.g., the wireless device 110). A secondary base station (e.g., the SN 1150) may provide a secondary cell group (SCG) comprising a primary secondary cell (PSCell) and/or one or more secondary cells for a wireless device (e.g., the wireless device 110).

In multi connectivity, a radio protocol architecture that a bearer uses may depend on how a bearer is setup. Three different types of bearer setup options may be supported: an MCG bearer, an SCG bearer, and/or a split bearer. A wireless device may receive and/or send (e.g., transmit) packets of an MCG bearer via one or more cells of the MCG. A wireless device may receive and/or send (e.g., transmit) packets of an SCG bearer via one or more cells of an SCG. Multi-connectivity may indicate having at least one bearer configured to use radio resources provided by the secondary base station. Multi-connectivity may or may not be configured and/or implemented.

A wireless device (e.g., wireless device 110) may send (e.g., transmit) and/or receive: packets of an MCG bearer via an SDAP layer (e.g., SDAP 1110), a PDCP layer (e.g., NR PDCP 1111), an RLC layer (e.g., MN RLC 1114), and a MAC layer (e.g., MN MAC 1118); packets of a split bearer via an SDAP layer (e.g., SDAP 1110), a PDCP layer (e.g., NR PDCP 1112), one of a master or secondary RLC layer (e.g., MN RLC 1115, SN RLC 1116), and one of a master or secondary MAC layer (e.g., MN MAC 1118, SN MAC 1119); and/or packets of an SCG bearer via an SDAP layer (e.g., SDAP 1110), a PDCP layer (e.g., NR PDCP 1113), an RLC layer (e.g., SN RLC 1117), and a MAC layer (e.g., MN MAC 1119).

A master base station (e.g., MN 1130) and/or a secondary base station (e.g., SN 1150) may send (e.g., transmit) and/or receive: packets of an MCG bearer via a master or secondary node SDAP layer (e.g., SDAP 1120, SDAP 1140), a master or secondary node PDCP layer (e.g., NR PDCP 1121, NR PDCP 1142), a master node RLC layer (e.g., MN RLC 1124, MN RLC 1125), and a master node MAC layer (e.g., MN MAC 1128); packets of an SCG bearer via a master or secondary node SDAP layer (e.g., SDAP 1120, SDAP 1140), a master or secondary node PDCP layer (e.g., NR PDCP 1122, NR PDCP 1143), a secondary node RLC layer (e.g., SN RLC 1146, SN RLC 1147), and a secondary node MAC layer (e.g., SN MAC 1148); packets of a split bearer via a master or secondary node SDAP layer (e.g., SDAP 1120, SDAP 1140), a master or secondary node PDCP layer (e.g., NR PDCP 1123, NR PDCP 1141), a master or secondary node RLC layer (e.g., MN RLC 1126, SN RLC 1144, SN RLC 1145, MN RLC 1127), and a master or secondary node MAC layer (e.g., MN MAC 1128, SN MAC 1148).

In multi connectivity, a wireless device may configure multiple MAC entities, such as one MAC entity (e.g., MN MAC 1118) for a master base station, and other MAC entities (e.g., SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be used. At least one cell of an SCG may have a configured UL CC and at least one cell of a SCG, named as primary secondary cell (e.g., PSCell, PCell of SCG, PCell), and may be configured with PUCCH resources. If an SCG is configured, there may be at least one SCG bearer or one split bearer. After or upon detection of a physical layer problem or a random access problem on a PSCell, or a number of NR RLC retransmissions has been reached associated with the SCG, or after or upon detection of an access problem on a PSCell associated with (e.g., during) a SCG addition or an SCG change: an RRC connection re-establishment procedure may not be triggered, UL transmissions towards cells of an SCG may be stopped, a master base station may be informed by a wireless device of a SCG failure type, a DL data transfer over a master base station may be maintained (e.g., for a split bearer). An NR RLC acknowledged mode (AM) bearer may be configured for a split bearer. A PCell and/or a PSCell may not be de-activated. A PSCell may be changed with a SCG change procedure (e.g., with security key change and a RACH procedure). A bearer type change between a split bearer and a SCG bearer, and/or simultaneous configuration of a SCG and a split bearer, may or may not be supported.

With respect to interactions between a master base station and a secondary base stations for multi-connectivity, one or more of the following may be used. A master base station and/or a secondary base station may maintain RRM measurement configurations of a wireless device. A master base station may determine (e.g., based on received measurement reports, traffic conditions, and/or bearer types) to request a secondary base station to provide additional resources (e.g., serving cells) for a wireless device. After or upon receiving a request from a master base station, a secondary base station may create and/or modify a container that may result in a configuration of additional serving cells for a wireless device (or decide that the secondary base station has no resource available to do so). For a wireless device capability coordination, a master base station may provide (e.g., all or a part of) an AS configuration and wireless device capabilities to a secondary base station. A master base station and a secondary base station may exchange information about a wireless device configuration such as by using RRC containers (e.g., inter-node messages) carried via Xn messages. A secondary base station may initiate a reconfiguration of the secondary base station existing serving cells (e.g., PUCCH towards the secondary base station). A secondary base station may decide which cell is a PSCell within a SCG. A master base station may or may not change content of RRC configurations provided by a secondary base station. A master base station may provide recent (and/or the latest) measurement results for SCG cell(s), for example, if an SCG addition and/or an SCG SCell addition occurs. A master base station and secondary base stations may receive information of SFN and/or subframe offset of each other from an OAM and/or via an Xn interface (e.g., for a purpose of DRX alignment and/or identification of a measurement gap). Dedicated RRC signaling may be used for sending required system information of a cell as for CA, for example, if adding a new SCG SCell, except for an SFN acquired from an MIB of a PSCell of a SCG.

Figure 12:
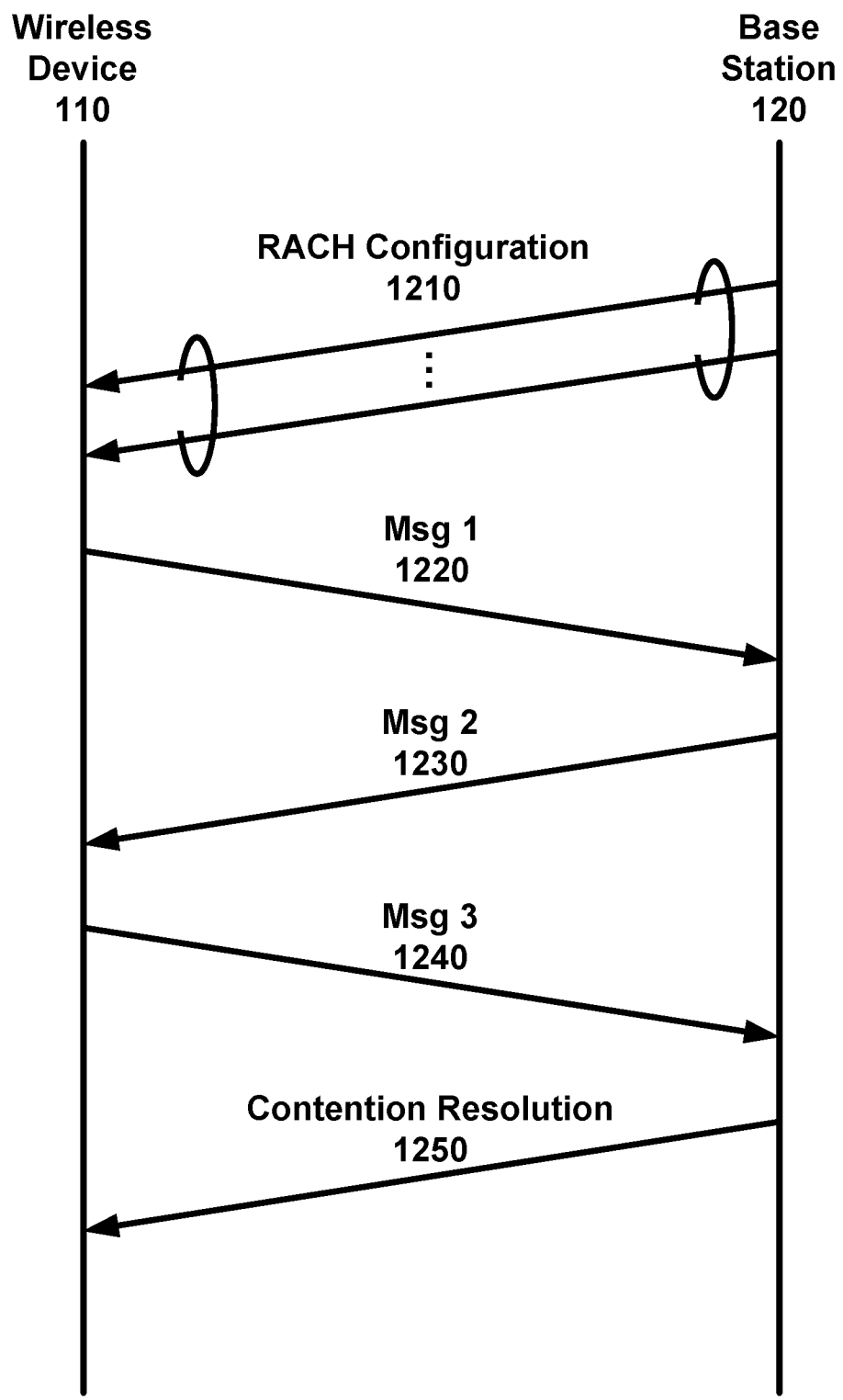
FIG. 12 shows an example of a random access procedure.

FIG. 12 shows an example of a random access procedure. One or more events may trigger a random access procedure. For example, one or more events may be at least one of following: initial access from RRC_IDLE, RRC connection re-establishment procedure, handover, DL or UL data arrival in (e.g., during) a state of RRC_CONNECTED (e.g., if UL synchronization status is non-synchronized), transition from RRC_Inactive, and/or request for other system information. A PDCCH order, a MAC entity, and/or a beam failure indication may initiate a random access procedure.

A random access procedure may comprise or be one of at least a contention based random access procedure and/or a contention free random access procedure. A contention based random access procedure may comprise one or more Msg 1 1220 transmissions, one or more Msg2 1230 transmissions, one or more Msg3 1240 transmissions, and contention resolution 1250. A contention free random access procedure may comprise one or more Msg 1 1220 transmissions and one or more Msg2 1230 transmissions. One or more of Msg 1 1220, Msg 2 1230, Msg 3 1240, and/or contention resolution 1250 may be transmitted in the same step. A two-step random access procedure, for example, may comprise a first transmission (e.g., Msg A) and a second transmission (e.g., Msg B). The first transmission (e.g., Msg A) may comprise transmitting, by a wireless device (e.g., wireless device 110) to a base station (e.g., base station 120), one or more messages indicating an equivalent and/or similar contents of Msg1 1220 and Msg3 1240 of a four-step random access procedure. The second transmission (e.g., Msg B) may comprise transmitting, by the base station (e.g., base station 120) to a wireless device (e.g., wireless device 110) after or in response to the first message, one or more messages indicating an equivalent and/or similar content of Msg2 1230 and contention resolution 1250 of a four-step random access procedure.

A base station may send (e.g., transmit, unicast, multicast, broadcast, etc.), to a wireless device, a RACH configuration 1210 via one or more beams. The RACH configuration 1210 may comprise one or more parameters indicating at least one of following: an available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), a random access preamble index, a maximum number of preamble transmissions, preamble group A and group B, a threshold (e.g., message size) to determine the groups of random access preambles, a set of one or more random access preambles for a system information request and corresponding PRACH resource(s) (e.g., if any), a set of one or more random access preambles for a beam failure recovery request and corresponding PRACH resource(s) (e.g., if any), a time window to monitor RA response(s), a time window to monitor response(s) on a beam failure recovery request, and/or a contention resolution timer.

The Msg1 1220 may comprise one or more transmissions of a random access preamble. For a contention based random access procedure, a wireless device may select an SS block with an RSRP above the RSRP threshold. If random access preambles group B exists, a wireless device may select one or more random access preambles from a group A or a group B, for example, depending on a potential Msg3 1240 size. If a random access preambles group B does not exist, a wireless device may select the one or more random access preambles from a group A. A wireless device may select a random access preamble index randomly (e.g., with equal probability or a normal distribution) from one or more random access preambles associated with a selected group. If a base station semi-statically configures a wireless device with an association between random access preambles and SS blocks, the wireless device may select a random access preamble index randomly with equal probability from one or more random access preambles associated with a selected SS block and a selected group.

A wireless device may initiate a contention free random access procedure, for example, based on a beam failure indication from a lower layer. A base station may semi-statically configure a wireless device with one or more contention free PRACH resources for a beam failure recovery request associated with at least one of SS blocks and/or CSI-RSs. A wireless device may select a random access preamble index corresponding to a selected SS block or a CSI-RS from a set of one or more random access preambles for a beam failure recovery request, for example, if at least one of the SS blocks with an RSRP above a first RSRP threshold amongst associated SS blocks is available, and/or if at least one of CSI-RSs with a RSRP above a second RSRP threshold amongst associated CSI-RSs is available.

A wireless device may receive, from a base station, a random access preamble index via PDCCH or RRC for a contention free random access procedure. The wireless device may select a random access preamble index, for example, if a base station does not configure a wireless device with at least one contention free PRACH resource associated with SS blocks or CSI-RS. The wireless device may select the at least one SS block and/or select a random access preamble corresponding to the at least one SS block, for example, if a base station configures the wireless device with one or more contention free PRACH resources associated with SS blocks and/or if at least one SS block with a RSRP above a first RSRP threshold amongst associated SS blocks is available. The wireless device may select the at least one CSI-RS and/or select a random access preamble corresponding to the at least one CSI-RS, for example, if a base station configures a wireless device with one or more contention free PRACH resources associated with CSI-RSs and/or if at least one CSI-RS with a RSRP above a second RSPR threshold amongst the associated CSI-RSs is available.

A wireless device may perform one or more Msg1 1220 transmissions, for example, by sending (e.g., transmitting) the selected random access preamble. The wireless device may determine a PRACH occasion from one or more PRACH occasions corresponding to a selected SS block, for example, if the wireless device selects an SS block and is configured with an association between one or more PRACH occasions and/or one or more SS blocks. The wireless device may determine a PRACH occasion from one or more PRACH occasions corresponding to a selected CSI-RS, for example, if the wireless device selects a CSI-RS and is configured with an association between one or more PRACH occasions and one or more CSI-RSs. The wireless device may send (e.g., transmit), to a base station, a selected random access preamble via a selected PRACH occasions. The wireless device may determine a transmit power for a transmission of a selected random access preamble at least based on an initial preamble power and a power-ramping factor. The wireless device may determine an RA-RNTI associated with a selected PRACH occasion in which a selected random access preamble is sent (e.g., transmitted). The wireless device may not determine an RA-RNTI for a beam failure recovery request. The wireless device may determine an RA-RNTI at least based on an index of a first OFDM symbol, an index of a first slot of a selected PRACH occasions, and/or an uplink carrier index for a transmission of Msg1 1220.

A wireless device may receive, from a base station, a random access response, Msg 2 1230. The wireless device may start a time window (e.g., ra-ResponseWindow) to monitor a random access response. For a beam failure recovery procedure, the base station may configure the wireless device with a different time window (e.g., bfr-ResponseWindow) to monitor response to on a beam failure recovery request. The wireless device may start a time window (e.g., ra-ResponseWindow or bfr-ResponseWindow) at a start of a first PDCCH occasion, for example, after a fixed duration of one or more symbols from an end of a preamble transmission. If the wireless device sends (e.g., transmits) multiple preambles, the wireless device may start a time window at a start of a first PDCCH occasion after a fixed duration of one or more symbols from an end of a first preamble transmission. The wireless device may monitor a PDCCH of a cell for at least one random access response identified by a RA-RNTI, or for at least one response to a beam failure recovery request identified by a C-RNTI, at a time that a timer for a time window is running A wireless device may determine that a reception of random access response is successful, for example, if at least one random access response comprises a random access preamble identifier corresponding to a random access preamble sent (e.g., transmitted) by the wireless device. The wireless device may determine that the contention free random access procedure is successfully completed, for example, if a reception of a random access response is successful. The wireless device may determine that a contention free random access procedure is successfully complete, for example, if a contention-free random access procedure is triggered for a beam failure recovery request and if a PDCCH transmission is addressed to a C-RNTI. The wireless device may determine that the random access procedure is successfully completed, and may indicate a reception of an acknowledgement for a system information request to upper layers, for example, if at least one random access response comprises a random access preamble identifier. The wireless device may stop sending (e.g., transmitting) remaining preambles (if any) after or in response to a successful reception of a corresponding random access response, for example, if the wireless device has signaled multiple preamble transmissions.

The wireless device may perform one or more Msg 3 1240 transmissions, for example, after or in response to a successful reception of random access response (e.g., for a contention based random access procedure). The wireless device may adjust an uplink transmission timing, for example, based on a timing advanced command indicated by a random access response. The wireless device may send (e.g., transmit) one or more transport blocks, for example, based on an uplink grant indicated by a random access response. Subcarrier spacing for PUSCH transmission for Msg3 1240 may be provided by at least one higher layer (e.g., RRC) parameter. The wireless device may send (e.g., transmit) a random access preamble via a PRACH, and Msg3 1240 via PUSCH, on the same cell. A base station may indicate an UL BWP for a PUSCH transmission of Msg3 1240 via system information block. The wireless device may use HARQ for a retransmission of Msg 3 1240.

Multiple wireless devices may perform Msg 1 1220, for example, by sending (e.g., transmitting) the same preamble to a base station. The multiple wireless devices may receive, from the base station, the same random access response comprising an identity (e.g., TC-RNTI). Contention resolution (e.g., comprising the wireless device 110 receiving contention resolution 1250) may be used to increase the likelihood that a wireless device does not incorrectly use an identity of another wireless device. The contention resolution 1250 may be based on, for example, a C-RNTI on a PDCCH, and/or a wireless device contention resolution identity on a DL-SCH. If a base station assigns a C-RNTI to a wireless device, the wireless device may perform contention resolution (e.g., comprising receiving contention resolution 1250), for example, based on a reception of a PDCCH transmission that is addressed to the C-RNTI. The wireless device may determine that contention resolution is successful, and/or that a random access procedure is successfully completed, for example, after or in response to detecting a C-RNTI on a PDCCH. If a wireless device has no valid C-RNTI, a contention resolution may be addressed by using a TC-RNTI. If a MAC PDU is successfully decoded and a MAC PDU comprises a wireless device contention resolution identity MAC CE that matches or otherwise corresponds with the CCCH SDU sent (e.g., transmitted) in Msg3 1250, the wireless device may determine that the contention resolution (e.g., comprising contention resolution 1250) is successful and/or the wireless device may determine that the random access procedure is successfully completed.

Figure 13:
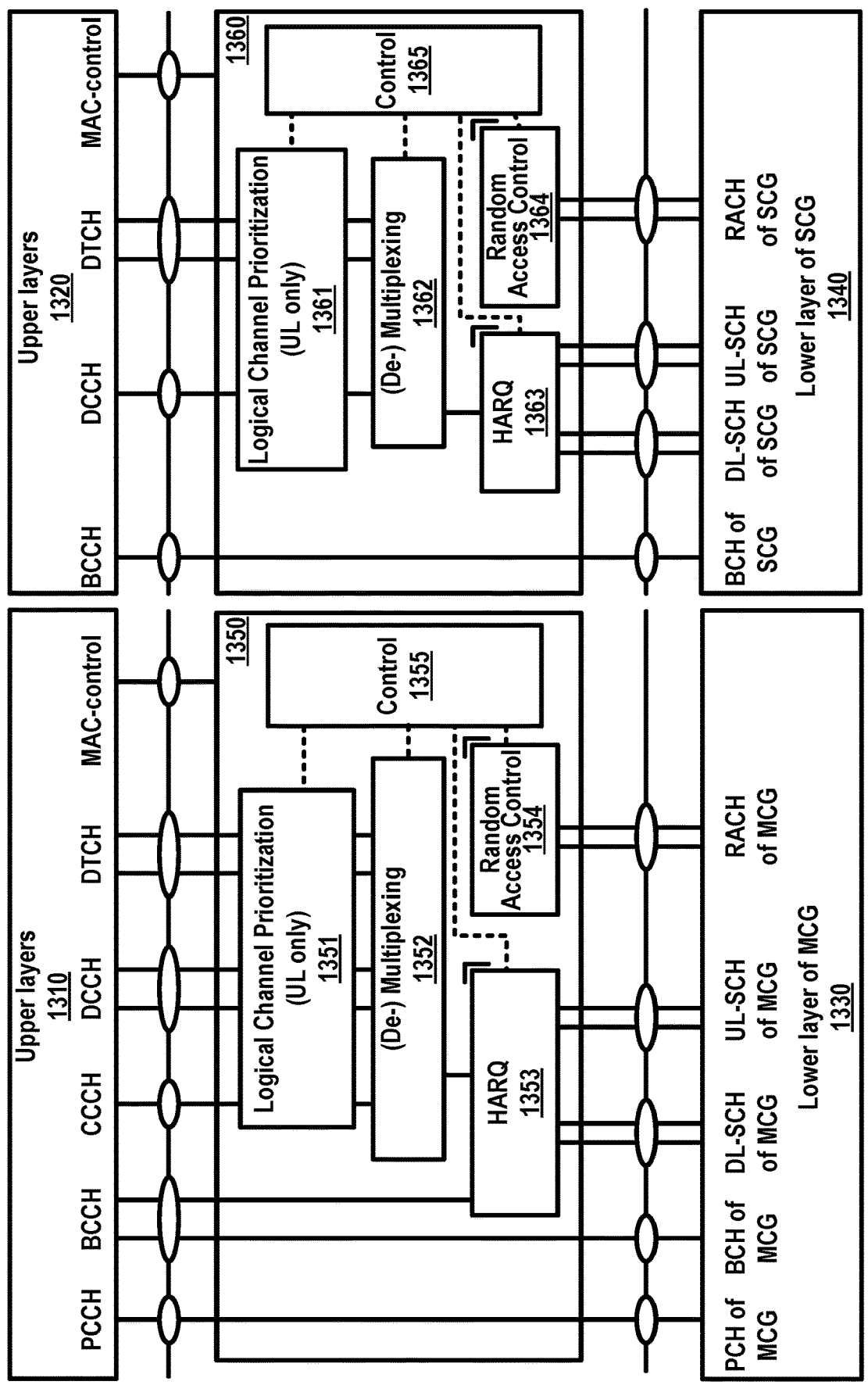
FIG. 13 shows example medium access control (MAC) entities.

FIG. 13 shows an example structure for MAC entities. A wireless device may be configured to operate in a multi-connectivity mode. A wireless device in RRC_CONNECTED with multiple Rx/Tx may be configured to utilize radio resources provided by multiple schedulers that may be located in a plurality of base stations. The plurality of base stations may be connected via a non-ideal or ideal backhaul over the Xn interface. A base station in a plurality of base stations may act as a master base station or as a secondary base station. A wireless device may be connected to and/or in communication with, for example, one master base station and one or more secondary base stations. A wireless device may be configured with multiple MAC entities, for example, one MAC entity for a master base station, and one or more other MAC entities for secondary base station(s). A configured set of serving cells for a wireless device may comprise two subsets: an MCG comprising serving cells of a master base station, and one or more SCGs comprising serving cells of a secondary base station(s). FIG. 13 shows an example structure for MAC entities in which a MCG and a SCG are configured for a wireless device.

At least one cell in a SCG may have a configured UL CC. A cell of the at least one cell may comprise a PSCell or a PCell of a SCG, or a PCell. A PSCell may be configured with PUCCH resources. There may be at least one SCG bearer, or one split bearer, for a SCG that is configured. After or upon detection of a physical layer problem or a random access problem on a PSCell, after or upon reaching a number of RLC retransmissions associated with the SCG, and/or after or upon detection of an access problem on a PSCell associated with (e.g., during) a SCG addition or a SCG change: an RRC connection re-establishment procedure may not be triggered, UL transmissions towards cells of a SCG may be stopped, and/or a master base station may be informed by a wireless device of a SCG failure type and DL data transfer over a master base station may be maintained.

A MAC sublayer may provide services such as data transfer and radio resource allocation to upper layers (e.g., 1310 or 1320). A MAC sublayer may comprise a plurality of MAC entities (e.g., 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. BCCH, PCCH, CCCH and/or DCCH may be control channels, and DTCH may be a traffic channel A first MAC entity (e.g., 1310) may provide services on PCCH, BCCH, CCCH, DCCH, DTCH, and/or MAC control elements. A second MAC entity (e.g., 1320) may provide services on BCCH, DCCH, DTCH, and/or MAC control elements.

A MAC sublayer may expect from a physical layer (e.g., 1330 or 1340) services such as data transfer services, signaling of HARQ feedback, and/or signaling of scheduling request or measurements (e.g., CQI). In dual connectivity, two MAC entities may be configured for a wireless device: one for a MCG and one for a SCG. A MAC entity of a wireless device may handle a plurality of transport channels. A first MAC entity may handle first transport channels comprising a PCCH of a MCG, a first BCH of the MCG, one or more first DL-SCHs of the MCG, one or more first UL-SCHs of the MCG, and/or one or more first RACHs of the MCG. A second MAC entity may handle second transport channels comprising a second BCH of a SCG, one or more second DL-SCHs of the SCG, one or more second UL-SCHs of the SCG, and/or one or more second RACHs of the SCG.

If a MAC entity is configured with one or more SCells, there may be multiple DL-SCHs, multiple UL-SCHs, and/or multiple RACHs per MAC entity. There may be one DL-SCH and/or one UL-SCH on an SpCell. There may be one DL-SCH, zero or one UL-SCH, and/or zero or one RACH for an SCell. A DL-SCH may support receptions using different numerologies and/or TTI duration within a MAC entity. A UL-SCH may support transmissions using different numerologies and/or TTI duration within the MAC entity.

A MAC sublayer may support different functions. The MAC sublayer may control these functions with a control (e.g., Control 1355 and/or Control 1365) element. Functions performed by a MAC entity may comprise one or more of: mapping between logical channels and transport channels (e.g., in uplink or downlink), multiplexing (e.g., (De-) Multiplexing 1352 and/or (De-) Multiplexing 1362) of MAC SDUs from one or different logical channels onto transport blocks (TBs) to be delivered to the physical layer on transport channels (e.g., in uplink), demultiplexing (e.g., (De-) Multiplexing 1352 and/or (De-) Multiplexing 1362) of MAC SDUs to one or different logical channels from transport blocks (TBs) delivered from the physical layer on transport channels (e.g., in downlink), scheduling information reporting (e.g., in uplink), error correction through HARQ in uplink and/or downlink (e.g., 1363), and logical channel prioritization in uplink (e.g., Logical Channel Prioritization 1351 and/or Logical Channel Prioritization 1361). A MAC entity may handle a random access process (e.g., Random Access Control 1354 and/or Random Access Control 1364).

Figure 14:
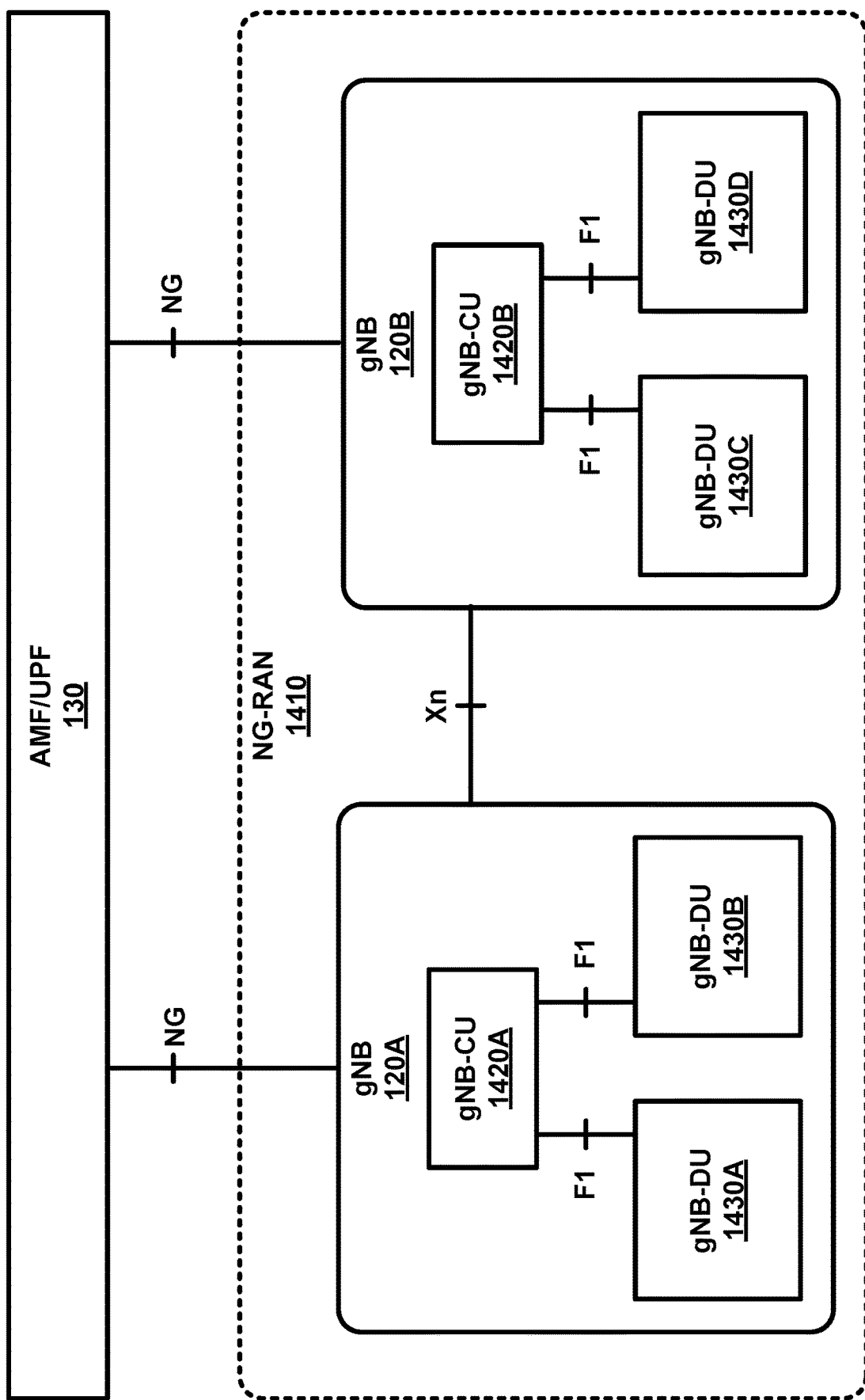
FIG. 14 shows an example RAN architecture.

FIG. 14 shows an example of a RAN architecture comprising one or more base stations. A protocol stack (e.g., RRC, SDAP, PDCP, RLC, MAC, and/or PHY) may be supported at a node. A base station (e.g., gNB 120A and/or 120B) may comprise a base station central unit (CU) (e.g., gNB-CU 1420A or 1420B) and at least one base station distributed unit (DU) (e.g., gNB-DU 1430A, 1430B, 1430C, and/or 1430D), for example, if a functional split is configured. Upper protocol layers of a base station may be located in a base station CU, and lower layers of the base station may be located in the base station DUs. An F1 interface (e.g., CU-DU interface) connecting a base station CU and base station DUs may be an ideal or non-ideal backhaul. F1-C may provide a control plane connection over an F1 interface, and F1-U may provide a user plane connection over the F1 interface. An Xn interface may be configured between base station CUs.

A base station CU may comprise an RRC function, an SDAP layer, and/or a PDCP layer. Base station DUs may comprise an RLC layer, a MAC layer, and/or a PHY layer. Various functional split options between a base station CU and base station DUs may be possible, for example, by locating different combinations of upper protocol layers (e.g., RAN functions) in a base station CU and different combinations of lower protocol layers (e.g., RAN functions) in base station DUs. A functional split may support flexibility to move protocol layers between a base station CU and base station DUs, for example, depending on service requirements and/or network environments.

Functional split options may be configured per base station, per base station CU, per base station DU, per wireless device, per bearer, per slice, and/or with other granularities. In a per base station CU split, a base station CU may have a fixed split option, and base station DUs may be configured to match a split option of a base station CU. In a per base station DU split, a base station DU may be configured with a different split option, and a base station CU may provide different split options for different base station DUs. In a per wireless device split, a base station (e.g., a base station CU and at least one base station DUs) may provide different split options for different wireless devices. In a per bearer split, different split options may be utilized for different bearers. In a per slice splice, different split options may be used for different slices.

Figure 15:
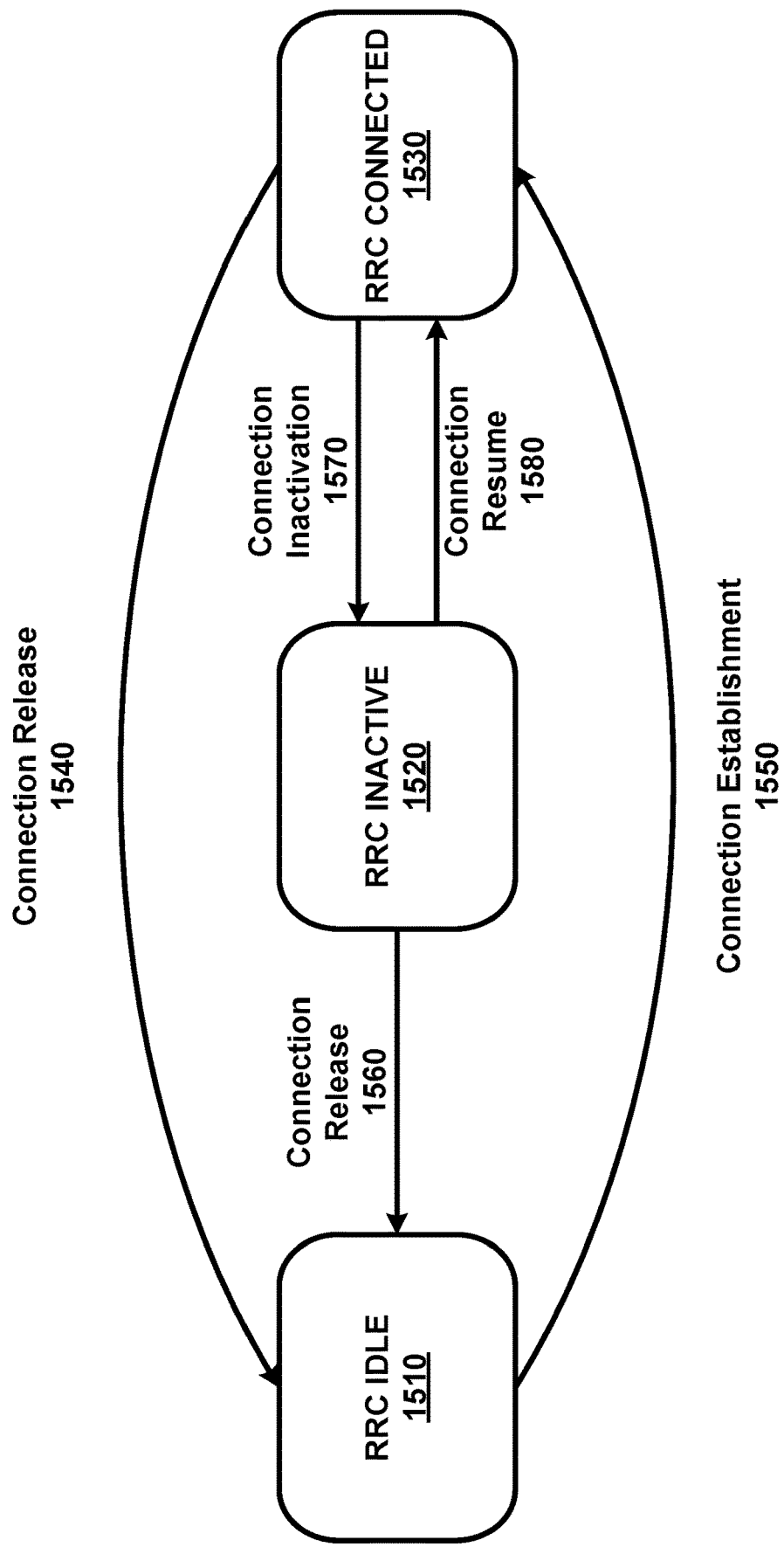
FIG. 15 shows example radio resource control (RRC) states.

FIG. 15 shows example RRC state transitions of a wireless device. A wireless device may be in at least one RRC state among an RRC connected state (e.g., RRC Connected 1530, RRC_Connected, etc.), an RRC idle state (e.g., RRC Idle 1510, RRC_Idle, etc.), and/or an RRC inactive state (e.g., RRC Inactive 1520, RRC_Inactive, etc.). In an RRC connected state, a wireless device may have at least one RRC connection with at least one base station (e.g., gNB and/or eNB), which may have a context of the wireless device (e.g., UE context). A wireless device context (e.g., UE context) may comprise at least one of an access stratum context, one or more radio link configuration parameters, bearer (e.g., data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an RRC idle state, a wireless device may not have an RRC connection with a base station, and a context of the wireless device may not be stored in a base station. In an RRC inactive state, a wireless device may not have an RRC connection with a base station. A context of a wireless device may be stored in a base station, which may comprise an anchor base station (e.g., a last serving base station).

A wireless device may transition an RRC state (e.g., UE RRC state) between an RRC idle state and an RRC connected state in both ways (e.g., connection release 1540 or connection establishment 1550; and/or connection reestablishment) and/or between an RRC inactive state and an RRC connected state in both ways (e.g., connection inactivation 1570 or connection resume 1580). A wireless device may transition its RRC state from an RRC inactive state to an RRC idle state (e.g., connection release 1560).

An anchor base station may be a base station that may keep a context of a wireless device (e.g., UE context) at least at (e.g., during) a time period that the wireless device stays in a RAN notification area (RNA) of an anchor base station, and/or at (e.g., during) a time period that the wireless device stays in an RRC inactive state. An anchor base station may comprise a base station that a wireless device in an RRC inactive state was most recently connected to in a latest RRC connected state, and/or a base station in which a wireless device most recently performed an RNA update procedure. An RNA may comprise one or more cells operated by one or more base stations. A base station may belong to one or more RNAs. A cell may belong to one or more RNAs.

A wireless device may transition, in a base station, an RRC state (e.g., UE RRC state) from an RRC connected state to an RRC inactive state. The wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

An anchor base station may broadcast a message (e.g., RAN paging message) to base stations of an RNA to reach to a wireless device in an RRC inactive state. The base stations receiving the message from the anchor base station may broadcast and/or multicast another message (e.g., paging message) to wireless devices in their coverage area, cell coverage area, and/or beam coverage area associated with the RNA via an air interface.

A wireless device may perform an RNA update (RNAU) procedure, for example, if the wireless device is in an RRC inactive state and moves into a new RNA. The RNAU procedure may comprise a random access procedure by the wireless device and/or a context retrieve procedure (e.g., UE context retrieve). A context retrieve procedure may comprise: receiving, by a base station from a wireless device, a random access preamble; and requesting and/or receiving (e.g., fetching), by a base station, a context of the wireless device (e.g., UE context) from an old anchor base station. The requesting and/or receiving (e.g., fetching) may comprise: sending a retrieve context request message (e.g., UE context request message) comprising a resume identifier to the old anchor base station and receiving a retrieve context response message comprising the context of the wireless device from the old anchor base station.

A wireless device in an RRC inactive state may select a cell to camp on based on at least a measurement result for one or more cells, a cell in which a wireless device may monitor an RNA paging message, and/or a core network paging message from a base station. A wireless device in an RRC inactive state may select a cell to perform a random access procedure to resume an RRC connection and/or to send (e.g., transmit) one or more packets to a base station (e.g., to a network). The wireless device may initiate a random access procedure to perform an RNA update procedure, for example, if a cell selected belongs to a different RNA from an RNA for the wireless device in an RRC inactive state. The wireless device may initiate a random access procedure to send (e.g., transmit) one or more packets to a base station of a cell that the wireless device selects, for example, if the wireless device is in an RRC inactive state and has one or more packets (e.g., in a buffer) to send (e.g., transmit) to a network. A random access procedure may be performed with two messages (e.g., 2-stage or 2-step random access) and/or four messages (e.g., 4-stage or 4-step random access) between the wireless device and the base station.

A base station receiving one or more uplink packets from a wireless device in an RRC inactive state may request and/or receive (e.g., fetch) a context of a wireless device (e.g., UE context), for example, by sending (e.g., transmitting) a retrieve context request message for the wireless device to an anchor base station of the wireless device based on at least one of an AS context identifier, an RNA identifier, a base station identifier, a resume identifier, and/or a cell identifier received from the wireless device. A base station may send (e.g., transmit) a path switch request for a wireless device to a core network entity (e.g., AMF, MME, and/or the like), for example, after or in response to requesting and/or receiving (e.g., fetching) a context. A core network entity may update a downlink tunnel endpoint identifier for one or more bearers established for the wireless device between a user plane core network entity (e.g., UPF, S-GW, and/or the like) and a RAN node (e.g., the base station), such as by changing a downlink tunnel endpoint identifier from an address of the anchor base station to an address of the base station).

A base station may configure a wireless device with one or more resource sets (e.g., SRS resource sets), for example, via a parameter (e.g., higher layer parameter, SRS-ResourceSet). The base station may configure the wireless device with one or more SRS resources, for example, via a parameter (e.g., higher layer parameter, SRS-Resource) and for an SRS resource set of the one or more Resource sets (e.g., SRS resource sets). The wireless device may indicate a value (e.g., maximum, minimum, or any quantity) of a quantity of the one or more SRS resources to the base station (e.g., by SRS_capability). The base station may configure an applicability of the SRS resource set, for example, via a parameter (e.g., a parameter in the higher layer parameter SRS-ResourceSet).

The wireless device may send (e.g., transmit) an SRS resource of the one or more SRS resources in each SRS resource set (e.g., simultaneously, in series, etc.), for example, based on a management parameter being set to a value (e.g., higher layer parameter, BeamManagement). The wireless device may determine that an SRS resource of the one or more SRS resources in each SRS resource set has the same/similar time domain behavior in a same/similar BWP (e.g., uplink BWP). The wireless device may send (e.g., transmit) the SRS resource of the one or more SRS resources in each SRS resource set in the same/similar BWP (e.g., simultaneously, in series, etc.), for example, based on the determining.

The wireless device may send (e.g., transmit) an SRS resource in each of the one or more Resource sets (e.g., SRS resource sets) (e.g., simultaneously, in series, etc.), for example, based on the management parameter being set to a value (e.g., higher layer parameter, BeamManagement). The wireless device may determine that the SRS resource in each of the one or more Resource sets (e.g., SRS resource sets) has a same/similar time domain behavior in a same/similar BWP (e.g., uplink BWP). The wireless device may send (e.g., transmit) the SRS resource in each of the one or more Resource sets (e.g., SRS resource sets) in the same/similar BWP (e.g., simultaneously, in series, etc.), for example, based on or in response to the determining The wireless device may send (e.g., transmit) an SRS resource in each of one or more Resource sets (e.g., SRS resource sets) (e.g., simultaneously, in series, etc.), for example, based on a parameter being set to a value (e.g., higher layer parameter, BeamManagement). The wireless device may determine that the SRS resource in each of the one or more Resource sets (e.g., SRS resource sets) may have a same/similar time domain behavior in a same/similar BWP (e.g., uplink BWP). The wireless device may send (e.g., transmit) the SRS resource in each of the one or more Resource sets (e.g., SRS resource sets) in the same/similar BWP (e.g., simultaneously, in series, etc.).

The one or more Resource sets (e.g., SRS resource sets) may comprise a first SRS resource set and a second SRS resource set. The first SRS resource set may comprise one or more first SRS resources. The one or more first SRS resources may comprise a first SRS resource and a second SRS resource. The second SRS resource set may comprise one or more second SRS resources. The one or more second SRS resources may comprise a third SRS resource and a fourth SRS resource.

A first time domain behavior of the first SRS resource and a third time domain behavior of the third SRS resource may be the same/similar in a BWP. The wireless device may send (e.g., transmit), via the BWP, the first SRS resource of the first SRS resource set and the third SRS resource of the second SRS resource set (e.g., simultaneously, in series, etc.), for example, based on a parameter being set to a value (e.g., higher layer parameter, BeamManagement) and/or based on the first time domain behavior of the first SRS resource and the third time domain behavior of the third SRS resource being the same/similar.

A first time domain behavior of the first SRS resource and a fourth time domain behavior of the fourth SRS resource may be different via a BWP. The wireless device may not send (e.g., transmit), via the BWP, the first SRS resource of the first SRS resource set and the fourth SRS resource of the second SRS resource set (e.g., simultaneously, in series, etc.), for example, based on or in response to the first time domain behavior of the first SRS resource and the fourth time domain behavior of the fourth SRS resource being different.

A second time domain behavior of the second SRS resource and a fourth time domain behavior of the fourth SRS resource may be the same/similar via a BWP. The wireless device may send (e.g., transmit), via the BWP, the second SRS resource of the first SRS resource set and the fourth SRS resource of the second SRS resource set (e.g., simultaneously, in series, etc.), for example, based on a parameter being set to a value (e.g., higher layer parameter, BeamManagement) and based on or in response to the second time domain behavior of the second SRS resource and the fourth time domain behavior of the fourth SRS resource being the same/similar.

A second time domain behavior of the second SRS resource and a third time domain behavior of the third SRS resource may be different via a BWP. The wireless device may not send (e.g., transmit), via the BWP, the second SRS resource of the first SRS resource set and the third SRS resource of the second SRS resource set (e.g., simultaneously, in series, etc.), for example, based on a parameter being set to a value (e.g., higher layer parameter, BeamManagement) and/or the second time domain behavior of the second SRS resource and the third time domain behavior of the third SRS resource being different.

A parameter (e.g., higher layer parameter, SRS-Resource) may indicate a configuration (semi-statically or otherwise) of at least one of: an SRS resource index (e.g., indicated by a parameter such as srs-ResourceId) indicating a configuration of an SRS resource; a time domain behavior of the configuration of the SRS resource (e.g., indicated by a parameter such as resourceType); an SRS sequence ID (e.g., indicated by a parameter such as sequenceId); and/or a configuration of a spatial relation between a reference RS and a target SRS. The base station may configure the wireless device with a spatial relation parameter (e.g., higher layer parameter, spatialRelationInfo). The spatial relation parameter (e.g., higher layer parameter, spatialRelationInfo) may comprise an index (ID) of the reference RS. Domain behavior of an SRS resource may comprise a periodic transmission, a semi-persistent transmission, and/or an aperiodic SRS transmission. A time domain behavior of an SRS resource may comprise a transmission periodicity, a transmission offset of the SRS resource, or other behavior.

A wireless device may be configured with one or more SRS resource configurations, for example, based on indications from a base station. A resource parameter (e.g., higher layer parameter, resourceType which may be comprised in a parameter such as SRS-Resource) may be set to a value (e.g., "periodic"). The base station may configure the wireless device with a spatial relation parameter (e.g., higher layer parameter, spatialRelationInfo). The spatial relation parameter (e.g., higher layer parameter, spatialRelationInfo) may comprise an ID of a reference RS (e.g., SSB-Index, CSI-RS-Index, SRS).

The reference RS may comprise a SS/PBCH block. The reference RS may comprise a RS (e.g., periodic CSI-RS, semi-persistent CSI-RS, aperiodic CSI-RS). The wireless device may receive the reference RS, for example, via a spatial domain receiving filter. The wireless device may send (e.g., transmit) a target SRS resource with a spatial domain transmission filter that is the same/similar to the spatial domain receiving filter, for example, based on or in response to a spatial relation parameter (e.g., higher layer parameter, spatialRelationInfo) indicating the reference RS (e.g., by the ID of the reference RS) via the SS/PBCH block or the CSI-RS. The wireless device may send (e.g., transmit) a target SRS resource with the spatial domain receiving filter, for example, based on the spatial parameter (e.g., higher layer parameter, spatialRelationInfo) indicating the reference RS (e.g., by the ID of the reference RS).

The RS may be an SRS (e.g., periodic SRS, semi-persistent SRS, aperiodic SRS). The wireless device may use a spatial domain transmission filter to send (e.g., transmit) the reference RS. The wireless device may send (e.g., transmit) a target SRS resource with the spatial domain transmission filter, for example, based on a spatial relation parameter (e.g., higher layer parameter, spatialRelationInfo) indicating the reference RS (e.g., by an ID of the reference RS) being the SRS.

The base station may activate and deactivate one or more configured resource sets (e.g., SRS resource sets, semi-persistent SRS resource sets) of a serving cell by sending a message (e.g., an SP SRS Activation/Deactivation MAC CE). The one or more configured Resource sets (e.g., SRS resource sets) may be initially deactivated upon configuration. The one or more configured Resource sets (e.g., SRS resource sets) may be deactivated after a handover.

A wireless device may be configured with one or more resource sets (e.g., SRS resource sets, semi-persistent SRS resource sets), for example, as indicated by a base station. A resource parameter (e.g., higher layer parameter, resourceType which may be comprised in a higher layer parameter SRS-Resource) may be set to a status (e.g., semi-persistent, persistent, etc.). The wireless device may receive an activation command (e.g., SP SRS Activation/Deactivation MAC CE) for an SRS resource set of the one or more Resource sets (e.g., SRS resource sets), for example, based on an indication from the base station. A downlink message (e.g., a PDSCH message) may carry the activation command. The wireless device may send (e.g., transmit) an acknowledgement (e.g., HARQ-ACK for the PDSCH message) in a slot n. The wireless device may apply one or more assumptions/actions for an SRS transmission of the SRS resource set sub frame starting from the slot $n+3N_{slot}^{subframe,\mu}+1$, for example, based on or in response to the sending of the acknowledgement (e.g., HARQ-ACK for the PDSCH message) in the slot n. The activation command may comprise one or more spatial relation assumptions for one or more SRS resources of the SRS resource set. A first field (e.g., Resource $ID_i$) in the activation command may comprise an identifier of a resource (e.g., SS/PBCH block, NZP CSI-RS, SRS) used for spatial relationship derivation for an SRS resource of the one or more SRS resources. The one or more spatial relation assumptions may be indicated by a list of references to one or more reference signal IDs (e.g., SSB-Index, SRS-ResourceId, etc.), for example, one per SRS resource of the SRS resource set (e.g., activated SRS resource set). A spatial relation assumption of the one or more spatial relation assumptions may be indicated by a reference to a reference RS (e.g., an ID of a reference RS). The reference RS may comprise a broadcast channel, channel state resource or other reference signal (e.g., SS/PBCH block, NZP CSI-RS resource, or SRS).

A wireless device may activate a semi-persistent SRS resource configuration on an uplink BWP of a serving cell, for example, based on or in response to receiving, from a base station, an activation command for the semi-persistent SRS resource configuration. The wireless device may not receive a deactivation command for the semi-persistent SRS resource configuration, for example, based on an indication from the base station.

The uplink BWP may be an active uplink BWP of the serving cell. A wireless device may consider a semi-persistent SRS resource configuration active, for example, based on the uplink BWP being the active uplink BWP of the serving cell and/or not receiving a deactivation command for the semi-persistent SRS resource configuration. The wireless device may send (e.g., transmit), via the uplink BWP of the serving cell, an SRS transmission, for example, based on the semi-persistent SRS resource configuration and/or the considering.

The uplink BWP may not be an active uplink BWP of the serving cell. The uplink BWP may not be the active uplink BWP, for example, based on the uplink BWP being deactivated in the serving cell. The wireless device may assume that the semi-persistent SRS configuration is suspended in the UL BWP of the serving cell, for example, based on not receiving the deactivation command for the semi-persistent SRS resource configuration and/or the uplink BWP being deactivated. The wireless device may reactivate the semi-persistent SRS configuration when the UL BWP becomes an active UL BWP of the serving cell, for example, based on the semi-persistent SRS configuration being suspended in the UL BWP.

A first SRS resource of an SRS resource set may have a first time domain behavior (e.g., periodic, semi-persistent, aperiodic). A second SRS resource of the SRS resource set may have a second time domain behavior (e.g., periodic, semi-persistent, aperiodic). The wireless device may expect/assume that the first time domain behavior and the second time behavior are the same/similar, for example, based on the first SRS resource and the second SRS resource being in the same/similar SRS resource set. The wireless device may not expect/assume that the first time domain behavior and the second time behavior are different, for example, based on the first SRS resource and the second SRS resource being in the (e.g., same/similar) SRS resource set.

An SRS resource of an SRS resource set may have a first time domain behavior (e.g., periodic, semi-persistent, aperiodic). The SRS resource set may have a second time domain behavior (e.g., periodic, semi-persistent, aperiodic). The wireless device may expect that the first time domain behavior and the second time behavior are the same/similar, for example, based on the SRS resource being associated with the SRS resource set. The wireless device may not expect that the first time domain behavior and the second time behavior are different, for example, based on the SRS resource and the SRS resource set having an association. The SRS resource association with the SRS resource set may be a comprised by relationship, for example, based on the SRS resource set comprising the SRS resource. The SRS resource association with the SRS resource set may be a comprised by relationship, for example, based on the SRS resource being an element of the SRS resource set.

A wireless device may not send (e.g., transmit) an RS (e.g., SRS) and a random access message (e.g., PRACH) (e.g., simultaneously, in series, etc.), for example, based on an intra-band carrier aggregation (CA) and/or in an inter-band CA band-band combination. The wireless device may not send (e.g., transmit) an RS (e.g., an SRS) from a first carrier and a random access message (e.g., PRACH) from a second carrier simultaneously, for example, based on not sending the RS (e.g., SRS) and the random access message (e.g., PRACH) simultaneously. The first carrier may be different from the second carrier.

A wireless device with a periodic SRS transmission on at least one symbol (e.g., OFDM symbol), for example, may be configured by one or more indications from a base station. The base station may configure an SRS resource with a resource parameter (e.g., higher layer parameter, resourceType) with a value (e.g., aperiodic). The base station may trigger the SRS resource on the at least one symbol. The wireless device may send (e.g., transmit) the (aperiodic) SRS resource on the (overlapped) at least one symbol, for example, based on to the SRS resource with the resource parameter (e.g., higher layer parameter, resourceType) set as a value (e.g., aperiodic) being triggered via the at least one symbol configured with the periodic SRS transmission. The wireless device may not perform the periodic SRS transmission on the at least one symbol, for example, based on the SRS resource with the resource parameter (e.g., resourceType) set to a value (e.g., aperiodic) being triggered on the at least one symbol configured with the periodic SRS transmission. The wireless device may not send (e.g., transmit) an SRS associated with the periodic SRS transmission on the (overlapped) at least one symbol, for example, based on not performing the periodic SRS transmission.

A wireless device with a semi-persistent SRS transmission on at least one symbol (e.g., OFDM symbol), for example, may be configured by indications from a base station. The base station may configure an SRS resource with a resource parameter (e.g., higher layer parameter, resourceType) set as a value (e.g., aperiodic). The base station may trigger the SRS resource on the at least one symbol. The wireless device may send (e.g., transmit) the (aperiodic) SRS resource on the (overlapped) at least one symbol, for example, based on the SRS resource with the resource parameter (e.g., higher layer parameter, resource-Type) set as a value (e.g., aperiodic) being triggered on the at least one symbol configured with the semi-persistent SRS transmission. The wireless device may not perform the semi-persistent SRS transmission on the at least one symbol, for example, based on the SRS resource with the resource parameter (e.g., higher layer parameter, resourceType) set as a value (e.g., aperiodic) being triggered on the at least one symbol configured with the semi-persistent SRS transmission. The wireless device may not send (e.g., transmit) an SRS associated with the semi-persistent SRS transmission on the (overlapped) at least one symbol, for example, based on not performing the semi-persistent SRS transmission.

A base station may configure a wireless device with a periodic SRS transmission on at least one symbol (e.g., OFDM symbol). The base station may configure an SRS resource with a resource parameter (e.g., higher layer parameter, resourceType) set as a value (e.g., semi-persistent). The base station may trigger the SRS resource on the at least one symbol. The wireless device may send (e.g., transmit) the SRS resource (e.g., semi-persistent) on the at least one symbol (e.g., overlapped), for example, based on the SRS resource with the resource parameter (e.g., resourceType) set as semi-persistent being triggered on the at least one symbol configured with the periodic SRS transmission, The wireless device may not perform the periodic SRS transmission on the at least one symbol, for example, based on the SRS resource with the resource parameter (e.g., resourceType) set as a value (e.g., semi-persistent) being triggered on the at least one symbol configured with the periodic SRS transmission. The wireless device may not send (e.g., transmit) an SRS associated with the periodic SRS transmission on the at least one symbol (e.g., overlapped), for example, based on the not performing the periodic SRS transmission.

A base station may configure a wireless device with a list of one or more TCI state configurations (e.g., TCI-States) using and/or via a higher layer parameter, for example, PDSCH-Config for a serving cell. A number (e.g., quantity, plurality, etc.) of the one or more TCI-States may depend on a capability of the wireless device. The wireless device may use the one or more TCI-States to decode a PDSCH based on a detected PDCCH with a DCI. The DCI may be intended, for example, for the wireless device and/or the serving cell. Each of the one or more TCI-States state may contain one or more parameters. The wireless device may use the one or more parameters, for example, to configure a quasi-co-location relationship between one or more downlink reference signals (e.g., a first DL RS and/or a second DL RS) and the DM-RS ports of the PDSCH. The quasi-co-location relationship may be configured by a higher layer parameter QCL-Type1 for the first DL RS. The quasi-co-location relationship may be configured by a higher layer parameter QCL-Type2 for the second DL RS, for example, if the second DL RS is configured.

A first QCL type of a first DL RS and a second QCL type of a second a second DL RS may not be the same, for example, if the wireless device configures a quasi co-location relationship between the two DL RSs. The first DL RS and the second DL RS may be the same. The first DL RS and the second DL RS may be different.

A quasi co-location type (e.g., the first QCL type, the second QCL type) of a DL RS (e.g., the first DL RS, the second DL RS) may be provided to the wireless device by a higher layer parameter (e.g., QCL-Type in QCL-Info). The higher layer parameter QCL-Type may be at least one of: QCL-TypeA: {Doppler shift, Doppler spread, average delay, delay spread}, QCL-TypeB: {Doppler shift, Doppler spread}, QCL-TypeC: {average delay, Doppler shift} and QCL-TypeD: {Spatial Rx parameter}.

A wireless device may receive an activation command. The activation command may be used to map one or more TCI states (e.g., 8 states) to one or more codepoints of a TCI field in DCI. Mapping between one or more TCI states and one or more codepoints of the TCI field in DCI may be applied starting from slot $n+3N_{slot}^{subframe,\mu}+1$, for example, if a HARQ-ACK corresponding to a PDSCH carrying the activation command is sent (e.g., transmitted) in slot n. The wireless device may determine (e.g., assume) that one or more DM-RS ports of a PDSCH of a serving cell are quasi-co-located with an SSB/PBCH block, for example, (i) before the wireless device receives the activation command and/or (ii) after the wireless device receives a higher layer configuration of TCI-States. The SSB/PBCH block may be determined in an initial access procedure with respect to one or more of QCL-TypeA' and QCL-TypeD', for example, if applicable.

A wireless device may be configured by a base station, with a higher layer parameter TCI-PresentInDCI. The wireless device may determine (e.g., assume) that a TCI field is present in a DCI format (e.g., DCI format 1_1) of a PDCCH transmitted on the CORESET, for example, if the higher layer parameter TCI-PresentInDCI is set as 'Enabled' for a CORESET scheduling a PDSCH.

A base station and/or a wireless device may configure one or more wireless resources for communications between the base station and the wireless device. The wireless resources may comprise, for example, one or more CORESETS. The base station may configure the one or more CORESETS for the wireless device. A base station may (or may not) configure a CORESET with a higher layer parameter (e.g., TCI-PresentInDCI). The CORESET may schedule a PDSCH. A time offset between a reception of DCI (e.g., DCI format 1_1, DCI format 1_0) in the CORESET and a corresponding PDSCH may be equal to or greater than a threshold (e.g., Threshold-Sched-Offset). The threshold may be based on a reported capability of the wireless device. The wireless device may apply/associate a second TCI state for/with the CORESET used for a PDCCH transmission of the DCI. The wireless device may apply/associate a second QCL assumption for/with the CORESET used for a PDCCH transmission of the DCI. The wireless device may assume, to determine antenna port quasi co-location of the PDSCH, that a first TCI state and/or a first QCL assumption for the PDSCH is identical to (or substantially the same as) the second TCI state and/or the second QCL assumption applied/associated for/with the CORESET. The wireless device may perform a default PDSCH RS selection, for example, based on one or more of: the base station not configuring the CORESET with a higher layer parameter (e.g., TCI-PresentInDCI), and/or the time offset between the reception of the DCI and the PDSCH being equal to or greater than the threshold. The wireless device may assume/determine that a first TCI state and/or a first QCL assumption for the PDSCH is identical to (or substantially the same as) the second TCI state and/or the second QCL assumption applied for the CORESET.

A base station may configure a CORESET with a higher layer parameter (e.g., TCI-PresentInDCI). The higher layer parameter (e.g., TCI-PresentInDCI) may be set as enabled (e.g., 1 or other value). The CORESET may schedule a PDSCH with DCI (e.g., DCI format 1_0). The DCI may or may not comprise a TCI field. A time offset between a reception of the DCI in the CORESET and a corresponding PDSCH may be equal to or greater than a threshold (e.g., Threshold-Sched-Offset). The threshold may be based on a capability or reported capability of the wireless device. The wireless device may apply/associate a second TCI state for/with the CORESET used for a PDCCH transmission of the DCI. The wireless device may apply/associate a second QCL assumption for the CORESET used for a PDCCH transmission of the DCI. The wireless device may determine (e.g., assume), to determine an antenna port quasi co-location of the PDSCH, that a first TCI state and/or a first QCL assumption for the PDSCH is identical to (or substantially the same as) the second TCI state and/or the second QCL assumption applied for/associated with the CORESET. The wireless device may perform a default PDSCH RS selection, for example, based on one or more of: the base station scheduling the PDSCH with the DCI not comprising the TCI field, and/or the time offset between the reception of the DCI and the PDSCH being equal or greater than the threshold. The wireless device may determine (e.g., assume) that a first TCI state and/or a first QCL assumption for the PDSCH is identical to (or substantially the same as) the second TCI state and/or the second QCL assumption applied for the CORESET. As described herein, the terms "TCI state" and "QCL assumption" may be used interchangeably. "TCI state" and/or "QCL assumption" may indicate a beam used for reception of data (e.g., reception of PDSCH data).

A base station may configure a CORESET with a higher layer parameter (e.g., TCI-PresentInDCI). The higher layer parameter (e.g., TCI-PresentInDCI) may be set as enabled (e.g., 1 or other value). The wireless device may receive DCI in the CORESET of a scheduling component carrier. The DCI may comprise a TCI field. The TCI field in the DCI in the scheduling component carrier may indicate one or more activated TCI states (e.g., after receiving the activation command) in a scheduled component carrier or in a DL BWP, for example, based on the higher layer parameter (e.g., TCI-PresentInDCI) being set as enabled (e.g., 1 or other value).

A base station may configure a CORESET with a higher layer parameter (e.g., TCI-PresentInDCI). The higher layer parameter (e.g., TCI-PresentInDCI) may be set as enabled (e.g., 1 or other value). The wireless device may receive DCI (e.g., DCI format 1_1) in the CORESET. The DCI may schedule a PDSCH of a wireless device. The DCI may comprise a TCI field. The value of the TCI field may indicate the TCI state. A time offset between a reception of the DCI and the corresponding scheduled PDSCH may be equal to or greater than a threshold (e.g., Threshold-Sched-Offset). The threshold may be based on a capability or reported capability of the wireless device. The wireless device may use a TCI state according to a value of the TCI field (e.g., in a detected PDCCH with the DCI) to determine antenna port quasi co-location for the PDSCH. The wireless device may determine antenna port quasi co-location for the PDSCH, for example, based on one or more of: the TCI field being present in the DCI scheduling the PDSCH, and/or a higher layer parameter (e.g., TCI-PresentInDCI) being set as enabled for the CORESET. Using the TCI state according to the value of the TCI field may comprise the wireless device determining/assuming that one or more DM-RS ports of the PDSCH of a serving cell are quasi co-located with one or more RS(s) in the TCI state with respect to one or more QCL type parameter(s) given by the TCI state, for example, if the time offset between the reception of the DCI and the PDSCH is equal or greater than the threshold.

A base station may configure a wireless device with a single slot PDSCH (e.g., and/or any other quantity of slot PDSCH). The single slot PDSCH may be scheduled in a slot. The base station may activate one or more TCI states in the slot. A TCI state (e.g., indicated by a TCI field in DCI scheduling the single slot PDSCH) may be based on the one or more activated TCI states in the slot with the scheduled single slot PDSCH. The TCI state may be one of the one or more activated TCI states in the slot. The TCI field in the DCI may indicate a TCI state of the one or more activated TCI states in the slot.

A wireless device may be configured with a CORESET. The CORESET may be associated with a search space set for cross-carrier scheduling. The wireless device may determine/expect/assume that a higher layer parameter (e.g., TCI-PresentInDCI) is set as enabled for the CORESET, for example, based on the CORESET being associated with the search space set for cross-carrier scheduling. A base station may configure a serving cell with one or more TCI states. The wireless device may detect, in the search space set, a PDCCH (e.g., comprising DCI) for scheduling a PDSCH. A TCI field in the DCI may indicate at least one of the one or more TCI states. The at least one of the one more TCI states (e.g., scheduled by the search space set) may comprise a QCL type (e.g., QCL-TypeD). The wireless device may determine/expect/assume that a time offset between a reception of the PDCCH detected in the search space set and the PDSCH is greater than or equal to a threshold (e.g., Threshold-Sched-Offset), for example, based on at least one of the one or more TCI states scheduled by the search space set containing the QCL type.

A base station may configure a CORESET with a higher layer parameter (e.g., TCI-PresentInDCI). The higher layer parameter (e.g., TCI-PresentInDCI) may be set as enabled. An offset between a reception of DCI in the CORESET and a PDSCH scheduled by the DCI may be less than a threshold (e.g., Threshold-Sched-Offset), for example, if the higher layer parameter (e.g., TCI-PresentInDCI) is set to be enabled for the CORESET.

A base station may or may not configure a CORESET with a higher layer parameter (e.g., TCI-PresentInDCI). The wireless device may be, for example, in an RRC connected mode. The wireless device may be, for example, in an RRC idle mode. The wireless device may be, for example, in an RRC inactive mode. An offset between a reception of DCI in the CORESET and a PDSCH scheduled by the DCI may be less than a threshold (e.g., Threshold-Sched-Offset), for example, if the higher layer parameter (e.g., TCI-PresentInDCI) is not configured for the CORESET.

A wireless device may monitor one or more CORESETs and/or one or more search spaces within/in an active BWP (e.g., an active downlink BWP) of a serving cell in one or more slots (e.g., one or more time slots). Monitoring the one or more CORESETs within/in the active BWP of the serving cell in the one or more slots may comprise monitoring at least one CORESET within/in the active BWP of the serving cell in each slot of the one or more slots. A latest slot of the one or more slots may be a most recent slot. The wireless device may monitor, within/in the active BWP of the serving cell, one or more second CORESETs of the one or more CORESETs in the latest slot. The wireless device may determine the latest slot, for example, based on monitoring the one or more second CORESETs in the latest slot. Each CORESET of the one or more second CORESETs may be indicated/identified by a CORESET-specific index (e.g., indicated by a higher layer parameter, such as CORESET-ID). A CORESET specific index of a CORESET of the one or more second CORESETs may be least among the CORESET specific indices of the one or more second CORESETs.

The wireless device may monitor a search space associated with the CORESET (e.g., in the latest slot). The wireless device may select the CORESET of the one or more second CORESETs, for example, based on one or more of: the CORESET-specific index of the CORESET being the least, and/or the monitoring the search space associated with the CORESET in the latest slot (or any other slot). The wireless device may perform a default PDSCH RS selection, for example, if an offset between the reception of the DCI in the CORESET and the PDSCH scheduled by the DCI is less than a threshold (e.g., Threshold-Sched-Offset). The wireless device may determine/assume that one or more DM-RS ports of the PDSCH of the serving cell are quasi co-located with one or more RSs in a TCI state with respect to one or more QCL type parameter(s), for example, based on the default PDSCH RS selection. The one or more RSs in the TCI state may be used for PDCCH quasi co-location indication of the CORESET of the one or more second CORESETs, based on or in response to the selecting the CORESET.

A wireless device may receive DCI via a PDCCH in a CORESET. The DCI may schedule a PDSCH. An offset between a reception of the DCI and the PDSCH may be less than a threshold (e.g., Threshold-Sched-Offset). A first QCL type (e.g., QCL-TypeD) of one or more DM-RS ports of the PDSCH may be different from a second QCL type (e.g., QCL-TypeA) of one or more second DM-RS ports of the PDCCH. The PDSCH and the PDCCH may overlap in at least one symbol. The wireless device may prioritize a reception of the PDCCH associated with the CORESET, for example, based on one or more of: the PDSCH and the PDCCH overlapping in at least one symbol, and/or the first QCL type being different from the second QCL type. The prioritizing may apply to an intra-band CA case, for example, if the PDSCH and the CORESET are in different component carriers. The prioritizing the reception of the PDCCH may comprise receiving the PDSCH with the second QCL type of one or more second DM-RS ports of the PDCCH. The prioritizing the reception of the PDCCH may comprise overwriting the first QCL type of the one or more DM-RS ports of the PDSCH with the second QCL type of the one or more second DM-RS ports of the PDCCH. The prioritizing the reception of the PDCCH may comprise assuming a spatial QCL of the PDCCH (e.g., the second QCL type), for the simultaneous reception of the PDCCH and the PDSCH. The prioritizing the reception of the PDCCH may comprise applying a spatial QCL of the PDCCH (e.g., the second QCL type), for the simultaneous reception of the PDCCH and the PDSCH.

The configured TCI states may or may not comprise an indication of a QCL type (e.g., none of the configured TCI states may comprise an indication of a QCL type, none of the configured TCI states may comprise an indication of a QCL-TypeD). The wireless device may determine assume QCL assumptions for the configured TCI states, for example, based on indicated TCI states for one or more scheduled PDSCH transmissions, for example, if none of the configured TCI states comprise the indication of the QCL type. The wireless device may determine QCL assumptions for the configured TCI states, for example, irrespective of the time offset between the reception of the DCI and the corresponding PDSCH.

A wireless device may use a CSI-RS for at least one of: time/frequency tracking, CSI computation, L1-RSRP computation, and/or mobility. A base station may configure a wireless device to monitor a CORESET on one or more symbols (e.g., OFDM symbols). A CSI-RS resource may be associated with a resource set parameter (e.g., non-zero power CSI-RS resource set, NZP-CSI-RS-ResourceSet). A higher layer parameter repetition of the NZP-CSI-RS-ResourceSet may be set to 'on' or another indication/value (e.g., 1, enabled, etc.). The wireless device may not determine/expect to be configured with a CSI-RS of the CSI-RS resource over the one or more symbols, for example, based on or in response to the CSI-RS resource being associated with the NZP-CSI-RS-ResourceSet with the higher layer parameter repetition set to 'on' or another indication/value (e.g., 1, enabled, etc.).

A higher layer parameter repetition of the NZP-CSI-RS-ResourceSet may not be set to 'on' or another indication/value (e.g., 1, enabled, etc.). A base station may configure a CSI-RS resource and/or one or more search space sets associated with a CORESET in the same (or different) one or more symbols (e.g., OFDM symbols). The wireless device may determine/assume that a CSI-RS of the CSI-RS resource and one or more DM-RS ports of a PDCCH are quasi co-located with QCL-TypeD, for example, based on one or more of: the higher layer parameter repetition of the NZP-CSI-RS-ResourceSet not being set to 'on' or another indication/value (e.g., 1, enabled, etc.), and/or the CSI-RS resource and the one or more search space sets associated with the CORESET being configured in the same one or more symbols. The base station may send (e.g., transmit the PDCCH in the one or more search space sets associated with the CORESET.

A higher layer parameter repetition of the NZP-CSI-RS-ResourceSet may not be set to 'on' or another indication/value (e.g., may be set to 0, disabled, etc.). In A base station may configure a CSI-RS resource of a first cell and one or more search space sets associated with a CORESET of a second cell in the same (or different) one or more symbols (e.g., OFDM symbols). The wireless device may determine/assume that a CSI-RS of the CSI-RS resource and one or more DM-RS ports of a PDCCH are quasi co-located with QCL-TypeD, for example, based on one or more of: the higher layer parameter repetition of the NZP-CSI-RS-ResourceSet not being set to 'on' or another indication/value (e.g., 1, enabled, etc.), and/or the CSI-RS resource and the one or more search space sets associated with the CORESET being configured in the same one or more symbols. The base station may send (e.g., transmit) the PDCCH in the one or more search space sets associated with the CORESET. The first cell and the second cell may be in different intra-band component carriers.

A base station may configure a wireless device with a CSI-RS in a first set of PRBs. The base station may configure the wireless device with one or more search space sets associated with a CORESET in one or more symbols (e.g., OFDM symbols) and/or in a second set of PRBs. The wireless device may not determine/expect that the first set of PRBs and the second set of PRBs overlap in the one or more symbols.

A base station may configure a wireless device with a CSI-RS resource and an SS/PBCH block in the same (or different) one or more symbols (e.g., OFDM symbols). The wireless device may determine/assume that the CSI-RS resource and the SS/PBCH block are quasi co-located with a QCL type (e.g., QCL-TypeD), for example, based on the CSI-RS resource and the SS/PBCH block being configured in the same one or more symbols.

The base station may configure the CSI-RS resource in a first set of PRBs for the wireless device. The base station may configure the SS/PBCH block in a second set of PRBs for the wireless device. The wireless device may not determine/expect that the first set of PRBs overlap with the second set of PRBs.

The base station may configure the CSI-RS resource with a first subcarrier spacing for the wireless device. The base station may configure the SS/PBCH block with a second subcarrier spacing for the wireless device. The wireless device may determine/expect that the first subcarrier spacing and the second subcarrier spacing are the same.

A base station may configure a wireless device with an NZP-CSI-RS-ResourceSet. The NZP-CSI-RS-ResourceSet may be configured with a higher layer parameter repetition set to 'on' or another indication/value (e.g., 1, enabled, etc.). The wireless device may determine/assume that the base station may send (e.g., transmit) one or more CSI-RS resources within the NZP-CSI-RS-ResourceSet with a same downlink spatial domain transmission filter, for example, based on the NZP-CSI-RS-ResourceSet being configured with the higher layer parameter repetition set to 'on' or another indication/value (e.g., 1, enabled, etc.). The base station may send (e.g., transmit) each CSI-RS resource of the one or more CSI-RS resources in different symbols (e.g., OFDM symbols).

The NZP-CSI-RS-ResourceSet may be configured with a higher layer parameter repetition set to 'off' or another indication/value (e.g., 0, disabled, etc.). The wireless device may not determine/assume that the base station may send (e.g., transmit) one or more CSI-RS resources within the NZP-CSI-RS-ResourceSet with a same downlink spatial domain transmission filter, for example, based on the NZP-CSI-RS-ResourceSet being configured with the higher layer parameter repetition set to 'off' or another indication/value (e.g., 0, disabled, etc.).

A base station may configure a wireless device with a higher layer parameter (e.g., groupBasedBeamReporting). The base station may set the higher layer parameter (e.g., groupBasedBeamReporting) to enabled or another indication/value (e.g., 1, on, etc.). The wireless device may report at least two different resource indicators (e.g., CRI, SSBRI) in a single reporting instance to report setting of one or more report settings, for example, based on the higher layer parameter groupBasedBeamReporting being set to enabled or another indication/value (e.g., 1, on, etc.). The wireless device may receive at least two RSs (e.g., CSI-RS, SSB) indicated by the at least two different resource indicators simultaneously. The wireless device may receive (e.g., simultaneously receive) the at least two RSs with a single spatial domain receive filter. The wireless device may receive (e.g., simultaneously receive) the at least two RSs with a plurality of simultaneous spatial domain receive filters.

A base station may need/request radio access capability information of a wireless device. The base station may initiate a procedure to request the radio access capability information. The base station may use, for example, an information element (e.g., UECapabilityEnquiry). The wireless device may use an information element (e.g., UECapabilityInformation) to transfer wireless device radio access capability information requested by the base station. The wireless device may indicate/provide, for example, a parameter (e.g., timeDurationForQCL) in a message (e.g., FeatureSetDownlink) indicating a set of features that the wireless device supports.

The threshold may comprise a minimum quantity of OFDM symbols for the wireless device to perform a downlink control channel message (e.g., PDCCH message) reception with a DCI and to apply a spatial QCL information (e.g., TCI-State) indicated by (e.g., received in) the DCI for a processing of a downlink shared channel message (e.g., PDSCH message) with a schedule indicated by the DCI. The minimum quantity of OFDM symbols between the downlink shared channel message (e.g., PDCCH message) reception and the processing of the PDSCH to apply the spatial QCL information may be used by the wireless device and/or indicated by the DCI, via a downlink shared channel message (e.g., PDSCH message).

A base station may use an information element (IE) (e.g., CSI-AperiodicTriggerStateList) to configure a wireless device with one or more aperiodic trigger states (e.g., 1, 64, 128, etc. aperiodic trigger states). A codepoint of a CSI request field in a DCI may indicate/be associated with an aperiodic trigger state of the one or more aperiodic trigger states. The aperiodic trigger state may comprise one or more report configurations (e.g., 1, 8, 16, etc. report configurations, indicated by a report parameter (e.g., higher layer parameter, associatedReportConfigInfoList)). The wireless device may perform measurement of CSI-RS and aperiodic reporting, for example, based on receiving the DCI with the CSI request field indicating the aperiodic trigger state and/or the one or more report configurations (e.g., in the associatedReportConfigInfoList) for the aperiodic trigger state. For example, the DCI and/or report configurations described herein may be used for aperiodic CSI RS A report configuration (e.g., indicated by a report parameter (e.g., higher layer parameter, CSI-AssociatedReportConfigInfo)) of the one or more report configurations may be indicated by/associated with a report configuration index (e.g., indicated by a higher layer parameter or CSI-ReportConfigId). The report configuration may comprise one or more CSI resources (e.g., 1, 8, 16, etc. CSI resources). An aperiodic CSI resource of the one or more CSI resources may be associated with a TCI state (e.g., indicated by a QCL parameter (e.g., higher layer parameter, qcl-info) in an IE (e.g., CSI-AperiodicTriggerStateList)) of one or more TCI-State configurations. The TCI state may indicate a QCL assumption (e.g., an RS, an RS source, SS/PBCH block, CSI-RS). The TCI state may indicate a QCL type (e.g., QCL-TypeA, QCL-TypeD, etc.).

The wireless device may receive a DCI message with a CSI request field from a base station. The wireless device may receive the DCI message via a PDCCH. The wireless device may receive the DCI message when monitoring the PDCCH. the DCI message with the CSI request field may initiate/indicate/trigger an aperiodic trigger state of the one or more aperiodic trigger states. A codepoint of the CSI request field in the DCI may indicate the aperiodic trigger state. The aperiodic trigger state may comprise one or more report configurations (e.g., a list of NZP-CSI-RS-ResourceSet). A report configuration (e.g., NZP-CSI-RS-ResourceSet) of the one or more report configurations may comprise one or more CSI resources (e.g., aperiodic CSI-RS resources, NZP-CSI-RS-Resources).

The base station may not configure the report configuration with a TRS parameter (e.g., higher layer parameter, trs-Info). A first antenna port for a first aperiodic CSI resource of the one or more CSI resources may be different from a second antenna port for a second aperiodic CSI resource of the one or more CSI resources, for example, based the report configuration without the TRS parameter (e.g., higher layer parameter, trs-Info). An antenna port for each aperiodic CSI-RS resource of the one or more CSI resources may be different, for example, based on the report configuration without the TRS parameter (e.g., higher layer parameter, trs-Info). The base station may not configure the report configuration with a higher layer parameter repetition. A scheduling offset between a last symbol of the a PDCCH message carrying the DCI and a first symbol of the one or more CSI resources in the report configuration may be smaller than a second threshold (e.g., beamSwitchTiming). The wireless device may report the second threshold. The second threshold may be a first value (e.g., 14, 28, 48, etc. symbols).

An aperiodic CSI resource of the one or more CSI resources may be associated with a first TCI state of the one or more TCI-State configurations. The first TCI state may indicate at least one first RS. The first TCI state may indicate at least one first QCL type. The aperiodic CSI resource may be associated with the first TCI state. The wireless device may receive an aperiodic CSI-RS of the aperiodic CSI resource with the at least one first RS (e.g., indicated by the first TCI state) with respect to the at least one first QCL type indicated by the first TCI state.

The base station may send (e.g., transmit) a downlink signal with a second TCI state. The second TCI state may indicate at least one second RS. The second TCI state may indicate at least one second QCL type. The wireless device may receive the downlink signal in one or more first symbols. The wireless device may receive an aperiodic CSI-RS for the aperiodic CSI resource in one or more second symbols. The one or more first symbols and the one or more second symbols may overlap (e.g., fully or partially). The downlink signal and the aperiodic CSI-RS (or the aperiodic CSI-RS resource) may overlap, for example, based on the one or more first symbols and the one or more second symbols overlapping.

The downlink signal and the aperiodic CSI-RS (or the aperiodic CSI-RS resource) may overlap in a time duration. The time duration may be at least one symbol. The time duration may be at least one slot. The time duration may be at least one subframe. The time duration may be at least one mini-slot. The time duration may be the one or more second symbols. The time duration may be the one or more first symbols.

The downlink signal may be a PDSCH message scheduled with an offset larger than or equal to a first threshold (e.g., Threshold-Sched-Offset, timeDurationForQCL). The downlink signal may be a second aperiodic CSI-RS scheduled with an offset larger than or equal a second threshold (e.g., beamSwitchTiming) when the second threshold is a first value (e.g., 14, 28, 48, etc. symbols). The downlink signal may be an RS (e.g., periodic CSI-RS, semi-persistent CSI-RS, SS/PBCH block etc.).

The scheduling offset between the last symbol of the PDCCH message and the first symbol may be smaller than the second threshold, for example, based on the downlink signal with the second TCI state and the aperiodic CSI-RS (or the aperiodic CSI-RS resource) overlapping. The wireless device may apply a QCL assumption indicated by the second TCI state, for example, based on receiving the aperiodic CSI-RS. The wireless device may receive the aperiodic CSI-RS with the at least one second RS (e.g., indicated by the second TCI state) with respect to the at least one second QCL type indicated by the second TCI state, for example, based on applying the QCL assumption (e.g., indicated by the second TCI state) and/or receiving the aperiodic CSI message.

A scheduling offset between a last symbol of the PDCCH message carrying the DCI and a first symbol of the one or more CSI resources in the report configuration may be equal to or larger than a second threshold (e.g., beamSwitchTiming) The wireless device may report the second threshold. The second threshold may be a first value (e.g., 14, 28, 48, etc. symbols). The wireless device may apply a QCL assumption (indicated by the first TCI state) for the aperiodic CSI resource of the one or more CSI resources in the report configuration, for example, based on the scheduling offset being equal to or larger than the second threshold. The wireless device may receive the aperiodic CSI-RS of the aperiodic CSI resource with the at least one first RS (indicated by the first TCI state) with respect to the at least one first QCL type indicated by the first TCI state, for example, based on the QCL assumption (e.g., indicated by the first TCI state) for the aperiodic CSI resource.

A wireless device may be equipped with one or more antenna panels. The wireless device may send (e.g., transmit) and/or receive via the one or more antenna panels (e.g., simultaneously, in series, or otherwise). The wireless device may deactivate at least one antenna panel of the one or more antenna panels to save power (e.g., less monitoring downlink control channel, less uplink/downlink transmission, etc.). The wireless device may not keep the one or more panels active for an uplink and/or downlink transmission. The wireless device may activate and/or deactivate at least one antenna panel of the one or more antenna panels autonomously. The wireless device may activate and/or deactivate at least one antenna panel of the one or more antenna panels, for example, based on an indication (for example, RRC, MAC-CE, DCI) from a base station.

The wireless device may stop sending an uplink signal (for example, RACH, PUCCH, SRS) via the uplink BWP, for example, based on deactivating an UL BWP. A wireless device may deactivate at least one antenna panel of one or more antenna panels within an uplink BWP. The behavior of the wireless device via the deactivated antenna panel(s) may not be currently defined. A mechanism for the wireless device may be used to communicate antenna panel status, for example, based on the wireless device activating and/or deactivating at least one antenna panel within the same/similar BWP (for example, an uplink BWP, and/or a downlink BWP). The wireless device may stop uplink transmissions (for example, PRACH, PUSCH, PUCCH, SRS) via the deactivated antenna panel(s). This stopping may reduce uplink interference to other wireless devices and other cells. This stopping may increase the signal quality (for example, SINR) of other wireless devices, and/or other cells.

The wireless device may stop reporting CSI for a deactivated antenna panel(s). The wireless device may stop monitoring at least one PDCCH in a CORESET configured for the deactivated antenna panel(s). This stopping may decrease the battery consumption power for the wireless device. The wireless device may save power, for example, based on stopping the monitoring and/or the reporting the CSI.

An antenna panel may be configured with a configured uplink grant and/or an SRS (e.g., semi-persistent SRS). Legacy systems may not teach the behavior of the wireless device for the configured grant and/or the SRS, for example, based on the wireless device deactivating the antenna panel. The wireless device may release and/or clear the configured uplink grant and/or the SRS, for example, based on the antenna panel being reactivated. The base station may send (e.g., transmit) new configuration parameters for a configured uplink grant and/or SRS. This process may increase the signaling overhead, battery consumption, and/or signaling latency.

Communicating, from the wireless device to the base station, one or more indications of deactivated panels may reduce signaling overhead, latency, and/or the like, for transmission of a configured grant and/or an SRS resource configuration when an antenna panel is set to an activated state and/or set to a deactivated state. The wireless device may receive downlink and/or send uplink transmissions when an antenna panel is set to an activated state and/or set to a deactivated state.

The wireless device may activate and/or deactivate antenna panel(s) autonomously (for example, without an indication from a base station). Deactivated antenna panel(s) may save power consumed by the wireless device. The wireless device may indicate the deactivated and/or activated panel(s) to the base station, for example, based on the activating and/or deactivating of antenna panel(s). The base station may use this information to communicate more efficiently to the wireless device. The base station may not send (e.g., transmit) and/or receive via the activated panel, for example, based the wireless device not indicating an activated panel. The wireless device may monitor, via the activated panel, for a downlink control information (DCI) message, for example, based on the base station not communicating with the activated panel. This process may increase the power consumption of the wireless device.

The base station may send (e.g., transmit) and/or receive (for example, a DCI message) via the deactivated panel, for example, based on the wireless device not indicating a deactivated panel. The wireless device may not monitor, via the deactivated panel, for a DCI message. The base station may send (e.g., transmit), via the deactivated panel, a DCI message, for example, based on the base station not being aware of the deactivated panel. The wireless device may miss (e.g., receiving) the DCI message via the deactivated antenna panel. This missing may increase latency of communication, decrease data rate, decrease reliability of the communication, and/or the like.

There may be a need to introduce a mechanism to indicate an activation and/or deactivation status of an antenna panel to the base station, for example, based on the wireless device activating and/or deactivating autonomously. A PDSCH message may have a single QCL assumption, for example, in legacy systems. The wireless device may receive the PDSCH message with a single reference signal (or beam), for example, based on the PDSCH having the single QCL assumption. The single QCL assumption may indicate a first RS (e.g., SS/PBCH block and/or CSI-RS) with a first QCL type (e.g., QCL-TypeD). The wireless device may determine that at least one DM-RS of the PDSCH message is quasi co-located with the first RS, for example, based on the PDSCH message having the single QCL assumption indicating the first RS. The wireless device may receive the PDSCH based on a first beam associated with the first RS. The wireless device may apply the single QCL assumption of the PDSCH for a reception of the aperiodic CSI-RS based on a second threshold (e.g., beamSwitchTiming), for example, based a legacy system use and an aperiodic CSI-RS overlapping with a PDSCH.

A base station may need UE radio access capability information of a wireless device (e.g., additional capability information). The base station may initiate a procedure to request the UE radio access capability information (e.g., by an information element UECapabilityEnquiry) from the wireless device, for example, based on lacking the UE radio access capability information. The wireless device may use an information element (e.g., UECapabilityInformation message) to indicate the UE radio access capability information, for example, based on information requested by the base station.

The wireless device may indicate a first threshold (e.g., timeDurationForQCL, Threshold-Sched-Offset) in a feature set (e.g., FeatureSetDownlink) indicating a set of features that the wireless device supports. The wireless device may indicate the first threshold (e.g., timeDurationForQCL, Threshold-Sched-Offset), for example, based on indicating UE radio access capability information requested by the base station. The first threshold may comprise a minimum quantity of OFDM symbols for the wireless device to perform a control channel message (e.g., PDCCH message) reception with a DCI and to apply a spatial QCL information (e.g., TCI-State) indicated by the DCI for a processing of a shared channel message (e.g., PDSCH message) scheduled by the DCI. The wireless device may use the minimum quantity of OFDM symbols between the control channel message (e.g., PDCCH message) reception and the processing of the shared channel message (e.g., PDSCH message) to apply the spatial QCL information, indicated by the DCI, via the shared channel (e.g., PDSCH).

The wireless device may indicate a second threshold (e.g., beamSwitchTiming) indicating a set of features that the wireless device supports. The wireless device may indicate the second threshold (e.g., beamSwitchTiming), for example, based on indicating UE radio access capability information requested by the base station.

The second threshold may indicate a minimum quantity of OFDM symbols between a DCI message triggering an aperiodic RS (e.g., CSI-RS) and transmission of the RS (e.g., aperiodic CSI-RS). A quantity of OFDM symbols for a minimum quantity of OFDM symbols may be measured from a last symbol containing an indication. A quantity of OFDM symbols for a minimum quantity of OFDM symbols may be measured to a first symbol of the aperiodic CSI-RS. The wireless device may include a second threshold for a sub-carrier spacing supported by the wireless device.

A wireless device may receive a PDSCH with one or more QCL assumptions, for example, based on multi-TRP being supported. A PDSCH may have at least two QCL assumptions, for example, based on at least two TRPs serving a wireless device. A first QCL assumption of the at least two QCL assumptions may be associated with a first TRP of the at least two TRPs. A second QCL assumption of the at least two QCL assumptions may be associated with a second TRP of the at least two TRPs.

The wireless device may receive a downlink signal/channel (e.g., PDSCH) sent by the TRP based on the QCL assumption (or the TCI state), for example, based on a QCL assumption (or a TCI state) associated with a TRP. At least one DM-RS port, sent by the TRP of the downlink signal/channel, may be quasi co-located with at least one RS indicated by the QCL assumption (or the TCI state), for example, based on receiving the downlink signal/channel and/or on the QCL assumption (or the TCI state).

Legacy systems may not employ a selection of which QCL assumption of the at least two QCL assumptions to apply for a reception of the aperiodic CSI-RS, for example, based on a PDSCH with at least two QCL assumptions overlapping with an aperiodic CSI-RS. A mechanism to avoid beam misalignment between the base station and the wireless device may enable the wireless device to receive the aperiodic CSI-RS reliably, for example, based on the base station and the wireless device using aligned QCL assumptions indicating beams. The wireless device may not receive the aperiodic CSI-RS reliably, for example, based on the wireless device selecting the first QCL assumption for the aperiodic CSI-RS reception and/or the base station using the second QCL assumption for the aperiodic CSI-RS transmission. The beam management procedure may become less efficient, for example, based on not receiving the aperiodic CSI-RS reliably. The base station may not identify a reliable and/or robust beam for the wireless device, for example, based on beam misalignment.

The beam at the wireless device may align with the beam at the base station when a PDSCH message with at least two QCL assumption overlaps with an aperiodic CSI-RS. Indicating this alignment may increase the robustness of the communication and/or decrease the latency to find a suitable beam to serve the wireless device.

Figure 16:
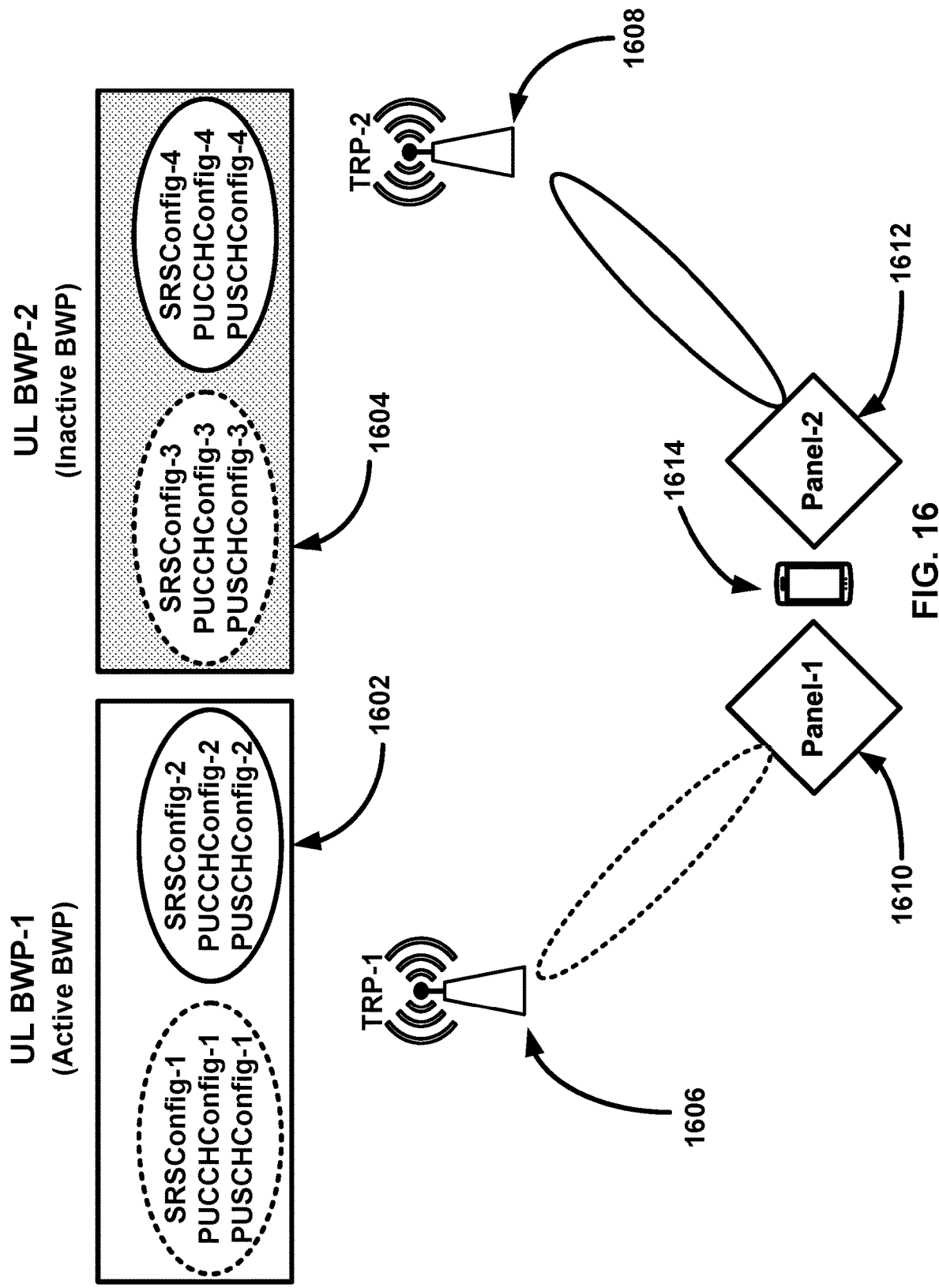
FIG. 16 shows example configurations of multiple antenna panels.

FIG. 16 shows example configurations of multiple antenna panels. A wireless device 1614 may comprise a plurality of antenna panels 1610 and 1612. The antenna panels 1610 and 1612 may send and receive information to TRPs 1606 and 1608 via BWPs 1602 and 1604. The wireless device 1614 may receive configurations of the BWPs 1602 and 1604 that include SRS, uplink control channel (e.g., PUCCH), and uplink shared channel (e.g., PUSCH) configurations.

A wireless device 1614 may receive (e.g., from a base station) one or more messages comprising one or more configuration parameters for a cell (e.g., PCell, PSCell, PUCCH SCell, SCell). The one or more messages may comprise one or more RRC messages (e.g., RRC connection reconfiguration message, or RRC connection reestablishment message, or RRC connection setup message). The one or more configuration parameters may further comprise BWP configuration parameters for a plurality of BWPs. The plurality of BWPs may comprise a plurality of downlink BWPs of the cell and a plurality of uplink BWPs of the cell. The plurality of downlink BWPs may comprise a downlink BWP of the cell. The plurality of uplink BWPs may comprise an uplink BWP (e.g., UL BWP-1, UL-BWP-2 in FIG. 16) of the cell.

The wireless device 1614 may be equipped with one or more antenna panels (e.g., Panel-1 1610 and Panel-2 1612). The one or more configuration parameters may indicate panel-specific indices (e.g., indicated by a higher layer parameter) for the one or more antenna panels. Each antenna panel of the one or more antenna panels may be indicated by a respective one panel-specific index of the panel-specific indices. A first antenna panel of the one or more antenna panels may be indicated by a first panel-specific index. A second antenna panel (e.g., Panel-2) of the one or more antenna panels may be indicated by a second panel-specific index.

The one or more configuration parameters may indicate one or more SRS resource sets for a serving cell (e.g., by a higher layer parameter or SRS-ResourceSet). The one or more configuration parameters may indicate SRS resource set indices (e.g., indicated by a SRS parameter (e.g., higher layer parameter, SRS-ResourceSetId)) for the one or more Resource sets (e.g., SRS resource sets). Each SRS resource set of the one or more Resource sets (e.g., SRS resource sets) may be indicated by a respective SRS resource set index of the SRS resource set indices. A first SRS resource set of the one or more Resource sets (e.g., SRS resource sets) may be indicated by a first SRS resource set index. A second SRS resource set of the one or more Resource sets (e.g., SRS resource sets) may be indicated by a second SRS resource set index.

The wireless device 1614 may send, via a first antenna panel of the one or more antenna panels, a first SRS transmission for the first SRS resource set. The wireless device 1614 may send, via a second antenna panel of the one or more antenna panels, a second SRS transmission for the second SRS resource set. Each SRS resource set may be associated with one antenna panel of the one or more antenna panels. The first SRS resource set index may indicate the first antenna panel. The second SRS resource set index may indicate the second antenna panel. The first panel-specific index and the first SRS resource set index may be the same/similar. The second panel-specific index and the second SRS resource set index may be the same/similar. Each antenna panel of the one or more antenna panels may be indicated by a respective one SRS resource set index of the SRS resource set indices.

The one or more configuration parameters may comprise SRS configuration parameters (e.g., SRSConfig-1 and SRSConfig-2; SRSConfig-3, and SRSConfig-4) for the one or more antenna panels (e.g., Panel-1 1610, Panel-2 1612) for an uplink BWP (e.g., UL BWP-1, UL-BWP-2) of the plurality of uplink BWPs of the cell. First SRS configuration parameters (e.g., SRSConfig-1) of the SRS configuration parameters for the uplink BWP (e.g., UL BWP-1) may be associated with a first antenna panel (e.g., Panel-1 1610) of the one or more antenna panels. Second SRS configuration parameters (e.g., SRSConfig-2) of the SRS configuration parameters for the uplink BWP (e.g., UL BWP-1) may be associated with a second antenna panel (e.g., Panel-2 1612) of the one or more antenna panels.

First SRS configuration parameters (e.g., SRSConfig-3) of the SRS configuration parameters for the uplink BWP (e.g., UL BWP-2) may be associated with a first antenna panel (e.g., Panel-1 1610) of the one or more antenna panels. Second SRS configuration parameters (e.g., SRSConfig-4) of the SRS configuration parameters for the uplink BWP (e.g., UL BWP-2) may be associated with a second antenna panel (e.g., Panel-2 1612) of the one or more antenna panels.

The one or more configuration parameters may comprise PUSCH configuration parameters (e.g., PUSCHConfig-1 and PUSCHConfig-2; PUSCHConfig-3, and PUSCHConfig-4) for the one or more antenna panels (e.g., Panel-1 1610, Panel-2 1612) for an uplink BWP (e.g., UL BWP-1, UL-BWP-2) of the plurality of uplink BWPs of the cell. First PUSCH configuration parameters (e.g., PUSCHConfig-1) of the PUSCH configuration parameters for the uplink BWP (e.g., UL BWP-1) may be associated with a first antenna panel (e.g., Panel-1 1610) of the one or more antenna panels. Second PUSCH configuration parameters (e.g., PUSCHConfig-2) of the PUSCH configuration parameters for the uplink BWP (e.g., UL BWP-1) may be associated with a second antenna panel (e.g., Panel-2 1612) of the one or more antenna panels.

First PUSCH configuration parameters (e.g., PUSCHConfig-3) of the PUSCH configuration parameters for the uplink BWP (e.g., UL BWP-2) may be associated with a first antenna panel (e.g., Panel-1 1610) of the one or more antenna panels. Second PUSCH configuration parameters (e.g., PUSCHConfig-4) of the PUSCH configuration parameters for the uplink BWP (e.g., UL BWP-2) may be associated with a second antenna panel (e.g., Panel-2 1612) of the one or more antenna panels.

The one or more configuration parameters may comprise PUCCH configuration parameters (e.g., PUCCHConfig-1 and PUCCHConfig-2; PUCCHConfig-3, and PUCCHConfig-4) for the one or more antenna panels (e.g., Panel-1 1610, Panel-2 1612) for an uplink BWP (e.g., UL BWP-1, UL-BWP-2) of the plurality of uplink BWPs of the cell. First PUCCH configuration parameters (e.g., PUCCHConfig-1) of the PUCCH configuration parameters for the uplink BWP (e.g., UL BWP-1) may be associated with a first antenna panel (e.g., Panel-1 1610) of the one or more antenna panels.

Second PUCCH configuration parameters (e.g., PUCCHConfig-2) of the PUCCH configuration parameters for the uplink BWP (e.g., UL BWP-1) may be associated with a second antenna panel (e.g., Panel-2 1612) of the one or more antenna panels.

First PUCCH configuration parameters (e.g., PUCCHConfig-3) of the PUCCH configuration parameters for the uplink BWP (e.g., UL BWP-2) may be associated with a first antenna panel (e.g., Panel-1 1610) of the one or more antenna panels. Second PUCCH configuration parameters (e.g., PUCCHConfig-4) of the PUCCH configuration parameters for the uplink BWP (e.g., UL BWP-2) may be associated with a second antenna panel (e.g., Panel-2 1612) of the one or more antenna panels.

Configuration parameters (e.g., SRSConfig-1, PUSCHConfig-1, PUCCHConfig-1) for an uplink BWP (e.g., UL BWP-1) of a cell may be associated with an antenna panel (e.g., Panel-1 1610). The wireless device 1614 may send (e.g., transmit) an uplink signal (e.g., SRS, a transport block, a preamble, PUSCH, PUCCH, UL-SCH, MAC-CE), for example, based on the uplink BWP being an active uplink BWP of the cell, the antenna panel being active, and/or the configuration parameters. The wireless device 1614 may send (e.g., transmit) the uplink signal via an uplink resource (e.g., SRS, PUSCH, PUCCH) indicated by the configuration parameters.

One or more TRPs may serve the wireless device 1614. An uplink transmission via an antenna panel of the one or more antenna panels may be received by a TRP of the one or more TRPs. An uplink transmission (e.g., SRS, PUSCH, PUCCH) may be received, for example, via a first antenna panel (e.g., Panel-1 1610) of the one or more antenna panels and/or by a first TRP (e.g., TRP-1) of the one or more TRPs. An uplink transmission (e.g., SRS, PUSCH, PUCCH) may be received, for example, via a second antenna panel (e.g., Panel-2 1612) of the one or more antenna panels and/or by a second TRP (e.g., TRP-2) of the one or more TRPs.

One or more TRPs may serve the wireless device 1614. A wireless device 1614 may receive a downlink transmission, for example, from a TRP of the one or more TRPs via an antenna panel of the one or more antenna panels. A wireless device 1614 may receive a downlink transmission (e.g., PDCCH, PDSCH), for example, from a first TRP (e.g., TRP-1) of the one or more TRPs via a first antenna panel (e.g., Panel-1 1610) of the one or more antenna panels. A wireless device 1614 may receive a downlink transmission (e.g., PDCCH, PDSCH), for example, from a second TRP (e.g., TRP-2) of the one or more TRPs via a second antenna panel (e.g., Panel-2) of the one or more antenna panels.

Figure 17:
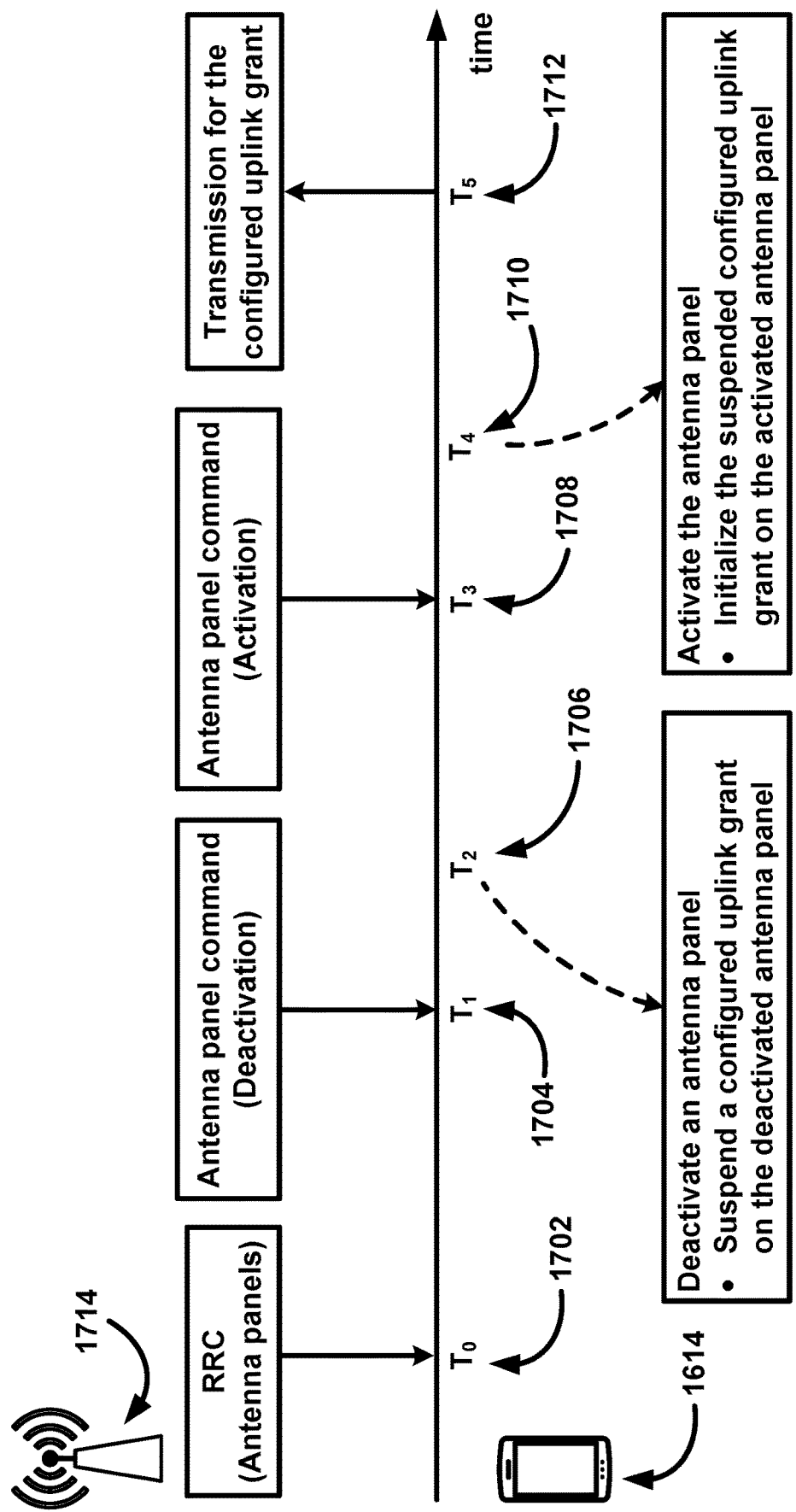
FIG. 17 shows an example timeline of antenna panel deactivation and activation.

FIG. 17 shows an example timeline of antenna panel deactivation and activation. A wireless device 1614 may receive, from a base station 1714, one or more messages (e.g., at time T0 1702) comprising one or more configuration parameters that indicate a configured uplink grant (e.g., configured grant Type 1, configured grant Type 2) for an antenna panel of one or more antenna panels of the wireless device 1614. The wireless device 1614 may deactivate the antenna panel (e.g., at time T1 1704). The wireless device 1614 may suspend the configured uplink grant for the antenna panel, for example, based on the deactivating the antenna panel (time T2 1706). The wireless device 1614 may activate the antenna panel indicated by a panel-specific index (time T3 1708). The wireless device 1614 may initialize the suspended and/or configured uplink grant for the antenna panel, for example, based on the activating the antenna panel (e.g., at time T4 1710). The wireless device 1614 may send (e.g., transmit) an uplink signal (e.g., a transport block) corresponding to/for the suspended and/or configured uplink grant via the antenna panel (time T5 in FIG. 17), for example, based on the initializing the suspended and/or configured uplink grant.

A wireless device 1614 may receive, from a base station 1714, one or more messages (e.g., at time T0 1702). The one or more messages may comprise one or more configuration parameters. The one or more configuration parameters may indicate a configured uplink grant (e.g., configured grant Type 1, configured grant Type 2) for an antenna panel of one or more antenna panels of the wireless device 1614. The one or more configuration parameters may indicate a configured uplink grant (e.g., configured grant Type 1, configured grant Type 2), for example, for/per an antenna panel of the one or more antenna panels for/per an uplink BWP of a plurality of uplink BWPs for/per a cell (e.g., PCell, SCell, SpCell, PsCell).

The one or more configuration parameters may indicate panel-specific indices for the one or more antenna panels. Each antenna panel of the one or more antenna panels may be indicated by a respective panel-specific index of the panel-specific indices. An antenna panel of the one or more antenna panels may be indicated by a panel-specific index.

An antenna panel may be active. The wireless device 1614 may send (e.g., transmit) an uplink signal/channel (e.g., SRS, PUSCH, PUCCH, etc.) via the antenna panel, for example, based on the antenna panel being active. The wireless device 1614 may receive a downlink signal/channel (e.g., CSI-RS, SS/PBCH block, DCI, PDCCH, PDSCH) via the antenna panel, for example, based on the antenna panel being active.

An antenna panel may be set to a deactivated state. The wireless device 1614 may not send (e.g., transmit) an uplink signal/channel (e.g., SRS, PUSCH, PUCCH, etc.) via the antenna panel, for example, based on the antenna panel being set to a deactivated state. The wireless device 1614 may not receive a downlink signal/channel (e.g., CSI-RS, SS/PBCH block, DCI, PDCCH, PDSCH) via the antenna panel, for example based on the antenna panel being set to a deactivated state. The wireless device 1614 may not monitor for a downlink signal/channel (e.g., CSI-RS, SS/PBCH block, DCI, PDCCH, PDSCH) via the antenna panel, for example, based on the antenna panel being set to a deactivated state.

The antenna panel indicated by a panel-specific index may be active. The wireless device 1614 may deactivate the antenna panel (e.g., at time T1 1702). The wireless device 1614 may deactivate the antenna panel with the panel-specific index, for example, based on receiving a DCI message (e.g., DCI format 1_1, DCI format 0_1, DCI format 0_0, DCI format 2_0, and the like) via a PDCCH. An antenna panel indicator field may be present/configured in the DCI message. The wireless device 1614 may deactivate the antenna panel indicated by the panel-specific index, for example, based on receiving an RRC signaling message. An antenna panel indicator field may be present/configured in the RRC signaling message. The wireless device 1614 may deactivate the antenna panel with the panel-specific index, for example, based on or in response to receiving a MAC-CE signaling message. An antenna panel indicator field may be present/configured in the MAC-CE signaling message.

The antenna panel indicator field may indicate a specific antenna panel. The antenna panel indicator field may comprise a value that indicates a panel-specific index of the antenna panel. The wireless device 1614 may deactivate the antenna panel, for example, based on the antenna panel indicator field indicating the antenna panel. The wireless device 1614 may set the antenna panel to a deactivated state.

The antenna panel indicator field may indicate a second antenna panel of the one or more antenna panels. The second antenna panel may be indicated by a second panel-specific index. The antenna panel indicator field may comprise a value indicating the second panel-specific index. The second antenna panel may be different from the antenna panel. The second antenna panel may be different from the antenna panel, for example, based on the second panel-specific index being different from the panel-specific index. The wireless device 1614 may switch from the antenna panel to the second antenna panel, for example, based on the antenna panel indicator field indicating the second antenna panel which may be different from the antenna panel. The wireless device 1614 may set the antenna panel to a deactivated state, for example, based on switching from the antenna panel to the second antenna panel. The wireless device 1614 may set the second antenna panel to an activated state, for example, based on switching from the antenna panel to the second antenna panel. The wireless device 1614 may deactivate the antenna panel, for example, based on the switching from the antenna panel to the second antenna panel. The wireless device 1614 may activate the second antenna panel, for example, based on switching from the antenna panel to the second antenna panel.

The one or more configuration parameters may indicate a timer value associated with an inactivity timer for the antenna panel (or for the cell). The antenna panel may be active when the inactivity timer is running. The inactivity timer may expire. The wireless device 1614 may deactivate the antenna panel based on the inactivity timer expiring. The wireless device 1614 may restart the inactivity timer associated with the timer value, for example, based on sending (e.g., transmitting) an uplink signal (e.g., MAC PDU, PUSCH, PUCCH, SRS, transport block, configured uplink grant) via the antenna panel. The wireless device 1614 may restart the inactivity timer associated with the timer value, for example, based on receiving a downlink signal (e.g., transport block, configured downlink assignment, PDCCH, PDCH, DCI) via the antenna panel. The downlink signal may indicate an uplink grant (e.g., for the antenna panel). The downlink signal may indicate a downlink assignment (e.g., for the antenna panel).

The antenna panel may be active. The wireless device 1614 may deactivate the antenna panel autonomously. The wireless device 1614 may deactivate the antenna panel without an indication (e.g., RRC, DCI, MAC-CE, etc.) from the base station 1714, for example, based on the wireless device 1614 deactivating the antenna panel autonomously. The wireless device 1614 may deactivate the antenna panel autonomously, for example, based on at least one measurement on the antenna panel. The at least one measurement may have a lower quality (e.g., lower SINR, lower L1-RSRP, higher BLER, etc.) than a threshold (e.g., indicated by the one or more configuration parameters).

The wireless device 1614 may suspend the configured uplink grant for the antenna panel, for example, based on the deactivating the antenna panel (time T2 1706). The wireless device 1614 may keep a configuration of the configured uplink grant for the antenna panel, for example, based on suspending the configured uplink grant for the antenna panel. The wireless device 1614 may not be enabled/allowed to use (or send (e.g., transmit) corresponding to) the configured uplink grant for the antenna panel, for example, based on suspending the configured uplink grant for the antenna panel. The wireless device 1614 may resume using (or sending a message corresponding to) the configured uplink grant for the antenna panel based on the antenna panel being (re-)activated (e.g., the antenna panel being active).

The wireless device 1614 may not use (or send (e.g., transmit) corresponding to) the configured uplink grant when the antenna panel is activated/reactivated, for example, based on the wireless device 1614 not suspending the configured uplink grant for the antenna panel and/or the deactivating the antenna panel. The base station 1714 may send (e.g., transmit), to the wireless device 1614, new configuration parameters to reconfigure the configured uplink grant for the antenna panel, for example, based on the wireless device 1614 not suspending the configured uplink grant for the antenna panel, deactivating the antenna panel, and/or the antenna panel being activated/reactivated. Sending (e.g., transmitting) the new configuration parameters for the configured uplink grant may increase the signaling overhead, signaling messages/exchange, and/or latency of the communication.

The antenna panel indicated by a panel-specific index may be set to a deactivated state (e.g., at time T2). The wireless device 1614 may activate the antenna panel indicated by the panel-specific index (time T3 1708). The wireless device 1614 may activate the antenna panel, for example, based on the antenna panel being set to a deactivated state. The wireless device 1614 may activate the antenna panel indicated by the panel-specific index, for example, based on receiving a DCI message (e.g., DCI format 1_1, DCI format 0_1, DCI format 0_0, DCI format 2_0, and the like) via a PDCCH. The DCI message may comprise an antenna panel indicator field.

The wireless device 1614 may activate the antenna panel indicated by the panel-specific index, for example, based on receiving an RRC signaling message. An antenna panel indicator field may be present/configured in the RRC signaling message. The wireless device 1614 may activate the antenna panel indicated by the panel-specific index, for example, based on receiving a MAC-CE signaling message. An antenna panel indicator field may be indicated in the MAC-CE signaling.

The antenna panel indicator field may indicate the antenna panel. The antenna panel indicator field may comprise a value indicating the panel-specific index of the antenna panel. The wireless device 1614 may activate the antenna panel, for example, based on the antenna panel indicator field indicating the antenna panel. The wireless device 1614 may indicate the antenna panel as set to an activated state, for example, based on activating the antenna panel.

A second antenna panel of the one or more antenna panels may be active. The second antenna panel may be indicated with a second panel-specific index. The antenna panel may be set to a deactivated state. The antenna panel indicator field may indicate the antenna panel. A value of the antenna panel indicator field may comprise a value that is equal to the panel-specific index of the antenna panel. The second antenna panel may be different from the antenna panel. The second panel-specific index may be different from the panel-specific index. The wireless device 1614 may switch from the second antenna panel to the antenna panel, for example, based on the antenna panel indicator field indicating the antenna panel being different from the second antenna panel.

The wireless device 1614 may set the antenna panel to an activated state, for example, based on switching from the second antenna panel to the antenna panel. The wireless device 1614 may set the second antenna panel to a deactivated state, for example, based on the switching from the second antenna panel to the antenna panel. The wireless device 1614 may deactivate the second antenna panel, for example, based on the switching from the second antenna panel to the antenna panel. The wireless device 1614 may activate the antenna panel, for example, based on the switching from the second antenna panel to the antenna panel.

The antenna panel may be set to a deactivated state. The wireless device 1614 may autonomously activate the antenna panel. The wireless device 1614 may activate the antenna panel without an indication (e.g., RRC, DCI, MAC-CE, etc.) from the base station 1714. The wireless device 1614 may autonomously activate the antenna panel based on at least one measurement of the antenna panel. The at least one measurement may have a higher quality (e.g., higher SINR, higher L1-RSRP, lower BLER, etc.) than a second threshold (e.g., indicated by the one or more configuration parameters).

The one or more configuration parameters may indicate a timer value associated with an inactivity timer for the second antenna panel and/or for the cell. The second antenna panel may be active during running of the inactivity timer. The inactivity timer may expire. The wireless device 1614 may switch from the second antenna panel to the antenna panel (e.g., default panel), for example, based on the inactivity timer expiring.

The wireless device 1614 may initialize the suspended and/or configured uplink grant for the antenna panel, for example, based on the activating the antenna panel (e.g., at time T4 1710). The wireless device 1614 may reinitialize the suspended and/or configured uplink grant for the antenna panel, for example, based on the activating the antenna panel. The wireless device 1614 may send (e.g., transmit) an uplink signal (e.g., a transport block) corresponding to/for the suspended and/or configured uplink grant via the antenna panel (time T5 1712 in FIG. 17), for example, based on the initializing the suspended and/or configured uplink grant. The wireless device 1614 may send (e.g., transmit), via the antenna panel (e.g., at time T5 1712), an uplink signal (e.g., a transport block) corresponding to/for the suspended and/or configured uplink grant.

The wireless device 1614 may send (e.g., transmit) an uplink signal (e.g., a transport block) via at least one uplink resource indicated by the (suspended) configured uplink grant via the antenna panel (at time T5 1712), for example, based on the initializing the suspended and/or configured uplink grant. The wireless device 1614 may send (e.g., transmit) an uplink signal (e.g., a transport block), for example, based on the reinitializing the (suspended) configured uplink grant and/or via at least one uplink resource indicated by the (suspended) configured uplink grant via the antenna panel (e.g., at time T5 1712).

Figure 18:
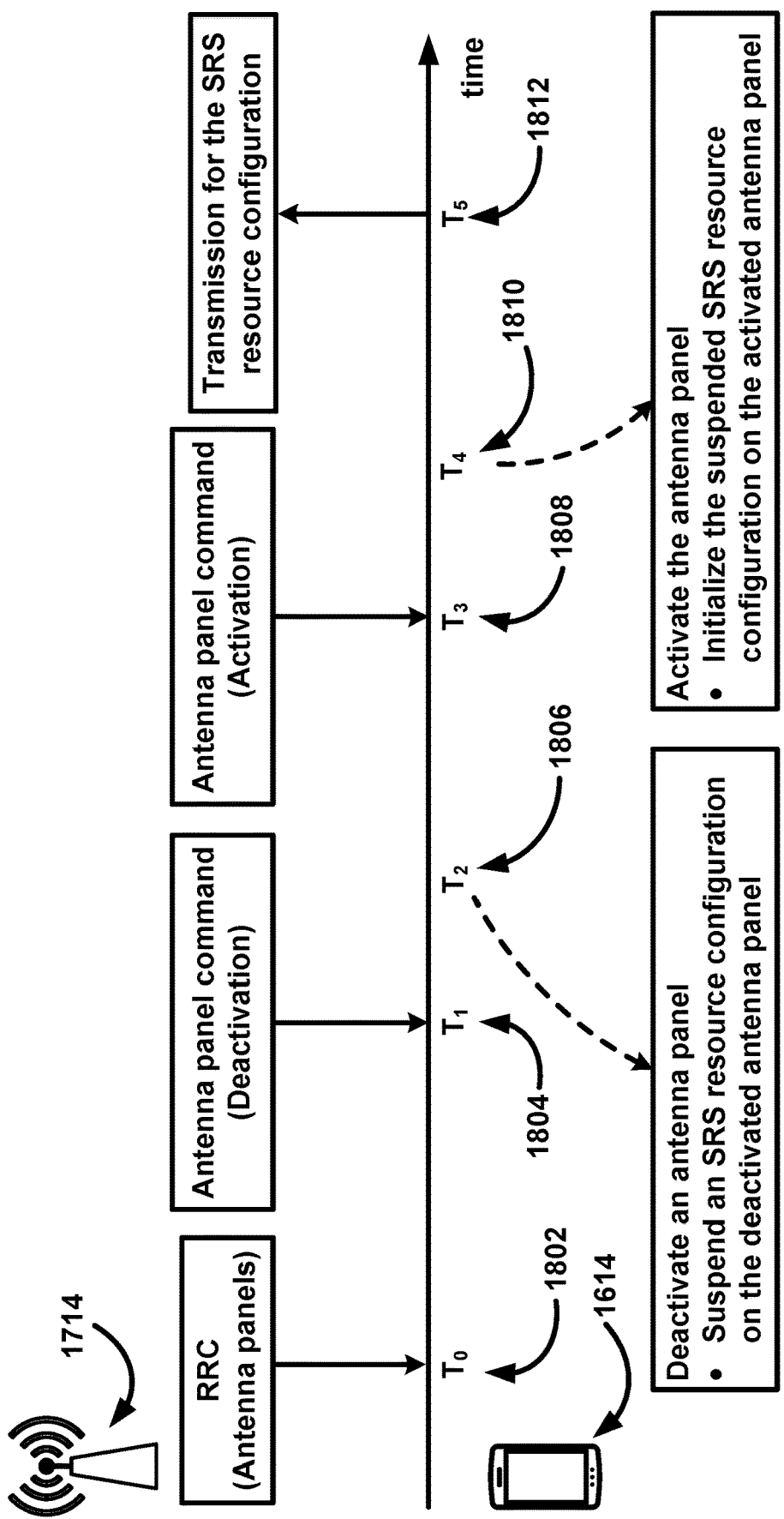
FIG. 18 shows an example timeline of antenna panel deactivation and activation.

FIG. 18 shows an example timeline of antenna panel deactivation and activation. A wireless device 1614 may receive, from a base station 1714, one or more messages (e.g., at time T0 1802) that comprise one or more configuration parameters that indicate a SRS resource configuration for an antenna panel of one or more antenna panels at the wireless device 1614. The wireless device 1614 may deactivate the antenna panel (e.g., at time T1 1804). The wireless device 1614 may suspend the SRS resource configuration for the antenna panel based on the deactivating the antenna panel (e.g., at time T2 1806). The wireless device 1614 may activate the antenna panel (e.g., time T3 1808). The wireless device 1614 may initialize the SRS resource configuration (e.g., suspended SRS resource configuration) for the antenna panel based on the activating the antenna panel (e.g., at time T4 1810). The wireless device 1614 may send (e.g., transmit) an uplink signal (e.g., SRS) corresponding to the suspended resource configuration (e.g., suspended SRS resource configuration) via the antenna panel (e.g., at time T5 1812), for example, based on the initializing the suspended SRS resource configuration for the antenna panel.

A wireless device 1614 may receive, from a base station 1714, one or more messages (e.g., time T0 1802). The one or more messages may comprise one or more configuration parameters. The one or more configuration parameters may indicate a SRS resource configuration (e.g., semi-persistent SRS configuration, periodic SRS configuration, aperiodic SRS configuration) for an antenna panel of one or more antenna panels at the wireless device 1614. The one or more configuration parameters may indicate an SRS resource configuration (e.g., semi-persistent SRS configuration, periodic SRS configuration, aperiodic SRS configuration), for example, for/per an antenna panel of the one or more antenna panels for/per an uplink BWP of a plurality of uplink BWPs for/per a cell (e.g., PCell, SCell, SpCell, PsCell).

The antenna panel indicated by a panel-specific index may be active. The wireless device 1614 may deactivate the antenna panel (e.g., at time T1 1804). The wireless device 1614 may deactivate the antenna panel, for example, based on receiving an RRC signaling message. The wireless device 1614 may deactivate the antenna panel, for example, based on receiving a MAC-CE signaling message. The wireless device 1614 may deactivate the antenna panel, for example, based on receiving a DCI message. The wireless device 1614 may deactivate the antenna panel, for example, based on an inactivity timer expiring. The wireless device 1614 may deactivate the antenna panel autonomously.

The wireless device 1614 may suspend the SRS resource configuration for the antenna panel based on the deactivating the antenna panel (e.g., at time T2 1806). The wireless device 1614 may keep a configuration of the SRS resource configuration for the antenna panel, for example, based on suspending the SRS resource configuration for the antenna panel. The wireless device 1614 may not be enabled/allowed to use (or send (e.g., transmit) corresponding to) the SRS resource configuration for the antenna panel, for example, based on suspending the SRS resource configuration for the antenna panel. The wireless device 1614 may be enabled to use/resume using (or sending corresponding to) the SRS resource configuration for the antenna panel, for example, based on the antenna panel being activated/reactivated (e.g., the antenna panel being active).

The wireless device 1614 may not use (or send (e.g., transmit) corresponding to) the SRS resource configuration, for example, based on the wireless device 1614 not suspending the SRS resource configuration for the antenna panel, deactivating the antenna panel, and/or the antenna panel being activated/reactivated. wireless device 1614 The base station 1714 may send (e.g., transmit) new configuration parameters, to the wireless device 1614, to reconfigure the SRS resource configuration for the antenna panel, for example, based on the antenna panel being activated/reactivated. The wireless device 1614 may not suspend the SRS resource configuration for the antenna panel, for example, based on deactivating the antenna panel. Sending (e.g., transmitting) the new configuration parameters for the SRS resource configuration may increase the signaling overhead, signaling messages/exchange, and/or latency of the communication.

The antenna panel may be set to a deactivated state. The wireless device 1614 may activate the antenna panel (e.g., time T3 1808). The wireless device 1614 may activate the antenna panel, for example, based on the antenna panel being set to a deactivated state. The wireless device 1614 may activate the antenna panel, for example, based on receiving a DCI message. The wireless device 1614 may activate the antenna panel, for example, based on receiving an RRC signaling message. The wireless device 1614 may activate the antenna panel, for example, based on receiving a MAC-CE signaling message. The wireless device 1614 may activate the antenna panel autonomously. The wireless device 1614 may activate the antenna panel, for example, based on an inactivity timer expiring.

The wireless device 1614 may initialize the SRS resource configuration (e.g., suspended SRS resource configuration) for the antenna panel based on the activating the antenna panel (e.g., at time T4 1810). The wireless device 1614 may reinitialize the SRS resource configuration (e.g., suspended SRS resource configuration) for the antenna panel, for example, based on the activating the antenna panel (time T4 1810).

The wireless device may send (e.g., transmit) an uplink signal (e.g., SRS) via the antenna panel (e.g., at time T5 1812), for example, based on the initializing the SRS resource configuration (e.g., suspended SRS resource configuration) for the antenna panel. The uplink signal may, for example, be an uplink signal corresponding to/for the suspended SRS resource configuration. Based on the reinitializing the SRS resource configuration (e.g., suspended SRS resource configuration) for the antenna panel, the wireless device 1614 may send (e.g., transmit) an uplink signal (e.g., SRS) corresponding to/for the SRS resource configuration (e.g., suspended SRS resource configuration) via the antenna panel (e.g., at time T5 1812).

The wireless device 1614 may initialize the SRS resource configuration (e.g., suspended SRS resource configuration) for the antenna panel. The wireless device 1614 may send (e.g., transmit) an uplink signal (e.g., SRS) via at least one uplink resource indicated by the SRS resource configuration (e.g., suspended SRS resource configuration) via the antenna panel (e.g., time T5 1812). The wireless device 1614 may reinitialize the SRS resource configuration (e.g., suspended SRS resource configuration) for the antenna panel. The wireless device 1614 may send (e.g., transmit) an uplink signal (e.g., SRS) via at least one uplink resource indicated by the SRS resource configuration (e.g., suspended SRS resource configuration) via the antenna panel (e.g., at time T5 1812).

Figure 19:
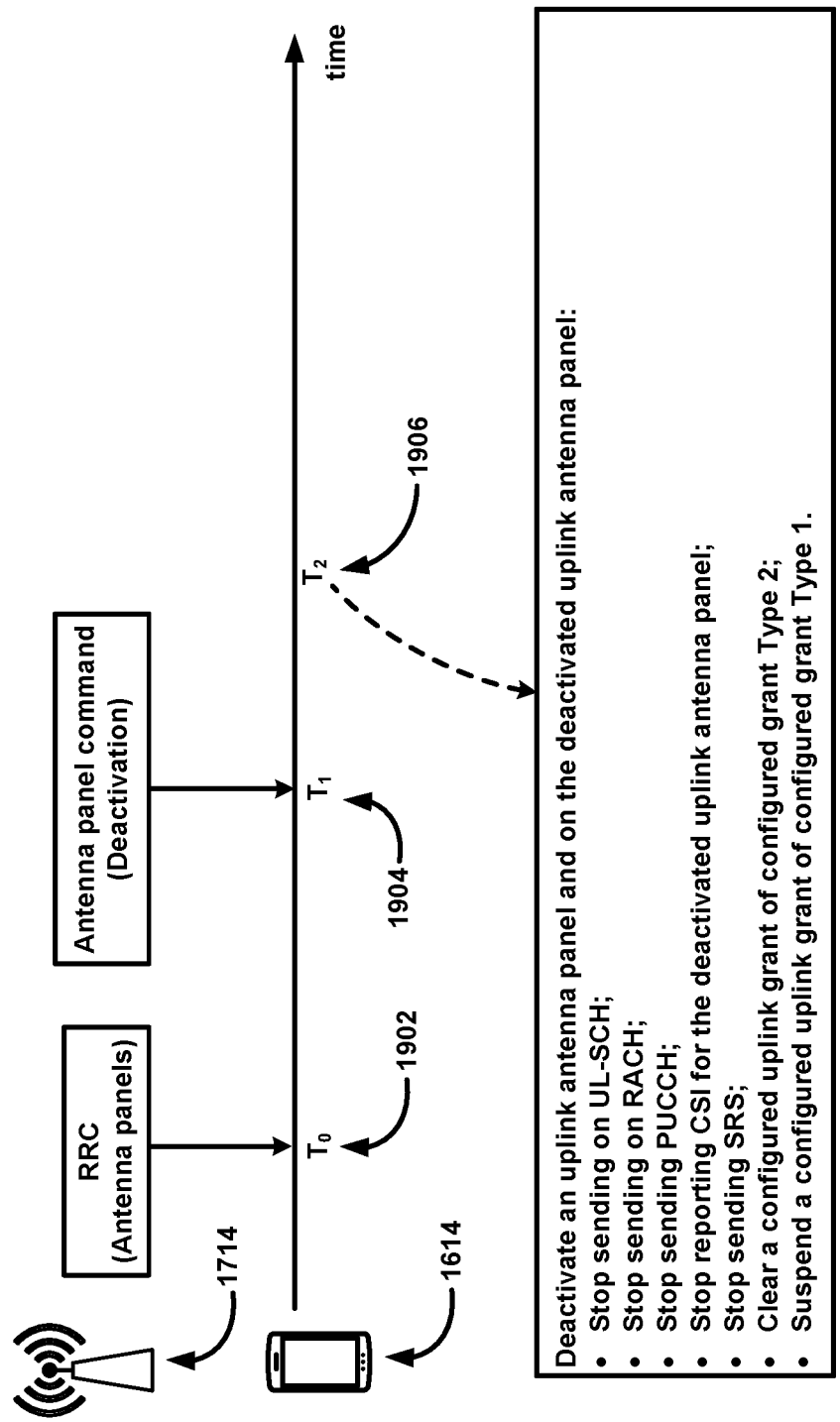
FIG. 19 shows an example timeline of antenna panel deactivation.

FIG. 19 shows an example timeline of antenna panel deactivation. A wireless device 1614 may receive, from a base station 1714, one or more messages (e.g., at time T0 1902) that comprise one or more configuration parameters that indicate configurations for/per an antenna panel of the one or more antenna panels for/per an uplink BWP of a plurality of uplink BWPs for/per a cell (e.g., PCell, SCell, SpCell, PsCell). The wireless device 1614 may deactivate the antenna panel (e.g., at time T1 1904). The wireless device 1614 may stop sending via UL-SCH, RACH, PUCCH via the deactivated antenna panel (e.g., at time T2 1906), for example, based on the deactivating the antenna panel. The wireless device 1614 may stop reporting CSI via the deactivated antenna panel (e.g., at time T2 1906), for example, based on the deactivating the antenna panel. The wireless device 1614 may stop sending SRS via the deactivated antenna panel (e.g., at time T2 1906), for example, based on the deactivating the antenna panel. The wireless device 1614 may clear a configured uplink grant (e.g., at time T2 1906), for example, based on the deactivating the antenna panel. The wireless device 1614 may suspend a configured uplink grant via the deactivated antenna panel (e.g., at time T2 1906), for example, based on the deactivating the antenna panel.

A wireless device 1614 may receive, from a base station 1714, one or more messages (e.g., at time T0 1902). The one or more messages may comprise one or more configuration parameters. The one or more configuration parameters may indicate configurations for/per an antenna panel of the one or more antenna panels for/per an uplink BWP of a plurality of uplink BWPs for/per a cell (e.g., PCell, SCell, SpCell, PsCell).

The one or more configuration parameters may indicate panel-specific indices for the one or more antenna panels. Each antenna panel of the one or more antenna panels may be indicated by a respective panel-specific index of the panel-specific indices. An antenna panel of the one or more antenna panels may be indicated by a panel-specific index.

The antenna panel indicated by a panel-specific index may be active. The wireless device 1614 may deactivate the antenna panel (e.g., at time T1 1904). The wireless device 1614 may deactivate the antenna panel with the panel-specific index, for example, based on receiving a DCI message (e.g., DCI format 1_1, DCI format 0_1, DCI format 0_0, DCI format 2_0, and the like) via a PDCCH. An antenna panel indicator field may be present/configured in the DCI message. The wireless device 1614 may deactivate the antenna panel with the panel-specific index, for example, based on receiving an RRC signaling message. An antenna panel indicator field may be present/configured in the RRC signaling message. The wireless device 1614 may deactivate the antenna panel with the panel-specific index, for example, based on or in response to receiving a MAC-CE signaling message. An antenna panel indicator field may be present/configured in the MAC-CE signaling message.

The antenna panel indicator field may indicate a specific antenna panel. The antenna panel indicator field may comprise a value indicates a panel-specific index of the antenna panel. The wireless device 1614 may deactivate the antenna panel, for example, based on the antenna panel indicator field indicating the antenna panel. The wireless device 1614 may set the antenna panel to a deactivated state.

The antenna panel indicator field may indicate a second antenna panel of the one or more antenna panels. The second antenna panel may be indicated by a second panel-specific index. The antenna panel indicator field may comprise a value indicating the second panel-specific index. The second antenna panel may be different from the antenna panel. The second antenna panel may be different from the antenna panel, for example, based on the second panel-specific index being different from the panel-specific index. The wireless device 1614 may switch from the antenna panel to the second antenna panel, for example, based on the antenna panel indicator field indicating the second antenna panel which may be different from the antenna panel. The wireless device 1614 may set the antenna panel to a deactivated state, for example, based on switching from the antenna panel to the second antenna panel. The wireless device 1614 may set the second antenna panel to an activated state, for example, based on switching from the antenna panel to the second antenna panel. The wireless device 1614 may deactivate the antenna panel, for example, based on the switching from the antenna panel to the second antenna panel. The wireless device 1614 may activate the second antenna panel, for example, based on switching from the antenna panel to the second antenna panel.

The wireless device 1614 may receive, from the base station 1714, one or more configuration parameters for one or more antenna panels at time T0 in FIG. 19. The wireless device 1614 may deactivate an antenna panel of the one or more antenna panels at time T1 in FIG. 19. The deactivated antenna panel may be used for uplink transmissions (e.g., UL-SCH, PUSCH, PUCCH, SRS, CSI report, etc.). The deactivated antenna panel may be an uplink antenna panel. The wireless device 1614 may stop sending (e.g., transmitting) via UL-SCH via the deactivated antenna panel (e.g., at time T2 1906), for example, based on the deactivating the antenna panel. The wireless device 1614 may stop sending (e.g., transmitting) via RACH via the deactivated antenna panel (e.g., at time T2 1906), for example, based on the deactivating the antenna panel. The wireless device 1614 may stop sending uplink control messages (e.g., PUCCH messages) via the deactivated antenna panel (e.g., at time T2 1906), for example, based on the deactivating the antenna panel. The wireless device 1614 may stop reporting CSI for the deactivated) antenna panel (e.g., at time T2 1906), for example, based on the deactivating the antenna panel. The wireless device 1614 may stop sending SRS via the deactivated antenna panel (e.g., at time T2 1906), for example, based on the deactivating the antenna panel. The one or more configuration parameters may indicate a first configured uplink grant configuration (e.g., of configured grant Type 2) for the antenna panel. The one or more configuration parameters may indicate a second configured uplink grant configuration (e.g., of configured grant Type 1) for the antenna panel. The wireless device 1614 may clear the first configured uplink grant (e.g., of configured grant Type 2) via the deactivated antenna panel (e.g., at time T2 1906), for example, based on the deactivating the antenna panel. The wireless device 1614 may suspend the second configured uplink grant (e.g., of configured grant Type 1) via the (deactivated) antenna panel (e.g., at time T2 1906), for example, based on the deactivating the antenna panel.

The wireless device 1614 may not send (e.g., transmit) a transport block via at least one uplink radio resource indicated by the configured uplink grant, for example, based on clearing a configured uplink grant. The wireless device 1614 may not send (e.g., transmit) a transport block for the configured uplink grant, for example, based on clearing a configured uplink grant. The base station 1714 may assign/ allocate the configured uplink grant (or the at least one uplink radio resource indicated by the configured uplink grant) to a second wireless device 1614. The wireless device 1614 may send (e.g., transmit) a transport block via the at least one uplink radio resource indicated by the configured uplink grant, for example, based on not clearing the configured uplink grant. Sending the transport block via the at least one uplink radio resource may result in a collision with the second wireless device 1614. The wireless device 1614 may not use the configured uplink grant for an uplink transmission, for example, based on the clearing the configured uplink grant. The wireless device 1614 may release the configured uplink grant, for example, based on clearing the configured uplink grant. The wireless device 1614 may release a configuration of the configured uplink grant, for example, based on releasing the configured uplink grant. The wireless device 1614 may clear the configured uplink grant. The base station 1714 may reconfigure/reschedule the wireless device 1614 with the configured uplink grant via a message (e.g., an explicit message, PDCCH signaling message, MAC CE message, RRC message, etc.). The reconfiguring/rescheduling may enable the wireless device 1614 to use/reuse at least one uplink radio resource indicated by the configured uplink grant.

Figure 20:
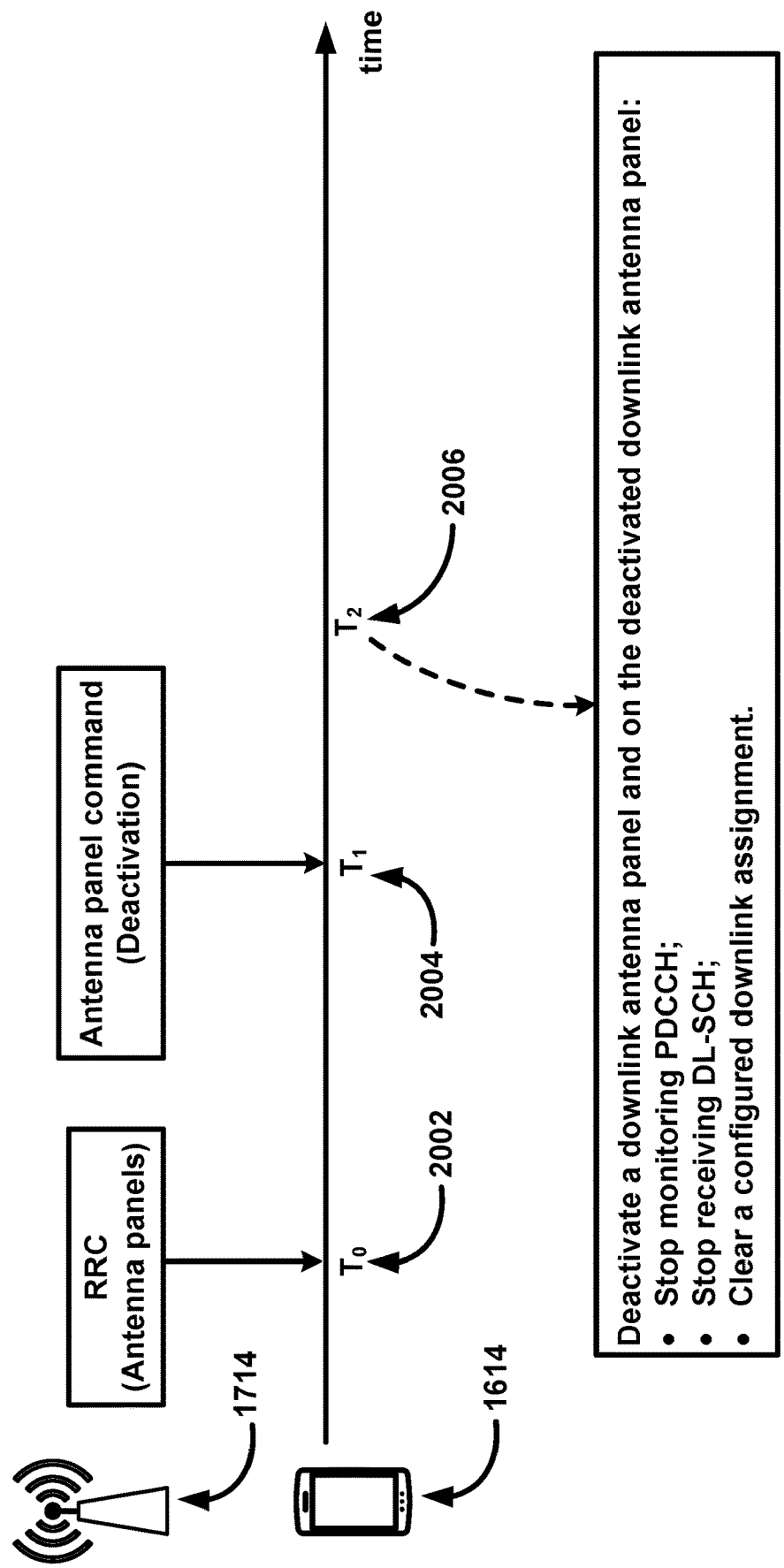
FIG. 20 shows an example timeline of antenna panel deactivation.

FIG. 20 shows an example timeline of antenna panel deactivation. The wireless device 1614 may receive, from the base station 1714, one or more configuration parameters for one or more antenna panels (e.g., at time T0 2002). The wireless may deactivate an antenna panel of the one or more antenna panels (e.g., at time T1 2004). The deactivated antenna panel may be used for downlink transmissions (e.g., DL-SCH, PDSCH, PDCCH, etc.). The wireless device 1614 may stop monitoring downlink control channels (e.g., PDCCH) via the deactivated antenna panel (e.g., at time T2 2004), for example based on deactivating the antenna panel. The wireless device 1614 may stop receiving downlink messages (e.g., DL-SCH) via the deactivated antenna panel (e.g., at time T2 2004), for example, based on deactivating the antenna panel. The wireless device 1614 may clear a configured downlink assignment via the deactivated antenna panel (e.g., at time T2 2004), for example, based on deactivating the antenna panel.

A wireless device 1614 may receive, from a base station 1714, one or more messages (e.g., at time T0). The one or more messages may comprise one or more configuration parameters. The one or more configuration parameters may indicate configurations for/per an antenna panel of the one or more antenna panels for/per an uplink BWP of a plurality of downlink BWPs for/per a cell (e.g., PCell, SCell, SpCell, PsCell).

The one or more configuration parameters may indicate panel-specific indices for the one or more antenna panels. Each antenna panel of the one or more antenna panels may be indicated by a respective panel-specific index of the panel-specific indices. An antenna panel of the one or more antenna panels may be indicated by a panel-specific index.

The antenna panel indicated by a panel-specific index may be active. The wireless device 1614 may deactivate the antenna panel (e.g., at time T1 2004). The wireless device 1614 may deactivate the antenna panel with the panel-specific index, for example, based on receiving a DCI message (e.g., DCI format 1_1, DCI format 0_1, DCI format 0_0, DCI format 2_0, and the like) via a PDCCH. An antenna panel indicator field may be present/configured in the DCI message. The wireless device 1614 may deactivate the antenna panel with the panel-specific index, for example, based on receiving an RRC signaling message. An antenna panel indicator field may be present/configured in the RRC signaling message. The wireless device 1614 may deactivate the antenna panel with the panel-specific index, for example, based on or in response to receiving a MAC-CE signaling message. An antenna panel indicator field may be present/ configured in the MAC-CE signaling message.

The antenna panel indicator field may indicate a specific antenna panel. The antenna panel indicator field may comprise a value indicates a panel-specific index of the antenna panel. The wireless device 1614 may deactivate the antenna panel, for example, based on the antenna panel indicator field indicating the antenna panel. The wireless device 1614 may set the antenna panel to deactivated.

The antenna panel indicator field may indicate a second antenna panel of the one or more antenna panels. The second antenna panel may be indicated by a second panel-specific index. The antenna panel indicator field may comprise a value indicating the second panel-specific index. The second antenna panel may be different from the antenna panel. The second antenna panel may be different from the antenna panel, for example, based on the second panel-specific index being different from the panel-specific index. The wireless device 1614 may switch from the antenna panel to the second antenna panel, for example, based on the antenna panel indicator field indicating the second antenna panel which may be different from the antenna panel. The wireless device 1614 may set the antenna panel to a deactivated state, for example, based on switching from the antenna panel to the second antenna panel. The wireless device 1614 may set the second antenna panel activated, for example, based on switching from the antenna panel to the second antenna panel. The wireless device 1614 may deactivate the antenna panel, for example, based on the switching from the antenna panel to the second antenna panel. The wireless device 1614 may activate the second antenna panel, for example, based on switching from the antenna panel to the second antenna panel.

The wireless device 1614 may receive, from the base station 1714, one or more configuration parameters for one or more antenna panels (e.g., at time T0 2002). The wireless device 1614 may deactivate an antenna panel of the one or more antenna panels (e.g., at time T1). The deactivated antenna panel may be used for downlink transmissions (e.g., DL-SCH, PDSCH, PDCCH, etc.). The deactivated antenna panel may be a downlink antenna panel. The wireless device 1614 may stop monitoring downlink control channels (e.g., PDCCH) via the deactivated antenna panel (e.g., at time T2 2004), for example based on deactivating the antenna panel. The wireless device 1614 may stop receiving downlink messages (e.g., DL-SCH) via the deactivated antenna panel (e.g., at time T2 2004), for example, based on deactivating the antenna panel. The one or more configuration parameters may indicate a configured downlink assignment (e.g., SPS) for the antenna panel. The wireless device 1614 may clear the configured downlink assignment via the deactivated antenna panel (e.g., at time T2 2004), for example, based on deactivating the antenna panel.

The wireless device 1614 may not receive a transport block via at least one downlink radio resource indicated by the configured downlink assignment, for example, based on clearing a configured downlink assignment. The wireless device 1614 may not receive a transport block for the configured downlink assignment, for example, based on clearing a configured downlink assignment. The base station 1714 may assign/allocate the configured downlink assignment (or the at least one downlink radio resource indicated by the configured downlink assignment) to a second wireless device 1614. The wireless device 1614 may not clear the configured downlink assignment assigned/allocated to the second wireless device 1614. The wireless device 1614 may monitor, via the at least one downlink radio resource indicated by the configured downlink assignment, for a transport block destined to the second wireless device 1614. The wireless device 1614 may not use the configured downlink assignment for a downlink transmission, for example, based on clearing the configured downlink assignment. The wireless device 1614 may release the configured downlink assignment, for example, based on the clearing the configured downlink assignment. The wireless device 1614 may release a configuration of the configured downlink assignment, for example, based on releasing the configured downlink assignment. The wireless device 1614 may clear the configured downlink assignment. The base station 1714 may reconfigure/reschedule, via a message (e.g., an explicit message, PDCCH signaling message, MAC CE message, RRC message, etc.), the wireless device 1614 with the configured downlink assignment. The reconfiguring/rescheduling may enable the wireless device 1614 to use/reuse at least one downlink radio resource indicated by the configured downlink assignment.

Figure 21:
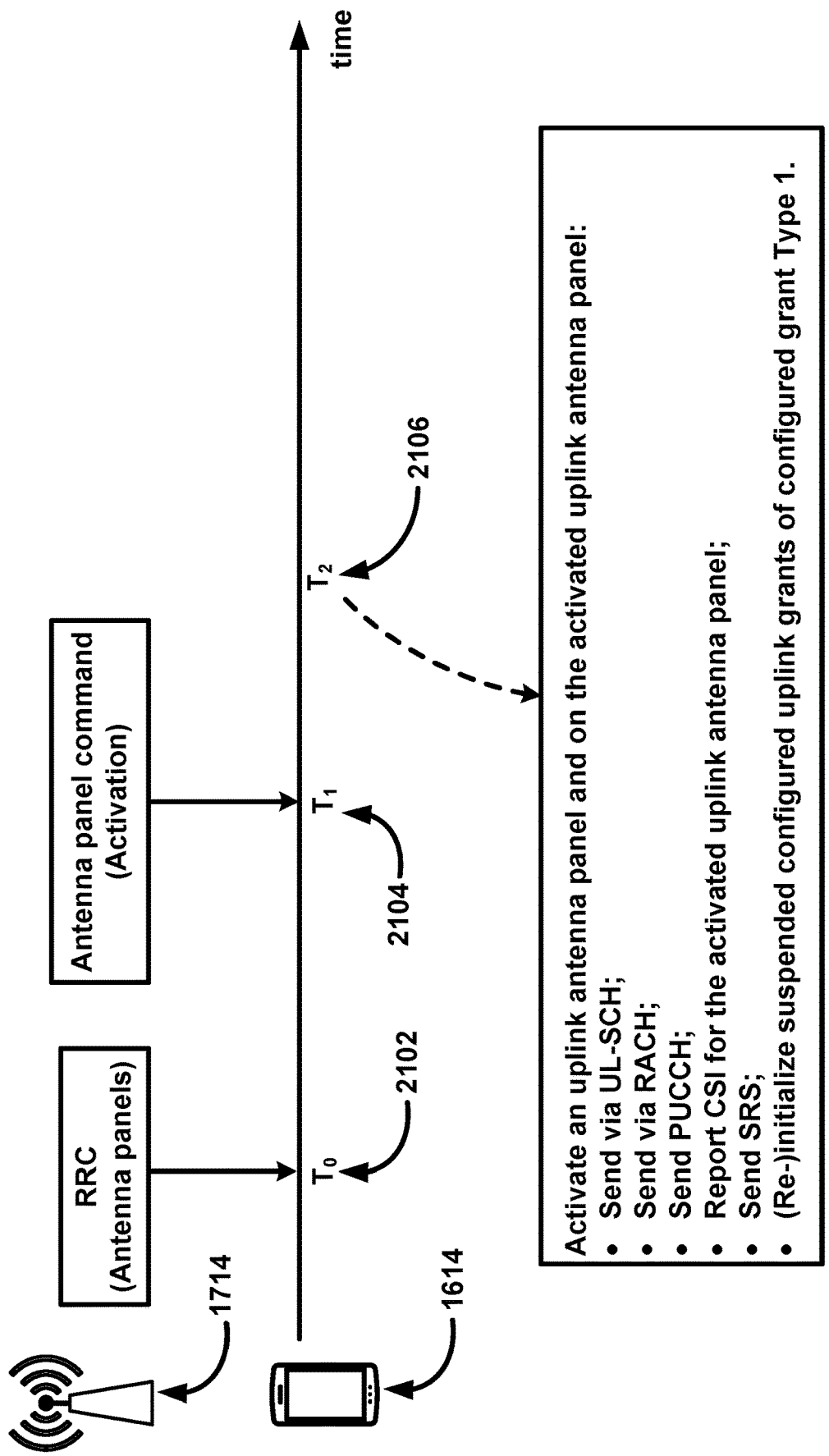
FIG. 21 shows an example timeline of antenna panel activation.

FIG. 21 shows an example timeline of antenna panel activation. The wireless device 1614 may receive, from the base station 1714, one or more configuration parameters for one or more antenna panels (e.g., at time T0 2102). The wireless device 1614 may activate an antenna panel of the one or more antenna panels (e.g., at time T1 2104). The wireless device 1614 may send (e.g., transmit) via an uplink channel (e.g., UL-CH, RACH, PUCCH) via the activated antenna panel (e.g., at time T2 2106), for example, based on activating the antenna panel. The wireless device 1614 may report CSI for the activated antenna panel (e.g., at time T2 2106), for example, based on the activating the antenna panel. The wireless device 1614 may send (e.g., transmit) SRS via the activated antenna panel (e.g., at time T2 2106), for example, based on activating the antenna panel. The wireless device 1614 may (re-)initialize the configured uplink grant on the activated antenna panel (e.g., at time T2 2106), for example, based on activating the antenna panel.

A wireless device 1614 may receive, from a base station 1714, one or more messages (e.g., at time T0 2102). The one or more messages may comprise one or more configuration parameters. The one or more configuration parameters may indicate configurations for/per an antenna panel of the one or more antenna panels for/per an uplink BWP of a plurality of uplink BWPs for/per a cell (e.g., PCell, SCell, SpCell, PsCell).

The one or more configuration parameters may indicate panel-specific indices for the one or more antenna panels. Each antenna panel of the one or more antenna panels may be indicated by a respective panel-specific index of the panel-specific indices. An antenna panel of the one or more antenna panels may be indicated by a panel-specific index.

The antenna panel indicated by a panel-specific index may be active. The wireless device 1614 may deactivate the antenna panel (e.g., at time T1 2104). The wireless device 1614 may deactivate the antenna panel with the panel-specific index, for example, based on receiving a DCI message (e.g., DCI format 1_1, DCI format 0_1, DCI format 0_0, DCI format 2_0, and the like) via a PDCCH. An antenna panel indicator field may be present/configured in the DCI message. The wireless device 1614 may deactivate the antenna panel with the panel-specific index, for example, based on receiving an RRC signaling message. An antenna panel indicator field may be present/configured in the RRC signaling message. The wireless device 1614 may deactivate the antenna panel with the panel-specific index, for example, based on or in response to receiving a MAC-CE signaling message. An antenna panel indicator field may be present/configured in the MAC-CE signaling message.

The antenna panel indicator field may indicate a specific antenna panel. The antenna panel indicator field may comprise a value that indicates a panel-specific index of the antenna panel. The wireless device 1614 may deactivate the antenna panel, for example, based on the antenna panel indicator field indicating the antenna panel. The wireless device 1614 may set the antenna panel to a deactivated state.

The antenna panel indicator field may indicate a second antenna panel of the one or more antenna panels. The second antenna panel may be indicated by a second panel-specific index. The antenna panel indicator field may comprise a value indicating the second panel-specific index. The second antenna panel may be different from the antenna panel. The second antenna panel may be different from the antenna panel, for example, based on the second panel-specific index being different from the panel-specific index. The wireless device 1614 may switch from the antenna panel to the second antenna panel, for example, based on the antenna panel indicator field indicating the second antenna panel which may be different from the antenna panel. The wireless device 1614 may set the antenna panel to a deactivated state, for example, based on switching from the antenna panel to the second antenna panel. The wireless device 1614 may set the second antenna panel activated, for example, based on switching from the antenna panel to the second antenna panel. The wireless device 1614 may deactivate the antenna panel, for example, based on the switching from the antenna panel to the second antenna panel. The wireless device 1614 may activate the second antenna panel, for example, based on switching from the antenna panel to the second antenna panel.

The wireless device 1614 may receive, from the base station 1714, one or more configuration parameters for one or more antenna panels (e.g., at time T0 2102). The wireless device 1614 may activate an antenna panel of the one or more antenna panels (e.g., at time T1 2104). The activated antenna panel may be used for uplink transmissions (e.g., UL-SCH, PUSCH, PUCCH, SRS, CSI report, etc.). The activated antenna panel may be an uplink antenna panel. The wireless device 1614 may send (e.g., transmit) via an uplink channel (e.g., UL-SCH) via the (activated) antenna panel (e.g., at time T2 2106), for example, based on activating the antenna panel. The wireless device 1614 may send (e.g., transmit) via a random access channel (e.g., RACH) via the activated antenna panel (e.g., at time T2 2106), for example, based on activating the antenna panel. The wireless device 1614 may send (e.g., transmit), via the activated antenna panel, an uplink channel message (e.g., PUCCH message) (e.g., at time T2 2106), for example, based on activating the antenna panel. The wireless device 1614 may report CSI for the activated antenna panel (e.g., at time T2 2106), for example, based on the activating the antenna panel. The wireless device 1614 may send (e.g., transmit) SRS via the activated antenna panel (e.g., at time T2 2106), for example, based on activating the antenna panel. The one or more configuration parameters may indicate a configuration of a configured uplink grant (e.g., of configured grant Type 1) for the antenna panel. The wireless device 1614 may (re-)initialize the configured uplink grant on the activated antenna panel (e.g., at time T2 2106), for example, based on activating the antenna panel.

Figure 22:
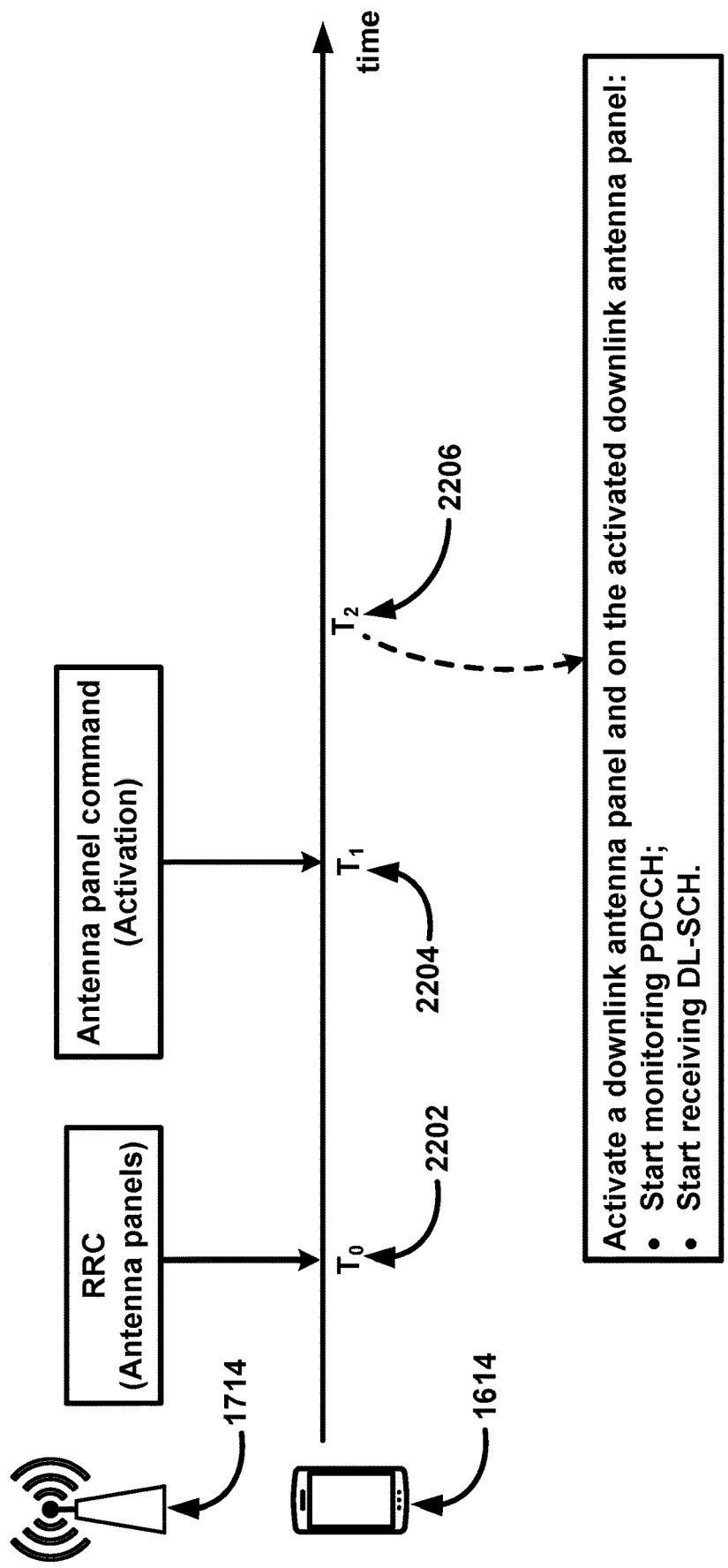
FIG. 22 shows an example timeline of antenna panel activation.

FIG. 22 shows an example timeline of antenna panel activation. A wireless device 1614 may receive, from a base station 1714, one or more messages (e.g., at time T0 2202) that comprise one or more configuration parameters. The one or more configuration parameters may indicate configurations for/per an antenna panel of the one or more antenna panels for/per an uplink BWP of a plurality of uplink BWPs for/per a cell (e.g., PCell, SCell, SpCell, PsCell). The wireless device 1614 may activate an antenna panel (e.g., at time T1 2204) that may be used for downlink transmissions (e.g., DL-SCH, PDSCH, PDCCH, etc.). The wireless device 1614 may monitor, via the activated antenna panel, a downlink channel (e.g., PDCCH) (e.g., at time T2 2206), for example, based on the activating the antenna panel. The wireless device 1614 may receive DL-SCH on the activated antenna panel (e.g., at time T2 2206), for example, based on activating the antenna panel.

A wireless device 1614 may receive, from a base station 1714, one or more messages (e.g., at time T0 2202). The one or more messages may comprise one or more configuration parameters. The one or more configuration parameters may indicate configurations for/per an antenna panel of the one or more antenna panels for/per an uplink BWP of a plurality of uplink BWPs for/per a cell (e.g., PCell, SCell, SpCell, PsCell).

The one or more configuration parameters may indicate panel-specific indices for the one or more antenna panels. Each antenna panel of the one or more antenna panels may be indicated by a respective panel-specific index of the panel-specific indices. An antenna panel of the one or more antenna panels may be indicated by a panel-specific index.

The antenna panel indicated by a panel-specific index may be active. The wireless device 1614 may deactivate the antenna panel (e.g., at time T1 2204). The wireless device 1614 may deactivate the antenna panel with the panel-specific index, for example, based on receiving a DCI message (e.g., DCI format 1_1, DCI format 0_1, DCI format 0_0, DCI format 2_0, and the like) via a PDCCH. An antenna panel indicator field may be present/configured in the DCI message. The wireless device 1614 may deactivate the antenna panel with the panel-specific index, for example, based on receiving an RRC signaling message. An antenna panel indicator field may be present/configured in the RRC signaling message. The wireless device 1614 may deactivate the antenna panel with the panel-specific index, for example, based on or in response to receiving a MAC-CE signaling message. An antenna panel indicator field may be present/configured in the MAC-CE signaling message.

The antenna panel indicator field may indicate a specific antenna panel. The antenna panel indicator field may comprise a value that indicates a panel-specific index of the antenna panel. The wireless device 1614 may deactivate the antenna panel, for example, based on the antenna panel indicator field indicating the antenna panel. The wireless device 1614 may set the antenna panel to a deactivated state.

The antenna panel indicator field may indicate a second antenna panel of the one or more antenna panels. The second antenna panel may be indicated by a second panel-specific index. The antenna panel indicator field may comprise a value indicating the second panel-specific index. The second antenna panel may be different from the antenna panel. The second antenna panel may be different from the antenna panel, for example, based on the second panel-specific index being different from the panel-specific index. The wireless device 1614 may switch from the antenna panel to the second antenna panel, for example, based on the antenna panel indicator field indicating the second antenna panel which may be different from the antenna panel. The wireless device 1614 may set the antenna panel to a deactivated state, for example, based on switching from the antenna panel to the second antenna panel. The wireless device 1614 may set the second antenna panel to activated, for example, based on switching from the antenna panel to the second antenna panel. The wireless device 1614 may deactivate the antenna panel, for example, based on the switching from the antenna panel to the second antenna panel. The wireless device 1614 may activate the second antenna panel, for example, based on switching from the antenna panel to the second antenna panel.

The wireless device 1614 may receive, from the base station 1714, one or more configuration parameters for one or more antenna panels (e.g., at time T0 2022). The wireless device 1614 may activate an antenna panel of the one or more antenna panels (e.g., at time T1 2204). The activated antenna panel may be used for downlink transmissions (e.g., DL-SCH, PDSCH, PDCCH, etc.). The activated antenna panel may be a downlink antenna panel. The wireless device 1614 may monitor, via the activated antenna panel, a downlink channel (e.g., PDCCH) (e.g., at time T2 2206), for example, based on the activating the antenna panel. The wireless device 1614 may receive DL-SCH on the activated antenna panel (e.g., at time T2 2206), for example, based on activating the antenna panel.

Figure 23A:
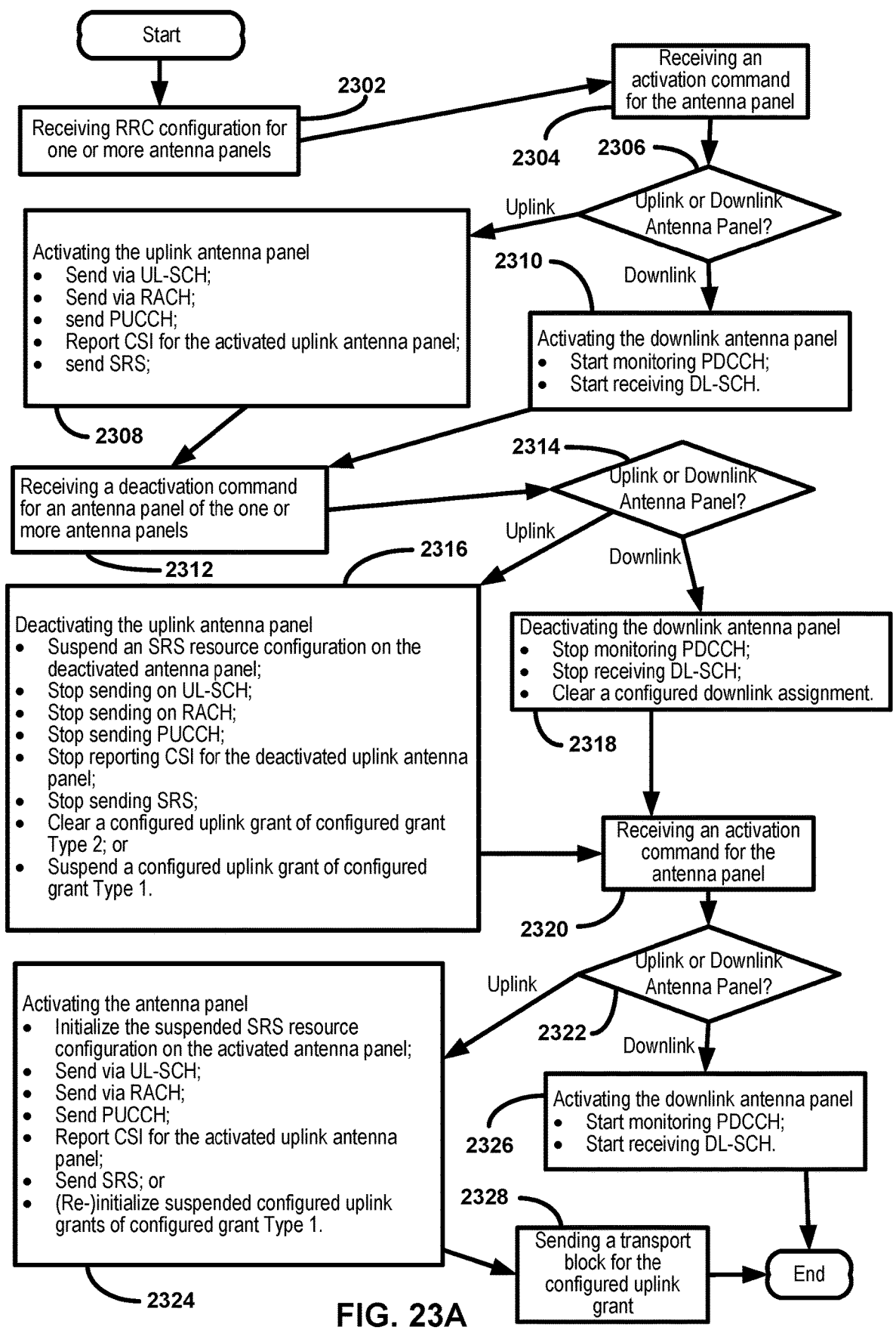
FIGS. 23A and 23B show example procedures for activating and deactivating antenna panels.
Figure 23B:
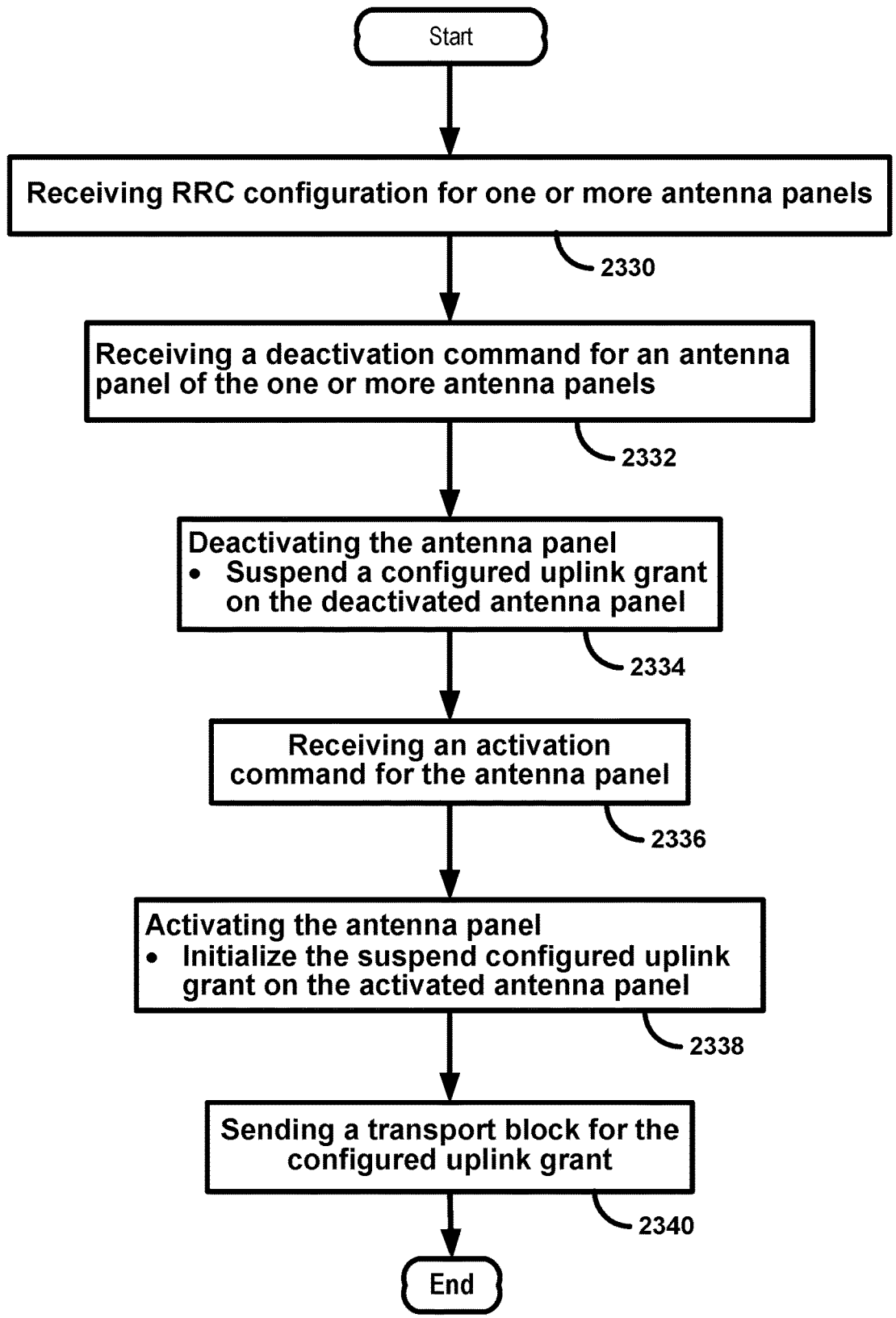

FIGS. 23A and 23B show example procedures for activating and deactivating antenna panels. FIG. 23A shows an example procedure for activating and deactivating downlink and uplink antenna panels. The wireless device may activate or deactivate panels in any order and perform none, some or all of the procedures described, for example, based on a context of wireless states and activating/deactivating antenna panels.

In step 2302, a wireless device may receive RRC configuration for one or more antenna panels. In step 2304, the wireless device may receive an activation command for an antenna panel. In step 2306, the wireless device may determine whether the antenna panel is an uplink panel or a downlink panel. If (e.g., based on a determination that) the antenna panel is an uplink panel, step 2308 may be performed. In step 2308, the wireless device may activate the uplink antenna panel. In step 2308, wireless device may send, via the uplink antenna panel, via uplink channels (e.g., UL-SCH, RACH, and/or PUCCH). In step 2308, wireless device may report CSI for the activated uplink antenna panel. In step 2308, wireless device may transmit SRS.

In step 2312, the wireless device may receive a deactivation command for an antenna panel of the one or more antenna panels. In step 2314, the wireless device may determine whether the antenna panel is an uplink panel or a downlink panel. If (e.g., based on a determination that) the antenna panel is an uplink panel, step 2316 may be performed. In step 2316, the wireless device may deactivate the uplink antenna panel. In step 2316, the wireless device may suspend an SRS resource configuration on the deactivated antenna panel. In step 2316, the wireless device may stop sending (e.g., transmitting) via uplink channels (e.g., UL-SCH, RACH, PUCCH). In step 2316, the wireless device may stop reporting CSI for the deactivated uplink antenna panel. In step 2316, the wireless device may stop sending SRS via the deactivated antenna panel. In step 2316, the wireless device may clear a configured uplink grant of configured grant Type 2. In step 2316, the wireless device may suspend a configured uplink grant (e.g., configured grant Type 1).

In step 2320, the wireless device may receive an activation command for the antenna panel. In step 2322, the wireless device may determine whether the antenna panel is an uplink panel or a downlink panel. If (e.g., based on a determination that) the antenna panel is an uplink panel, step 2324 may be performed. In step 2324, the wireless device may activate the antenna panel. In step 2324, the wireless device may initialize the suspended SRS resource configuration for the activated antenna panel. In step 2324, the wireless device may send (e.g., transmit) via uplink channels (e.g., UL-SCH, RACH, PUCCH). In step 2324, the wireless device may report CSI for the activated uplink antenna panel. In step 2324, the wireless device may send (e.g., transmit) SRS. In step 2324, the wireless device may (re-)initialize suspended configured uplink grants (e.g., of configured grant Type 1) for the activated antenna panel. In step 2328, the wireless device may send a transport step for the configured uplink grant.

If (e.g., based on a determination that) the antenna panel is a downlink panel in step 2306, step 2310 may be performed. In step 2310, the wireless device may activate the downlink antenna panel. In step 2310, the wireless device may start monitoring (e.g., via the activated downlink panel) a downlink channel (e.g., PDCCH). In step 2310, the wireless device may start receiving (e.g., via the activated downlink panel) downlink messages (e.g., DL-SCH).

If (e.g., based on a determination that) the antenna panel is a downlink panel in step 2312, step 2318 may be performed. In step 2318, the wireless device may deactivate the downlink antenna panel. In step 2318, the wireless device may stop monitoring a downlink channel (e.g., PDCCH). In step 2318, the wireless device may stop receiving downlink messages (e.g., DL-SCH). In step 2318, the wireless device may clear a configured downlink assignment.

In step 2322, the wireless device may determine whether the antenna panel is an uplink panel or a downlink panel. If (e.g., based on a determination that) the antenna panel is a downlink panel, step 2326 may be performed. In step 2326, the wireless device may activate the downlink antenna panel. In step 2326, the wireless device may start monitoring a downlink channel (e.g., PDCCH). In step 2326, the wireless device may start receiving downlink messages (e.g., DL-SCH).

FIG. 23B shows an example procedure for activating and deactivating uplink antenna panels with a suspended uplink grant. FIG. 23B shows that a subset of operations of 23A may be used by a wireless device (and/or an associated base station). In step 2330, a wireless device may receive RRC configuration for one or more antenna panels. In step 2332, the wireless device may receive a deactivation command for an antenna panel of the one or more antenna panels. In step 2334, the wireless device may deactivate the antenna panel and/or suspend a configured uplink grant on the deactivated antenna panel. In step 2336, the wireless device may receive an activation command for the antenna panel. In step 2338, the wireless device may activate the antenna panel and/or initialize the suspend configured uplink grant on the activated antenna panel. In step 2338, the wireless device may send (e.g., transmit) a transport step for the configured uplink grant.

The one or more configuration parameters (e.g., received by a wireless device in FIGS. 17-22) may comprise one or more reference signals (e.g., periodic CSI-RSs, SS/PBCH blocks, etc.) for a cell. The wireless device may detect a beam failure, for example, based on the one or more reference signals. The wireless device may assess that a quality of the one or more reference signals is worse (e.g., higher BLER, lower L1-RSRP, lower SINR, etc.) than a threshold for a consecutive quantity of previous measurements. The one or more configuration parameters may indicate the threshold. The one or more configuration parameters may indicate a consecutive quantity of previous measurements. The wireless device may initiate a beam failure recovery procedure (e.g., RACH based, PUCCH based, MAC-CE based) for the cell, for example, based on the detecting the beam failure.

The wireless device may deactivate at least one antenna panel of one or more antenna panels, for example, as a part of the beam failure recovery procedure. The wireless device may detect the beam failure, for example, based on monitoring a CORESET via the at least one antenna panel. The wireless device may perform, via the at least one antenna panel, the beam failure recovery procedure (e.g., sending (e.g., transmitting) an uplink signal for the BFR procedure). The wireless device may abort the beam failure recovery procedure, for example, based on deactivating the at least one antenna panel of one or more antenna panels as a part of the beam failure recovery procedure.

The wireless device may activate at least one antenna panel of one or more antenna panels, for example, as a part of beam failure recovery procedure. The wireless device may monitor, via the at least one antenna panel, a CORESET via the at least one antenna panel. At least one reference signal associated with the CORESET may have a better quality than the threshold. The wireless device may abort the beam failure recovery procedure, for example, based on activating the at least one antenna panel of one or more antenna panels as a part of the beam failure recovery procedure.

Aborting the beam failure recovery procedure may decrease the battery power consumption for the wireless device. Aborting the beam failure recovery procedure may decrease the uplink interference to other wireless devices and/or other cells.

FIGS. 24 and 25A-25F shows an example of multiple antenna panels and antenna activation information that may be provided to a base station. A wireless device may comprise multiple antenna panels that may be individually activated and deactivated.

A base station may know/store/receive information indicative of an activation status of antenna panels of a wireless device, for example, based on the base station instructing the wireless device to activate or deactivate antenna panels. A base station may not know an activation status of antenna panels of a wireless device, for example, based on the wireless device activating or deactivating one or more antenna panels autonomously. If a base station is not aware of (e.g., store information associated with) an activation status of a particular antenna panel of a wireless device, the base station may still send (e.g., transmit) downlink signals via deactivated antenna panel(s), monitor uplink channels/resources via deactivated uplink antenna panel(s) and/or schedule transmissions for deactivated antenna panels. The base station may attempt to send (e.g., transmit) a downlink message (e.g., a DCI message or MAC-CE message) via deactivated antenna panels. The deactivated antenna panels may not be monitored by the wireless device. This sending (e.g., transmitting) to deactivated antenna panels may result in missed reception of the downlink signal, reduced reliability and/or increased delay/latency. The base station may monitor uplink channels/resources configured for deactivated antenna panels. The monitoring may result in power waste/overuse/inefficiencies, for example, based on no uplink transmissions via these deactivated antenna panels and monitoring of these uplink resources. The base station may schedule the wireless device to send (e.g., transmit) an uplink message (e.g., PUSCH message) via one of the deactivated antenna panels. The base station may transmit a DCI message indicating a deactivated antenna panel for an uplink transmission (e.g., PUSCH transmission). The wireless device may reactivate the deactivated antenna panel for the uplink transmission (e.g., PUSCH transmission), which was initially deactivated for power-saving purposes. Activating a deactivated antenna panel may cause a wait of up to 3 ms.

A wireless device may activate or deactivate one or more antenna panels of a plurality of antenna panels. The wireless device may send an uplink message to the base station indicating an activation status of one, some, or all of the plurality of panels. The uplink message may, for example, be sent via a physical uplink control channel message (e.g., periodic or aperiodic PUCCH report) or via a MAC CE message with a field indicating antenna panel activation status (e.g., activated/deactivated). A control channel message (e.g., PDCCH message) may provide advantages of resources that may be more (e.g., already, quickly, etc.) available (e.g., lower latency), but use more overhead (e.g., less efficient). A MAC CE message may use an uplink resource indicated by grant that may have more latency, but may use more efficient communication (e.g., less overhead).

The wireless device may deactivate an antenna panel, for example, based on an expiry of an inactivity timer, a downlink signal comprising a second indication to deactivate the first antenna panel, activating a second antenna panel, or completing reception of a scheduled message via the first antenna panel. A wireless device may activate an antenna panel for transmissions (e.g., with a BWP) and start an inactivity timer. The wireless device may reset the inactivity timer, for example, based on communications via the antenna panel. The wireless device may deactivate an antenna panel, for example, based on expiration of the inactivity timer.

The base station may transmit a downlink signal (e.g., DCI message, MAC-CE message, RRC message) indicating a deactivation of a first antenna panel. The wireless device may deactivate the first antenna panel. The wireless device may send (e.g., transmit) a message to confirm that the first antenna panel is deactivated (e.g., the message may comprise an acknowledgement of the reception of the downlink signal indicating the deactivation of the first antenna panel).

The wireless device may have two antenna panels comprising a first antenna panel and a second antenna panel. The wireless device may have a capability of activating one of the antenna panels at a time. The first antenna panel of the wireless device may be active. The wireless device may receive, from a base station, a DCI scheduling a transmission (e.g., an uplink transmission such as a PUSCH message, PUCCH message, SRS message or a downlink transmission such as PDSCH message) via the second antenna panel. The wireless device may deactivate the first antenna panel and activate the second antenna panel, for example, based on the wireless device being unable to be active on both antenna panels at the same time. The wireless device may deactivate the first antenna panel and activate the second antenna panel to receive/send/perform the transmission scheduled by the DCI. The base station may not be aware (e.g., have stored an indication) of the single active antenna panel capability of the wireless device. The base station may not be able to anticipate the deactivation of the first antenna panel. The wireless device may send the indication of antenna panel status to inform the base station about the deactivation of the first antenna panel.

The wireless device may receive, from a base station, a DCI scheduling a transmission (e.g., an uplink transmission such as a PUSCH message, a PUCCH message, an SRS message or a downlink transmission such as a PDSCH message) via the first antenna panel. The wireless device may deactivate the first antenna panel after completing the scheduled transmission. This deactivation may save power. The wireless device may be active on a primary antenna panel. The wireless device may use the first antenna panel as a secondary antenna panel. The wireless device may deactivate the first antenna panel, for example, based on the wireless device completing an uplink/downlink transmission via the first antenna panel. The first antenna panel may be the secondary antenna panel, which may be activated upon demand. The base station may not know (e.g., store) information about the primary and the secondary antenna panels at the wireless device. The antenna panel organization may be implementation information at the wireless device side.

Figure 24:
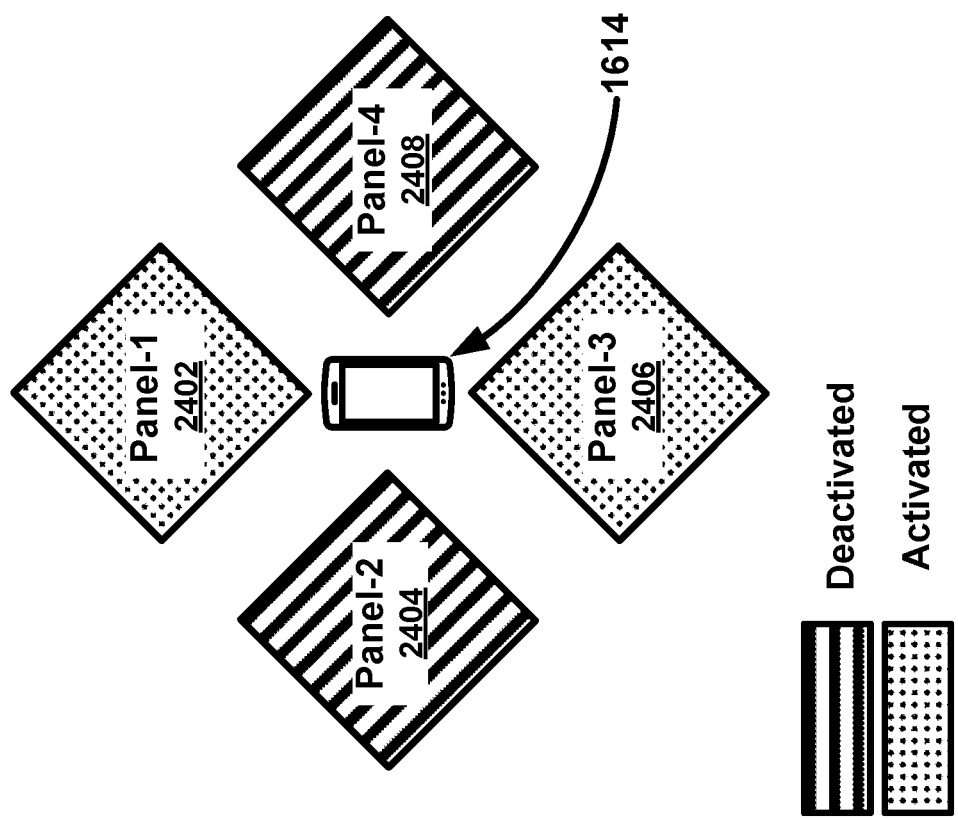
FIG. 24 shows an example of multiple antenna panels and an uplink report.

FIG. 24 shows an example of multiple antenna panels and an uplink report. A wireless device 1614 may receive, from a base station, one or more messages. The one or more messages may comprise one or more configuration parameters for one or more antenna panels (e.g., Panel-1 2402, Panel-2 2404, Panel-3 2406, Panel-4 2408) of the wireless device 1614. The one or more configuration parameters may indicate panel-specific indices (e.g., indicated by a higher layer parameter) for the one or more antenna panels. Each antenna panel of the one or more antenna panels may be indicated by a respective panel-specific index of the panel-specific indices. A first antenna panel (e.g., Panel-1 2402) of the one or more antenna panels may be indicated by a first panel-specific index (e.g., Panel-1 index). A second antenna panel (e.g., Panel-2 2404) of the one or more antenna panels may be indicated by a second panel-specific index (e.g., Panel-2 index). A third antenna panel (e.g., Panel-3 2406) of the one or more antenna panels may be indicated by a third panel-specific index (e.g., Panel-3 index). A fourth antenna panel (e.g., Panel-4 2408) of the one or more antenna panels may be indicated by a fourth panel-specific index (e.g., Panel-4 index).

The base station may configure the wireless device 1614 with resources (e.g., indicated by the one or more configuration parameters) for a report 2410. The report 2410 may comprise uplink control information and/or antenna panel status. The wireless device 1614 may be semi-statically configured (e.g., by higher layers) to perform transmission of the report 2410 via the resources (e.g., PUSCH resources, PUCCH resources). The one or more configuration parameters may indicate a time domain behavior (e.g., aperiodic, periodic, semi-persistent) for the report 2410. The one or more configuration parameters may indicate a periodicity for the report 2410. The one or more configuration parameters may indicate a slot offset for the report 2410.

The wireless device 1614 may activate at least one antenna panel (e.g., Panel-1 2402, Panel-3 2406) of the one or more antenna panels. The wireless device 1614 may use the report 2410 to indicate, to the base station, the activated at least one antenna panel. The wireless device 1614 may deactivate at least one antenna panel (e.g., Panel-2 2404, Panel-4 2408) of the one or more antenna panels. The wireless device 1614 may use the report 2410 to indicate, to the base station, the deactivated at least one antenna panel. The wireless device 1614 may send (e.g., transmit) the report 2410 via uplink channel resources (e.g., PUSCH resources) and/or via uplink channel resources (e.g., PUCCH resources). The resources may be periodic, aperiodic, and/or semi-persistent.

The wireless device 1614 may deactivate at least one antenna panel (e.g., Panel-2 2404, Panel-4 2408) of the one or more antenna panels. The wireless device 1614 may deactivate the at least one antenna panel autonomously. The wireless device 1614 may set one or more fields in the report 2410 to a first value (e.g., zero, one, or any other value), for example, based on deactivating the at least one antenna panel. Each of the one or more fields may correspond to at least one antenna panel. Each of the one or more fields may correspond to a panel-specific index of the at least one antenna panel. The deactivated at least one antenna panel may comprise the second panel (e.g., Panel-2 2404) and the fourth panel (e.g., Panel-4 2408). The one or more fields (e.g., in the Activation Status) corresponding to the second panel-specific index (e.g., Panel-2 index in the Antenna Panel) of the second panel and the fourth panel-specific index (e.g., Panel-4 index in the Antenna Panel) of the fourth panel may comprise the first value (e.g., zero, one, or any other value) in the report 2410. The deactivated at least one antenna panel may comprise the first panel (e.g., Panel-1 2402), the second panel (e.g., Panel-2 2404) and the fourth panel (e.g., Panel-4 2408). The one or more fields, (e.g., in the Activation Status) corresponding to the first panel-specific index (e.g., Panel-1 index in the Antenna Panel) of the first panel, the second panel-specific index (e.g., Panel-2 index in the Antenna Panel) of the second panel, and/or the fourth panel-specific index (e.g., Panel-4 index in the Antenna Panel) of the fourth panel, may comprise the first value (e.g., zero, one or any other value) in the report 2410.

The wireless device 1614 may activate at least one antenna panel (e.g., Panel-1 2402, Panel-3 2406) of the one or more antenna panels. The wireless device 1614 may activate the at least one antenna panel autonomously. The wireless device 1614 may set one or more second fields in the report 2410 to a second value (e.g., zero, one, or any other value), for example, based on the activating the at least one antenna panel. Each of the one or more second fields may correspond to a respective antenna panel of the at least one antenna panel. Each of the one or more second fields may correspond to at least one panel-specific index of the at least one antenna panel. The activated at least one antenna panel may comprise the first panel (e.g., Panel-1 2402) and the third panel (e.g., Panel-3 2406). The one or more second fields (e.g., in the Activation Status) corresponding to the first panel-specific index (e.g., Panel-1 index in the Antenna Panel) of the first panel and the third panel-specific index (e.g., Panel-3 index in the Antenna Panel) of the third panel may comprise the second value (e.g., one, zero, or any other value) in the report 2410. The activated at least one antenna panel may comprise the first panel (e.g., Panel-1 2402), the second panel (e.g., Panel-2 2404) and the third panel (e.g., Panel-3 2406). The one or more second fields (e.g., in the Activation Status) corresponding to the first panel-specific index (e.g., Panel-1 index in the Antenna Panel) of the first panel, the second panel-specific index (e.g., Panel-2 index in the Antenna Panel) of the second panel and the third panel-specific index (e.g., Panel-3 index in the Antenna Panel) of the third panel may comprise the second value (e.g., one, zero or any other value) in the report 2410. The wireless device 1614 may send (e.g., transmit) the report 2410, via the resources (e.g., PUSCH resources, PUCCH resources) of a cell (e.g., PCell, SCell configured with PUCCH, SpCell, PsCell, etc.). The base station may determine activation status (e.g., activated, deactivated) of the one or more antenna panels, for example, based on receiving the report 2410.

The one or more second fields corresponding to the first panel-specific index (e.g., Panel-1 index in the Antenna Panel) and the third panel-specific index (e.g., Panel-3 index in the Antenna Panel) may comprise the second value (e.g., one, zero, or any other value). The base station may determine that the first panel (e.g., Panel-1 2402) and the third panel (e.g., Panel-3 2406) are active at the wireless device 1614. The one or more fields corresponding to the second panel-specific index (e.g., Panel-2 index in the Antenna Panel) and the fourth panel-specific index (e.g., Panel-4 index in the Antenna Panel) may comprise the first value (e.g., zero, one, or any other value), the base station may determine that the second panel (e.g., Panel-2 2404) and the fourth panel (e.g., Panel-4 2408) are set to a deactivated state at the wireless device 1614.

FIGS. 25A, FIG. 25B, FIG. 25C, FIG. 25D, FIG. 25E, and FIG. 25F show examples of multiple antenna panels and indications of activation/deactivation of the multiple antenna panels. The wireless device 1614 may deactivate at least one antenna panel (e.g., Panel-2 2404, Panel-4 2408) of one or more antenna panels. The wireless device 1614 may deactivate the at least one antenna panel autonomously. The wireless device 1614 may send (e.g., transmit) a MAC-CE message (e.g., Panel activation/deactivation MAC-CE message, Panel deactivation MAC-CE message), for example, based on deactivating the at least one antenna panel. The deactivating the at least one antenna panel may trigger a process to send the MAC-CE message. The wireless device 1614 may send (e.g., transmit) the MAC-CE message to indicate, to the base station, the deactivated at least one antenna panel. The wireless device 1614 may send (e.g., transmit) the MAC-CE message to indicate, to the base station, at least one antenna panel-specific-index associated with the deactivated at least one antenna panel.

The wireless device 1614 may activate at least one antenna panel (e.g., Panel-1 2402, Panel-3 2406) of one or more antenna panels. The wireless device 1614 may activate the at least one antenna panel autonomously. The wireless device 1614 may send (e.g., transmit) a MAC-CE message (e.g., Panel activation/deactivation MAC-CE message, Panel activation MAC-CE message), for example, based on activating the at least one antenna panel. Activating the at least one antenna panel may trigger a process to send the MAC-CE message. The wireless device 1614 may send (e.g., transmit) the MAC-CE message to indicate, to the base station, the activated at least one antenna panel. The wireless device 1614 may send (e.g., transmit) the MAC-CE message to indicate, to the base station, at least one antenna panel-specific-index associated with the activated at least one antenna panel.

Figure 25D:
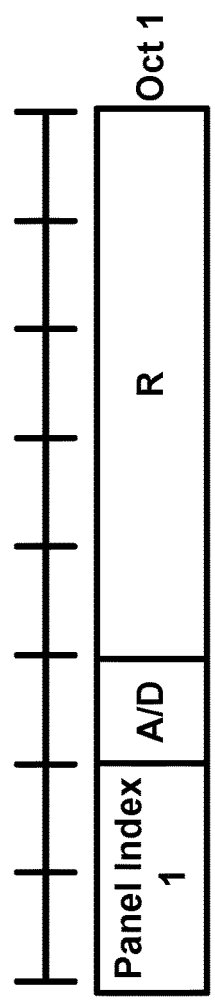

FIG. 25B, FIG. 25C, FIG. 25D, FIG. 25E, and FIG. 25F show examples of fields within a MAC CE to indicate activation status of antenna panels of the wireless device. FIG. 25B shows an example of a portion of a MAC CE message comprising one or more indications of activation status of one or more antenna panels. The MAC-CE message may be associated with an LCID in a corresponding MAC header (not shown). The LCID may indicate a logical channel instance of the MAC-CE message. A size of the LCID may comprise a value (e.g., 6 bits or any other value). The LCID may indicate that the MAC-CE message may deactivate the at least one antenna panel. The LCID may indicate that the MAC-CE message may activate the at least one antenna panel. The MAC-CE message may comprise one or more fields. The one or more fields may comprise a first field, a second field, and/or a third field.

The first field may indicate at least one panel-specific index (e.g., Panel ID_0, . . . , Panel-ID_(M−1)) of the at least one antenna panel. Each of the at least one panel-specific index may indicate a panel-specific index associated with an antenna panel of the at least one antenna panel. Each antenna panel of the at least one antenna panel may be indicated by a panel-specific-index of the at least one panel-specific index. The one or more configuration parameters may indicate the at least one panel-specific index.

The deactivated at least one antenna panel may comprise the second panel (e.g., Panel-2 2404) and the fourth panel (e.g., Panel-4 2408). M may be two (e.g., two panels set to a deactivated state), for example, based on the deactivated second panel and fourth panel. A first panel identifier (e.g., Panel ID_0) may be equal to the second panel-specific index of the second antenna panel. The first panel identifier (e.g., Panel ID_0) may be equal to the fourth panel-specific index of the fourth antenna panel. A second panel identifier (e.g., Panel ID_1) may be equal to the fourth panel-specific index of the fourth antenna panel. The second panel identifier (e.g., Panel ID_1) may be equal to the second panel-specific index of the second antenna panel. A first length of the first field may comprise a first value (e.g., M*N bits). M may be a first number of the deactivated at least one antenna panel. N may be computed based on a second number of the one or more antenna panels, for example, N=log 2(the second number). The first field length may be 8 bits, for example, based on N=2 bits and the second number being the inverse log of 2 (e.g., 4.

The activated at least one antenna panel may comprise the first panel (e.g., Panel-1 2402) and the third panel (e.g., Panel-3 2406). M may be two (e.g., two panels set to an activated state), for example, based on the activated first panel and third panel. A first panel identifier (e.g., Panel ID_0) may be equal to the first panel-specific index of the first antenna panel. The first panel identifier (e.g., Panel ID_0) may be equal to the third panel-specific index of the third antenna panel. A second panel identifier (e.g., Panel ID_1) may be equal to the first panel-specific index of the first antenna panel. The second panel identifier (e.g., Panel ID_1) may be equal to the third panel-specific index of the third antenna panel. A first length of the first field may comprise a first value (e.g., M*N bits). M may be a first number of the activated at least one antenna panel. N may be computed based on a second number of the one or more antenna panels (for example, N=log 2(the second number)). The first field length may be 8 bits, for example, based on N=2 bits and the second number being the inverse log of 2 (e.g., 4.

At least one first antenna panel of the one or more antenna panels may be active (e.g., Panel-1 2402, Panel-3 2406). At least one second antenna panel of the one or more antenna panels may be set to a deactivated state (e.g., Panel-2 2404, Panel-4 2408). The MAC-CE message may comprise at least one first antenna panel-specific index of the at least one first antenna panel and at least one second antenna panel-specific index of the at least one second antenna panel. M may be four (e.g., M may be equal to a number of the one or more antenna panels). The first panel identifier (e.g., Panel ID_0) may be equal to the first panel-specific index of the first antenna panel. The second panel identifier (e.g., Panel ID_1) may be equal to the second panel-specific index of the second antenna panel. The third panel identifier (e.g., Panel ID_2) may be equal to the third panel-specific index of the third antenna panel. The fourth panel identifier (e.g., Panel ID_3) may be equal to the fourth panel-specific index of the fourth antenna panel. A first length of the first field may comprise a first value (e.g., M*N bits). M may be the number of the one or more antenna panels. N may be computed based on the number (e.g., N=log 2(the number)). The first field length may be 8 bits, for example, based on N=2 bits and the second number being the inverse log of 2 (e.g., 4.

The second field (e.g., A/D) may indicate whether the MAC-CE message is used to activate or deactivate the at least one antenna panel indicated by the at least one panel-specific index (e.g., Panel ID_0, . . . , Panel-ID_(M−1)). Setting the second field to "1" (or any other value) for an antenna panel of the at least one antenna panel may indicate an activation of the antenna panel. Setting the second field to "0" (or any other value) for an antenna panel of the at least one antenna panel may indicate a deactivation of the antenna panel. A second length of the second field may comprise a second value.

The wireless device 1614 may activate the first panel (e.g., Panel-1 2402). The wireless device 1614 may set, for the MAC-CE message, the first field to the first panel-specific index of the first panel and the second field to "1" (or any other value). The wireless device 1614 may activate the third panel (e.g., Panel-3 2406). The wireless device 1614 may set, for the MAC-CE message, the first field to the third panel-specific index of the third panel and the second field to "1" (or any other value).

The wireless device 1614 may deactivate the second panel (e.g., Panel-2 2404). The wireless device 1614 may set, for the MAC-CE message, the first field to the second panel-specific index of the second panel and the second field to "0" (or any other value). The wireless device 1614 may deactivate the fourth panel (e.g., Panel-4 2408). The wireless device 1614 may set, for the MAC-CE message, the first field to the fourth panel-specific index of the fourth panel and the second field to "0" (or any other value). The third field may indicate an R field. The R field may indicate a reserved bit. The R field may be set to zero or any other value. A third length of the third field may comprise a third value.

FIG. 25C shows an example of a portion of a MAC CE message with a bitmap indication of activation status of one or more antenna panels. The MAC-CE message may comprise one or more fields. The one or more fields may comprise a first field. The one or more fields ($C_0 \ldots C_{M-1}$) may comprise individual values (e.g., one bit, two bits, etc.) that indicate a status of some of or each of the antenna panels of the wireless device. A position of the individual value indicates the antenna panel of the wireless device. The bitmap may be indexed by position to indicate the antenna panel. A first value (e.g., 0, 1 or any other value) at position $C_3$ may indicate that an antenna panel with index 3 is set to a deactivated state. A second value (e.g., 1, 0 or any other value) at position $C_3$ may indicate that an antenna panel with index 3 is set to an activated state.

The first field may comprise panel-specific indices (e.g., $C_0, \ldots C_{M-1}$) of the one or more antenna panels. M may be a number of the one or more antenna panels. A panel-specific index field (e.g., $C_i$ field) of the panel-specific indices may indicate an activation/deactivation status of an antenna panel of the one or more antenna panels. The antenna panel may be indicated by a panel-specific index. The panel-specific index may be based on i (e.g., equal to i, equal to i–1, equal to i+1, etc.). The antenna panel with the panel-specific index being based on i may be set to an activated state, for example, based on the panel-specific index field ($C_i$ field) being set to a value (e.g., one, zero, or any other value). The antenna panel with the panel-specific index being based on i may be set to a deactivated state, for example, based on the panel-specific index field ($C_i$ field) being set to a value (e.g., zero, one, or any other value).

FIG. 25D shows an example of a portion of a MAC CE message with a panel index and indication of activation status of an antenna panel. Each antenna panel of the one or more antenna panels may be identified by a respective panel-specific index of the panel-specific indices. A MAC CE message may comprise one or more fields. The one or more fields may comprise fields (e.g., Panel Index 1 . . . Panel Index M–1) that hold values for panel indices, fields (e.g., A/D) that hold values indicating antenna panel activation status (e.g., activated, deactivated), and one or more reserved bit fields (e.g., R). The message may include all antenna panels or a portion of the antenna panels. The message may include indications for antenna panels that have changed antenna panel activation status (e.g., active to deactivated, or deactivated to active).

Figure 25E:
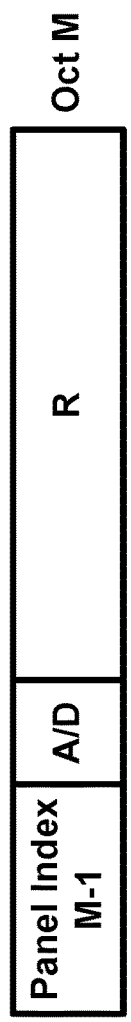

FIG. 25E shows an example of a portion of a MAC CE message with grouping of panel indices with a single indication of activation status of the grouping of antenna panel indices. Each antenna panel of the one or more antenna panels may be indicated by a respective panel-specific index of the panel-specific indices. A MAC CE message may comprise one or more fields. The one or more fields may comprise an activation status (e.g., A/D), one or more antenna panel indices (e.g., Panel Index 1 . . . Panel Index M–1), and one or more reserve bits (e.g., R). The wireless device 1614 may indicate a set of antenna panels that share a same/similar activation status. The wireless device 1614 may indicate an activated status and antenna panel indices of Panel-1 and Panel-3.

Figure 25F:
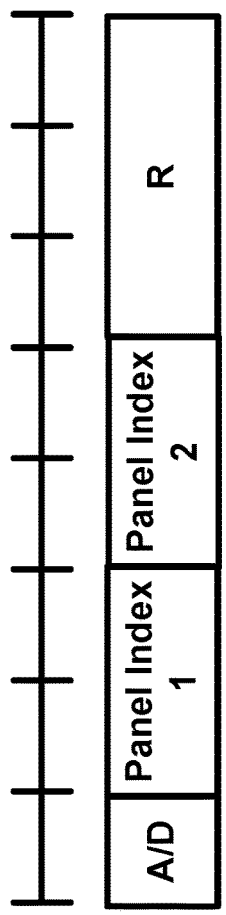

FIG. 25F shows an example of a portion of a MAC CE message with a bitmap indication of activation status of a plurality of antenna panels. Each antenna panel of the one or more antenna panels may be indicated by a placement of a bit within the bitmap, for example, based on a respective panel-specific index of the panel-specific indices. A MAC CE message may comprise one or more fields. The one or more fields may comprise reserve bits (e.g., R) and activation status bits (e.g., $C_0$ to $C_3$) with each bit representing antenna status (e.g., activated, deactivated) of one or more antenna panels. A value in C0 may represent Panel-1 2402. A value in $C_1$ may represent Panel-2 2404. A value in C2 may represent Panel-3 2406. A value in $C_3$ may represent Panel-4 2408.

The wireless device 1614 may send (e.g., transmit) the MAC-CE message (e.g., of the form seen in any of FIGS. 25B-25F or others), via at least one uplink resource (e.g., PUSCH resource). An uplink grant may indicate the at least one uplink resource. The base station may determine activation status (e.g., activated, deactivated) of the one or more antenna panels, for example, based on the base station receiving the MAC-CE message.

The base station may receive the MAC_CE message with the first field being set to the second panel-specific index of the second panel and the second field being set to "0" (or any other value) The base station may determine that the wireless device 1614 deactivates the second panel (e.g., Panel-2 2404). The base station may receive the MAC_CE message with the first field being set to the first panel-specific index of the first panel and the second field being set to "1" (or any other value). The base station may determine that the wireless device 1614 activates the first panel (e.g., Panel-1 2402). The base station may receive the MAC_CE message with a panel-specific index field (e.g., C_0 field) set to "1" (or any other value). The base station may determine that the wireless device 1614 activates the first panel (e.g., Panel-1 2402). The base station may receive the MAC_CE message with a panel-specific index field (e.g., C_1 field) set to "0" (or any other value). The base station may determine that the wireless device 1614 activates the second panel (e.g., Panel-2 2404).

A wireless device 1614 may indicate (e.g., report), to a base station, an RF capability of the wireless device 1614 via a capability signaling of the wireless device 1614. The RF capability may be reception capability and/or transmission capability. The base station may determine whether the wireless device 1614 may receive (and/or transmit) simultaneous physical channels and/or RSs via different receiving (and/or transmitting) beams from one or more component carriers in the downlink (and/or uplink) at the same time instant, for example, based on the capability signaling.

A base station may configure (e.g., in intra-band CA) one or more component carriers in the same band. The one or more component carriers may be powered by a same and a single RF chain. The wireless device 1614 may apply a single and a same set of TX/RX spatial parameters to the one or more component carriers in the same band at a same (or substantially the same) time instant. Applying the single and the same set of TX/RX spatial parameters may impose limitations on flexibility of multiplexing physical channels (e.g., PDSCH/PUSCH, PDCCH/PUCCH, SRS, PRACH, etc.) and/or reference signals (RSs) (e.g., CSI-RS, SSB, etc.), for example, within and/or across the one or more component carriers.

A first channel/RS of a first serving cell (e.g., PCell, BWP) and a second channel/RS of a second serving cell (e.g., SCell, BWP) may be multiplexed in the same OFDM symbols, for example if the first channel/RS is associated with a second channel/RS (e.g., QCL-ed with QCL type as QCL TypeD). A wireless device 1614 may transmit/receive (e.g., simultaneously transmit/receive) the multiplexed first channel/RS and the second channel/RS in the uplink/downlink.

One or more first antenna ports of a first serving cell and one or more second antenna ports of a second serving cell may not be associated (e.g., may not be QCL-ed with QCL type as QCL-TypeD). A wireless device 1614 may not determine (e.g., may not infer) one or more channel properties of the one or more first antenna ports of the first serving cell from the one or more second antenna ports of the second serving cell.

The first channel/RS (e.g., PDSCH/PUSCH, PDCCH/PUCCH, SRS, PRACH, CSI-RS, SSB, etc.) and the second channel/RS (e.g., PDSCH/PUSCH, PDCCH/PUCCH, SRS, PRACH, CSI-RS, SSB, etc.) may not be associated (e.g., may not be QCL-ed with QCL type as QCL-TypeD). A base station may configure the first channel/RS may with a first QCL assumption and the second channel/RS with a second QCL assumption. A first transmission/reception of the first channel/RS and a second transmission/reception of the second channel/RS may overlap (e.g., in at least one OFDM symbol). The wireless device 1614 may not perform the first transmission/reception and the second transmission/reception simultaneously, for example, if the first QCL assumption and the second QCL assumption are not the same.

FIG. 26 shows an example of a TCI State information element. A base station may configure a wireless device with one or more TCI-State configurations by a state parameter (e.g., higher layer parameter, tci-StatesToAddModList, tci-StatesToReleaseList in IE PDSCH-Config) for a serving cell (e.g., PCell, SCell). The wireless device may detect a downlink message (e.g., PDCCH message) with a DCI for the serving cell. The wireless device may use at least one of the TCI states of the one or more TCI-State configurations to decode a downlink message (e.g., PDSCH message or for a reception of a PDSCH message) scheduled by the downlink control message (e.g., PDCCH message or DCI message). The DCI message may be intended for the wireless device and/or the serving cell of the wireless device.

The DCI may indicate the TCI state. The wireless device may receive a downlink message (e.g., PDSCH message) based on the TCI state. The TCI state may comprise one or more parameters (e.g., qcl-Type1, qcl-Type2, referenceSignal, etc.). The TCI state may be indicated by a TCI state index (e.g., tci-StateId). The wireless device may use the one or more parameters in the TCI state to configure one or more QCL relationships between at least one downlink reference signal (e.g., SS/PBCH block, CSI-RS) and at least one DM-RS port of the PDSCH (scheduled by the DCI). A first QCL relationship of the one or more QCL relationships may be configured by a QCL parameter (e.g., higher layer parameter, qcl-Type1) for a first DL RS (e.g., indicated by the referenceSignal) of the at least one DL RS. A second QCL relationship of the one or more QCL relationships may be configured by a QCL parameter (e.g., higher layer parameter, qcl-Type2) for a second DL RS (e.g., indicated by the referenceSignal) of the at least one downlink reference signal.

At least one QCL type of the at least one downlink reference signal (e.g., the first DL RS, the second DL RS) may be indicated to the wireless device by a QCL parameter (e.g., higher layer parameter, qcl-Type in QCL-Info). The first QCL relationship of the first DL RS may comprise a first QCL type (e.g., QCL-TypeA, QCL-TypeB) of the at least one QCL type. The second QCL relationship of the second DL RS may comprise a second QCL type (e.g., QCL-TypeC, QCL-TypeD) of the at least one QCL type. The first QCL type of the first DL RS and the second QCL type of the second DL RS may not be the same/similar. The first DL RS and the second DL RS may be the same/similar. The first DL RS and the second DL RS may be different.

The wireless device may use the one or more parameters in the TCI state to configure the one or more QCL relationships between the at least one downlink reference signal (e.g., the first DL RS and the second DL RS). The wireless device may use at least one DM-RS port of the downlink resource (e.g., PDSCH resource). The at least one DM-RS port of the downlink resource (e.g., PDSCH resource) may be quasi co-located with the first DL RS with respect to the first QCL type. The wireless device may use the one or more parameters in the TCI state to configure the one or more QCL relationships between the at least one downlink reference signal (e.g., the first DL RS and the second DL RS) and the at least one DM-RS port of the PDSCH. The at least one DM-RS port of the downlink resource (e.g., PDSCH resource) may be quasi co-located with the second DL RS with respect to the second QCL type.

Figure 27:
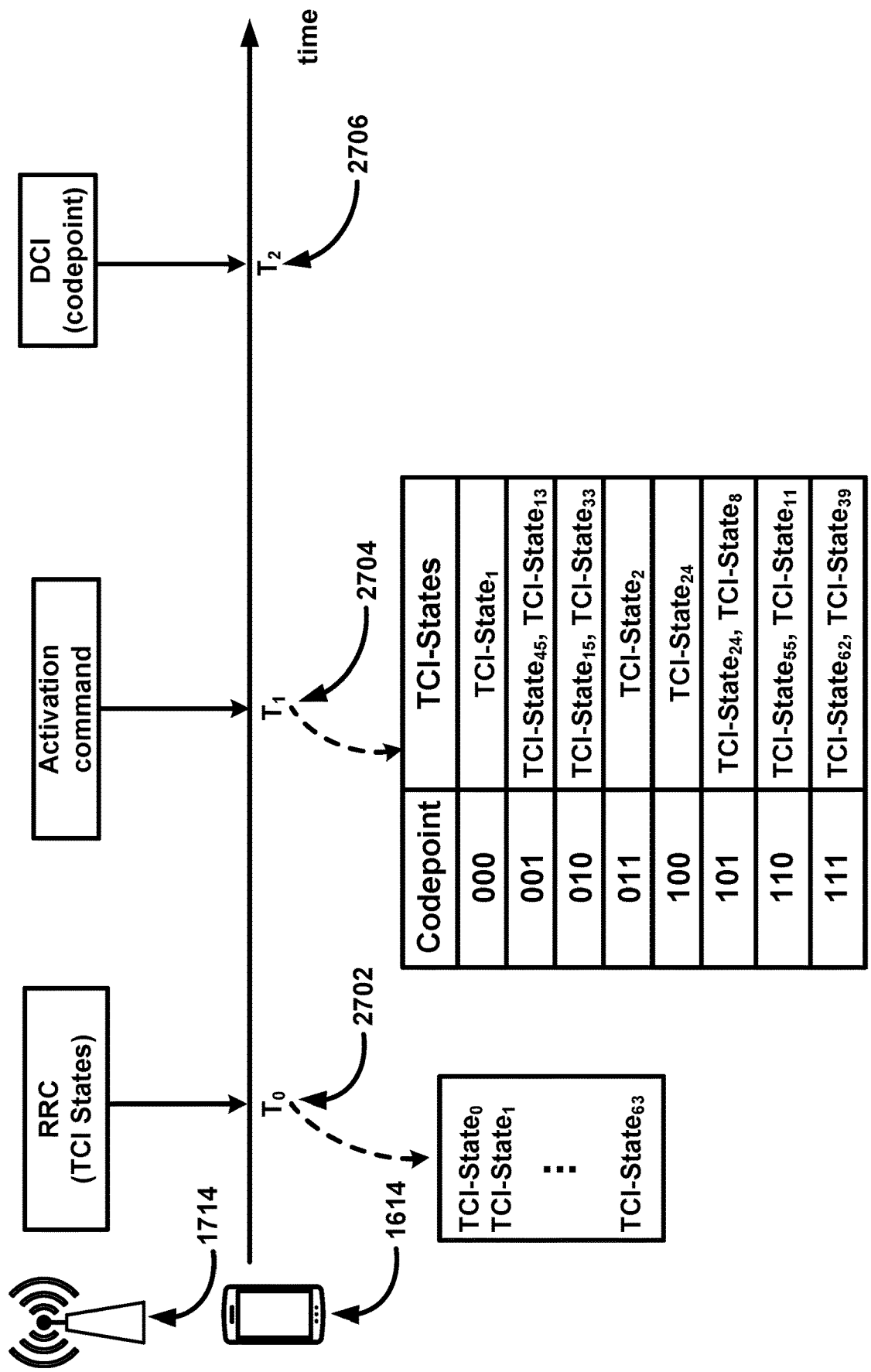
FIG. 27 shows an example timeline of TCI State configuration and selection.

FIG. 27 shows an example timeline of TCI State configuration and selection. A base station 1714 may configure (e.g., at time T0 2702) a wireless device 1614 with one or more TCI-State configurations. A wireless device 1614 may receive (e.g., at time T1 2704) an activation command that indicates an activation/deactivation status of a TCI state of the one or more TCI-State configurations. The activation command may be used to map the one or more TCI states to one or more codepoints. A TCI field in a DCI message (e.g., at time T2 2706) may indicate (or may be equal to) a codepoint of the one or more codepoints.

A base station 1714 may configure (e.g., at time T0 2702) a wireless device 1614 with one or more TCI-State configurations (e.g., TCI-State_0, TCI-State_1, . . . , TCI-State_63) by a TCI parameter (e.g., higher layer parameter, tci-StatesToAddModList, tci-StatesToReleaseList in IE PDSCH-Config) for a serving cell (e.g., PCell, SCell). Other TCI-State configurations (e.g., TCI-State_0, TCI-State_1, . . . , TCI-State_63) may be used and be different for different base stations, for example, based on TCI State fields sent (e.g., transmitted) by the base station to the wireless device. A wireless device 1614 may receive (e.g., at time T1 2704) an activation command (e.g., TCI States Activation/Deactivation for UE-specific PDSCH MAC CE). The activation command may indicate an activation/deactivation status of a TCI state of the one or more TCI-State configurations. The activation command may activate one or more TCI states (e.g., TCI-State_1, TCI-State_45, TCI-State_13, TCI-State_15, TCI-State_33, TCI-State_2, TCI-State_24, TCI-State_8, TCI-State_55, TCI-State_11, TCI-State_62, TCI-State_39) of the one or more TCI-State configurations. The activation command may be used to map the one or more TCI states to one or more codepoints (e.g., 0, 1, 2, . . . 7, etc.). A TCI field in a DCI message (e.g., at time T2 2706) may indicate (or may be equal to) a codepoint of the one or more codepoints.

The mapping between the one or more TCI states and the one or more codepoints may be one-to-one. A TCI state of the one or more TCI states may be mapped to a codepoint of the one or more codepoints. The mapping between the one or more TCI states and the one or more codepoints may be multi-to-one. At least two TCI states of the one or more TCI states may be mapped to a codepoint of the one or more codepoints. The mapping between the one or more TCI states and the one or more codepoints may be one-to-multi. A TCI state of the one or more TCI states may be mapped to at least two codepoints of the one or more codepoints. A codepoint of the one or more codepoints may comprise/indicate at least one TCI state of the one or more TCI states.

A codepoint (e.g., 000, 011, 100) of the one or more codepoints may comprise/indicate a single TCI state (e.g., TCI-State_1, TCI-State_2, TCI-State_24). The single TCI state may comprise TCI-State_1, for example, based on the codepoint being equal to a value (e.g., "000" or any other value). The single TCI state may comprise TCI-State_24, for example, based on the codepoint being equal to a value (e.g., "100" or any other value). The single TCI state may comprise TCI-State_2, for example, based on the codepoint being equal to a value (e.g., "011" or any other value). A codepoint (e.g., 000, 011, 100) of the one or more codepoints may comprise/indicate one TCI state (e.g., TCI-State_1, TCI-State_2, TCI-State_24).

A codepoint (e.g., 001, 010, 101, 110, 111) of the one or more codepoints may comprise/indicate at least two TCI states. The at least two TCI states may comprise TCI-State_45 and TCI-State_13, for example, based on the codepoint being equal to a value (e.g., "001" or any other value). The at least two TCI states may comprise TCI-State_62 and TCI-State_39, for example, based on the codepoint being equal to a value (e.g., "111" or any other value).

Figure 28:
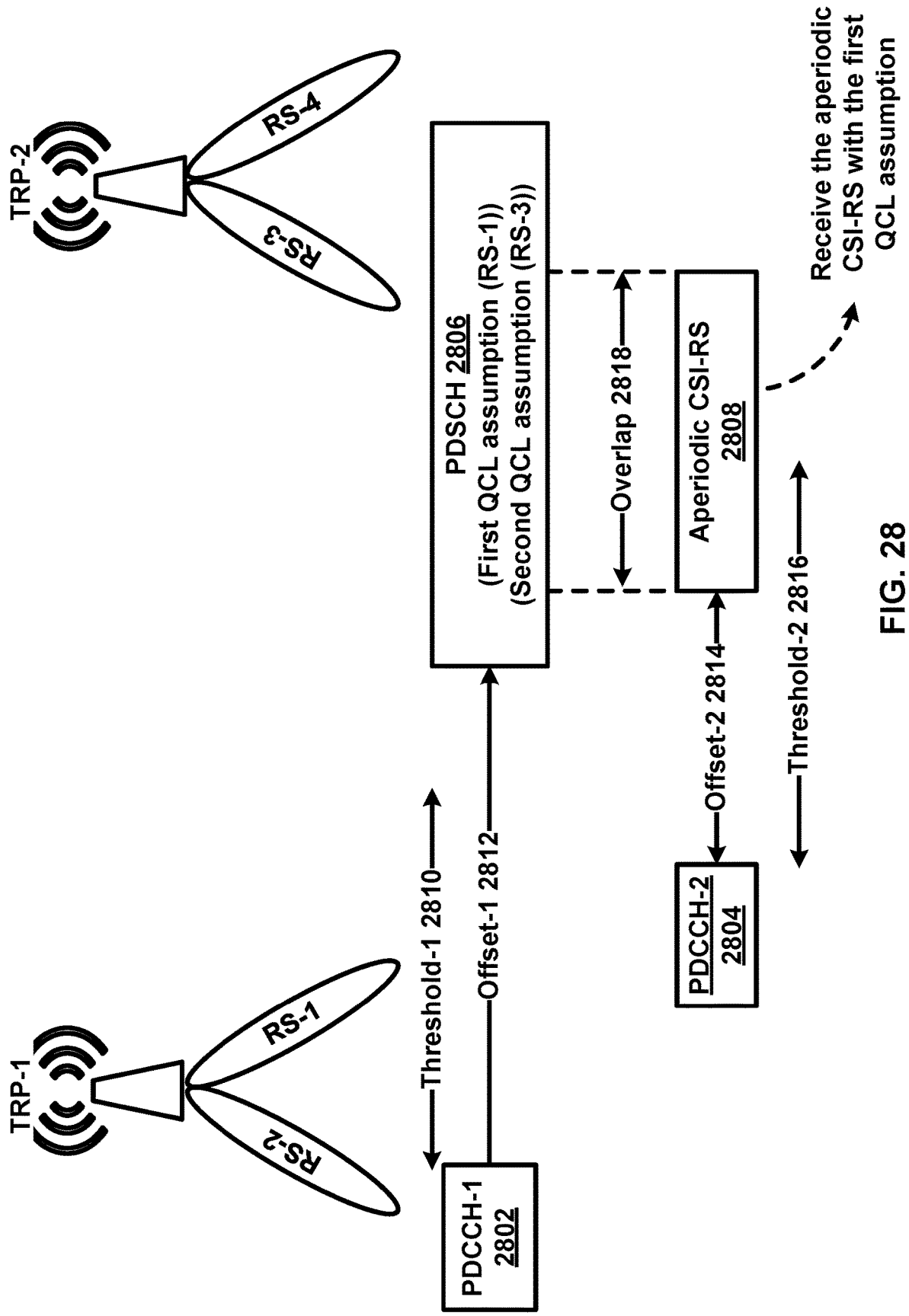
FIG. 28 shows an example of an overlap between a downlink message and a channel state information reference signal (CSI-RS).

FIG. 28 shows an example of an overlap between a downlink message and a channel state information reference signal (CSI-RS). A downlink message (e.g., PDSCH message) 2806 may be transmitted by multiple TRPs. Different layers of the downlink message (e.g., PDSCH message) may be transmitted from different TRPs. An aperiodic CSI-RS 2808 may overlap with a downlink message (e.g., PDSCH message) 2806 received with multiple beams. Misalignment may occur between one or more TRPs and the wireless device unless the wireless device may determine which beam to apply among the multiple beams to receive and measure the aperiodic CSI-RS 2808. A misalignment between the base station (or one or more TRPs) and the wireless device on the beam used to receive/measure the aperiodic CSI-RS may cause measurement of the aperiodic CSI-RS to be inaccurate. The inaccurate measurement may result in inaccurate channel estimation. The base station may receive this inaccurate channel estimation report of the aperiodic CSI-RS from the wireless device. The inaccurate report may affect the scheduling decision at the base station. The base station may assume that the channel conditions are bad based on the aperiodic CSI-RS report. The base station may assign higher transmission power for a downlink transmission to mitigate the bad channel conditions. Higher transmission power may increase power consumption at the base station and/or increased interference to other cells and the wireless devices. Inaccurate scheduling (e.g., selection of wrong parameters such as power, MCS level) may result in missed downlink reception at the wireless device. Inaccurate scheduling may lead to retransmission of the downlink signals, increasing latency of a successful communication, and/or increasing the power consumption at the wireless device.

The wireless device may select a beam for reception of the CSI-RS 2808 overlapping the downlink message (e.g., PDSCH message) 2806 transmitted by multiple TRPs based on a rule shared with the base station. The wireless device may select the aperiodic CSI-RS 2808 with the beam associated with the lowest TCI state index. The wireless device may select the beam of the TRP transmitting the DCI scheduling the aperiodic CSI-RS 2808. The wireless device may select the beam of the TRP transmitting the DCI scheduling the downlink message (e.g., PDSCH message) 2806. The power consumption at the wireless device and the base station may be reduced. Interference to other cells/wireless devices may be reduced and/or avoided. Retransmission of a downlink signal (e.g., PDSCH signal) may reduce and/or avoided, which may result in a reduced transmission latency/delay.

Wireless communications are described. A downlink message may be transmitted by multiple TRPs with different layers of the downlink message transmitted from different TRPs and received with multiple beams of the wireless device. An aperiodic CSI-RS may overlap with the downlink message received with multiple beams. The wireless device and base station may share a rule for selection of a beam to receive the aperiodic CSI-RS, for example, when the aperiodic CSI-RS overlaps with the downlink message. The power consumption at the wireless device and the base station may be reduced. Interference to other cells/wireless devices may be reduced and/or avoided. Retransmission of a downlink signal (e.g., PDSCH signal) may be reduced and/or avoided.

A backhaul may meet latency and throughput thresholds (e.g., ideal backhaul), for example, as described above. The backhaul may exist between a first TRP and a second TRP. The first TRP may send (e.g., transmit) a DCI message scheduling a downlink message (e.g., PDSCH message). The downlink message (e.g., PDSCH message) may be sent (e.g., transmitted) by the first TRP and the second TRP.

A backhaul may not meet latency and/or throughput thresholds (e.g., a non-ideal backhaul) between a first TRP and a second TRP. The first TRP may send (e.g., transmit) a first DCI message scheduling a first downlink message (e.g., PDSCH) transmitted by the first TRP and the second TRP transmits a second DCI scheduling a second downlink message (e.g., PDSCH message). The downlink message (e.g., PDSCH message) may be sent (e.g., transmitted) by the second TRP.

The aperiodic CSI-RS may overlap with one or more downlink messages (e.g., PDSCH messages), for example, in ideal backhaul and/or non-ideal backhaul. The aperiodic CSI-RS may overlap with two TCI states/QCL assumptions (e.g., may overlap with the downlink message (e.g., PDSCH message) with two different TCI states and/or may overlap with the second downlink message (e.g., PDSCH message) and the third downlink message (e.g., PDSCH message), each with a respective TCI state). Beam misalignment may occur.

An aperiodic CSI-RS may also overlap with multiple downlink messages (e.g., PDSCH messages). The wireless device may receive a first DCI message via a first control resource set (CORESET) indicated by a first CORESET index. The first DCI message may indicate a first schedule for a first downlink message (e.g., first PDSCH message). The DCI message may indicate a first TCI state indicating a first RS. The wireless device may receive a second DCI message via a second CORESET indicated by a second CORESET index. The second DCI message may indicate a second schedule for a second downlink message (e.g., second PDSCH message). The second DCI message may indicate a second TCI state indicating a second RS. The wireless device may receive a third DCI comprising a CSI request field indicating an aperiodic CSI-RS resource. The wireless device may determine that the aperiodic CSI resource overlaps in time with the first downlink message (e.g., first PDSCH message) and the second downlink message (e.g., second PDSCH message). The wireless device may select a selected RS among a first RS and a second RS based on the first CORESET index and the second CORESET index. (or based on CORESET state indices). The wireless device may receive the aperiodic CSI-RS resource based on the selected RS. The power consumption at the wireless device and the base station may be reduced. Interference to other cells/wireless devices may be reduced and/or avoided. Retransmission of a downlink signal (e.g., PDSCH signal) may be reduced and/or avoided, which may result in a reduced transmission latency/delay.

A wireless device may receive, from a base station, a first DCI message. The first DCI message may schedule a physical downlink shared channel resource (e.g., PDSCH). The wireless device may receive the first DCI message as a first downlink control message 2802 (e.g., PDCCH-1 message). The wireless device may receive the first DCI message, for example, based on monitoring the first downlink control channel (e.g., PDCCH). A first time offset 2812 (e.g., Offset-1) between a reception of the first DCI message and a reception of the downlink message 2806 (e.g., PDSCH message) may be equal to or greater than a first threshold 2810 (e.g., timeDurationForQCL, Threshold-Sched-Offset, Threshold-1).

A time offset 2812 (e.g., the first time offset) between a reception of a DCI message 2802 (e.g., the first DCI message) and a reception of a downlink message 2806 (e.g., the PDSCH message) scheduled by the DCI message may be equal to or larger than a threshold 2810 (e.g., timeDurationForQCL, Threshold-Sched-Offset). The downlink message 2806 (e.g., PDSCH message) may be scheduled after the threshold, for example, based on the time offset being equal to or larger than the threshold 2810. A time offset 2812 (e.g., the first time offset) between a reception of a DCI message 2802 (e.g., the first DCI message) and a reception of a downlink message 2806 (e.g., the PDSCH message) scheduled by the DCI message 2802 may be lower than a threshold 2810 (e.g., timeDurationForQCL, Threshold-Sched-Offset). The downlink message 2806 (e.g., PDSCH message) may be scheduled before the threshold 2810, for example, based on the time offset being lower than the threshold.

The first DCI message 2802 may comprise a transmission configuration indication (TCI) field. The TCI field may indicate (or be equal to) a codepoint. The codepoint may indicate/comprise at least two TCI states (e.g., TCI-State_45 and TCI-State_13). The at least two TCI states may comprise a first TCI state (e.g., TCI-State_45) indicated by a first TCI state index and a second TCI state (e.g., TCI-State_13) indicated by a second TCI state index.

The wireless device may receive, from a base station, one or more messages comprising one or more configuration parameters for a serving cell (e.g., PCell, SCell, PsCell, SpCell, etc.). The one or more configuration parameters may indicate the first TCI state index of the first TCI state. The one or more configuration parameters may indicate the second TCI state index of the second TCI state.

The first TCI state may indicate at least one first RS (e.g., RS-1 indicated by a RS parameter (e.g., higher layer parameter, referenceSignal)). The second TCI state may indicate at least one second RS (e.g., RS-3 indicated by a RS parameter (e.g., higher layer parameter, referenceSignal)). The first TCI state may indicate at least one first QCL type (e.g., QCL-TypeD, QCL-TypeA indicated by a QCL parameter (e.g., higher layer parameter, qcl-Type in QCL-Info)). The second TCI state may indicate at least one second QCL type (e.g., QCL-TypeD, QCL-TypeA indicated by a QCL parameter (e.g., higher layer parameter, qcl-Type in QCL-Info)).

The wireless device may receive the downlink message 2806 (e.g., PDSCH message) based on the at least two TCI states comprising the first TCI state and the second TCI state. At least one first DM-RS port of the downlink resource (e.g., PDSCH resource) may be quasi co-located with the at least one first RS with respect to the first QCL type (e.g., indicated by the first TCI state). At least one second DM-RS port of the downlink resource (e.g., PDSCH resource) may be quasi co-located with the at least one second RS with respect to the second QCL type (indicated by the second TCI state). At least one first DM-RS port of the downlink resource (e.g., PDSCH resource) may be quasi co-located with the at least one first RS (e.g., as indicated by the first TCI state). At least one second DM-RS port of the downlink resource (e.g., PDSCH resource) may be quasi co-located with the at least one second RS (e.g., as indicated by the second TCI state).

The wireless device may receive the downlink message 2806 (e.g., PDSCH message) based on at least two QCL assumptions comprising a first QCL assumption and a second QCL assumption. The first QCL assumption may indicate at least one first RS (e.g., SS/PBCH block, CSI-RS, RS-1, etc.). The second QCL assumption may indicate at least one second RS (e.g., SS/PBCH block, CSI-RS, RS-3, etc.) The receiving the downlink message 2806 (PDSCH message) based on the at least two QCL assumption comprising the first QCL assumption and the second QCL assumption may comprise that at least one first DM-RS port of the downlink resource (e.g., PDSCH resource) is quasi co-located with the at least one first RS and at least one second DM-RS port of the downlink resource (e.g., PDSCH resource) is quasi co-located with the at least one second RS.

The first QCL assumption may be indicated by a first TCI state index. The first QCL assumption may be indicated by a second TCI state index. The at least one first RS indicated by the first QCL assumption may be indicated by a first TCI state index (e.g., indicated by the one or more configuration parameters (e.g., ssb-Index, csi-RS-Index)). The at least one second RS indicated by the second QCL assumption may be indicated by a second TCI state index (e.g., indicated by the one or more configuration parameters (e.g., ssb-Index, csi-RS-Index)). The first TCI state may indicate the first QCL assumption. The second TCI state may indicate the second QCL assumption.

The one or more configuration parameters may indicate a control resource set (CORESET) configured with a TCI parameter (e.g., higher layer parameter, TCI-PresentInDCI) for a serving cell (e.g., PCell, SCell, SpCell, PsCell, etc.). The wireless device may receive the first DCI message in the CORESET. The first time offset 2812 may be equal to or greater than the first threshold 2810 (e.g., timeDurationForQCL, Threshold-Sched-Offset). The first time offset 2812 may be equal to or greater than the first threshold 2810. The TCI field in the first DCI message may indicate the at least two TCI states (e.g., the first TCI state and the second TCI state). The wireless device may determine/assume that at least one first DM-RS port of the downlink resource (e.g., PDSCH resource) may be quasi co-located with the at least one first RS with respect to the first QCL type. At least one second DM-RS port of the downlink resource (e.g., PDSCH) may be quasi co-located with the at least one second RS with respect to the second QCL type.

The one or more configuration parameters may indicate a control resource set (CORESET). The base station may not configure the CORESET with a TCI parameter (e.g., higher layer parameter, TCI-PresentInDCI). The wireless device may receive the first DCI message 2802 (e.g., DCI format 1_1, DCI format 1_0) in the CORESET. The first DCI message 2802 may not comprise a TCI field. The first DCI message 2802 may comprise a TCI field. The first time offset 2812 may be equal to or greater than the first threshold 2810 (e.g., timeDurationForQCL, Threshold-Sched-Offset). The first time offset 2812 may be equal to or greater than the first threshold 2810. The first DCI message 2802 may be received in the CORESET without being configured with the TCI parameter (e.g., higher layer parameter, TCI-PresentInDCI). The wireless device may, in order to determine antenna port QCL for the downlink resource (e.g., PDSCH resource), determine at least two TCI states (or at least two QCL assumptions) for a reception of the downlink resource (e.g., PDSCH).

The one or more configuration parameters may indicate a control resource set (CORESET). The base station may not configure the CORESET with a TCI parameter (e.g., higher layer parameter, TCI-PresentInDCI). The base station may configure the CORESET with TCI parameter (e.g., higher layer parameter, TCI-PresentInDCI). The wireless device may receive the first DCI message 2802 (e.g., DCI format 1_0) in the CORESET. The first DCI message 2802 may not comprise a TCI field. The first time offset 2812 may be equal to or greater than the first threshold 2810 (e.g., timeDurationForQCL, Threshold-Sched-Offset). The first time offset 2812 may be equal to or greater than the first threshold 2810. The first DCI message 2802 may not comprise the TCI field. The wireless device may, in order to determine antenna port QCL for the downlink message 2806 (e.g., PDSCH message), determine at least two TCI states (or at least two QCL assumptions) for a reception of the downlink message 2806 (e.g., PDSCH message).

The at least two TCI states may comprise a first TCI state and a second TCI state. The at least two QCL assumptions may comprise a first QCL assumption and a second QCL assumption. The wireless device may determine the at least two TCI states for the reception of the downlink message, (e.g., PDSCH message). The wireless device may assume that at least one first DM-RS port of the downlink resource 2806 (e.g., PDSCH resource) is quasi co-located with the at least one first RS with respect to the at least one first QCL type (indicated by the first TCI state). At least one second DM-RS port of the downlink resource (e.g., PDSCH resource) may be quasi co-located with the at least one second RS with respect to the at least one second QCL type (e.g., as indicated by the second TCI state). The wireless device may determine the at least two QCL assumptions for the reception of the downlink message 2806 (e.g., PDSCH message). The wireless device may assume that at least one first DM-RS port of the downlink resource (e.g., PDSCH resource) may be quasi co-located with the at least one first RS (indicated by the first QCL assumption). At least one second DM-RS port of the downlink resource (e.g., PDSCH resource) may be quasi co-located with the at least one second RS (e.g., as indicated by the second QCL assumption).

The one or more configuration parameters may indicate a control resource set (CORESET). The one or more configuration parameters may indicate a second CORESET. The wireless device may determine the first TCI state (or the first QCL assumption) of the at least two TCI states (or the at least two QCL assumptions) based on the CORESET. The wireless device may determine the second TCI state (or the second QCL assumption) of the at least two TCI states (or the at least two QCL assumptions), for example, based on the second CORESET. The one or more configuration parameters may indicate a CORESET index (e.g., CORESETID) for the CORESET. The CORESET may be indicated by the CORESET index. The one or more configuration parameters may indicate a second CORESET index (e.g., CORESETID) for the second CORESET. The second CORESET may be indicated by the second CORESET index.

The base station may configure the CORESET with a third TCI state (e.g., via a first TCI parameter (e.g., higher layer parameter, tci-StatesPDCCH-ToAddList), and/or a second TCI parameter (e.g., higher layer parameter, tci-StatesPDCCH-ToReleaseList or UE-specific PDCCH MAC CE)). The wireless device may receive a downlink signal (e.g., DCI message, PDCCH message) in the CORESET indicating a third QCL assumption. The base station may configure the second CORESET with a fourth TCI state (e.g., via a first TCI parameter (e.g., higher layer parameter, tci-StatesPDCCH-ToAddList), and/or a second TCI parameter (e.g., higher layer parameter, tci-StatesPDCCH-ToReleaseList, UE-specific PDCCH MAC CE)). The wireless device may receive a downlink signal (e.g., DCI message, PDCCH message) via the second CORESET with a fourth QCL assumption. The third TCI state (or the third QCL assumption) may indicate at least one third RS (e.g., RS-2). The third TCI state may indicate at least one third QCL type. At least one third DM-RS port of a first downlink resource (e.g., PDCCH resource) in the CORESET may be quasi co-located with the at least one third RS with respect to the at least one third QCL type. The fourth TCI state (or the fourth QCL assumption) may indicate at least one fourth RS (e.g., RS-4). The fourth TCI state may indicate at least one fourth QCL type. At least one fourth DM-RS port of a second downlink resource (e.g., PDCCH resource) in the second CORESET may be quasi co-located with the at least one fourth RS with respect to the at least one fourth QCL type.

The wireless device may determine the first TCI state (or the first QCL assumption) of the at least two TCI states (or the at least two QCL assumptions), for example, based on the CORESET. The first TCI state (or the first QCL assumption) may be same/similar as the third TCI state (or the third QCL assumption) of the CORESET. The first TCI state may be the same/similar as the third TCI state (or the third QCL assumption). The wireless device may determine that at least one first DM-RS port of the downlink resource (e.g., PDSCH resource) is quasi co-located with the at least one third RS (indicated by the third TCI state or the third QCL assumption).

The wireless device may determine the second TCI state (or the second QCL assumption), for example, based on the second CORESET. The second TCI state (or the second QCL assumption) may be same/similar as the fourth TCI state (or the fourth QCL assumption) of the second CORESET. The second TCI state may be the same/similar as the fourth TCI state (or the fourth QCL assumption). The wireless device may determine that at least one second DM-RS port of the downlink resource (e.g., PDSCH resource) is quasi co-located with the at least one fourth RS (indicated by the fourth TCI state or the fourth QCL assumption).

The one or more configuration parameters may indicate one or more aperiodic channel state information (CSI) trigger states (e.g., by a CSI parameter (e.g., higher layer parameter, CSI-AperiodicTriggerStateList)). The one or more configuration parameters may indicate state-specific indices for the one or more aperiodic CSI trigger states. Each aperiodic CSI trigger state of the one or more aperiodic CSI trigger states may be indicated by a state-specific index of the state-specific indices. An aperiodic CSI trigger state of the one or more aperiodic CSI trigger states may be indicated by a state-specific index. A first aperiodic CSI trigger state of the one or more aperiodic CSI trigger states may be indicated by a first state-specific index of the state-specific indices. A second aperiodic CSI trigger state of the one or more aperiodic CSI trigger states may be indicated by a second state-specific index of the state-specific indices.

The wireless device may receive a second DCI message. The wireless device may receive the second DCI message in a second downlink message 2804 (e.g., PDCCH-2). The wireless device may receive the second DCI when monitoring the second downlink channel (e.g., PDCCH). The second DCI message may comprise a CSI request field. The CSI request field may indicate/trigger/initiate an aperiodic CSI trigger state (e.g., indicating an aperiodic CSI-RS 2808) of the one or more aperiodic CSI trigger states. The CSI request field indicating/triggering/initiating the aperiodic CSI trigger state may comprise that the CSI request field is equal to a state-specific index of the aperiodic CSI trigger state.

The aperiodic CSI trigger state may comprise one or more report configurations (e.g., a list of NZP-CSI-RS-Resource-Set). A report configuration (e.g., NZP-CSI-RS-Resource-Set) of the one or more report configurations may comprise one or more CSI-RS resources (e.g., aperiodic CSI-RS resources, NZP-CSI-RS-Resources).

The base station may not configure the report configuration with a TRS parameter (e.g., higher layer parameter, trs-Info). The base station may not configure the report configuration with a parameter repetition. A scheduling offset 2814 (e.g., Offset-2) between a last symbol of the second downlink resource (e.g., PDCCH resource) carrying the second DCI message and a first symbol of at least one CSI-RS resource of the one or more CSI-RS resources in the report configuration may be smaller than a second threshold 2816 (e.g., beamSwitchTiming, Threshold-2). The wireless device may report the second threshold 2816 (e.g., to the base station). The second threshold 2816 may comprise a first value (e.g., 14, 28, 48, etc. symbols).

The wireless device may receive the downlink message 2806 (e.g., PDSCH message) in one or more first symbols. The wireless device may receive an aperiodic CSI-RS 2808 for the at least one aperiodic CSI-RS resource in one or more second symbols. The one or more first symbols and the one or more second symbols may overlap 2818 (e.g., fully or partially). The downlink message 2806 (e.g., PDSCH message) and the aperiodic CSI-RS 2808 (or the at least one aperiodic CSI-RS resource) may overlap (e.g., overlap), for example, based on the one or more first symbols and the one or more second symbols overlapping.

The downlink message 2806 (e.g., PDSCH message) and the aperiodic CSI-RS 2808 (or the at least one aperiodic CSI-RS resource) may overlap 2818 in a time duration. The time duration may comprise at least one symbol. The time duration may comprise at least one slot. The time duration may comprise at least one subframe. The time duration may comprise at least one mini-slot. The time duration may comprise the one or more second symbols. The time duration may comprise the one or more first symbols.

The wireless device may determine that the downlink message 2806 (e.g., PDSCH) and the at least one aperiodic CSI-RS resource of the aperiodic CSI trigger state overlap 2818 (e.g., overlap in time duration partially or fully). The wireless device may select a selected RS among the at least one first RS and the at least one second RS, for example, based on determining that the downlink message 2806 (e.g., PDSCH) and the at least one aperiodic CSI-RS 2808 (e.g., CSI-RS resource) overlap 2818 and/or the first TCI state index and the second TCI state index.

The wireless device may select the selected RS, for example, based on the first TCI state index and the second TCI state index. The wireless device may compare the first TCI state index and the second TCI state index. The wireless device may determine that the first TCI state index is lower (or higher) than the second TCI state index, for example, based on the comparison. The selected RS may comprise the at least one first RS indicated by the first TCI state (or the first QCL assumption) based on the first TCI state index being lower (or higher) than the second TCI state index. The selected RS may comprise the at least one second RS indicated by the second TCI state (or the second QCL assumption) based on the first TCI state index being lower (or higher) than the second TCI state index.

The wireless device may apply the selected RS when receiving the aperiodic CSI-RS 2808 for the at least one aperiodic CSI-RS resource, for example, based on the selecting the selected RS. The wireless device may receive the aperiodic CSI-RS 2808 for the at least one aperiodic CSI-RS resource with the selected RS, for example, based on the selecting the selected RS.

The at least one aperiodic CSI-RS resource may be associated with a fifth TCI state of the one or more TCI-State configurations. The fifth TCI state may indicate at least one fifth RS. The fifth TCI state may indicate at least one fifth QCL type. The wireless device may receive the aperiodic CSI-RS 2808 of the at least one aperiodic CSI-RS resource, for example, with the at least one fifth RS with respect to the at least one fifth QCL type.

The first TCI state (or the first QCL assumption indicated by the first TCI state) and the fifth TCI state (or a fifth QCL assumption indicated by the fifth TCI state) may be different. The wireless device may not receive the downlink message 2806 (e.g., PDSCH message) based on the first TCI state and the aperiodic CSI-RS 2808 (e.g., in the overlapped time duration) simultaneously. The at least one first RS and the at least one fifth RS may be different. The at least one first RS and the at least one fifth RS may not be quasi co-located.

The second TCI state (or the second QCL assumption indicated by the second TCI state) and the fifth TCI state (or a fifth QCL assumption indicated by the fifth TCI state) may be different. The wireless device may not receive the downlink message 2806 (e.g., PDSCH message) based on the second TCI state and the aperiodic CSI-RS 2808 (e.g., in the overlapped time duration) simultaneously. The at least one second RS and the at least one fifth RS may be different. The at least one second RS and the at least one fifth RS may not be quasi co-located.

A wireless device may receive a downlink signal/channel message 2806 (e.g., PDSCH message) with a plurality of QCL assumptions (or a plurality of TCI States) simultaneously. A quantity of the plurality of QCL assumptions (or the plurality of TCI States) may depend on wireless device capability (e.g., a quantity of TRPs serving the wireless device). The wireless device may be equipped with a plurality of sending/receiving antenna panels. The quantity of the plurality of QCL assumptions (or the plurality of TCI States) may be equal to a quantity of the plurality of sending/receiving antenna panels (or any other value). The wireless device may be served with a plurality of TRPs (e.g., TRP-1, TRP-2). The quantity of the plurality of QCL assumptions (or the plurality of TCI States) may be equal to a quantity of the plurality of TRPs (or any other value). A first QCL assumption (or a first TCI state) (e.g., RS-1) of the plurality of QCL assumptions (or the plurality of TCI States) may be associated with a first TRP (e.g., TRP-1) of the plurality of TRPs. A second QCL assumption (or a second TCI state, e.g., RS-3) of the plurality of QCL assumptions (or the plurality of TCI States) may be associated with a second TRP (e.g., TRP-2) of the plurality of TRPs. A QCL assumption (or a TCI state) may be associated with a TRP. The wireless device may receive a downlink message 2806 (e.g., PDSCH message) sent by the TRP based on the QCL assumption (or the TCI state). At least one DM-RS port, sent by the TRP, of the downlink signal/channel may be quasi co-located with at least one RS indicated by the QCL assumption (or the TCI state).

The downlink message 2806 (e.g., PDSCH message) may comprise one or more DM-RS groups. The one or more DM-RS groups may comprise a first DM-RS group and a second DM-RS group. The first DM-RS group may comprise the at least one first DM-RS port of the downlink message 2806 (e.g., PDSCH message). The second DM-RS group may comprise the at least one second DM-RS port of the downlink message 2806 (e.g., PDSCH message).

The one or more configuration parameters may indicate DM-RS-group-specific indices (e.g., indicated by a parameter) for the one or more DM-RS groups. Each DM-RS group of the one or more DM-RS groups may be indicated by a respective one DM-RS-group-specific index of the DM-RS-group-specific indices. The first DM-RS group may be indicated by a first DM-RS-group-specific index. The second DM-RS group may be indicated by a second DM-RS-group-specific index. The at least one first DM-RS port of the downlink message 2806 (e.g., PDSCH message) and the at least one second DM-RS port of the downlink message 2806 (e.g., PDSCH message) may be sent by a first TRP (e.g., TRP-1) and a second TRP (e.g., TRP-2), respectively.

The plurality of TRPs (e.g., TRP-1, TRP-2 in FIG. 28) may serve the wireless device. The wireless device may receive the first DCI message from a first TRP (e.g., TRP-1) of the plurality of TRPs. The wireless device may receive the first DCI message from a second TRP (e.g., TRP-2) of the plurality of TRPs. The first QCL assumption (or the first TCI state, e.g., RS-1) may be associated with the first TRP. The second QCL assumption (or the second TCI state, e.g., RS-3) may be associated with the second TRP. The wireless device may receive the downlink message 2806 (e.g., PDSCH) based on the at least two TCI states comprising the first TCI state and the second TCI state. The wireless device may receive the downlink message 2806 (e.g., PDSCH) based on at least two QCL assumptions comprising the first QCL assumption and the second QCL assumption.

The wireless device may determine that the downlink resource (e.g., PDSCH resource) and the at least one aperiodic CSI-RS resource overlap. The wireless device may select a selected RS among the at least one first RS and the at least one second RS, for example, based on determining/selecting a selected TRP among the plurality of the TRPs. The selected TRP may send (e.g., transmit) the first DCI message.

The wireless device may determine that the first TRP of the plurality of TRPs sends (e.g., transmits) the first DCI message. The wireless device may determine that the selected RS is the at least one first RS sent (e.g., transmitted) by the first TRP, for example, based on determining that the first TRP sends (e.g., transmits) the first DCI message. The wireless device may determine that the second TRP of the plurality of TRPs sends (e.g., transmits) the first DCI message. The wireless device may determine that the selected RS is the at least one second RS was sent (e.g., transmitted) by the second TRP, for example, based on determining that the second TRP sends (e.g., transmits) the first DCI message.

The wireless device may select a selected RS among the at least one third RS and the at least one fourth RS based on the CORESET index and the second CORESET index, for example, based on determining that the downlink resource (e.g., PDSCH resource) and the at least one aperiodic CSI-RS resource overlap 2808. The wireless device may compare the CORESET index and the second CORESET index. The wireless device may determine that the CORESET index is lower (or higher) than the second CORESET index, for example, based on the comparing. The wireless device may select the selected RS, for example, based on the CORESET state index and the second CORESET index. The selected RS may comprise the at least one third RS indicated by the third TCI state (or the third QCL assumption) of the CORESET, for example, based on the CORESET index being lower (or higher) than the second CORESET index. The wireless device may select the selected RS, for example, based on the CORESET index and the second CORESET index. The selected RS may comprise the at least one fourth RS indicated by the fourth TCI state (or the fourth QCL assumption) of the second CORESET, for example, based on the CORESET index being lower (or higher) than the second CORESET index.

The plurality of TRPs (e.g., TRP-1, TRP-2) may serve the wireless device. The wireless device may receive the aperiodic CSI-RS 2808 from a first TRP (e.g., TRP-1) of the plurality of TRPs. The wireless device may receive the aperiodic CSI-RS from a second TRP (e.g., TRP-2) of the plurality of TRPs. The first QCL assumption (or the first TCI state, e.g., RS-1) may be associated with the first TRP. The second QCL assumption (or the second TCI state, e.g., RS-3) may be associated with the second TRP. The wireless device may receive the downlink message 2806 (e.g., PDSCH message) based on the at least two TCI states comprising the first TCI state and the second TCI state. The wireless device may receive the downlink message 2806 (e.g., PDSCH message) based on at least two QCL assumptions comprising the first QCL assumption and the second QCL assumption.

The wireless device may determine that the downlink resource (e.g., PDSCH resource) and the at least one aperiodic CSI-RS resource overlap. The wireless device may select a selected RS among the at least one first RS and the at least one second RS, for example, based on determining/selecting a selected TRP among the plurality of the TRPs. The selected TRP may send (e.g., transmit) the aperiodic CSI-RS 2808.

The wireless device may determine that the first TRP of the plurality of TRPs sends (e.g., transmits) the aperiodic CSI-RS 2808. The wireless device may determine that the selected RS is the at least one first RS sent (e.g., transmitted) by the first TRP. The wireless device may determine that the second TRP of the plurality of TRPs sends (e.g., transmits) the aperiodic CSI-RS. The wireless device may determine that the selected RS is the at least one second RS sent (e.g., transmitted) by the second TRP.

A wireless device may receive (e.g., from a base station) a first DCI message scheduling a first downlink message 2806 (e.g., PDSCH message). The first DCI message may comprise a first TCI field. The first TCI field may indicate a first TCI state indicating at least one first RS and/or a first QCL type. The wireless device may receive the first downlink message 2806 (e.g., PDSCH message) based on the first TCI state. At least one first DM-RS port of the first downlink resource (e.g., PDSCH resource) may be quasi co-located with the at least one first RS with respect to the first QCL type (indicated by the first TCI state).

The wireless device may receive the first downlink message 2806 (e.g., PDSCH message) based on a first QCL assumption. The first QCL assumption may indicate at least one first RS. At least one first DM-RS port of the first downlink message 2806 (e.g., PDSCH message) may be quasi co-located with the at least one first RS.

The wireless device may receive (e.g., from the base station) a second DCI message scheduling a second downlink message (e.g., PDSCH message). The second DCI message may comprise a second TCI field. The second TCI field may indicate a second TCI state indicating at least one second RS and/or a second QCL type. The wireless device may receive the second downlink message (e.g., PDSCH message) based on the second TCI state. At least one second DM-RS port of the second downlink message (e.g., PDSCH message) may be quasi co-located with the at least one second RS with respect to the second QCL type (indicated by the second TCI state).

The wireless device may receive the second downlink message (e.g., PDSCH message) based on a second QCL assumption. The second QCL assumption may indicate at least one second RS. At least one second DM-RS port of the second downlink resource (e.g., PDSCH resource) may be quasi co-located with the at least one second RS.

The wireless device may receive (e.g., from the base station) one or more messages comprising one or more configuration parameters for a serving cell (e.g., PCell, SCell, PsCell, SpCell, etc.). The one or more configuration parameters may indicate one or more control resource sets (CORESETs) comprising a CORESET and a second CORESET. The one or more configuration parameters may indicate CORESET-specific indices for the one or more CORESETs. Each CORESET of the one or more CORESETs may be indicated by a respective one CORESET-specific index of the CORESET-specific indices. The CORESET of the one or more CORESETs may be indicated by a CORESET-specific index. The second CORESET of the one or more CORESETs may be indicated by a second CORESET-specific index.

The wireless device may receive the first DCI in the CORESET. The wireless device may receive the third DCI in the second CORESET. The wireless device may receive a third DCI. The third DCI may comprise a CSI request field. The CSI request field may indicate/trigger/initiate the aperiodic CSI trigger state (e.g., Aperiodic CSI-RS) of the one or more aperiodic CSI trigger states.

The first downlink resource (e.g., PDSCH resource), the second downlink resource (e.g., PDSCH resource) and the aperiodic CSI-RS (or the at least one aperiodic CSI-RS resource) may overlap (e.g., partially, fully) in a time duration. The time duration may comprise at least one symbol. The time duration may comprise at least one slot. The time duration may comprise at least one subframe. The time duration may comprise at least one mini-slot. The wireless device may determine that the first downlink resource (e.g., PDSCH resource), the second downlink resource (e.g., PDSCH resource) and the at least one aperiodic CSI-RS resource of the aperiodic CSI trigger state overlap (e.g., in the time duration, partially, fully). The wireless device may select a selected RS among the at least one first RS and the at least one second RS, for example, based on the CORESET index and the second CORESET index.

The wireless device may select the selected RS, for example, based on the CORESET index and the second CORESET index. The wireless device may compare the CORESET index and the second CORESET index. The wireless device may determine that the CORESET index is lower (or higher) than the second CORESET index, for example, based on the comparing. The wireless device may select the selected RS, for example, based on the CORESET state index. The selected RS may comprise the at least one first RS indicated by the first TCI state (or the first QCL assumption) of the CORESET, for example, based on the CORESET index being lower (or higher) than the second CORESET index. The wireless device may select the selected RS, for example, based on the CORESET index and the second CORESET index. The selected RS may comprise the at least one second RS indicated by the second TCI state (or the second QCL assumption) of the second CORESET, for example, based on the CORESET index being lower (or higher) than the second CORESET index. The wireless device may apply the selected RS when receiving the aperiodic CSI-RS, for example, based on the selecting the selected RS.

Figure 29:
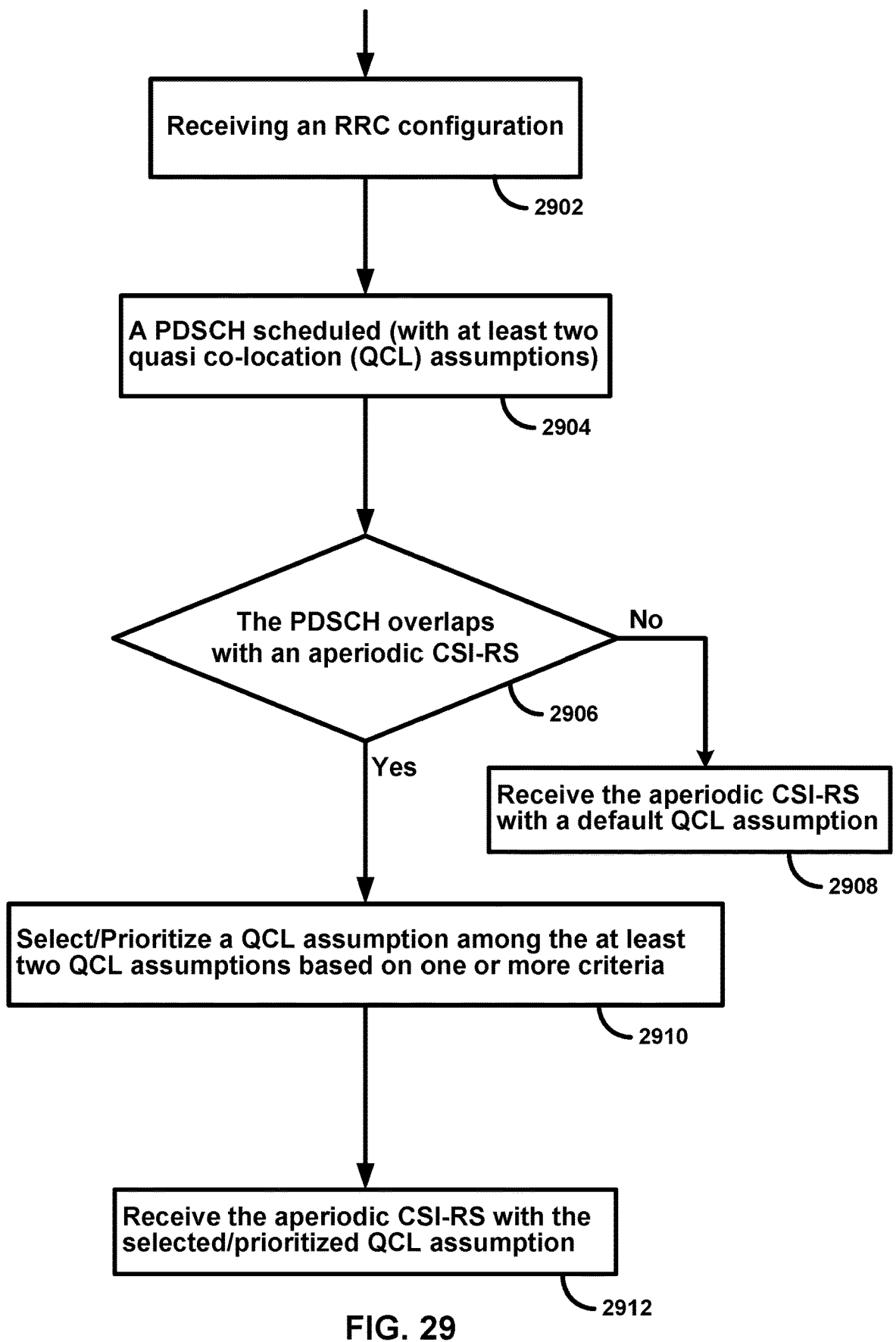
FIG. 29 shows an example procedure of managing overlap between a downlink message and a CSI-RS.

FIG. 29 shows an example procedure of managing, by a wireless device, overlap between a downlink message and a CSI-RS. In step 2902, the wireless device may receive an RRC configuration. In step 2904, the wireless device may determine that the downlink message (e.g., PDSCH message) is scheduled with at least two QCL assumptions. In step 2906, the wireless device may determine that the downlink message (e.g., PDSCH message) overlaps with an aperiodic CSI-RS. In step 2910, the wireless device may select/prioritize a QCL assumption among the at least two QCL assumptions, for example, based on one or more criteria (e.g., criteria described in conjunction with FIG. 28). In step 2912, the wireless device may receive the aperiodic CSI-RS with the selected/prioritized QCL assumption. Alternatively, in step 2906, the wireless device may determine that the downlink message (e.g., PDSCH message) does not overlap with an aperiodic CSI-RS. In step 2910, the wireless device may receive the aperiodic CSI-RS with a default QCL assumption.

Figure 30:
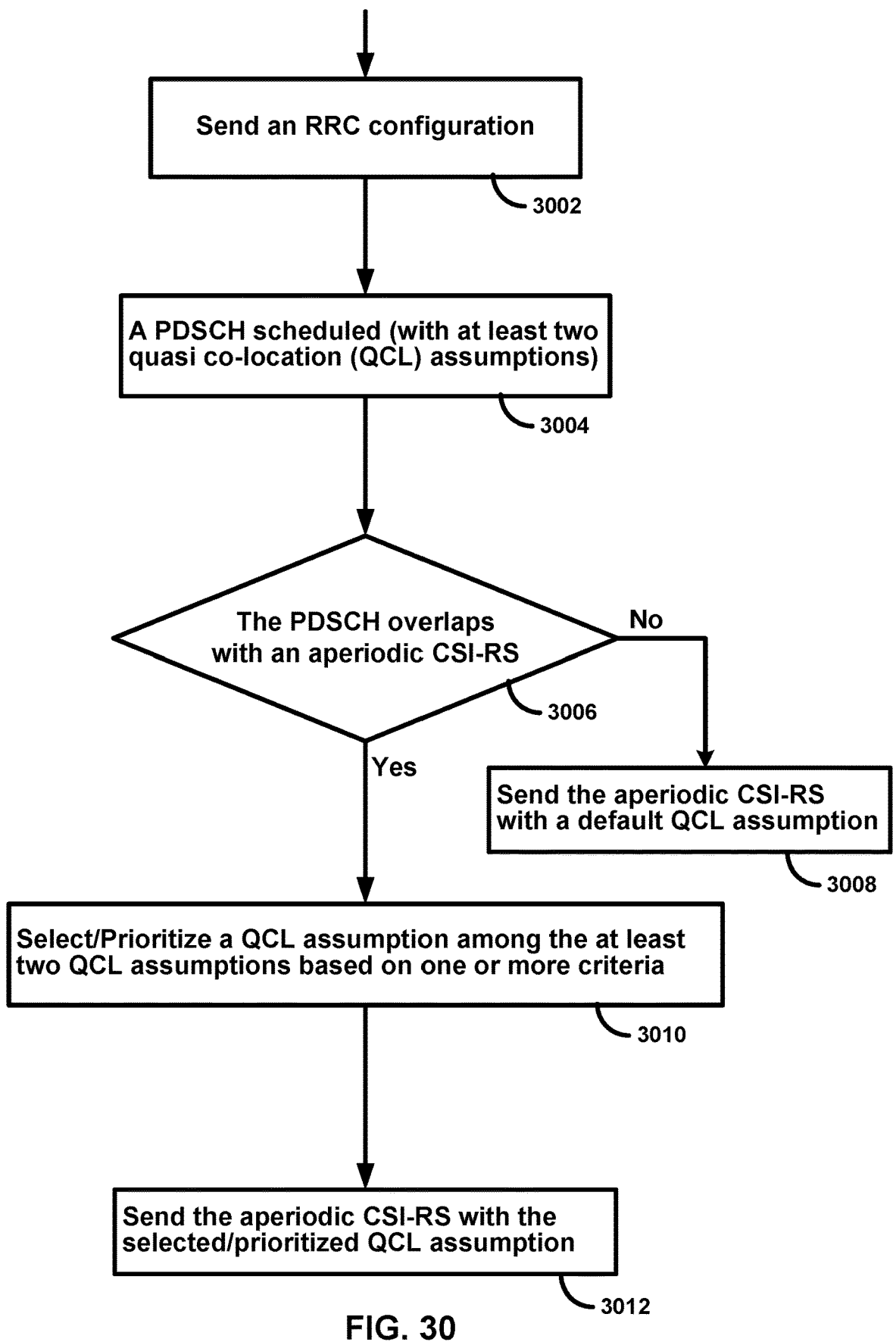
FIG. 30 shows an example procedure of managing overlap between a downlink message and a CSI-RS.

FIG. 30 shows an example procedure of managing, by a base station, overlap between a downlink message and a CSI-RS. In step 3002, the base station may send an RRC configuration. In step 3004, the base station may determine that a downlink message (e.g., PDSCH message) is scheduled with at least two QCL assumptions. In step 3006, the base station may determine that the downlink message (e.g., PDSCH message) overlaps with an aperiodic CSI-RS. In step 3010, the base station may select/prioritize a QCL assumption among the at least two QCL assumptions, for example, based on one or more criteria (e.g., criteria described in conjunction with FIG. 28). In step 3012, the base station may send the aperiodic CSI-RS with the selected/prioritized QCL assumption. Alternatively, in step 3006, the base station may determine that the downlink message (e.g., PDSCH message) does not overlap with an aperiodic CSI-RS. In step 3010, the base station may send the aperiodic CSI-RS with a default QCL assumption.

A wireless device may perform a method comprising multiple operations. The wireless device may receive, from a base station, configuration parameters for a first antenna panel of a plurality of antenna panels of a wireless device. The wireless device may activate the first antenna panel. The wireless device may deactivate the first antenna panel. The wireless device may send, via an uplink resource, a message comprising an indication that the first antenna panel is deactivated.

The wireless device may also perform one or more additional operations. The wireless device may receive an uplink grant indicating the uplink resource of an uplink shared channel for transmission of the message. The message may comprise a medium access control control element (MAC CE). The indication may comprise a field comprising a value indicating that the first antenna panel is deactivated. The indication may comprise a field comprising a first antenna panel index of the first antenna panel. The wireless device may receive one or more messages comprising one or more configuration parameters associated with scheduling resources for one or more messages. The message may comprise an uplink control channel message. The deactivating the first antenna panel may be based on an expiry of an inactivity timer, a downlink signal comprising a second indication to deactivate the first antenna panel, activating a second antenna panel, or completing reception of a scheduled message via the first antenna panel.

Systems, devices and media may be configured with the method. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to receive the indication that the first antenna panel is deactivated. A computer-readable medium may store instructions that, when executed, cause performance of the described method, additional operations and/or include the additional elements.

A base station may perform a method comprising multiple operations. The base station may send, to a wireless device, configuration parameters for a first antenna panel of a plurality of antenna panels of the wireless device. The base station may send, via the first antenna panel, a first message. The base station may receive, from the wireless device, a second message comprising an indication that the first antenna panel is deactivated. The base station may send, based on the second message, one or more messages to the wireless device via one or more other antenna panels.

The wireless device may also perform one or more additional operations. The second message may comprise an uplink control channel message. The second message may comprise a medium access control control element (MAC CE). The base station may suspend a configured uplink grant for the first antenna panel. The base station may stop sending, based on the second message, downlink shared channel messages (DL-SCH) via the first antenna panel. The base station may suspend, based on deactivating the first antenna panel, a sounding reference signal (SRS) resource configuration for the first antenna panel. The base station may abort, based on the indication that the first antenna panel is deactivated, a beam failure recovery procedure.

Systems, devices and media may be configured with the method. A base station may comprise one or more processors; and memory storing instructions that, when executed by the one or more processors, cause the base station to perform the described method, additional operations and/or include the additional elements. A system may comprise a base station configured to perform the described method, additional operations and/or include the additional elements; and a wireless device configured to send the indication that the first antenna panel is deactivated. A computer-readable medium may store instructions that, when executed, cause performance of the described method, additional operations and/or include the additional elements.

A wireless device may perform a method comprising multiple operations. The wireless device may receive, by a wireless device, one or more messages comprising one or more configuration parameters to schedule resources for one or more messages. The wireless device may deactivate a first antenna panel of a plurality of antenna panels of the wireless device. The wireless device may send, based on the one or more configuration parameters, a message indicating that the first antenna panel is deactivated.

The wireless device may also perform one or more additional operations. The one or more configuration parameters may indicate that the message comprises at least one of: a periodic message, a semi-persistent message, or an aperiodic message. The message may comprise a field indicating that the first antenna panel is deactivated. The message may comprise capability indications. The one or more configuration parameters may further comprise at least one configuration parameter for the first antenna panel. The message may be a channel state information (CSI) report for a second antenna panel that is activated.

Systems, devices and media may be configured with the method. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station device configured to receive the message indicating that the first antenna panel is deactivated. A computer-readable medium may store instructions that, when executed, cause performance of the described method, additional operations and/or include the additional elements.

Figure 31:
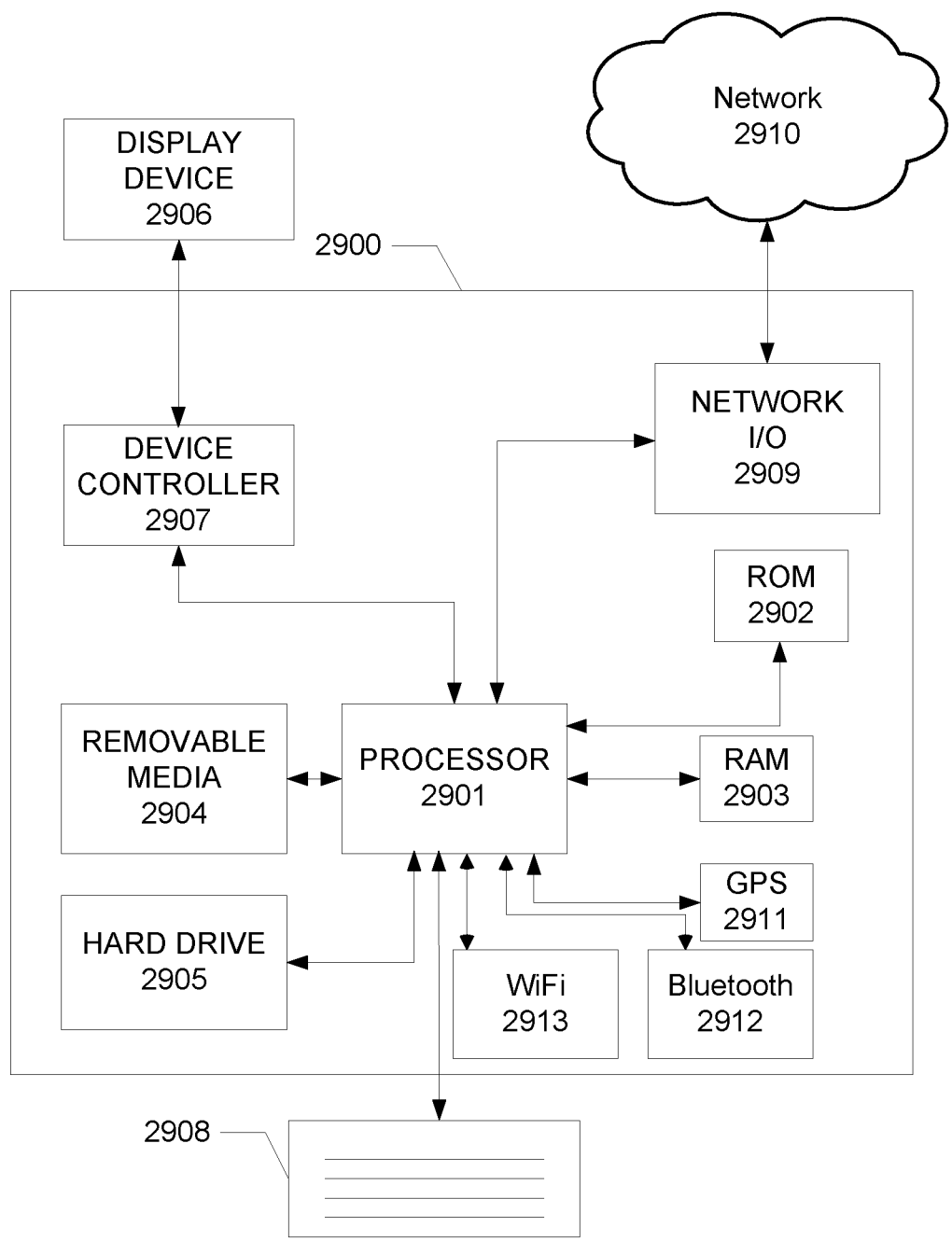
FIG. 31 shows example elements of a computing device that may be used to implement any of the various devices described herein.

FIG. 31 shows example elements of a computing device that may be used to implement any of the various devices described herein, including, e.g., the base station 120A and/or 120B, the wireless device 110 (e.g., 110A and/or 110B), or any other base station, wireless device, or computing device described herein. The computing device 3100 may include one or more processors 3101, which may execute instructions stored in the random-access memory (RAM) 3103, the removable media 3104 (such as a Universal Serial Bus (USB) drive, compact disk (CD) or digital versatile disk (DVD), or floppy disk drive), or any other desired storage medium. Instructions may also be stored in an attached (or internal) hard drive 3105. The computing device 3100 may also include a security processor (not shown), which may execute instructions of one or more computer programs to monitor the processes executing on the processor 3101 and any process that requests access to any hardware and/or software components of the computing device 3100 (e.g., ROM 3102, RAM 3103, the removable media 3104, the hard drive 3105, the device controller 3107, a network interface 3109, a GPS 3111, a Bluetooth interface 3112, a WiFi interface 3113, etc.). The computing device 3100 may include one or more output devices, such as the display 3106 (e.g., a screen, a display device, a monitor, a television, etc.), and may include one or more output device controllers 3107, such as a video processor. There may also be one or more user input devices 3108, such as a remote control, keyboard, mouse, touch screen, microphone, etc. The computing device 3100 may also include one or more network interfaces, such as a network interface 3109, which may be a wired interface, a wireless interface, or a combination of the two. The network interface 3109 may provide an interface for the computing device 3100 to communicate with a network 3110 (e.g., a RAN, or any other network). The network interface 3109 may include a modem (e.g., a cable modem), and the external network 3110 may include communication links, an external network, an in-home network, a provider's wireless, coaxial, fiber, or hybrid fiber/coaxial distribution system (e.g., a DOCSIS network), or any other desired network. Additionally, the computing device 3100 may include a location-detecting device, such as a global positioning system (GPS) microprocessor 3111, which may be configured to receive and process global positioning signals and determine, with possible assistance from an external server and antenna, a geographic position of the computing device 3100.

The example in FIG. 31 may be a hardware configuration, although the components shown may be implemented as software as well. Modifications may be made to add, remove, combine, divide, etc. components of the computing device 3100 as desired. Additionally, the components may be implemented using basic computing devices and components, and the same components (e.g., processor 3101, ROM storage 3102, display 3106, etc.) may be used to implement any of the other computing devices and components described herein. For example, the various components described herein may be implemented using computing devices having components such as a processor executing computer-executable instructions stored on a computer-readable medium, as shown in FIG. 31. Some or all of the entities described herein may be software based, and may co-exist in a common physical platform (e.g., a requesting entity may be a separate software process and program from a dependent entity, both of which may be executed as software on a common computing device).

The disclosed mechanisms herein may be performed if certain criteria are met, for example, in a wireless device, a base station, a radio environment, a network, a combination of the above, and/or the like. Example criteria may be based on, for example, wireless device and/or network node configurations, traffic load, initial system set up, packet sizes, traffic characteristics, a combination of the above, and/or the like. If the one or more criteria are met, various examples may be used. It may be possible to implement examples that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
   receiving, by a wireless device, downlink control information (DCI) associated with an aperiodic channel state information reference signal (CSI-RS); and
   receiving, using a first transmission configuration indicator (TCI) state of at least two TCI states, the aperiodic CSI-RS, wherein using the first TCI state is based on:
      a scheduling offset, between a last symbol of the DCI and a first symbol of the aperiodic CSI-RS, being less than a threshold; and
      the aperiodic CSI-RS overlapping in time with a scheduled physical downlink shared channel (PDSCH) transmission that is indicated with the at least two TCI states.

2. The method of claim 1, wherein the at least two TCI states comprise the first TCI state and a second TCI state, and wherein the method further comprises receiving one or more configuration parameters that indicate the first TCI state and the second TCI state.

3. The method of claim 2, wherein the one or more configuration parameters comprise:
   a first TCI state index associated with the first TCI state; and
   a second TCI state index associated with the second TCI state.

4. The method of claim 1, further comprising:
   receiving one or more configuration parameters that indicate one or more aperiodic CSI trigger states; and
   receiving the aperiodic CSI-RS based on the one or more aperiodic CSI trigger states.

5. The method of claim 1, wherein the DCI comprises a TCI field that indicates the at least two TCI states.

6. The method of claim 1, wherein the threshold is associated with beam switching.

7. The method of claim 1, wherein each TCI state, of the at least two TCI states, is associated with a different index of a plurality of indices, and
   wherein the first TCI state is associated with a first index that comprises a lowest value of the plurality of indices.

8. A wireless device comprising:
   one or more processors; and
   memory storing instructions that, when executed by the one or more processors, cause the wireless device to:
      receive downlink control information (DCI) associated with an aperiodic channel state information reference signal (CSI-RS); and
      receive, using a first transmission configuration indicator (TCI) state of at least two TCI states, the aperiodic CSI-RS, wherein using the first TCI state is based on:
         a scheduling offset, between a last symbol of the DCI and a first symbol of the aperiodic CSI-RS, being less than a threshold; and
         the aperiodic CSI-RS overlapping in time with a scheduled physical downlink shared channel (PDSCH) transmission that is indicated with the at least two TCI states.

9. The wireless device of claim 8, wherein the at least two TCI states comprise the first TCI state and a second TCI state, and
   wherein the instructions, when executed by the one or more processors, cause the wireless device to receive one or more configuration parameters that indicate the first TCI state and the second TCI state.

10. The wireless device of claim 9, wherein the one or more configuration parameters comprise:
    a first TCI state index associated with the first TCI state; and
    a second TCI state index associated with the second TCI state.

11. The wireless device of claim 8, wherein the instructions, when executed by the one or more processors, cause the wireless device to:
    receive one or more configuration parameters that indicate one or more aperiodic CSI trigger states; and
    receive the aperiodic CSI-RS based on the one or more aperiodic CSI trigger states.

12. The wireless device of claim 8,
    wherein the DCI comprises a TCI field that indicates the at least two TCI states.

13. The wireless device of claim 8, wherein the threshold is associated with beam switching.

14. The wireless device of claim 8, wherein each TCI state, of the at least two TCI states, is associated with a different index of a plurality of indices, and
    wherein the first TCI state is associated with a first index that comprises a lowest value of the plurality of indices.

15. A system comprising:
    a wireless device; and
    a base station,
       wherein the base station is configured to:
          transmit, to the wireless device, downlink control information (DCI) associated with an aperiodic channel state information reference signal (CSI-RS); and
       wherein the wireless device is configured to:
          receive, using a first transmission configuration indicator (TCI) state of at least two TCI states, the aperiodic CSI-RS, wherein using the first TCI state is based on:

a scheduling offset, between a last symbol of the DCI and a first symbol of the aperiodic CSI-RS, being less than a threshold; and the aperiodic CSI-RS overlapping in time with a scheduled physical downlink shared channel (PDSCH) transmission that is indicated with the at least two TCI states.

16. The system of claim 15, wherein the at least two TCI states comprise the first TCI state and a second TCI state, and wherein the wireless device is configured to receive one or more configuration parameters that indicate the first TCI state and the second TCI state.

17. The system of claim 16, wherein the one or more configuration parameters comprise:

a first TCI state index associated with the first TCI state; and a second TCI state index associated with the second TCI state.

18. The system of claim 15, wherein the base station is configured to transmit one or more configuration parameters that indicate one or more aperiodic CSI trigger states; and wherein the wireless device is configured to receive the aperiodic CSI-RS based on the one or more aperiodic CSI trigger states.

19. The system of claim 15, wherein the DCI comprises a TCI field that indicates the at least two TCI states.

20. The system of claim 15, wherein each TCI state, of the at least two TCI states, is associated with a different index of a plurality of indices, and wherein the first TCI state is associated with a first index that comprises a lowest value of the plurality of indices.

* * * * *

UNITED STATES PATENT AND TRADEMARK OFFICE
CERTIFICATE OF CORRECTION

PATENT NO. : 11,632,758 B2
APPLICATION NO. : 17/493282
DATED : April 18, 2023
INVENTOR(S) : Cirik et al.

It is certified that error appears in the above-identified patent and that said Letters Patent is hereby corrected as shown below:

On the Title Page

Page 3, Column 1, Other Publications, Line 45:
Delete "ncorporated," and insert --incorporated,-- therefor Page 5, Column 1, Other Publications, Line 23:
Delete "ncorporated," and insert --incorporated,-- therefor In the Drawings Sheet 8 of 33, Fig. 8:
Delete "840" and insert --801-- therefor Sheet 8 of 33, Fig. 8:
Delete "830" and insert --804-- therefor Sheet 8 of 33, Fig. 8:
Delete "850" and insert --807-- therefor Sheet 8 of 33, Fig. 8:
Delete "810" and insert --806-- therefor Sheet 8 of 33, Fig. 8:
Delete "820" and insert --805-- therefor In the Specification Column 7, Detailed Description, Line 15:
After "security,", delete "¶"

Signed and Sealed this
Twenty-third Day of July, 2024

*Katherine Kelly Vidal*
Katherine Kelly Vidal
*Director of the United States Patent and Trademark Office*

CERTIFICATE OF CORRECTION (continued)
U.S. Pat. No. 11,632,758 B2

Column 11, Detailed Description, Line 26:
Delete "MasterinformationBlock" and insert --MasterInformationBlock-- therefor Column 13, Detailed Description, Line 25:
After "2", insert --120B-- therefor Column 13, Detailed Description, Line 53:
After "channel", insert --.-- therefor Column 31, Detailed Description, Line 29:
After "running", insert --.-- therefor Column 32, Detailed Description, Line 28:
Delete "1250," and insert --1240,-- therefor Column 33, Detailed Description, Line 12:
After "channel", insert --.-- therefor Column 36, Detailed Description, Line 67:
After "determining", insert --.-- therefor Column 49, Detailed Description, Lines 66-67:
After "beamSwitchTiming)", insert --.-- therefor Column 60, Detailed Description, Line 53:
Delete "activated/reactivated." and insert --activated/reactivated,-- therefor Column 60, Detailed Description, Line 53:
After "1614", insert --.-- therefor Column 68, Detailed Description, Line 60:
Delete "2022)." and insert --2202).-- therefor Column 78, Detailed Description, Line 19:
Delete "C0" and insert --$C_0$-- therefor Column 78, Detailed Description, Line 20:
Delete "C2" and insert --$C_2$-- therefor Column 96, Detailed Description, Line 42:
Delete "Lab VIEWMathScript." and insert --LabVIEWMathScript.-- therefor Column 97, Detailed Description, Lines 23-24:
After "manner", insert --.-- therefor